(12) United States Patent
Kister et al.

(10) Patent No.: US 12,285,012 B2
(45) Date of Patent: Apr. 29, 2025

(54) COMPOSITIONS COMPRISING PYRIDINE CARBOXYLATE HERBICIDES WITH ACETOLACTATE SYNTHASE (ALS) INHIBITOR HERBICIDES

(71) Applicant: Corteva Agriscience LLC, Indianapolis, IN (US)

(72) Inventors: Jeremy Kister, Carmel, IN (US); Norbert M. Satchivi, Carmel, IN (US)

(73) Assignee: CORTEVA AGRISCIENCE LLC, Indianapolis, IN (US)

( * ) Notice: Subject to any disclaimer, the term of this patent is extended or adjusted under 35 U.S.C. 154(b) by 733 days.

(21) Appl. No.: 17/289,416

(22) PCT Filed: Nov. 4, 2019

(86) PCT No.: PCT/US2019/059594
§ 371 (c)(1),
(2) Date: Apr. 28, 2021

(87) PCT Pub. No.: WO2020/096925
PCT Pub. Date: May 14, 2020

(65) Prior Publication Data
US 2023/0022569 A1    Jan. 26, 2023

Related U.S. Application Data

(60) Provisional application No. 62/756,745, filed on Nov. 7, 2018.

(51) Int. Cl.
| *A01N 43/40* | (2006.01) |
| *A01N 25/32* | (2006.01) |
| *A01N 43/50* | (2006.01) |
| *A01N 43/54* | (2006.01) |
| *A01N 43/90* | (2006.01) |
| *A01N 47/38* | (2006.01) |
| *A01P 13/00* | (2006.01) |

(52) U.S. Cl.
CPC ............. *A01N 43/40* (2013.01); *A01N 25/32* (2013.01); *A01N 43/50* (2013.01); *A01N 43/54* (2013.01); *A01N 43/90* (2013.01); *A01N 47/38* (2013.01); *A01P 13/00* (2021.08)

(58) Field of Classification Search
None
See application file for complete search history.

(56) References Cited

U.S. PATENT DOCUMENTS

| 4,044,140 | A | 8/1977 | Sherlock |
| 4,698,093 | A | 10/1987 | Lee et al. |
| 4,877,897 | A | 10/1989 | Swithenbank et al. |
| 9,179,676 | B2 | 11/2015 | Hoffmann et al. |
| 9,521,847 | B2 | 12/2016 | Satchivi et al. |
| 9,611,282 | B2 | 4/2017 | Eckelbarger et al. |
| 9,763,445 | B2 | 9/2017 | Satchivi et al. |
| 11,363,812 | B2 | 6/2022 | Wang et al. |
| 11,363,816 | B2 | 6/2022 | Kister et al. |
| 12,029,217 | B2 | 7/2024 | Satchivi et al. |
| 2003/0114311 | A1 | 6/2003 | Balko et al. |
| 2007/0093390 | A1* | 4/2007 | Witschel ............... A01N 43/90 504/136 |
| 2010/0137137 | A1 | 6/2010 | Rosinger et al. |
| 2011/0245157 | A1 | 10/2011 | Meng |
| 2015/0005156 | A1 | 1/2015 | Dash et al. |
| 2015/0005165 | A1 | 1/2015 | Hoffmann et al. |
| 2016/0073632 | A1 | 3/2016 | Satchivi et al. |
| 2016/0135457 | A1 | 5/2016 | Satchivi et al. |
| 2016/0135458 | A1 | 5/2016 | Satchivi et al. |
| 2017/0064955 | A1 | 3/2017 | Satchivi et al. |
| 2019/0069549 | A1 | 3/2019 | Satchivi et al. |
| 2019/0069550 | A1 | 3/2019 | Satchivi et al. |
| 2020/0068888 | A1 | 3/2020 | Kister et al. |
| 2021/0161135 | A1 | 6/2021 | Satchivi et al. |
| 2021/0352899 | A1 | 11/2021 | Kister et al. |
| 2021/0386068 | A1 | 12/2021 | Kister et al. |
| 2021/0392888 | A1 | 12/2021 | Satchivi et al. |
| 2021/0392889 | A1 | 12/2021 | Kister et al. |
| 2021/0392890 | A1 | 12/2021 | Kister et al. |

(Continued)

FOREIGN PATENT DOCUMENTS

| JP | S5268186 A | 6/1977 |
| WO | 03/011853 A1 | 2/2003 |

(Continued)

OTHER PUBLICATIONS

Examination Report of Pakistan Patent Application No. 330/2018, mailed May 9, 2018, 5 Pages Applicant: (Dow Agrosciences LLC, dated Aug. 16, 2019).
Extended European Search Report for European Application No. 18798826.6, mailed Nov. 25, 2020, 8 Pages.
International Preliminary Report on Patentability for International Application No. PCT/US2018/031004, mailed Nov. 21, 2019, 7 Pages.
International Preliminary Report on Patentability for International Application No. PCT/US2019/058779, mailed May 20, 2021, 9 Pages.
International Preliminary Report on Patentability for International Application No. PCT/US2019/058788, mailed May 20, 2021, 09 Pages.

(Continued)

*Primary Examiner* — Robert A Wax
*Assistant Examiner* — Andre Mach

(57) ABSTRACT

Disclosed herein are compositions comprising (a) a pyridine carboxylate herbicide or an agriculturally acceptable N-oxide, salt, or ester thereof and (b) an acetolactate synthase (ALS) inhibitor or an agriculturally acceptable salt or ester thereof. Also disclosed herein are methods of controlling undesirable vegetation, comprising applying to vegetation or an area adjacent the vegetation or applying in soil or water to control the emergence or growth of vegetation (a) a pyridine carboxylate herbicide or an agriculturally acceptable N-oxide, salt, or ester thereof and (b) an ALS inhibitor or an agriculturally acceptable salt or ester thereof.

18 Claims, No Drawings

(56) References Cited

U.S. PATENT DOCUMENTS

| | | |
|---|---|---|
| 2021/0392891 A1 | 12/2021 | Kister et al. |
| 2021/0392892 A1 | 12/2021 | Satchivi et al. |
| 2021/0400967 A1 | 12/2021 | Satchivi et al. |
| 2021/0400968 A1 | 12/2021 | Satchivi et al. |
| 2021/0400969 A1 | 12/2021 | Satchivi et al. |
| 2021/0400970 A1 | 12/2021 | Satchivi et al. |
| 2022/0000109 A1 | 1/2022 | Satchivi et al. |
| 2022/0000110 A1 | 1/2022 | Satchivi et al. |
| 2022/0007644 A1 | 1/2022 | Kister et al. |
| 2023/0009120 A1 | 1/2023 | Satchivi et al. |

FOREIGN PATENT DOCUMENTS

| | | | |
|---|---|---|---|
| WO | 2009029518 A2 | 3/2009 | |
| WO | 2013/014165 A1 | 1/2013 | |
| WO | 2013085991 A1 | 6/2013 | |
| WO | 2014018398 A1 | 1/2014 | |
| WO | 2014018402 A1 | 1/2014 | |
| WO | 2014018407 A1 | 1/2014 | |
| WO | 2014116910 A1 | 7/2014 | |
| WO | 2014116927 A1 | 7/2014 | |
| WO | 2014/151005 A1 | 9/2014 | |
| WO | 2016/044282 | 3/2016 | |
| WO | 2016044229 A2 | 3/2016 | |
| WO | 2016044276 A1 | 3/2016 | |
| WO | 2016044283 A1 | 3/2016 | |
| WO | WO-2016044285 A1 * | 3/2016 | ............ A01N 43/40 |
| WO | WO-2018208582 A1 * | 11/2018 | ............ A01N 43/40 |
| WO | 2019046666 A1 | 3/2019 | |
| WO | 2019046667 A1 | 3/2019 | |
| WO | 2019060366 A1 | 3/2019 | |
| WO | 2019195495 A1 | 10/2019 | |
| WO | 2019195496 A1 | 10/2019 | |
| WO | PCT/US2019/059594 | 3/2020 | |
| WO | PCT/US2019/059596 | 4/2020 | |
| WO | 2020096832 A1 | 5/2020 | |

OTHER PUBLICATIONS

International Preliminary Report on Patentability for International Application No. PCT/US2019/058795, mailed May 20, 2021, 9 Pages.
International Preliminary Report on Patentability for International Application No. PCT/US2019/059592, mailed May 20, 2021, 9 Pages.
International Preliminary Report on Patentability for International Application No. PCT/US2019/059594, mailed May 20, 2021, 09 Pages.
International Preliminary Report on Patentability for International Application No. PCT/US2019/059596, mailed May 20, 2021, 10 Pages.
International Preliminary Report on Patentability for International Application No. PCT/US2019/059599, mailed May 20, 2021, 10 Pages.
International Preliminary Report on Patentability for International Application No. PCT/US2019/059601, mailed May 20, 2021, 10 Pages.
International Preliminary Report on Patentability for International Application No. PCT/US2019/059604, mailed May 20, 2021, 9 Pages.
International Preliminary Report on Patentability for International Application No. PCT/US2019/059605, mailed May 20, 2021, 9 Pages.
International Preliminary Report on Patentability for International Application No. PCT/US2019/059606, mailed May 20, 2021, 9 Pages.
International Preliminary Report on Patentability for International Application No. PCT/US2019/059609, mailed May 20, 2021, 9 Pages.
International Preliminary Report on Patentability for International Application No. PCT/US2019/059612, mailed May 20, 2021, 9 Pages.
International Preliminary Report on Patentability for International Application No. PCT/US2019/059613, mailed May 20, 2021, 9 Pages.
International Preliminary Report on Patentability for International Application No. PCT/US2019/059615, mailed May 20, 2021, 10 Pages.
International Preliminary Report on Patentability for International Application No. PCT/US2019/059617, mailed May 20, 2021, 9 Pages.
International Search Report and Written Opinion for International Application No. PCT/US2014/024745, mailed Jul. 7, 2014, 9 Pages.
International Search Report and Written Opinion for International Application No. PCT/US2018/031004, mailed Jul. 26, 2018, 8 Pages.
International Search Report and Written Opinion for International Application No. PCT/US2019/058779, mailed Feb. 19, 2020, 11 Pages.
International Search Report and Written Opinion for International Application No. PCT/US2019/058788, mailed Feb. 19, 2020, 11 Pages.
International Search Report and Written Opinion for International Application No. PCT/US2019/058795, mailed Feb. 19, 2020, 11 Pages.
International Search Report and Written Opinion for International Application No. PCT/US2019/059592, mailed Apr. 2, 2020, 12 Pages.
International Search Report and Written Opinion for International Application No. PCT/US2019/059599, mailed Mar. 19, 2020, 13 Pages.
International Search Report and Written Opinion for International Application No. PCT/US2019/059601, mailed Apr. 2, 2020, 13 Pages.
International Search Report and Written Opinion for International Application No. PCT/US2019/059604, mailed Apr. 2, 2020, 12 Pages.
International Search Report and Written Opinion for International Application No. PCT/US2019/059605, mailed Mar. 19, 2020, 12 Pages.
International Search Report and Written Opinion for International Application No. PCT/US2019/059606, mailed Apr. 2, 2020, 12 Pages.
International Search Report and Written Opinion for International Application No. PCT/US2019/059609, mailed Apr. 2, 2020, 12 Pages.
International Search Report and Written Opinion for International Application No. PCT/US2019/059612, mailed Mar. 19, 2020, 12 Pages.
International Search Report and Written Opinion for International Application No. PCT/US2019/059613, mailed Mar. 9, 2020, 12 Pages.
International Search Report and Written Opinion for International Application No. PCT/US2019/059615, mailed Apr. 24, 2020, 13 Pages.
International Search Report and Written Opinion for International Application No. PCT/US2019/059617, mailed Apr. 2, 2020, 12 Pages.
Official Action for Eurasian Patent Application No. 201992666, dated Nov. 23, 2021 for Dow Agrosciences LLC, Dec. 9, 2019, 3 Pages.
Official Action for Eurasian Patent Application No. 201992666, dated Feb. 24, 2021 for Dow Agrosciences LLC, Dec. 9, 2019, 3 Pages.
Bonneville Power Administration., "Sulfentrazone Herbicide Fact Sheet," U.S. Department of Energy, 2004, pp. 1-9.
Van-Assche C. J., et al., "Photosystem Ii Inhibiting Chemicals: Molecular Interaction Between Inhibitors and a Common Target," Biochemical Responses Induced by Herbicides, ACS Publications, 1982, pp. 1-21.
Aim EC Herbicide label, FMC Corporation, May 2, 2017.
Bayer., "An Integrated Approach to Manage Weeds," Crop Science, Retrieved from Internet URL: , No Pagination, 2016, pp. 1-3.

(56) References Cited

OTHER PUBLICATIONS

Official Action for Eurasian Patent Application No. 201992666, dated Feb. 17, 2021 for Dow Agrosciences LLC, English Translation Received Feb. 24, 2021, 6 Pages.

Official Action for Eurasian Patent Application No. 210992666, dated Nov. 9, 2021 for Dow AgroSciences LLC, English Translation Received Nov. 23, 2021, 5 Pages.

\* cited by examiner

COMPOSITIONS COMPRISING PYRIDINE CARBOXYLATE HERBICIDES WITH ACETOLACTATE SYNTHASE (ALS) INHIBITOR HERBICIDES

CROSS REFERENCE TO RELATED APPLICATIONS

This application is the National Stage Entry of International Application No. PCT/US19/59594, filed on Nov. 4, 2019, which claims the benefit of priority of U.S. Provisional Application No. 62/756,745, filed Nov. 7, 2018, both of which are incorporated by reference herein in their entirety.

FIELD OF THE DISCLOSURE

The present disclosure includes compositions comprising (a) a pyridine carboxylate herbicide or an agriculturally acceptable N-oxide, salt, or ester thereof, and (b) an acetolactate synthase (ALS) inhibitor or an agriculturally acceptable salt or ester thereof. The present disclosure also relates to methods of controlling undesirable vegetation using the same.

BACKGROUND

Many recurring problems in agriculture involve controlling the growth of undesirable vegetation that can, for instance, negatively affect the growth of desirable vegetation. To help control undesirable vegetation, researchers have produced a variety of chemicals and chemical formulations effective in controlling such unwanted growth. However, there exists a need for new herbicides compositions and methods to control the growth of undesirable vegetation.

SUMMARY OF THE DISCLOSURE

Disclosed herein are compositions that may be used as herbicides, for example, in crops. The compositions may contain (a) a pyridine carboxylate herbicide or agriculturally acceptable N-oxide, salt, or ester thereof and (b) an acetolactate synthase inhibitor ("ALS inhibitor") or an agriculturally acceptable salt or ester thereof. The weight ratio of (a) to (b) can be from 1:3400 to 1200:1 (e.g., from 1:1700 to 600:1, from 1:280 to 160:1, from 1:10 to 16:1, from 1:14 to 10:1, or from 1:5 to 5:1).

In some aspects, the composition comprises (a) a pyridine carboxylate herbicide defined by Formula (I):

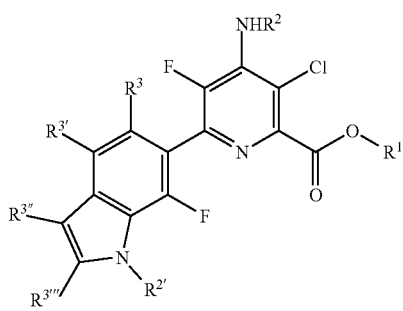

Formula I wherein:
$R^1$ is cyanomethyl or propargyl;
$R^2$ and $R^{2'}$ are independently hydrogen, $C_1$-$C_6$ alkyl, formyl, alkoxycarbonyl, or acyl;
$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide, salt, or ester thereof; and
(b) an ALS inhibitor or an agriculturally acceptable salt or ester thereof.

In some aspects, the composition comprises:
(a) the pyridine carboxylate herbicide compound cyanomethyl 4-amino-3-chloro-5-fluoro-6-(7-fluoro-1H-indol-6-yl)pyridine-2-carboxylate, referred to hereinafter as Compound A:

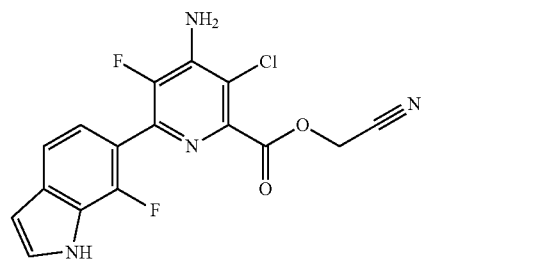

Compound A or an agriculturally acceptable N-oxide, salt, or ester thereof; and
(b) an ALS inhibitor or an agriculturally acceptable salt or ester thereof.

In some aspects, the composition comprises:
(a) the pyridine carboxylate herbicide compound propargyl 4-amino-3-chloro-5-fluoro-6-(7-fluoro-1H-indol-6-yl)pyridine-2-carboxylate, referred to hereinafter as Compound B:

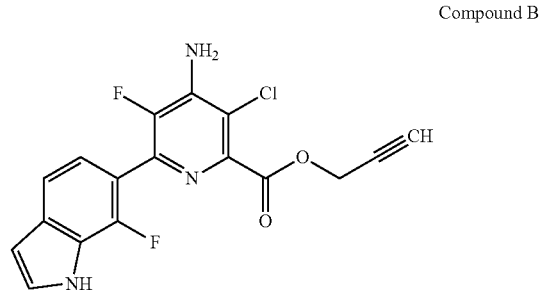 [SMILES: C#CCOC(=O)c1nc(-c2ccc3cc[nH]c3c2F)c(F)c(N)c1Cl]

Compound B or an agriculturally acceptable N-oxide, salt, or ester thereof; and
(b) an ALS inhibitor or an agriculturally acceptable salt or ester thereof.

In some aspects, (b) can comprise a triazolopyrimidine sulfonamide herbicide. In some aspects, (b) can include florasulam, cloransulam, diclosulam, flumetsulam, metosulam, penoxsulam, or pyroxsulam, agriculturally acceptable salts or esters thereof, or combinations thereof.

In some aspects, (b) can comprise an imidazolinone herbicide. In some aspects, (b) can include imazamethabenz, imazamox, imazapic, imazapyr, imazaquin, or imazethapyr, agriculturally acceptable salts or esters thereof, or combinations thereof.

In some aspects, (b) can comprise a pyrimidinyl oxybenzoate herbicide. In some aspects, (b) can include bispyribac, pyribenzoxim, pyriftalid, pyriminobac, pyrimisulfan, or pyrithiobac, agriculturally acceptable salts or esters thereof, or combinations thereof.

In some aspects, (b) can comprise a sulfonylaminocarbonyl triazolinone herbicide. In some aspects, (b) can include flucarbazone, propoxycarbazone, or thiencarbazone, agriculturally acceptable salts or esters thereof, or combinations thereof.

In some aspects, (b) can comprise a sulfonylurea herbicide. In some aspects, (b) can include amidosulfuron, azimsulfuron, bensulfuron, chlorimuron, chlorsulfuron, cinosulfuron, cyclosulfamuron, ethametsulfuron, ethoxysulfuron, flazasulfuron, flucetosulfuron, flupyrsulfuron, foramsulfuron, halosulfuron, imazosulfuron, iodosulfuron, iofensulfuron, mesosulfuron, metazosulfuron, metsulfuron, nicosulfuron, orthosulfamuron, oxasulfuron, primisulfuron, propyrisulfuron, prosulfuron, pyrazosulfuron, rimsulfuron, sulfometuron, sulfosulfuron, triasulfuron, tribenuron, thifensulfuron, trifloxysulfuron, or tritosulfuron, agriculturally acceptable salts or esters thereof, or combinations thereof.

In some aspects, the composition can further comprise an agriculturally acceptable adjuvant or carrier, an additional pesticide, or combinations thereof. In some aspects, the only active ingredients in the composition are (a) and (b). In some aspects, the composition can be provided as a herbicidal concentrate.

Also disclosed herein are methods of controlling undesirable vegetation, comprising applying to vegetation, to an area adjacent the vegetation, or to soil or water to control the emergence or growth of vegetation, a composition comprising: (a) a pyridine carboxylate herbicide or an agriculturally acceptable N-oxide, salt, or ester thereof; and (b) an ALS inhibitor or an agriculturally acceptable salt or ester thereof. In some aspects, (a) and (b) are applied simultaneously. In some aspects, (a) and (b) are applied sequentially. In some aspects, (a) and (b) are applied pre-emergence of the undesirable vegetation. In some aspects, (a) and (b) are applied post-emergence of the undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

In some aspects, the pyridine carboxylate herbicide (a) can be applied in an amount of from 0.5 gram acid equivalent per hectare (g ae/ha) to 300 g ae/ha (e.g., from 30 g ae/ha to 40 g ae/ha). In some cases, the ALS inhibitor (b) can be applied in an amount of from 0.25 g ai/ha to 1000 g ai/ha (e.g., from 3 g ai/ha to 40 g ai/ha). In some cases, (a) and (b) can be applied in a weight ratio of from 1:3400 to 1200:1 (e.g., from 1:1700 to 600:1, from 1:280 to 160:1, from 1:10 to 16:1, from 1:14 to 10:1, or from 1:5 to 5:1).

The description below sets forth details of one or more aspect of the present disclosure. Other features, objects, and advantages will be apparent from the description and from the claims.

DETAILED DESCRIPTION

The present disclosure includes compositions comprising: (a) a pyridine carboxylate herbicide or an agriculturally acceptable N-oxide, salt, or ester thereof and (b) an ALS inhibitor or an agriculturally acceptable salt or ester thereof. The present disclosure also includes methods for controlling undesirable vegetation. In some aspects, the undesirable vegetation is in cereals. In some aspects, the undesirable vegetation is in maize, wheat, barley, rice, sorghum, millet, or oats. In some aspects, the undesirable vegetation is in broadleaf crops. In some aspects, the undesirable vegetation is in canola, flax, sunflower, soy, or cotton.

I. Definitions

Terms used herein will have their customary meaning in the art unless specified otherwise. The singular forms "a" and "the" include plural references unless stated otherwise. To the extent that the term "or" is employed (e.g., A or B) it is intended to mean "A or B or both." If this disclosure intends to indicate "only A or B but not both" then the term "only A or B but not both" will be employed. Thus, use of the term "or" herein is the inclusive and not the exclusive use.

The chemical moieties mentioned when defining variable positions within the general formulae described herein (e.g., the term "alkyl") are collective terms for the individual substituents encompassed by the chemical moiety. The prefix $C_n$-$C_m$ preceding a group or moiety indicates, in each case, the possible number of carbon atoms in the group or moiety that follows.

As used herein, the terms "herbicide" and "herbicidal active ingredient" may be understood to include an active ingredient that kills, controls, or otherwise adversely modifies the growth of vegetation, particularly undesirable vegetation such as weed species, when applied in an appropriate amount.

As used herein, the term "herbicidal effect" may be understood to include an adversely modifying effect of an active ingredient on vegetation, including, for example, a deviation from natural growth or development, killing, regulation, desiccation, growth inhibition, growth reduction, and retardation. The term "herbicidal activity" refers generally to herbicidal effects of an active ingredient. As used herein, the term "prevents" or similar terms such as "preventing" may be understood by a person of ordinary skill to include any combination that shows herbicidal effect or reduces the competitive capability of the weed with respect to a crop.

As used herein, "applying" a herbicide or herbicidal composition refers to delivering it directly to the targeted vegetation or to the locus thereof or to the area where control of undesirable vegetation is desired. Methods of application include, but are not limited to, pre-emergently contacting soil or water, post-emergently contacting the undesirable vegetation, or contacting the area adjacent to the undesirable vegetation.

As used herein, the term "vegetation" can include, for instance, dormant seeds, germinating seeds, emerging seedlings, plants propagating from vegetative propagules, immature vegetation, and established vegetation.

As used herein, the term "crop" refers to desired vegetation, for instance, plants that are grown to provide food, shelter, pasture, erosion control, etc. Example crops include cereals, legumes, vegetables, orchard and timber trees, grapevines, etc. Preferably, herbicides or herbicidal compositions have zero or minimal herbicidal effect on crops.

As used herein, the term "undesirable vegetation" refers to vegetation that is not wanted in a given area, for instance, weed species. Herbicides or herbicidal compositions are used to control undesirable vegetation. Preferably, herbicides or herbicidal compositions have a large or complete herbicidal effect on undesirable vegetation.

As used herein, "active ingredient" or "ai" may be understood to include a chemical compound or composition that has an effect on vegetation, for example, a herbicidal effect or a safening effect on the vegetation.

As used herein, "acid equivalent" or "ae" may be understood to include the amount of the acid form of an active ingredient that is calculated from the amount of a salt or ester form of that active ingredient. For example, if the acid form of an active ingredient "Z" has a molecular weight of 100 Dalton, and the salt form of Z has a molecular weight of 130 Dalton, an application of 130 g ai/ha of the Z salt would be equal to applying 100 g ae/ha of the acid form of Z:

130 g ai/ha Z salt*(100 Da Z acid/130 Da Z salt)=100 g ae/ha Z acid.

As used herein, unless otherwise specified, the term "acyl" may be understood to include a group of formula —C(O)R, where "C(O)" is short-hand notation for C=O. In the acyl group, the R may be alkyl (e.g., $C_1$-$C_6$ alkyl), haloalkyl (e.g., $C_1$-$C_6$ haloalkyl), alkenyl (e.g., $C_2$-$C_6$ alkenyl), haloalkenyl (e.g., $C_2$-$C_6$ haloalkenyl), alkynyl (e.g., $C_2$-$C_6$ alkynyl), aryl or heteroaryl, or arylalkyl (e.g., $C_7$-$C_{10}$ arylalkyl).

As used herein, the term "alkyl" may be understood to include saturated, straight-chained, branched, or cyclic saturated hydrocarbon moieties. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, cyclopropyl, 1-methyl-ethyl, butyl, cyclobutyl, 1-methyl-propyl, 2-methyl-propyl, 1,1-dimethyl-ethyl, pentyl, cyclopentyl, 1-methyl-butyl, 2-methyl-butyl, 3-methyl-butyl, 2,2-dimethyl-propyl, 1-ethyl-propyl, hexyl, cyclohexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "haloalkyl" may be understood to include straight-chained or branched alkyl groups, wherein the hydrogen atoms may partially or entirely be substituted with halogen atoms. Unless otherwise specified, $C_1$-$C_{20}$ (e.g., $C_1$-$C_{12}$, $C_1$-$C_{10}$, $C_1$-$C_8$, $C_1$-$C_6$, or $C_1$-$C_4$) alkyl groups are intended. Examples include chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl, pentafluoroethyl, and 1,1,1-trifluoroprop-2-yl. Haloalkyl substituents may also be substituted with one or more chemical moieties. Examples of suitable substituents include, for example, hydroxy, nitro, cyano, formyl, $C_1$-$C_6$ alkoxy, $C_1$-$C_6$ haloalkoxy, $C_1$-$C_6$ acyl, $C_1$-$C_6$ alkylthio, $C_1$-$C_6$ haloalkylthio, $C_1$-$C_6$ alkylsulfinyl, $C_1$-$C_6$ haloalkylsulfinyl, $C_1$-$C_6$ alkylsulfonyl, $C_1$-$C_6$ haloalkylsulfonyl, $C_1$-$C_6$ alkoxycarbonyl, $C_1$-$C_6$ haloalkoxycarbonyl, $C_1$-$C_6$ carbamoyl, $C_1$-$C_6$ halocarbamoyl, hydroxycarbonyl, $C_1$-$C_6$ alkylcarbonyl, $C_1$-$C_6$ haloalkylcarbonyl, aminocarbonyl, $C_1$-$C_6$ alkylaminocarbonyl, haloalkylaminocarbonyl, $C_1$-$C_6$ dialkylaminocarbonyl, and $C_1$-$C_6$ dihaloalkylaminocarbonyl, provided that the substituents are sterically compatible and the rules of chemical bonding and strain energy are satisfied. Preferred substituents include cyano and $C_1$-$C_6$ alkoxy.

As used herein, the term "alkoxy" may be understood to include a group of the formula R—O—, where R is unsubstituted or substituted alkyl as defined above. Unless otherwise specified, alkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-dimethyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, the term "alkoxycarbonyl" may be understood to include a group of the formula —C(O)OR, where R is an unsubstituted or substituted alkyl as defined above. Unless otherwise specified, alkoxycarbonyl groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include methoxycarbonyl, ethoxycarbonyl, propoxycarbonyl, 1-methyl-ethoxycarbonyl, butoxycarbonyl, 1-methyl-propoxycarbonyl, 2-methyl-propoxycarbonyl, 1,1-dimethyl-ethoxycarbonyl, pentoxycarbonyl, 1-methyl-butoxycarbonyl, 2-methyl-butoxycarbonyl, 3-methyl-butoxycarbonyl, 2,2-dimethyl-propoxycarbonyl, 1-ethyl-propoxycarbonyl, hexoxycarbonyl, 1,1-dimethyl-propoxycarbonyl, 1,2-dimethyl-propoxycarbonyl, 1-methyl-pentoxycarbonyl, 2-methyl-pentoxycarbonyl, 3-methyl-pentoxycarbonyl, 4-methyl-penoxycarbonyl, 1,1-dimethyl-butoxycarbonyl, 1,2-dimethyl-butoxycarbonyl, 1,3-dimethyl-butoxycarbonyl, 2,2-dimethyl-butoxycarbonyl, 2,3-dimethyl-butoxycarbonyl, 3,3-dimethyl-butoxycarbonyl, 1-ethyl-butoxycarbonyl, 2-ethylbutoxycarbonyl, 1,1,2-trimethyl-propoxycarbonyl, 1,2,2-trimethyl-propoxycarbonyl, 1-ethyl-1-methyl-propoxycarbonyl, and 1-ethyl-2-methyl-propoxycarbonyl.

As used herein, the term "haloalkoxy" may be understood to include a group of the formula R—O—, where R is unsubstituted or substituted haloalkyl as defined above. Unless otherwise specified, haloalkoxy groups wherein R is a $C_1$-$C_{20}$ (e.g., $C_1$-$C_{12}$, $C_1$-$C_{10}$, $C_1$-$C_8$, $C_1$-$C_6$, or $C_1$-$C_4$) alkyl group are intended. Examples include chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-2,2-difluoroethoxy, 2,2-dichloro-2-fluoroethoxy, 2,2,2-trichloroethoxy, pentafluoroethoxy, and 1,1,1-trifluoroprop-2-oxy.

As used herein, the term "aryl," as well as derivative terms such as aryloxy, may be understood to include groups that include a monovalent aromatic carbocyclic group of from 6 to 14 carbon atoms. Aryl groups can include a single ring or multiple condensed rings. In some aspects, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some aspects, the aryl group can be a phenyl, indanyl or naphthyl group.

As used herein, the term "heteroaryl," as well as derivative terms such as "heteroaryloxy," may be understood to include a 5- or 6-membered aromatic ring containing one or more heteroatoms, for example, N, O or S. Heteroaryl rings may be fused to other aromatic systems. The aryl or heteroaryl substituents may also be substituted with one or more chemical moieties. Examples of suitable substituents include, for example, hydroxy, nitro, cyano, formyl, $C_1$-$C_6$ alkyl, $C_2$-$C_6$ alkenyl, $C_2$-$C_6$ alkynyl, $C_1$-$C_6$ alkoxy, $C_1$-$C_6$ haloalkyl, $C_1$-$C_6$ haloalkoxy, $C_1$-$C_6$ acyl, $C_1$-$C_6$ alkylthio, $C_1$-$C_6$ alkylsulfinyl, $C_1$-$C_6$ alkylsulfonyl, $C_1$-$C_6$ alkoxycarbonyl, $C_1$-$C_6$ carbamoyl, hydroxycarbonyl, $C_1$-$C_6$ alkylcarbonyl, aminocarbonyl, $C_1$-$C_6$ alkylaminocarbonyl, $C_1$-$C_6$ dialkylaminocarbonyl, provided that the substituents are sterically compatible and the rules of chemical bonding and strain energy are satisfied. Preferred substituents include halogen, $C_1$-$C_4$ alkyl and $C_1$-$C_4$ haloalkyl.

As used herein, the term "halogen," including derivative terms such as "halo," refers to fluorine, chlorine, bromine and iodine.

As used herein, agriculturally acceptable salts and esters may be understood to include salts and esters that exhibit herbicidal activity, or that are or can be converted in plants, water, or soil to the referenced herbicide. Exemplary agriculturally acceptable esters are those that are or can be hydrolyzed, oxidized, metabolized, or otherwise converted, e.g., in plants, water, or soil, to the corresponding carboxylic acid which, depending on the pH, may be in the dissociated or undissociated form.

Compounds described herein can include N-oxides. Pyridine N-oxides can be obtained by oxidation of the corresponding pyridines. Suitable oxidation methods are described, for example, in Houben-Weyl, *Methoden der organischen Chemie* [*Methods in organic chemistry*], expanded and subsequent volumes to the 4th edition, volume E 7b, p. 565 f.

II. Pyridine Carboxylate Herbicides

Compositions and methods of the present disclosure include a composition comprising
(a) a pyridine carboxylate herbicide defined by Formula (I):

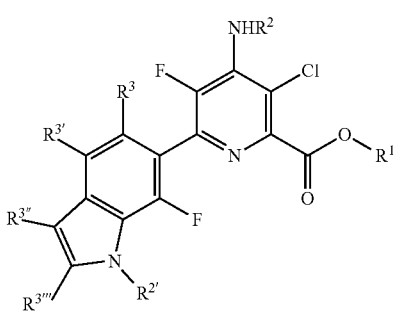

Formula I wherein:
$R^1$ is cyanomethyl or propargyl;
$R^2$ and $R^{2'}$ are independently hydrogen, $C_1$-$C_6$ alkyl, formyl, alkoxycarbonyl, or acyl;
$R^3$, $R^{3'}$, $R^{3''}$, and $R^{3'''}$ are independently hydrogen, halogen, $C_1$-$C_4$ alkyl, $C_1$-$C_4$ haloalkyl, $C_1$-$C_3$alkoxy, or $C_1$-$C_3$ haloalkoxy;
or an agriculturally acceptable N-oxide, salt, or ester thereof; and
(b) an ALS inhibitor or an agriculturally acceptable salt or ester thereof.

In some aspects, compositions and methods of the present disclosure include the composition comprising (a) the pyridine carboxylate herbicide cyanomethyl 4-amino-3-chloro-5-fluoro-6-(7-fluoro-1H-indol-6-yl)pyridine-2-carboxylate, Compound A:

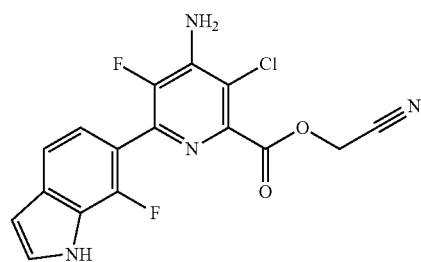

Compound A or an agriculturally acceptable N-oxide, salt, or ester thereof, and (b) an ALS inhibitor or an agriculturally acceptable salt or ester thereof.

In some aspects, compositions and methods of the present disclosure include the composition comprising (a) the pyridine carboxylate herbicide propargyl 4-amino-3-chloro-5-fluoro-6-(7-fluoro-1H-indol-6-yl)pyridine-2-carboxylate, Compound B:

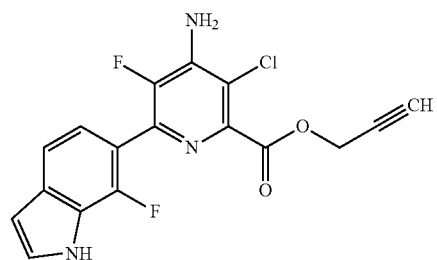

Compound B or an agriculturally acceptable N-oxide, salt, or ester thereof, and (b) an ALS inhibitor or an agriculturally acceptable salt or ester thereof.

Pyridine carboxylate herbicides defined by Formula (I), as well as methods of making these pyridine carboxylate herbicides, are disclosed in application PCT/US2018/031004, filed May 4, 2018, the entire disclosure of which is hereby expressly incorporated by reference.

In some aspects, the pyridine carboxylate herbicide can be provided as an agriculturally acceptable salt. Exemplary agriculturally acceptable salts of the pyridine carboxylate herbicides include, but are not limited to: sodium salts; potassium salts; ammonium salts or substituted ammonium salts, in particular mono-, di- and tri-$C_1$-$C_8$-alkylammonium salts such as methyl ammonium, dimethylammonium and isopropylammonium; mono-, di- and tri-hydroxy-$C_2$-$C_8$-alkylammonium salts such as hydroxyethylammonium, di(hydroxyethyl)ammonium, tri(hydroxyethyl)ammonium, hydroxypropylammonium, di(hydroxypropyl)ammonium and tri(hydroxypropyl)ammonium salts; olamine salts; diglycolamine salts; choline salts; and quaternary ammonium salts such as those represented by the formula $R^9R^{10}R^{11}R^{12}N^+$ and wherein $R^9$, $R^{10}$, $R^{11}$ and $R^{12}$ (e.g., $R^9$-$R^{12}$) each independently can represent hydrogen, $C_1$-$C_{10}$ alkyl, $C_2$-$C_8$ alkenyl, $C_2$-$C_8$ alkynyl, $C_1$-$C_8$ alkoxy, $C_1$-$C_8$ alkylthio, or aryl groups, provided that $R^9$-$R^{12}$ are sterically compatible.

In some aspects, the pyridine carboxylate herbicide can be provided as an agriculturally acceptable ester. Exemplary agriculturally acceptable esters of the pyridine carboxylate herbicides include, but are not limited to: methyl, ethyl, propyl, 1-methyl-ethyl, butyl, 1-methyl-propyl, 2-methyl-propyl, pentyl, 1-methyl-butyl, 2-methyl-butyl, 3-methyl-butyl, 1-ethyl-propyl, hexyl, 1-methyl-hexyl (mexyl), 2-ethylhexyl, heptyl, 1-methyl-heptyl (meptyl), octyl, isooctyl (isoctyl), butoxyethyl (butotyl), and benzyl.

The pyridine carboxylate herbicide, or an agriculturally acceptable N-oxide, salt, or ester thereof, can be applied to vegetation or an area adjacent the vegetation or applied to soil or water to prevent the emergence or growth of vegetation in an amount sufficient to induce a herbicidal effect. In some aspects, the pyridine carboxylate herbicide, or an agriculturally acceptable N-oxide, salt, or ester thereof, is applied to vegetation or an area adjacent the vegetation or applied to soil or water to prevent the emergence or growth of vegetation in an amount of 0.1 grams acid equivalent per hectare (g ae/ha) or greater, such as 0.2 g ae/ha or greater, 0.3 g ae/ha or greater, 0.4 g ae/ha or greater, 0.5 g ae/ha or greater, 0.6 g ae/ha or greater, 0.7 g ae/ha or greater, 0.8 g ae/ha or greater, 0.9 g ae/ha or greater, 1 g ae/ha or greater, 1.1 g ae/ha or greater, 1.2 g ae/ha or greater, 1.3 g ae/ha or greater, 1.4 g ae/ha or greater, 1.5 g ae/ha or greater, 1.6 g ae/ha or greater, 1.7 g ae/ha or greater, 1.8 g ae/ha or greater, 1.9 g ae/ha or greater, 2 g ae/ha or greater, 2.25 g ae/ha or greater, 2.5 g ae/ha or greater, 2.75 g ae/ha or greater, 3 g ae/ha or greater, 4 g ae/ha or greater, 5 g ae/ha or greater, 6 g ae/ha or greater, 7 g ae/ha or greater, 8 g ae/ha or greater, 9 g ae/ha or greater, 10 g ae/ha or greater, 11 g ae/ha or greater, 12 g ae/ha or greater, 13 g ae/ha or greater, 14 g ae/ha or greater, 15 g ae/ha or greater, 16 g ae/ha or greater, 17 g ae/ha or greater, 18 g ae/ha or greater, 19 g ae/ha or greater, 20 g ae/ha or greater, 22 g ae/ha or greater, 24 g ae/ha or greater, 25 g ae/ha or greater, 26 g ae/ha or greater, 28 g ae/ha or greater, 30 g ae/ha or greater, 32 g ae/ha or greater, 34 g ae/ha or greater, 35 g ae/ha or greater, 36 g ae/ha or greater, 38 g ae/ha or greater, 40 g ae/ha or greater, 42.5 g ae/ha or greater, 45 g ae/ha or greater, 47.5 g ae/ha or greater, 50 g ae/ha or greater, 52.5 g ae/ha or greater, 55 g ae/ha or greater, 57.5 g ae/ha or greater, 60 g ae/ha or greater, 65 g ae/ha or greater, 70 g ae/ha or greater, 75 g ae/ha or greater, 80 g ae/ha or greater, 85 g ae/ha or greater, 90 g ae/ha or greater, 95 g ae/ha or greater, 100 g ae/ha or greater, 110 g ae/ha or greater, 120 g ae/ha or greater, 130 g ae/ha or greater, 140 g ae/ha or greater, 150 g ae/ha or greater, 160 g ae/ha or greater, 170 g ae/ha or greater, 180 g ae/ha or greater, 190 g ae/ha or greater, 200 g ae/ha or greater, 210 g ae/ha or greater, 220 g ae/ha or greater, 230 g ae/ha or greater, 240 g ae/ha or greater, 250 g ae/ha or greater, 260 g ae/ha or greater, 270 g ae/ha or greater, 280 g ae/ha or greater, or 290 g ae/ha or greater; in an amount of 300 g ae/ha or less, such as 290 g ae/ha or less, 280 g ae/ha or less, 270 g ae/ha or less, 260 g ae/ha or less, 250 g ae/ha or less, 240 g ae/ha or less, 230 g ae/ha or less, 220 g ae/ha or less, 210 g ae/ha or less, 200 g ae/ha or less, 190 g ae/ha or less, 180 g ae/ha or less, 170 g ae/ha or less, 160 g ae/ha or less, 150 g ae/ha or less, 140 g ae/ha or less, 130 g ae/ha or less, 120 g ae/ha or less, 110 g ae/ha or less, 100 g ae/ha or less, 95 g ae/ha or less, 90 g ae/ha or less, 85 g ae/ha or less, 80 g ae/ha or less, 75 g ae/ha or less, 70 g ae/ha or less, 65 g ae/ha or less, 60 g ae/ha or less, 57.5 g ae/ha or less, 55 g ae/ha or less, 52.5 g ae/ha or less, 50 g ae/ha or less, 47.5 g ae/ha or less, 45 g ae/ha or less, 42.5 g ae/ha or less, 40 g ae/ha or less, 38 g ae/ha or less, 36 g ae/ha or less, 35 g ae/ha or less, 34 g ae/ha or less, 32 g ae/ha or less, 30 g ae/ha or less, 28 g ae/ha or less, 26 g ae/ha or less, 25 g ae/ha or less, 24 g ae/ha or less, 22 g ae/ha or less, 20 g ae/ha or less, 19 g ae/ha or less, 18 g ae/ha or less, 17 g ae/ha or less, 16 g ae/ha or less, 15 g ae/ha or less, 14 g ae/ha or less, 13 g ae/ha or less, 12 g ae/ha or less, 11 g ae/ha or less, 10 g ae/ha or less, 9 g ae/ha or less, 8 g ae/ha or less, 7 g ae/ha or less, 6 g ae/ha or less, 5 g ae/ha or less, 4 g ae/ha or less, 3 g ae/ha or less, 2.75 g ae/ha or less, 2.5 g ae/ha or less, 2.25 g ae/ha or less, 2 g ae/ha or less, 1.9 g ae/ha or less, 1.8 g ae/ha or less, 1.7 g ae/ha or less, 1.6 g ae/ha or less, 1.5 g ae/ha or less, 1.4 g ae/ha or less, 1.3 g ae/ha or less, 1.2 g ae/ha or less, 1.1 g ae/ha or less, 1 g ae/ha or less, 0.9 g ae/ha or less, 0.8 g ae/ha or less, 0.7 g ae/ha or less, 0.6 g ae/ha or less, 0.5 g ae/ha or less, 0.4 g ae/ha or less, 0.3 g ae/ha or less, or 0.2 g ae/ha or less; or in an amount within any range defined between any pair of the preceding values, such as 0.1-300 g ae/ha, 1-150 g ae/ha, 10-200 g ae/ha, 25 g ae/ha-75 g ae/ha, or 40-100 g ae/ha.

III. ALS Inhibitors

In addition to the pyridine carboxylate herbicide or agriculturally acceptable N-oxide, salt, or ester thereof, the compositions can include an acetolactate synthase (ALS) inhibitor. ALS inhibitors disrupt the production of amino acids in the plant, which eventually leads to inhibition of DNA synthesis. Examples of ALS inhibitors include sulfonylureas, imidazolinones, triazolopyrimidine sulfonamides, pyrimidinyl oxybenzoates and sulfonylaminocarbonyl triazolinones. In some aspects, the ALS inhibitor can contain a triazolopyrimidine sulfonamide herbicide. In some aspects, the ALS inhibitor can contain an imidazolinone herbicide. In some aspects, the ALS inhibitor can contain a pyrimidinyl oxybenzoate herbicide. In some aspects, the ALS inhibitor can contain a sulfonylaminocarbonyl triazolinone herbicide. In some aspects, the ALS inhibitor can contain a sulfonylurea herbicide.

In some aspects, the composition can include an ALS inhibitor selected from the group of imidazolinones, triazolopyrimidine sulfonamides, pyrimidinyl oxybenzoates, sulfonylaminocarbonyl triazolinones, sulfonylureas, and combinations thereof. In some cases, the composition can include amidosulfuron, azimsulfuron, bispyribac, bensulfuron, chlorimuron, chlorsulfuron, cinosulfuron, cloransulam, cyclosulfamuron, diclosulam, ethametsulfuron, ethoxysulfuron, flazasulfuron, florasulam, flucarbazone, flucetosulfuron, flumetsulam, flupyrsulfuron, foramsulfuron, halosulfuron, imazamethabenz, imazamox, imazapic, imazapyr, imazaquin, imazethapyr, imazosulfuron, iodosulfuron, iofensulfuron, mesosulfuron, metazosulfuron, metosulam, metsulfuron, nicosulfuron, orthosulfamuron, oxasulfuron, penoxsulam, primisulfuron, propoxycarbazone, propyrisulfuron, prosulfuron, pyrazosulfuron, pyribenzoxim, pyriftalid, pyriminobac, pyrimisulfan, pyrithiobac, pyroxsulam, rimsulfuron, sulfometuron, sulfosulfuron, thiencarbazone, thifensulfuron, triasulfuron, tribenuron, trifloxysulfuron, triflusulfuron, tritosulfuron, agriculturally acceptable salts and esters thereof, and combinations thereof.

The ALS inhibitor or agriculturally acceptable salt or ester thereof can be applied to vegetation or an area adjacent the vegetation or applied to soil or water to prevent the emergence or growth of vegetation in an amount sufficient to induce a herbicidal effect. In some aspects, the ALS inhibitor or agriculturally acceptable salt or ester thereof is applied to vegetation or an area adjacent the vegetation or applied to soil or water to prevent the emergence or growth of vegetation in an amount of 0.25 grams active ingredient per hectare (g ai/ha) or more, such as 0.3 g ai/ha or more, 0.4 g ai/ha or more, 0.5 g ai/ha or more, 0.6 g ai/ha or more, 0.7 g ai/ha or more, 0.8 g ai/ha or more, 0.9 g ai/ha or more, 1 g ai/ha or more, 1.5 g ai/ha or more, 2 g ai/ha or more, 2.5 g ai/ha or more, 3 g ai/ha or more, 3.5 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 250 g ai/ha or more, 260 g ai/ha or more, 280 g ai/ha or more, 300 g ai/ha or more, 320 g ai/ha or more, 340 g ai/ha or more, 350 g ai/ha or more, 360 g ai/ha or more, 380 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, 580 g ai/ha or more, 600 g ai/ha or more, 625 g ai/ha or more, 650 g ai/ha or more, 675 g ai/ha or more, 700 g ai/ha or more, 725 g ai/ha or more, 750 g ai/ha or more, 775 g ai/ha or more, 800 g ai/ha or more, 825 g ai/ha or more, 850 g ai/ha or more, 875 g ai/ha or more, 900 g ai/ha or more, 925 g ai/ha or more, 950 g ai/ha or more, 975 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1650 g ai/ha or more, 1675 g ai/ha or more, 1680 g ai/ha or more, or 1690 g ai/ha or more; in an amount of 1700 g ai/ha or less, such as 1690 g ai/ha or less, 1680 g ai/ha or less, 1675 g ai/ha or less, 1650 g ai/ha or less, 1600 g ai/ha or less, 1550 g ai/ha or less, 1500 g ai/ha or less, 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 975 g ai/ha or less, 950 g ai/ha or less, 925 g ai/ha or less, 900 g ai/ha or less, 875 g ai/ha or less, 850 g ai/ha or less, 825 g ai/ha or less, 800 g ai/ha or less, 775 g ai/ha or less, 750 g ai/ha or less, 725 g ai/ha or less, 700 g ai/ha or less, 675 g ai/ha or less, 650 g ai/ha or less, 625 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 380 g ai/ha or less, 360 g ai/ha or less, 350 g ai/ha or less, 340 g ai/ha or less, 320 g ai/ha or less, 300 g ai/ha or less, 280 g ai/ha or less, 260 g ai/ha or less, 250 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4.5 g ai/ha or less, 4 g ai/ha or less, 3.5 g ai/ha or less, 3 g ai/ha or less, 2.5 g ai/ha or less, 2 g ai/ha or less, 1.5 g ai/ha or less, 1 g ai/ha or less, 0.9 g ai/ha or less, 0.8 g ai/ha or less, 0.7 g ai/ha or less, 0.6 g ai/ha or less, 0.5 g ai/ha or less, 0.4 g ai/ha or less, or 0.3 g ai/ha or less; or in an amount ranging from any of the minimum values described above to any of the maximum values described above, such as 0.25-1700 g ai/ha, 0.25-1250 g ai/ha, 0.5-150 g ai/ha, 2-90 g ai/ha, 2.5-200 g ai/ha, 3-900 g ai/ha, 5-260 g ai/ha, 5-750 g ai/ha, 5-1000 g ai/ha, 6-280 g ai/ha, 7-100 g ai/ha, 10-560 g ai/ha, 10-1600 g ai/ha, 20-500 g ai/ha, 25-140 g ai/ha, 30-480 g ai/ha, 40-400 g ai/ha, 50-320 g ai/ha, 60-300 g ai/ha, 70-1250 g ai/ha, 100-140 g ai/ha, 140-520 g ai/ha, or 250-1700 g ai/ha.

A. Triazolopyrimidine Sulfonamide Herbicides

In some aspects, the composition contains a herbicidally effective amount of (a) a pyridine carboxylate herbicide or an agriculturally acceptable N-oxide, salt, or ester thereof, and (b) florasulam, cloransulam, diclosulam, flumetsulam, metosulam, penoxsulam, or pyroxsulam, or agriculturally acceptable salts or esters thereof.

Florasulam

Compositions and methods of the present disclosure can include florasulam or an agriculturally acceptable salt or ester thereof. Florasulam, shown below, is a triazolopyrimidine sulfonamide that provides broad-spectrum control of many broad-leaved weeds in cereals and maize. Florasulam, as well as methods of preparing florasulam, are known in the art. Its herbicidal activity is described, for example, in *The Pesticide Manual*, Sixteenth Edition, 2012.

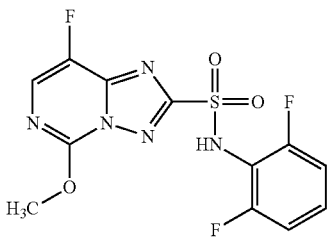 [SMILES: COc1ncc(F)c2nc(S(=O)(=O)Nc3c(F)cccc3F)nn12]

Florasulam can be applied to vegetation or an area adjacent the vegetation or applied to soil or water to prevent the emergence or growth of vegetation in an amount sufficient to induce a herbicidal effect. In some aspects, florasulam is applied to vegetation or an area adjacent the vegetation or applied to soil or water to prevent the emergence or growth of vegetation in an amount of 0.25 g ai/ha or more, such as 0.3 g ai/ha or more, 0.4 g ai/ha or more, 0.5 g ai/ha or more, 0.6 g ai/ha or more, 0.7 g ai/ha or more, 0.8 g ai/ha or more, 0.9 g ai/ha or more, 1 g ai/ha or more, 1.1 g ai/ha or more, 1.25 g ai/ha or more, 1.5 g ai/ha or more, 1.75 g ai/ha or more, 2 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.25 g ai/ha or more, 4.5 g ai/ha or more, 4.75 g ai/ha or more, 5 g ai/ha or more, 5.25 g ai/ha or more, 5.5 g ai/ha or more, 5.75 g ai/ha or more, 6 g ai/ha or more, 6.25 g ai/ha or more, 6.5 g ai/ha or more, 6.75 g ai/ha or more, 7 g ai/ha or more, 7.25 g ai/ha or more, 7.5 g ai/ha or more, 8 g ai/ha or more, 8.5 g ai/ha or more, 9 g ai/ha or more, or 9.5 g ai/ha, or more; in an amount of 10 g ai/ha or less, such as 9.5 g ai/ha or less, 9 g ai/ha or less, 8.5 g ai/ha or less, 8 g ai/ha or less 7.5 g ai/ha or less, 7.25 g ai/ha or less, 7 g ai/ha or less, 6.75 g ai/ha or less, 6.5 g ai/ha or less, 6.25 g ai/ha or less, 6 g ai/ha or less, 5.75 g ai/ha or less, 5.5 g ai/ha or less, 5.25 g ai/ha or less, 5 g ai/ha or less, 4.75 g ai/ha or less, 4.5 g ai/ha or less, 4.25 g ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, 2.25 g ai/ha or less, 2 g ai/ha or less, 1.75 g ai/ha or less, 1.5 g ai/ha or less, 1.25 g ai/ha or less, 1 g ai/ha or less, 0.9 g ai/ha or less, 0.8 g ai/ha or less, 0.7 g ai/ha or less, 0.6 g ai/ha or less, 0.5 g ai/ha or less, 0.4 g ai/ha or less, or 0.3 g ai/ha or less; or in an amount ranging from any of the minimum values described above to any of the maximum values described above, such as 0.25-10 g ai/ha, 0.25-7 g ai/ha, 0.4-6.5 g ai/ha, 0.5-6 g ai/ha, 0.6-9 g ai/ha, 0.7-8.5 g ai/ha, 0.8-4.5 g ai/ha, 1-4 g ai/ha, 1.1-7.5 g ai/ha, 1.5-5.75 g ai/ha, 2-7.25 g ai/ha, 2.25-10 g ai/ha, 3-8.5 g ai/ha, or 3.5-9.5 g ai/ha.

Cloransulam

Compositions and methods of the present disclosure can include cloransulam or an agriculturally acceptable salt or ester thereof. Cloransulam, as well as methods of preparing cloransulam, are known in the art. In some aspects, cloransulam can be provided as an agriculturally acceptable ester of cloransulam. Cloransulam-methyl, shown below, is a triazolopyrimidine sulfonamide that provides broad-spectrum control of many broadleaf weeds in soybeans and other broadleaf crops. Its herbicidal activity is described in *The Pesticide Manual*, Seventeenth Edition, 2016.

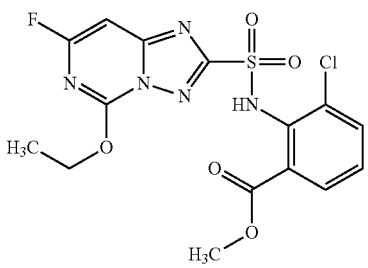 [SMILES: CCOc1nc(F)cc2nc(S(=O)(=O)Nc3c(Cl)cccc3C(=O)OC)nn12]

Cloransulam can be applied to vegetation or an area adjacent the vegetation or applied to soil or water to prevent the emergence or growth of vegetation in an amount sufficient to induce a herbicidal effect. In some aspects, cloransulam is applied to vegetation or an area adjacent the vegetation or applied to soil or water to prevent the emergence or growth of vegetation in an amount of 2.18 g ai/ha or more, such as 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 25 g ai/ha or more, 30 g ai/ha or more, 35 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 51 g ai/ha or more, 52 g ai/ha or more, 53 g ai/ha or more, 54 g ai/ha or more, 55 g ai/ha or more, 56 g ai/ha or more, 57 g ai/ha or more, 58 g ai/ha or more, or 59 g ai/ha or more; in an amount of 61 g ai/ha or less, such as 60 g ai/ha or less, 59 g ai/ha or less, 58 g ai/ha or less, 57 g ai/ha or less, 56 g ai/ha or less, 55 g ai/ha or less, 54 g ai/ha or less, 53 g ai/ha or less, 52 g ai/ha or less, 51 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 35 g ai/ha or less, 30 g ai/ha or less, 25 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, 4.5 g ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, or 2.25 g ai/ha or less; or in an amount ranging from any of the minimum values described above to any of the maximum values described above, such as 2.18-61 g ai/ha, 2.5-60 g ai/ha, 2.75-44 g ai/ha, 3-59 g ai/ha, 3.25-60 g ai/ha, 3.5-40 g ai/ha, 3.75-18 g ai/ha, 3.75-50 g ai/ha, 4-60 g ai/ha, 4-52 g ai/ha, 4.25-30 g ai/ha, 4.25-55 g ai/ha, 4.5-51 g ai/ha, or 5-38 g ai/ha.

Diclosulam

Compositions and methods of the present disclosure can include diclosulam or an agriculturally acceptable salt or ester thereof. Diclosulam, shown below, is a triazolopyrimidine sulfonamide that provides broad-spectrum control of many broadleaf weeds in soybeans and peanuts. Diclosulam, as well as methods of preparing diclosulam, are known in the art. Its herbicidal activity is described in *The Pesticide Manual*, Seventeenth Edition, 2016.

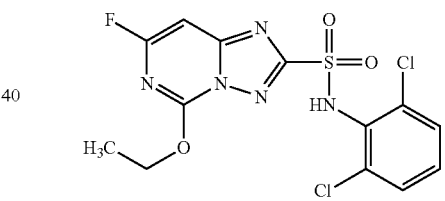

Diclosulam can be applied to vegetation or an area adjacent the vegetation or applied to soil or water to prevent the emergence or growth of vegetation in an amount sufficient to induce a herbicidal effect. In some aspects, diclosulam is applied to vegetation or an area adjacent the vegetation or applied to soil or water to prevent the emergence or growth of vegetation in an amount of 2.18 g ai/ha or more, such as 2.25 g ai/ha or more, 2.5 g ai/ha or more, 2.75 g ai/ha or more, 3 g ai/ha or more, 3.25 g ai/ha or more, 3.5 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 27 g ai/ha or more, 28 g ai/ha or more, 29 g ai/ha or more, 30 g ai/ha or more, 31 g ai/ha or more, 31.5 g ai/ha or more, 32 g ai/ha or more, 32.5 g ai/ha or more, 33 g ai/ha or more, 33.5 g ai/ha or more, 34 g ai/ha or more, 34.5 g ai/ha or more, or 34.75 g ai/ha or more; in an amount of 35 g ai/ha or less, such as 34.5 g ai/ha or less, 34 g ai/ha or less, 33.5 g ai/ha or less, 33 g ai/ha or less, 32.5 g ai/ha or less, 32 g ai/ha or less, 31.5 g ai/ha or less, 31 g ai/ha or less, 30 g ai/ha or less, 29 g ai/ha or less, 28 g ai/ha or less, 27 g ai/ha or less, 26 g ai/ha or less, 24 g ai/ha or less, 22 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, 4.5 g ai/ha or less, 4 g ai/ha or less, 3.5 g ai/ha or less, 2.75 g ai/ha or less, 2.5 g ai/ha or less, 2.25 g ai/ha or less; or in an amount ranging from any of the minimum values described above to any of the maximum values described above, such as 2.18-35 g ai/ha, 2.5-34 g ai/ha, 2.75-22 g ai/ha, 3-29 g ai/ha, 3.25-34 g ai/ha, 3.25-32 g ai/ha, 3.5-30 g ai/ha, 3.75-27 g ai/ha, 4-35 g ai/ha, 4-30 g ai/ha, 4.5-18 g ai/ha, 4.5-33.5 g ai/ha, 5-32 g ai/ha, or 6-33 g ai/ha.

Flumetsulam

Compositions and methods of the present disclosure can include flumetsulam or an agriculturally acceptable salt or ester thereof. Flumetsulam, shown below, is a triazolopyrimidine sulfonamide that provides control of broadleaf weeds and greens in soybeans, field peas, and maize. Flumetsulam, as well as methods of preparing flumetsulam, are known in the art. Its herbicidal activity is described in *The Pesticide Manual*, Seventeenth Edition, 2016.

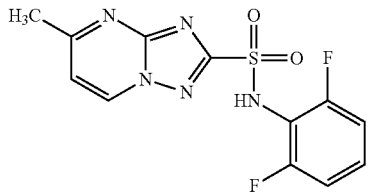 [SMILES: Cc1ccn2nc(S(=O)(=O)Nc3c(F)cccc3F)nc2n1]

Flumetsulam can be applied to vegetation or an area adjacent the vegetation or applied to soil or water to prevent the emergence or growth of vegetation in an amount sufficient to induce a herbicidal effect. In some aspects, flumetsulam is applied to vegetation or an area adjacent the vegetation or applied to soil or water to prevent the emergence or growth of vegetation in an amount of 2.18 g ai/ha or more, such as 2.5 g ai/ha or more, 2.75 g ai/ha or more, 3 g ai/ha or more, 3.5 g ai/ha or more, 4 g ai/ha or more, 4.5 g ai/ha or more, 5 g ai/ha or more, 7 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 36 g ai/ha or more, 37 g ai/ha or more, 38 g ai/ha or more, 39 g ai/ha or more, 40 g ai/ha or more, 41 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, 70 g ai/ha or more, 72 g ai/ha or more, 74 g ai/ha or more, or 77 g ai/ha or more; in an amount of 78 g ai/ha or less, such as 77 g ai/ha or less, 75 g ai/ha or less, 74 g ai/ha or less, 72 g ai/ha or less, 70 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 41 g ai/ha or less, 40 g ai/ha or less, 39 g ai/ha or less, 38 g ai/ha or less, 37 g ai/ha or less, 36 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 7 g ai/ha or less, 5 g ai/ha or less, 4.5 g ai/ha or less, 4 g ai/ha or less, 3.5 g ai/ha or less, 3 g ai/ha or less, 2.75 g ai/ha or less, 2.5 g ai/ha or less; or in an amount ranging from any of the minimum values described above to any of the maximum values described above, such as 2.18-78 g ai/ha, 2.5-75 g ai/ha, 2.75-54 g ai/ha, 3-46 g ai/ha, 3-78 g ai/ha, 3.5-39 g ai/ha, 3.5-72 g ai/ha, 4-60 g ai/ha, 4-75 g ai/ha, 4.5-25 g ai/ha, 4.5-66 g ai/ha, 5-58 g ai/ha, or 9-62 g ai/ha.

Penoxsulam

Compositions and methods of the present disclosure can include penoxsulam or an agriculturally acceptable salt or ester thereof. Penoxsulam, shown below, is a triazolopyrimidine sulfonamide that provides control of *Echinochloa* spp., as well as many broadleaf, sedge, and aquatic weeds in rice. Penoxsulam, as well as methods of preparing penoxsulam, are known in the art. Its herbicidal activity is described in *The Pesticide Manual*, Seventeenth Edition, 2016.

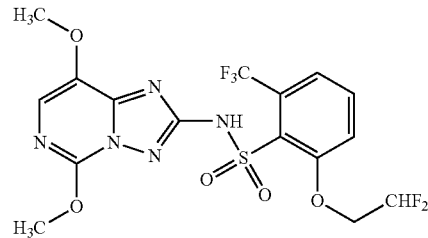 [SMILES: COc1cnc(OC)n2nc(NS(=O)(=O)c3c(OCC(F)F)cccc3C(F)(F)F)nc12]

Penoxsulam can be applied to vegetation or an area adjacent the vegetation or applied to soil or water to prevent the emergence or growth of vegetation in an amount sufficient to induce a herbicidal effect. In some aspects, penoxsulam is applied to vegetation or an area adjacent the vegetation or applied to soil or water to prevent the emergence or growth of vegetation in an amount of 2.5 g ai/ha or more, such as 2.75 g ai/ha or more, 3 g ai/ha or more, 3.5 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 41 g ai/ha or more, 42 g ai/ha or more, 43 g ai/ha or more, 44 g ai/ha or more, 45 g ai/ha or more, 46 g ai/ha or more, 47 g ai/ha or more, 48 g ai/ha or more, or 49 g ai/ha or more; in an amount of 50 g ai/ha or less, such as 49 g ai/ha or less, 48 g ai/ha or less, 47 g ai/ha or less, 46 g ai/ha or less, 45 g ai/ha or less, 44 g ai/ha or less, 43 g ai/ha or less, 42 g ai/ha or less, 41 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, 4.5 g ai/ha or less, 4.25 g ai/ha or less, 4 g ai/ha or less, 3.5 g ai/ha or less, 3 g ai/ha or less, or 2.75 g ai/ha or less; or in an amount ranging from any of the minimum values described above to any of the maximum values described above, such as 2.5-50 g ai/ha, 3-28 g ai/ha, 3.5-40 g ai/ha, 4-34 g ai/ha, 4.25-50 g ai/ha, 4.5-47 g ai/ha, 5-45 g ai/ha, 6-36 g ai/ha, 8-22 g ai/ha, or 10-49 g ai/ha.

Pyroxsulam

Compositions and methods of the present disclosure can include pyroxsulam or an agriculturally acceptable salt or ester thereof. Pyroxsulam, shown below, is a triazolopyrimidine sulfonamide that provides broad spectrum post-emergence annual grass and broadleaf weeds control in cereals. Pyroxsulam, as well as methods of preparing pyroxsulam, are known in the art. Its herbicidal activity is described in *The Pesticide Manual*, Seventeenth Edition, 2016.

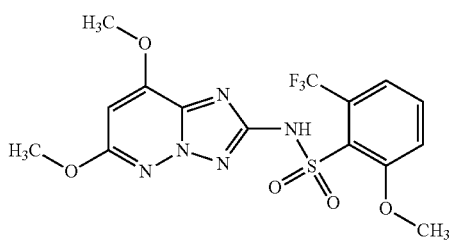

Pyroxsulam can be applied to vegetation or an area adjacent the vegetation or applied to soil or water to prevent the emergence or growth of vegetation in an amount sufficient to induce a herbicidal effect. In some aspects, pyroxsulam is applied to vegetation or an area adjacent the vegetation or applied to soil or water to prevent the emergence or growth of vegetation in an amount of 1.9 g ai/ha or more, such as 2 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.5 g ai/ha or more, 5 g ai/ha or more, 6 g ai/ha or more, 7 g ai/ha or more, 8 g ai/ha or more, 9 g ai/ha or more, 9.5 g ai/ha or more, 10 g ai/ha or more, 10.5 g ai/ha or more, 11 g ai/ha or more, 11.5 g ai/ha or more, 12 g ai/ha or more, 12.5 g ai/ha or more, 13 g ai/ha or more, 13.5 g ai/ha or more, 14 g ai/ha or more, 14.5 g ai/ha or more, 15 g ai/ha or more, 15.25 g ai/ha or more, 15.5 g ai/ha or more, 15.75 g ai/ha or more, 16 g ai/ha or more, 16.25 g ai/ha or more, 16.5 g ai/ha or more, 16.75 g ai/ha or more, 17 g ai/ha or more, 17.25 g ai/ha or more, 17.5 g ai/ha or more, 17.75 g ai/ha or more, 18 g ai/ha or more, 18.25 g ai/ha or more, or 18.5 g ai/ha or more; in an amount of 18.75 g ai/ha or less, such as 18.5 g ai/ha or less, 18.25 g ai/ha or less, 18 g ai/ha or less, 17.75 g ai/ha or less, 17.5 g ai/ha or less, 17.25 g ai/ha or less, 17 g ai/ha or less, 16.75 g ai/ha or less, 16.5 g ai/ha or less, 16.25 g ai/ha or less, 16 g ai/ha or less, 15.75 g ai/ha or less, 15.5 g ai/ha or less, 15.25 g ai/ha or less, 15 g ai/ha or less, 14.5 g ai/ha or less, 14 g ai/ha or less, 13.5 g ai/ha or less, 13 g ai/ha or less, 12.5 g ai/ha or less, 12 g ai/ha or less, 11.5 g ai/ha or less, 11 g ai/ha or less, 10.5 g ai/ha or less, 10 g ai/ha or less, 9.5 g ai/ha or less, 9 g ai/ha or less, 8 g ai/ha or less, 7 g ai/ha or less, 6 g ai/ha or less, 5 g ai/ha or less, 4.5 g ai/ha or less, 4 g ai/ha or less, 3.5 g ai/ha or less, 3.25 g ai/ha or less, 3 g ai/ha or less, 2.75 g ai/ha or less, 2.5 g ai/ha or less, or 2.25 g ai/ha or less; or in an amount ranging from any of the minimum values described above to any of the maximum values described above, such as 1.9-18.75 g ai/ha, 2.25-18 g ai/ha, 2.5-14.5 g ai/ha, 2.75-12.5 g ai/ha, 2.75-18.5 g ai/ha, 3-13 g ai/ha, 3.25-10.5 g ai/ha, 3.5-16 g ai/ha, 4-15.25 g ai/ha, 5-18 g ai/ha, 6-17.75 g ai/ha, 8-16 g ai/ha, 9-18 g ai/ha, or 10-14.5 g ai/ha.

B. Imidazolinone Herbicides

In some aspects, the composition contains a herbicidally effective amount of (a) a pyridine carboxylate herbicide or an agriculturally acceptable N-oxide, salt, or ester thereof, and (b) imazamethabenz, imazamox, imazapic, imazapyr, imazaquin, imazethapyr, or agriculturally acceptable salts or esters thereof, or combinations thereof.

Imazamethabenz

Compositions and methods of the present disclosure can include imazamethabenz or an agriculturally acceptable salt or ester thereof. Imazamethabenz, shown below, is a mixture of

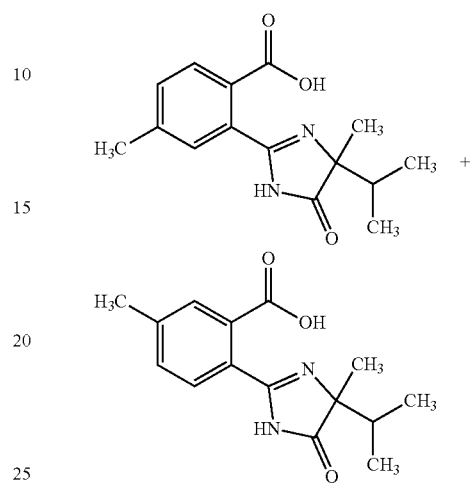

isomers and an imidazolinone that provides post-emergence control of *Avena* species, *Alopecurus myosuroides*, *Apera spica-venti* and dicotyledonous weeds in wheat, barley, rye and sunflowers. Imazamethabenz, as well as methods of preparing imazamethabenz, are known in the art. Its herbicidal activity is described in *The Pesticide Manual*, Seventeenth Edition, 2016.

Imazamethabenz can be applied to vegetation or an area adjacent the vegetation or applied to soil or water to prevent the emergence or growth of vegetation in an amount sufficient to induce a herbicidal effect. In some aspects, imazamethabenz is applied to vegetation or an area adjacent the vegetation or applied to soil or water to prevent the emergence or growth of vegetation in an amount of 50 g ai/ha or more, such as 55 g ai/ha or more, 60 g ai/ha or more, 65 g ai/ha or more, 70 g ai/ha or more, 75 g ai/ha or more, 80 g ai/ha or more, 90 g ai/ha or more, 95 g ai/ha or more, 100 g ai/ha or more, 110 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 220 g ai/ha or more, 240 g ai/ha or more, 260 g ai/ha or more, 280 g ai/ha or more, 300 g ai/ha or more, 320 g ai/ha or more, 340 g ai/ha or more, 360 g ai/ha or more, 380 g ai/ha or more, 400 g ai/ha or more, 420 g ai/ha or more, 440 g ai/ha or more, 460 g ai/ha or more, 480 g ai/ha or more, 500 g ai/ha or more, 520 g ai/ha or more, 540 g ai/ha or more, 560 g ai/ha or more, 580 g ai/ha or more, 600 g ai/ha or more, 620 g ai/ha or more, 640 g ai/ha or more, 650 g ai/ha or more, 660 g ai/ha or more, 670 g ai/ha or more, 680 g ai/ha or more, or 690 g ai/ha or more; in an amount of 700 g ai/ha or less, such as 690 g ai/ha or less, 680 g ai/ha or less, 670 g ai/ha or less, 660 g ai/ha or less, 650 g ai/ha or less, 640 g ai/ha or less, 620 g ai/ha or less, 600 g ai/ha or less, 580 g ai/ha or less, 560 g ai/ha or less, 540 g ai/ha or less, 520 g ai/ha or less, 500 g ai/ha or less, 480 g ai/ha or less, 460 g ai/ha or less, 440 g ai/ha or less, 420 g ai/ha or less, 400 g ai/ha or less, 380 g ai/ha or less, 360 g ai/ha or less, 340 g ai/ha or less, 320 g ai/ha or less, 300 g ai/ha or less, 280 g ai/ha or less, 260 g ai/ha or less, 240 g ai/ha or less, 220 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, or 55 g ai/ha or less; or in an amount ranging from any of the minimum values described above to any of the maximum values described above, such as 50-700 g ai/ha, 55-400 g ai/ha, 60-650 g ai/ha, 75-520 g ai/ha, 80-400 g ai/ha, 85-500 g ai/ha, 90-220 g ai/ha, 100-700 g ai/ha, 100-500 g ai/ha, 110-640 g ai/ha, 120-420 g ai/ha, 120-500 g ai/ha, 140-670 g ai/ha, or 150-580 g ai/ha.

Imazamox

Compositions and methods of the present disclosure can include imazamox or an agriculturally acceptable salt or ester thereof. Imazamox, shown below, is an imidazolinone that provides pre- and post-emergence control of broadleaf and grass weeds, e.g., in rice, maize, rape, alfalfa, peas and beans. Imazamox, as well as methods of preparing imazamox, are known in the art. Its herbicidal activity is described in *The Pesticide Manual*, Seventeenth Edition, 2016.

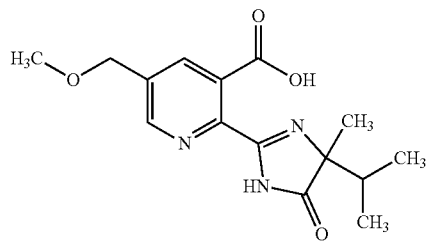 [SMILES: COCc1cnc(C2=NC(C)(C(C)C)C(=O)N2)c(C(=O)O)c1]

Imazamox can be applied to vegetation or an area adjacent the vegetation or applied to soil or water to prevent the emergence or growth of vegetation in an amount sufficient to induce a herbicidal effect. In some aspects, imazamox is applied to vegetation or an area adjacent the vegetation or applied to soil or water to prevent the emergence or growth of vegetation in an amount of 5 g ai/ha or more, such as 6 g ai/ha or more, 7 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 21 g ai/ha or more, 22 g ai/ha or more, 23 g ai/ha or more, 24 g ai/ha or more, 25 g ai/ha or more, 26 g ai/ha or more, 27 g ai/ha or more, 28 g ai/ha or more, 29 g ai/ha or more, 30 g ai/ha or more, 32 g ai/ha or more, 34 g ai/ha or more, 36 g ai/ha or more, 38 g ai/ha or more, 40 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, or 58 g ai/ha or more; in an amount of 60 g ai/ha or less, such as 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 29 g ai/ha or less, 28 g ai/ha or less, 27 g ai/ha or less, 26 g ai/ha or less, 25 g ai/ha or less, 24 g ai/ha or less, 23 g ai/ha or less, 22 g ai/ha or less, 21 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, or 6 g ai/ha or less; or in an amount ranging from any of the minimum values described above to any of the maximum values described above, such as 5-60 g ai/ha, 5-52 g ai/ha, 6-46 g ai/ha, 6-54 g ai/ha, 7-38 g ai/ha, 7-50 g ai/ha, 8-48 g ai/ha, 9-45 g ai/ha, 10-40 g ai/ha, 10-58 g ai/ha, 11-36 g ai/ha, 12-54 g ai/ha, 13-60 g ai/ha, or 15-48 g ai/ha.

Imazapic

Compositions and methods of the present disclosure can include imazapic or an agriculturally acceptable salt or ester thereof. Imazapic, shown below, is an imidazolinone that provides pre- and post-emergence control of a wide range of annual and perennial weeds in pasture, rangeland and non-cropland areas. Imazapic, as well as methods of preparing imazapic, are known in the art. Its herbicidal activity is described in *The Pesticide Manual*, Seventeenth Edition, 2016.

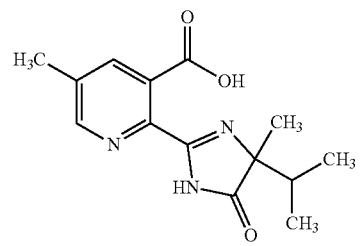 [SMILES: Cc1cnc(C2=NC(C)(C(C)C)C(=O)N2)c(C(=O)O)c1]

Imazapic can be applied to vegetation or an area adjacent the vegetation or applied to soil or water to prevent the emergence or growth of vegetation in an amount sufficient to induce a herbicidal effect. In some aspects, imazapic is applied to vegetation or an area adjacent the vegetation or applied to soil or water to prevent the emergence or growth of vegetation in an amount of 17.5 g ai/ha or more, such as 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 35 g ai/ha or more, 40 g ai/ha or more, 45 g ai/ha or more, 50 g ai/ha or more, 45 g ai/ha or more, 50 g ai/ha or more, 60 g ai/ha or more, 70 g ai/ha or more, 80 g ai/ha or more, 90 g ai/ha or more, 100 g ai/ha or more, 110 g ai/ha or more, 120 g ai/ha or more, 130 g ai/ha or more, 140 g ai/ha or more, 150 g ai/ha or more, 155 g ai/ha or more, 160 g ai/ha or more, 165 g ai/ha or more, 170 g ai/ha or more, 175 g ai/ha or more, 180 g ai/ha or more, 185 g ai/ha or more, 190 g ai/ha or more, 195 g ai/ha or more, 200 g ai/ha or more, 205 g ai/ha or more, 210 g ai/ha or more, or 215 g ai/ha or more; in an amount of 220 g ai/ha or less, such as 215 g ai/ha or less, 210 g ai/ha or less, 205 g ai/ha or less, 200 g ai/ha or less, 195 g ai/ha or less, 190 g ai/ha or less, 185 g ai/ha or less, 180 g ai/ha or less, 175 g ai/ha or less, 170 g ai/ha or less, 165 g ai/ha or less, 160 g ai/ha or less, 155 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 80 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, or 18 g ai/ha or less; or in an amount ranging from any of the minimum values described above to any of the maximum values described above, such as 17.5-220 g ai/ha, 17.5-210 g ai/ha, 18-200 g ai/ha, 19-120 g ai/ha, 20-210 g ai/ha, 20-170 g ai/ha, 22-190 g ai/ha, 24-175 g ai/ha, 26-210 g ai/ha, 26-160 g ai/ha, 30-190 g ai/ha, 30-140 g ai/ha, 35-220 g ai/ha, or 45-215 g ai/ha.

Imazapyr

Compositions and methods of the present disclosure can include imazapyr or an agriculturally acceptable salt or ester thereof. Imazapyr, shown below, is an imidazolinone that provides pre- and post-emergence control of annual and perennial grasses, broadleaf weeds, brush and trees. Imazapyr, as well as methods of preparing imazapyr, are known in the art. Its herbicidal activity is described in *The Pesticide Manual*, Seventeenth Edition, 2016.

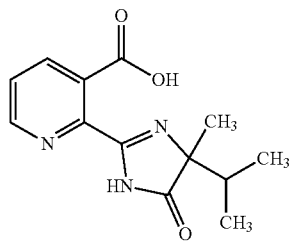 [SMILES: CC(C)C1(C)N=C(c2ncccc2C(=O)O)NC1=O]

Imazapyr can be applied to vegetation or an area adjacent the vegetation or applied to soil or water to prevent the emergence or growth of vegetation in an amount sufficient to induce a herbicidal effect. In some aspects, imazapyr is applied to vegetation or an area adjacent the vegetation or applied to soil or water to prevent the emergence or growth of vegetation in an amount of 100 g ai/ha or more, such as 120 g ai/ha or more, 125 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 225 g ai/ha or more, 250 g ai/ha or more, 275 g ai/ha or more, 300 g ai/ha or more, 325 g ai/ha or more, 350 g ai/ha or more, 375 g ai/ha or more, 400 g ai/ha or more, 425 g ai/ha or more, 450 g ai/ha or more, 475 g ai/ha or more, 500 g ai/ha or more, 600 g ai/ha or more, 700 g ai/ha or more, 800 g ai/ha or more, 900 g ai/ha or more, 1000 g ai/ha or more, 1050 g ai/ha or more, 1100 g ai/ha or more, 1150 g ai/ha or more, 1200 g ai/ha or more, 1250 g ai/ha or more, 1300 g ai/ha or more, 1350 g ai/ha or more, 1400 g ai/ha or more, 1450 g ai/ha or more, 1500 g ai/ha or more, 1550 g ai/ha or more, 1600 g ai/ha or more, 1620 g ai/ha or more, 1640 g ai/ha or more, 1660 g ai/ha or more, or 1680 g ai/ha or more; in an amount of 1700 g ai/ha or less (e.g., 1680 g ai/ha or less, 1660 g ai/ha or less, 1640 g ai/ha or less, 1620 g ai/ha or less, 1600 g ai/ha or less, 1550 g ai/ha or less, 1500 g ai/ha or less, 1450 g ai/ha or less, 1400 g ai/ha or less, 1350 g ai/ha or less, 1300 g ai/ha or less, 1250 g ai/ha or less, 1200 g ai/ha or less, 1150 g ai/ha or less, 1100 g ai/ha or less, 1050 g ai/ha or less, 1000 g ai/ha or less, 900 g ai/ha or less, 800 g ai/ha or less, 700 g ai/ha or less, 600 g ai/ha or less, 500 g ai/ha or less, 475 g ai/ha or less, 450 g ai/ha or less, 425 g ai/ha or less, 400 g ai/ha or less, 375 g ai/ha or less, 350 g ai/ha or less, 325 g ai/ha or less, 300 g ai/ha or less, 275 g ai/ha or less, 250 g ai/ha or less, 225 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 125 g ai/ha or less, 120 g ai/ha or less, or 110 g ai/ha or less; or in an amount ranging from any of the minimum values described above to any of the maximum values described above, such as 100-1700 g ai/ha, 125-850 g ai/ha, 130-700 g ai/ha, 150-1000 g ai/ha, 160-475 g ai/ha, 170-1660 g ai/ha, 180-1500 g ai/ha, 190-1050 g ai/ha, 200-700 g ai/ha, 250-1500 g ai/ha, 325-1200 g ai/ha, 450-1500 g ai/ha, 500-900 g ai/ha, or 110-1000 g ai/ha.

Imazethapyr

Compositions and methods of the present disclosure can include imazethapyr or an agriculturally acceptable salt or ester thereof. Imazethapyr, shown below, is an imidazolinone that controls many major annual and perennial grass and broadleaf weeds in most major crops. Imazethapyr, as well as methods of preparing imazethapyr, are known in the art. Its herbicidal activity is described in *The Pesticide Manual*, Seventeenth Edition, 2016.

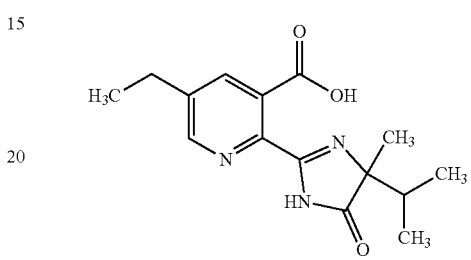

Imazethapyr can be applied to vegetation or an area adjacent the vegetation or applied to soil or water to prevent the emergence or growth of vegetation in an amount sufficient to induce a herbicidal effect. In some aspects, imazethapyr is applied to vegetation or an area adjacent the vegetation or applied to soil or water to prevent the emergence or growth of vegetation in an amount of 8.75 g ai/ha or more, such as 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 18 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 80 g ai/ha or more, 90 g ai/ha or more, 100 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 272 g ai/ha or more, 274 g ai/ha or more, 276 g ai/ha or more, or 278 g ai/ha or more; in an amount of 280 g ai/ha or less, such as 278 g ai/ha or less, 276 g ai/ha or less, 274 g ai/ha or less, 272 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 80 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 18 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, or 9 g ai/ha or less; or in an amount ranging from any of the minimum values described above to any of the maximum values described above, such as 8.75-280 g ai/ha, 8.75-170 g ai/ha, 9-220 g ai/ha, 10-260 g ai/ha, 10-150 g ai/ha, 11-220 g ai/ha, 12-200 g ai/ha, 13-274 g ai/ha, 15-230 g ai/ha, 16-160 g ai/ha, 18-280 g ai/ha, 20-210 g ai/ha, 20-190 g ai/ha, or 25-272 g ai/ha.

C. Pyrimidinyl Oxybenzoate Herbicides

In some aspects, the composition contains a herbicidally effective amount of (a) a pyridine carboxylate herbicide or an agriculturally acceptable N-oxide, salt, or ester thereof, and (b) bispyribac, pyribenzoxim, pyriftalid, pyriminobac, pyrimisulfan, pyrithiobac, or agriculturally acceptable salts or esters thereof, or combinations thereof.

Bispyribac

Compositions and methods of the present disclosure can include bispyribac or an agriculturally acceptable salt or ester thereof. Bispyribac-sodium, shown below, is a pyrimidinyl oxybenzoate that provides control of grasses, sedges and broadleaf weeds, e.g., in direct-seeded and water-seeded rice and in turf. Bispyribac-sodium, as well as methods of preparing bispyribac-sodium, are known in the art. Its herbicidal activity is described in *The Pesticide Manual*, Seventeenth Edition, 2016.

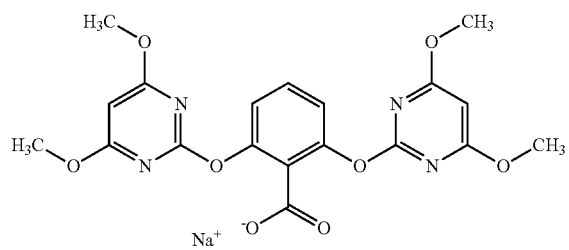

Bispyribac can be applied to vegetation or an area adjacent the vegetation or applied to soil or water to prevent the emergence or growth of vegetation in an amount sufficient to induce a herbicidal effect. In some aspects, bispyribac is applied to vegetation or an area adjacent the vegetation or applied to soil or water to prevent the emergence or growth of vegetation in an amount of 5 g ai/ha or more, such as 7.5 g ai/ha or more, 10 g ai/ha or more, 12.5 g ai/ha or more, 15 g ai/ha or more, 17.5 g ai/ha or more, 20 g ai/ha or more, 22.5 g ai/ha or more, 25 g ai/ha or more, 27.5 g ai/ha or more, 30 g ai/ha or more, 32.5 g ai/ha or more, 35 g ai/ha or more, 37.5 g ai/ha or more, 40 g ai/ha or more, 42.5 g ai/ha or more, 45 g ai/ha or more, 47.5 g ai/ha or more, 50 g ai/ha or more, 52.5 g ai/ha or more, 55 g ai/ha or more, 57.5 g ai/ha or more, 60 g ai/ha or more, 62.5 g ai/ha or more, 65 g ai/ha or more, 67.5 g ai/ha or more, 70 g ai/ha or more, 72.5 g ai/ha or more, 75 g ai/ha or more, 77.5 g ai/ha or more, 80 g ai/ha or more, 82.5 g ai/ha or more, 85 g ai/ha or more, 87.5 g ai/ha or more, 90 g ai/ha or more, 92.5 g ai/ha or more, 95 g ai/ha or more, 97.5 g ai/ha or more; in an amount of 100 g ai/ha or less, such as 97.5 g ai/ha or less, 95 g ai/ha or less, 92.5 g ai/ha or less, 90 g ai/ha or less, 87.5 g ai/ha or less, 85 g ai/ha or less, 82.5 g ai/ha or less, 80 g ai/ha or less, 77.5 g ai/ha or less, 75 g ai/ha or less, 72.5 g ai/ha or less, 70 g ai/ha or less, 67.5 g ai/ha or less, 65 g ai/ha or less, 62.5 g ai/ha or less, 60 g ai/ha or less, 57.5 g ai/ha or less, 55 g ai/ha or less, 52.5 g ai/ha or less, 50 g ai/ha or less, 47.5 g ai/ha or less, 45 g ai/ha or less, 42.5 g ai/ha or less, 40 g ai/ha or less, 37.5 g ai/ha or less, 35 g ai/ha or less, 32.5 g ai/ha or less, 30 g ai/ha or less, 27.5 g ai/ha or less, 25 g ai/ha or less, 22.5 g ai/ha or less, 20 g ai/ha or less, 17.5 g ai/ha or less, 15 g ai/ha or less, 12.5 g ai/ha or less, 10 g ai/ha or less, or 7.5 g ai/ha or less; or in an amount ranging from any of the minimum values described above to any of the maximum values described above, such as 5-100 g ai/ha, 5-90 g ai/ha, 7.5-45 g ai/ha, 10-55 g ai/ha, 15-90 g ai/ha, 20-50 g ai/ha, 22.5-90 g ai/ha, 25-52.5 g ai/ha, 25-80 g ai/ha, 25-65 g ai/ha, 27.5-60 g ai/ha, 27.5-47.5 g ai/ha, 30-85 g ai/ha, or 40-95 g ai/ha.

Pyribenzoxim

Compositions and methods of the present disclosure can include pyribenzoxim or an agriculturally acceptable salt or ester thereof. Pyribenzoxim, shown below, is a pyrimidinyl oxybenzoate that provides post-emergence control of barnyard grass, blackgrass and *Polygonum* species in rice, wheat and zoysiagrass. Pyribenzoxim, as well as methods of preparing pyribenzoxim, are known in the art. Its herbicidal activity is described, for example, in *The Pesticide Manual*, Seventeenth Edition, 2016.

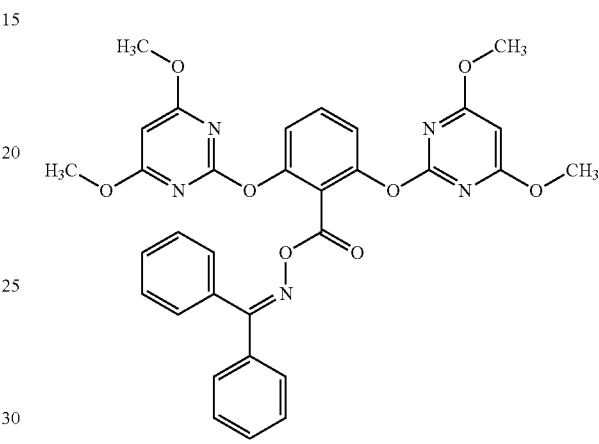

Pyribenzoxim can be applied to vegetation or an area adjacent the vegetation or applied to soil or water to prevent the emergence or growth of vegetation in an amount sufficient to induce a herbicidal effect. In some aspects, pyribenzoxim is applied to vegetation or an area adjacent the vegetation or applied to soil or water to prevent the emergence or growth of vegetation in an amount of 7.5 g ai/ha or more, such as 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, or 69 g ai/ha or more; in an amount of 70 g ai/ha or less, such as 69 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, or 8 g ai/ha or less; or in an amount ranging from any of the minimum values described above to any of the maximum values described above, such as 7.5-70 g ai/ha, 7.5-68 g ai/ha, 7.5-52 g ai/ha, 8-60 g ai/ha, 9-38 g ai/ha, 9-64 g ai/ha, 10-66 g ai/ha, 10-44 g ai/ha, 10-40 g ai/ha, 11-62 g ai/ha, 12-46 g ai/ha, 13-70 g ai/ha, 15-54 g ai/ha, or 20-64 g ai/ha.

Pyriftalid

Compositions and methods of the present disclosure can include pyriftalid or an agriculturally acceptable salt or ester thereof. Pyriftalid, shown below, is a pyrimidinyl oxybenzoate that provides control of grass weeds in rice. Pyriftalid, as well as methods of preparing pyriftalid, are known in the art. Its herbicidal activity is described, for example, in *The Pesticide Manual*, Seventeenth Edition, 2016.

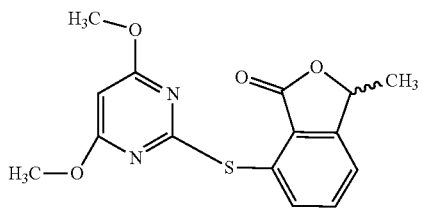

Pyriftalid can be applied to vegetation or an area adjacent the vegetation or applied to soil or water to prevent the emergence or growth of vegetation in an amount sufficient to induce a herbicidal effect. In some aspects, pyriftalid is applied to vegetation or an area adjacent the vegetation or applied to soil or water to prevent the emergence or growth of vegetation in an amount of 20 g ai/ha or more, such as 22 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 70 g ai/ha or more, 80 g ai/ha or more, 90 g ai/ha or more, 100 g ai/ha or more, 120 g ai/ha or more, 130 g ai/ha or more, 140 g ai/ha or more, 150 g ai/ha or more, 160 g ai/ha or more, 170 g ai/ha or more, 180 g ai/ha or more, 190 g ai/ha or more, 200 g ai/ha or more, 210 g ai/ha or more, 220 g ai/ha or more, 230 g ai/ha or more, 240 g ai/ha or more, 250 g ai/ha or more, 260 g ai/ha or more, 270 g ai/ha or more, 280 g ai/ha or more, 290 g ai/ha or more, 300 g ai/ha or more, 310 g ai/ha or more, 320 g ai/ha or more, 330 g ai/ha or more, 340 g ai/ha or more, or 345 g ai/ha or more; in an amount of 350 g ai/ha or less, such as 345 g ai/ha or less, 340 g ai/ha or less, 330 g ai/ha or less, 320 g ai/ha or less, 310 g ai/ha or less, 300 g ai/ha or less, 290 g ai/ha or less, 280 g ai/ha or less, 270 g ai/ha or less, 260 g ai/ha or less, 250 g ai/ha or less, 240 g ai/ha or less, 230 g ai/ha or less, 220 g ai/ha or less, 210 g ai/ha or less, 200 g ai/ha or less, 190 g ai/ha or less, 180 g ai/ha or less, 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 80 g ai/ha or less, 70 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, or 22 g ai/ha or less; or in an amount ranging from any of the minimum values described above to any of the maximum values described above, such as 20-350 g ai/ha, 55-170 g ai/ha, 22-220 g ai/ha, 70-260 g ai/ha, 30-250 g ai/ha, 45-220 g ai/ha, 80-200 g ai/ha, 130-270 g ai/ha, 150-330 g ai/ha, 60-160 g ai/ha, 180-345 g ai/ha, 210-310 g ai/ha, 90-190 g ai/ha, or 22-340 g ai/ha.

Pyriminobac

Compositions and methods of the present disclosure can include pyriminobac or an agriculturally acceptable salt or ester thereof. Pyriminobac, shown below, is a pyrimidinyl oxybenzoate that provides post-emergence control of *Echinochloa* spp., in paddy rice. Pyriminobac, as well as methods of preparing pyriminobac, are known in the art. Its herbicidal activity is described, for example, in *The Pesticide Manual*, Seventeenth Edition, 2016.

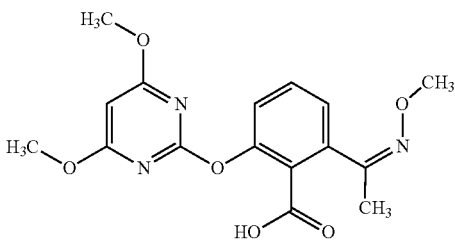

Pyriminobac can be applied to vegetation or an area adjacent the vegetation or applied to soil or water to prevent the emergence or growth of vegetation in an amount sufficient to induce a herbicidal effect. In some aspects, pyriminobac is applied to vegetation or an area adjacent the vegetation or applied to soil or water to prevent the emergence or growth of vegetation in an amount of 20 g ai/ha or more, such as 22 g ai/ha or more, 25 g ai/ha or more, 30 g ai/ha or more, 35 g ai/ha or more, 40 g ai/ha or more, 45 g ai/ha or more, 50 g ai/ha or more, 60 g ai/ha or more, 70 g ai/ha or more, 80 g ai/ha or more, 90 g ai/ha or more, 100 g ai/ha or more, 120 g ai/ha or more, 130 g ai/ha or more, 140 g ai/ha or more, 150 g ai/ha or more, 160 g ai/ha or more, or 170 g ai/ha or more; in an amount of 175 g ai/ha or less, such as 170 g ai/ha or less, 160 g ai/ha or less, 150 g ai/ha or less, 140 g ai/ha or less, 130 g ai/ha or less, 120 g ai/ha or less, 110 g ai/ha or less, 100 g ai/ha or less, 90 g ai/ha or less, 80 g ai/ha or less, 70 g ai/ha or less, 60 g ai/ha or less, 50 g ai/ha or less, 45 g ai/ha or less, 40 g ai/ha or less, 35 g ai/ha or less, 30 g ai/ha or less, 25 g ai/ha or less, or 22 g ai/ha or less; or in an amount ranging from any of the minimum values described above to any of the maximum values described above, such as 20-175 g ai/ha, 22-170 g ai/ha, 35-120 g ai/ha, 100-160 g ai/ha, 40-150 g ai/ha, 80-120 g ai/ha, 25-110 g ai/ha, 90-150 g ai/ha, 45-130 g ai/ha, 60-160 g ai/ha, 30-120 g ai/ha, 20-160 g ai/ha, or 22-100 g ai/ha.

D. Sulfonylaminocarbonyl Triazolinone Herbicides

In some aspects, the composition contains a herbicidally effective amount of (a) a pyridine carboxylate herbicide or an agriculturally acceptable N-oxide, salt, or ester thereof, and (b) flucarbazone, propoxycarbazone, thiencarbazone, or agriculturally acceptable salts or esters thereof, or combinations thereof.

Flucarbazone

Compositions and methods of the present disclosure can include flucarbazone or an agriculturally acceptable salt or ester thereof. Flucarbazone, shown below, is a sulfonylamino-carbonyl triazolinone that provides post-emergence control of annual grass weeds and some perennial grass weeds and some broad-leaved weeds. Flucarbazone, as well as methods of preparing flucarbazone, are known in the art. Its herbicidal activity is described in *The Pesticide Manual*, Seventeenth Edition, 2016.

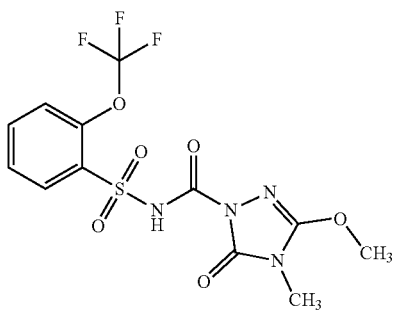 [SMILES: COc1nn(C(=O)NS(=O)(=O)c2ccccc2OC(F)(F)F)c(=O)n1C]

Flucarbazone can be applied to vegetation or an area adjacent the vegetation or applied to soil or water to prevent the emergence or growth of vegetation in an amount sufficient to induce a herbicidal effect. In some aspects, flucarbazone is applied to vegetation or an area adjacent the vegetation or applied to soil or water to prevent the emergence or growth of vegetation in an amount of 3.75 g ai/ha or more, such as 4 g ai/ha or more, 4.25 g ai/ha or more, 4.5 g ai/ha or more, 4.75 g ai/ha or more, 5 g ai/ha or more, 5.25 g ai/ha or more, 5.5 g ai/ha or more, 5.75 g ai/ha or more, 6 g ai/ha or more, 7 g ai/ha or more, 7.5 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 21 g ai/ha or more, 22 g ai/ha or more, 23 g ai/ha or more, 24 g ai/ha or more, 25 g ai/ha or more, 25.5 g ai/ha or more, 26 g ai/ha or more, 26.5 g ai/ha or more, 27 g ai/ha or more, 27.5 g ai/ha or more, 28 g ai/ha or more, 28.5 g ai/ha or more, 29 g ai/ha or more, 29.25 g ai/ha or more, 29.5 g ai/ha or more, or 29.75 g ai/ha or more; in an amount of 30 g ai/ha or less, such as 29.75 g ai/ha or less, 29.5 g ai/ha or less, 29.25 g ai/ha or less, 29 g ai/ha or less, 28.5 g ai/ha or less, 28 g ai/ha or less, 27.5 g ai/ha or less, 27 g ai/ha or less, 26.5 g ai/ha or less, 26 g ai/ha or less, 25 g ai/ha or less, 24 g ai/ha or less, 23 g ai/ha or less, 22 g ai/ha or less, 21 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7.5 g ai/ha or less, 7 g ai/ha or less, 6 g ai/ha or less, 5.75 g ai/ha or less, 5.5 g ai/ha or less, 5.25 g ai/ha or less, 5 g ai/ha or less, 4.75 g ai/ha or less, 4.5 g ai/ha or less, 4.25 g ai/ha or less, or 4 g ai/ha or less; or in an amount ranging from any of the minimum values described above to any of the maximum values described above, such as 3.75-30 g ai/ha, 3.75-27 g ai/ha, 4-28 g ai/ha, 4-20 g ai/ha, 5-29.5 g ai/ha, 5-21 g ai/ha, 5.5-28 g ai/ha, 6-26 g ai/ha, 7-25 g ai/ha, 7.5-30 g ai/ha, 7.5-21 g ai/ha, 8-25 g ai/ha, 9-19 g ai/ha, or 10-28.5 g ai/ha.

Propoxycarbazone

Compositions and methods of the present disclosure can include propoxycarbazone or an agriculturally acceptable salt or ester thereof. Propoxycarbazone, shown below, is a sulfonylaminocarbonyl triazolinone that provides post-emergence control of grass weeds and some broad-leaved weeds. Propoxycarbazone, as well as methods of preparing propoxycarbazone, are known in the art. Its herbicidal activity is described in *The Pesticide Manual*, Seventeenth Edition, 2016.

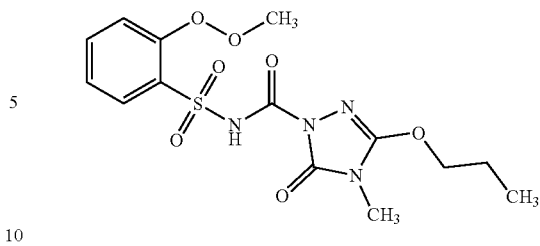

Propoxycarbazone can be applied to vegetation or an area adjacent the vegetation or applied to soil or water to prevent the emergence or growth of vegetation in an amount sufficient to induce a herbicidal effect. In some aspects, propoxycarbazone is applied to vegetation or an area adjacent the vegetation or applied to soil or water to prevent the emergence or growth of vegetation in an amount of 3.75 g ai/ha or more, such as 4 g ai/ha or more, 4.25 g ai/ha or more, 4.5 g ai/ha or more, 4.75 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 61 g ai/ha or more, 62 g ai/ha or more, 63 g ai/ha or more, 64 g ai/ha or more, 65 g ai/ha or more, 66 g ai/ha or more, 67 g ai/ha or more, 68 g ai/ha or more, or 69 g ai/ha or more; in an amount of 70 g ai/ha or less, such as 69 g ai/ha or less, 68 g ai/ha or less, 67 g ai/ha or less, 66 g ai/ha or less, 65 g ai/ha or less, 64 g ai/ha or less, 63 g ai/ha or less, 62 g ai/ha or less, 61 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 28 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, 4.5 g ai/ha or less, 4.25 g ai/ha or less, or 4 g ai/ha or less; or in an amount ranging from any of the minimum values described above to any of the maximum values described above, such as 3.75-70 g ai/ha, 4-68 g ai/ha, 4.25-56 g ai/ha, 4.5-28 g ai/ha, 5-62 g ai/ha, 5-38 g ai/ha, 7-70 g ai/ha, 8-52 g ai/ha, 9-40 g ai/ha, 10-70 g ai/ha, 10-24 g ai/ha, 12-69 g ai/ha, 14-65 g ai/ha, or 20-58 g ai/ha.

Thiencarbazone

Compositions and methods of the present disclosure can include thiencarbazone or an agriculturally acceptable salt or ester thereof. Thiencarbazone-methyl, shown below, is a sulfonylaminocarbonyl triazolinone that provides post-emergence control of grass weeds and some broad-leaved weeds. Thiencarbazone, as well as methods of preparing thiencarbazone, are known in the art. Its herbicidal activity is described in *The Pesticide Manual*, Seventeenth Edition, 2016.

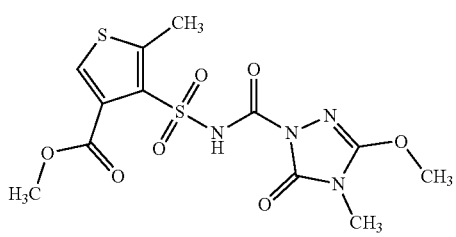

Thiencarbazone can be applied to vegetation or an area adjacent the vegetation or applied to soil or water to prevent the emergence or growth of vegetation in an amount sufficient to induce a herbicidal effect. In some aspects, thiencarbazone is applied to vegetation or an area adjacent the vegetation or applied to soil or water to prevent the emergence or growth of vegetation in an amount of 2.5 g ai/ha or more, such as 2.75 g ai/ha or more, 3 g ai/ha or more, 3.25 g ai/ha or more, 3.5 g ai/ha or more, 3.75 g ai/ha or more, 4 g ai/ha or more, 4.25 g ai/ha or more, 4.5 g ai/ha or more, 4.75 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 28 g ai/ha or more, 30 g ai/ha or more, 31 g ai/ha or more, 32 g ai/ha or more, 33 g ai/ha or more, 34 g ai/ha or more, 35 g ai/ha or more, 36 g ai/ha or more, 37 g ai/ha or more, 38 g ai/ha or more, 39 g ai/ha or more, 40 g ai/ha or more, 41 g ai/ha or more, 42 g ai/ha or more, 43 g ai/ha or more, or 44 g ai/ha or more; in an amount of 45 g ai/ha or less, such as 44 g ai/ha or less, 43 g ai/ha or less, 42 g ai/ha or less, 41 g ai/ha or less, 40 g ai/ha or less, 39 g ai/ha or less, 38 g ai/ha or less, 37 g ai/ha or less, 36 g ai/ha or less, 35 g ai/ha or less, 34 g ai/ha or less, 33 g ai/ha or less, 32 g ai/ha or less, 31 g ai/ha or less, 30 g ai/ha or less, 28 g ai/ha or less, 26 g ai/ha or less, 24 g ai/ha or less, 22 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, 4.5 g ai/ha or less, 4.25 g ai/ha or less, 4 g ai/ha or less, 3.75 g ai/ha or less, 3.5 g ai/ha or less, 3.25 g ai/ha or less, 3 g ai/ha or less, or 2.75 g ai/ha or less; or in an amount ranging from any of the minimum values described above to any of the maximum values described above, such as 2.5-45 g ai/ha, 2.5-41 g ai/ha, 2.75-39 g ai/ha, 2.75-37 g ai/ha, 3-40 g ai/ha, 3-33 g ai/ha, 3.25-28 g ai/ha, 3.5-45 g ai/ha, 3.75-45 g ai/ha, 4-39 g ai/ha, 4.5-31 g ai/ha, 5-45 g ai/ha, 5-37 g ai/ha, or 8-36 g ai/ha.

E. Sulfonylurea Herbicides

In some aspects, the composition contains a herbicidally effective amount of (a) a pyridine carboxylate herbicide or an agriculturally acceptable N-oxide, salt, or ester thereof, and (b) amidosulfuron, azimsulfuron, bensulfuron, chlorimuron, chlorsulfuron, cinosulfuron, cyclosulfamuron, ethametsulfuron, ethoxysulfuron, flazasulfuron, flucetosulfuron, flupyrsulfuron, foramsulfuron, halosulfuron, imazosulfuron, iodosulfuron, iofensulfuron, mesosulfuron, metazosulfuron, metsulfuron, nicosulfuron, orthosulfamuron, oxasulfuron, primisulfuron, propyrisulfuron, prosulfuron, pyrazosulfuron, rimsulfuron, sulfometuron, sulfosulfuron, triasulfuron, tribenuron, thifensulfuron, trifloxysulfuron, triflusulfuron, tritosulfuron, or agriculturally acceptable salts or esters thereof, or combinations thereof.

Amidosulfuron

Compositions and methods of the present disclosure can include amidosulfuron or an agriculturally acceptable salt or ester thereof. Amidosulfuron, shown below, is a sulfonylurea that provides post-emergence control of a wide range of broadleaf weeds, e.g., cleavers, in winter wheat, durum wheat, barley, rye, triticale and oats. Amidosulfuron, as well as methods of preparing amidosulfuron, are known in the art. Its herbicidal activity is described in *The Pesticide Manual*, Seventeenth Edition, 2016.

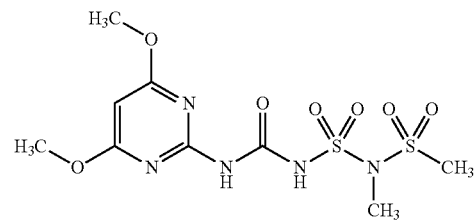

Amidosulfuron can be applied to vegetation or an area adjacent the vegetation or applied to soil or water to prevent the emergence or growth of vegetation in an amount sufficient to induce a herbicidal effect. In some aspects, amidosulfuron is applied to vegetation or an area adjacent the vegetation or applied to soil or water to prevent the emergence or growth of vegetation in an amount of 3.75 g ai/ha or more, such as 4 g ai/ha or more, 4.25 g ai/ha or more, 4.5 g ai/ha or more, 4.75 g ai/ha or more, 5 g ai/ha or more, 6 g ai/ha or more, 7 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 51 g ai/ha or more, 52 g ai/ha or more, 53 g ai/ha or more, 54 g ai/ha or more, 55 g ai/ha or more, 56 g ai/ha or more, 57 g ai/ha or more, 58 g ai/ha or more, or 59 g ai/ha or more; in an amount of 60 g ai/ha or less, such as 59 g ai/ha or less, 58 g ai/ha or less, 57 g ai/ha or less, 56 g ai/ha or less, 55 g ai/ha or less, 54 g ai/ha or less, 53 g ai/ha or less, 52 g ai/ha or less, 51 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, 4.5 g ai/ha or less, or 4.25 g ai/ha or less, or 4 g ai/ha or less; or in an amount ranging from any of the minimum values described above to any of the maximum values described above, such as 3.75-60 g ai/ha, 4-58 g ai/ha, 4.5-51 g ai/ha, 5-57 g ai/ha, 5-30 g ai/ha, 6-42 g ai/ha, 8-50 g ai/ha, 9-32 g ai/ha, 10-53 g ai/ha, 12-30 g ai/ha, or 13-40 g ai/ha.

Azimsulfuron

Compositions and methods of the present disclosure can include azimsulfuron or an agriculturally acceptable salt or ester thereof. Azimsulfuron, shown below, is a sulfonylurea that provides e.g., post-emergence control of annual and perennial broadleaf and sedge weeds in rice. Azimsulfuron, as well as methods of preparing azimsulfuron, are known in the art. Its herbicidal activity is described in *The Pesticide Manual*, Seventeenth Edition, 2016.

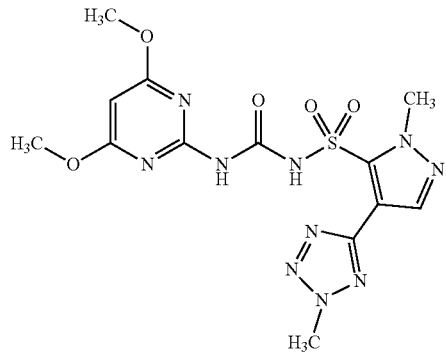 [SMILES: COc1cc(OC)nc(NC(=O)NS(=O)(=O)c2c(-c3nnn(C)n3)cnn2C)n1]

Azimsulfuron can be applied to vegetation or an area adjacent the vegetation or applied to soil or water to prevent the emergence or growth of vegetation in an amount sufficient to induce a herbicidal effect. In some aspects, azimsulfuron is applied to vegetation or an area adjacent the vegetation or applied to soil or water to prevent the emergence or growth of vegetation in an amount of 3.125 g ai/ha or more, such as 3.25 g ai/ha or more, 3.5 g ai/ha or more, 3.75 g ai/ha or more, 4 g ai/ha or more, 4.25 g ai/ha or more, 4.5 g ai/ha or more, 4.75 g ai/ha or more, 5 g ai/ha or more, 5.5 g ai/ha or more, 6 g ai/ha or more, 6.5 g ai/ha or more, 7 g ai/ha or more, 7.5 g ai/ha or more, 8 g ai/ha or more, 8.5 g ai/ha or more, 9 g ai/ha or more, 9.5 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 20.5 g ai/ha or more, 21 g ai/ha or more, 21.5 g ai/ha or more, 22 g ai/ha or more, 22.5 g ai/ha or more, 22.75 g ai/ha or more, 23 g ai/ha or more, 23.25 g ai/ha or more, 23.5 g ai/ha or more, 23.75 g ai/ha or more, 24 g ai/ha or more, 24.25 g ai/ha or more, 24.5 g ai/ha or more, or 24.75 g ai/ha or more; in an amount of 25 g ai/ha or less, such as 24.75 g ai/ha or less, 24.5 g ai/ha or less, 24.25 g ai/ha or less, 24 g ai/ha or less, 23.75 g ai/ha or less, 23.5 g ai/ha or less, 23.25 g ai/ha or less, 23 g ai/ha or less, 22.75 g ai/ha or less, 22.5 g ai/ha or less, 22 g ai/ha or less, 21.5 g ai/ha or less, 21 g ai/ha or less, 20.5 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9.5 g ai/ha or less, 9 g ai/ha or less, 8.5 g ai/ha or less, 8 g ai/ha or less, 7.5 g ai/ha or less, 7 g ai/ha or less, 6.5 g ai/ha or less, 6 g ai/ha or less, 5.5 g ai/ha or less, 5 g ai/ha or less, 4.75 g ai/ha or less, 4.5 g ai/ha or less, 4.25 g ai/ha or less, 4 g ai/ha or less, 3.75 g ai/ha or less, 3.5 g ai/ha or less, or 3.25 g ai/ha or less; or in an amount ranging from any of the minimum values described above to any of the maximum values described above, such as 3.125-25 g ai/ha, 3.125-23.5 g ai/ha, 3.125-19 g ai/ha, 3.25-22 g ai/ha, 3.5-24.5 g ai/ha, 3.5-19 g ai/ha, 3.75-22 g ai/ha, 4-25 g ai/ha, 4-23.25 g ai/ha, 4.25-20 g ai/ha, 4.5-18 g ai/ha, 4.75-22.75 g ai/ha, or 5-24 g ai/ha.

Bensulfuron

Compositions and methods of the present disclosure can include bensulfuron or an agriculturally acceptable salt or ester thereof. Bensulfuron-methyl, shown below, is a sulfo-nylurea that provides e.g., pre- and post-emergence control of annual and perennial broadleaf weeds and sedges in rice. Bensulfuron, as well as methods of preparing bensulfuron, are known in the art. Its herbicidal activity is described in *The Pesticide Manual*, Seventeenth Edition, 2016.

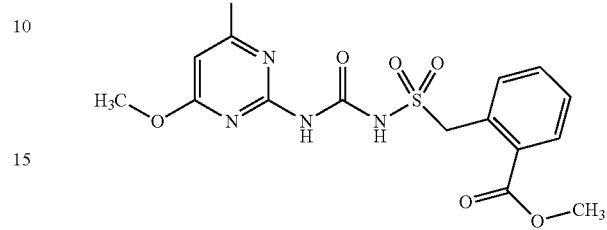

Bensulfuron can be applied to vegetation or an area adjacent the vegetation or applied to soil or water to prevent the emergence or growth of vegetation in an amount sufficient to induce a herbicidal effect. In some aspects, bensulfuron is applied to vegetation or an area adjacent the vegetation or applied to soil or water to prevent the emergence or growth of vegetation in an amount of 8.75 g ai/ha or more, such as 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, or 69 g ai/ha or more; in an amount of 70 g ai/ha or less, such as 69 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, or 9 g ai/ha or less; or in an amount ranging from any of the minimum values described above to any of the maximum values described above, such as 8.75-70 g ai/ha, 9-60 g ai/ha, 10-65 g ai/ha, 10-40 g ai/ha, 10-28 g ai/ha, 11-68 g ai/ha, 11-54 g ai/ha, 12-60 g ai/ha, 12-42 g ai/ha, 13-69 g ai/ha, 14-56 g ai/ha, 15-40 g ai/ha, 20-46 g ai/ha, or 20-69 g ai/ha.

Chlorsulfuron

Compositions and methods of the present disclosure can include chlorsulfuron or an agriculturally acceptable salt or ester thereof. Chlorsulfuron, shown below, is a sulfonylurea that provides control of e.g., broadleaf weeds and annual grasses in wheat, barley, oats, rye, triticale, flax and on non-crop land. Chlorsulfuron, as well as methods of preparing chlorsulfuron, are known in the art. Its herbicidal activity is described in *The Pesticide Manual*, Seventeenth Edition, 2016.

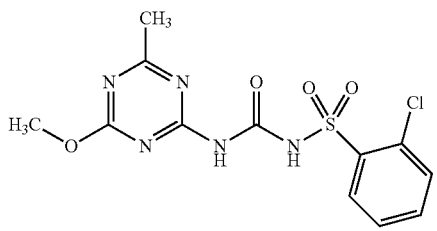 [SMILES: COc1nc(C)nc(NC(=O)NS(=O)(=O)c2ccccc2Cl)n1]

Chlorsulfuron can be applied to vegetation or an area adjacent the vegetation or applied to soil or water to prevent the emergence or growth of vegetation in an amount sufficient to induce a herbicidal effect. In some aspects, chlorsulfuron is applied to vegetation or an area adjacent the vegetation or applied to soil or water to prevent the emergence or growth of vegetation in an amount of 1.1 g ai/ha or more, such as 1.25 g ai/ha or more, . . . , 1.5 g ai/ha or more, 1.75 g ai/ha or more, 2 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.25 g ai/ha or more, 4.5 g ai/ha or more, 4.75 g ai/ha or more, 5 g ai/ha or more, 6 g ai/ha or more, 7 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 47 g ai/ha or more, 48 g ai/ha or more, 49 g ai/ha or more, 50 g ai/ha or more, 51 g ai/ha or more, or 51.5 g ai/ha or more; in an amount of 52 g ai/ha or less, such as 51.5 g ai/ha or less, 51 g ai/ha or less, 50 g ai/ha or less, 49 g ai/ha or less, 48 g ai/ha or less, 47 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, 4.5 g ai/ha or less, or 4.25 g ai/ha or less, ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, 2.25 g ai/ha or less, 2 g ai/ha or less, 1.75 g ai/ha or less, 1.5 g ai/ha or less, or 1.25 g ai/ha or less; or in an amount ranging from any of the minimum values described above to any of the maximum values described above, such as 1.1-52 g ai/ha, 1.25-51.5 g ai/ha, 1.5-30 g ai/ha, 1.75-47 g ai/ha, 2-26 g ai/ha, 3-50 g ai/ha, 4-38 g ai/ha, 4.5-42 g ai/ha, 5-51 g ai/ha, 7-49 g ai/ha, 9-32 g ai/ha, 10-45 g ai/ha, 12-52 g ai/ha, or 15-48 g ai/ha.

Ethoxysulfuron

Compositions and methods of the present disclosure can include ethoxysulfuron or an agriculturally acceptable salt or ester thereof. Ethoxysulfuron, shown below, is a sulfonylurea that provides e.g., control of broadleaf and sedge weeds in cereals, rice and sugar cane. Ethoxysulfuron, as well as methods of preparing ethoxysulfuron, are known in the art. Its herbicidal activity is described in *The Pesticide Manual*, Seventeenth Edition, 2016.

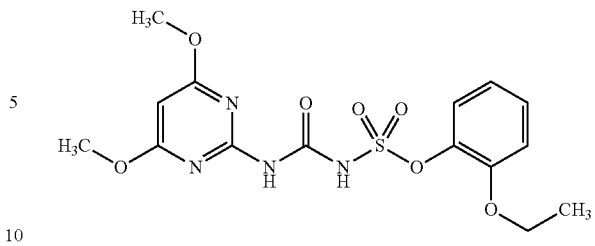

Ethoxysulfuron can be applied to vegetation or an area adjacent the vegetation or applied to soil or water to prevent the emergence or growth of vegetation in an amount sufficient to induce a herbicidal effect. In some aspects, ethoxysulfuron is applied to vegetation or an area adjacent the vegetation or applied to soil or water to prevent the emergence or growth of vegetation in an amount of 5 g ai/ha or more, such as 6 g ai/ha or more, 7 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 101 g ai/ha or more, 102 g ai/ha or more, 103 g ai/ha or more, 104 g ai/ha or more, 105 g ai/ha or more, 106 g ai/ha or more, 107 g ai/ha or more, 108 g ai/ha or more, 109 g ai/ha or more, 110 g ai/ha or more, 111 g ai/ha or more, 112 g ai/ha or more, 113 g ai/ha or more, 114 g ai/ha or more, 115 g ai/ha or more, 116 g ai/ha or more, 117 g ai/ha or more, 118 g ai/ha or more, or 119 g ai/ha or more; in an amount of 120 g ai/ha or less, such as 119 g ai/ha or less, 118 g ai/ha or less, 117 g ai/ha or less, 116 g ai/ha or less, 115 g ai/ha or less, 114 g ai/ha or less, 113 g ai/ha or less, 112 g ai/ha or less, 111 g ai/ha or less, 110 g ai/ha or less, 109 g ai/ha or less, 108 g ai/ha or less, 107 g ai/ha or less, 106 g ai/ha or less, 105 g ai/ha or less, 104 g ai/ha or less, 103 g ai/ha or less, 102 g ai/ha or less, 101 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7 g ai/ha or less, or 6 g ai/ha or less; or in an amount ranging from any of the minimum values described above to any of the maximum values described above, such as 5-120 g ai/ha, 5-90 g ai/ha, 5-75 g ai/ha, 6-114 g ai/ha, 8-108 g ai/ha, 9-113 g ai/ha, 10-80 g ai/ha, 10-55 g ai/ha, 12-112 g ai/ha, 13-85 g ai/ha, 15-106 g ai/ha, 20-100 g ai/ha, 24-105 g ai/ha, or 28-115 g ai/ha.

Flupyrsulfuron

Compositions and methods of the present disclosure can include flupyrsulfuron or an agriculturally acceptable salt or ester thereof. Flupyrsulfuron-methyl sodium, shown below, is a

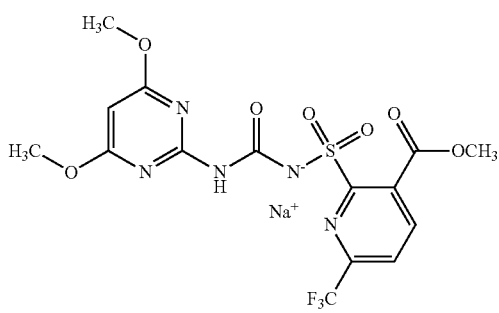 [SMILES: COC(=O)c1ccc(C(F)(F)F)nc1S(=O)(=O)[N-]C(=O)Nc1nc(OC)cc(OC)n1 ; [Na+]]

sulfonylurea that is used, e.g., for post-emergent control of grass and broadleaf weeds in cereals. Flupyrsulfuron, as well as methods of preparing flupyrsulfuron, are known in the art. Its herbicidal activity is described in *The Pesticide Manual*, Seventeenth Edition, 2016.

Flupyrsulfuron can be applied to vegetation or an area adjacent the vegetation or applied to soil or water to prevent the emergence or growth of vegetation in an amount sufficient to induce a herbicidal effect. In some aspects, flupyrsulfuron thereof is applied to vegetation or an area adjacent the vegetation or applied to soil or water to prevent the emergence or growth of vegetation in an amount of 2.5 g ai/ha or more, such as 2.6 g ai/ha or more, 2.7 g ai/ha or more, 2.8 g ai/ha or more, 2.9 g ai/ha or more, 3.0 g ai/ha or more, 3.2 g ai/ha or more, 3.4 g ai/ha or more, 3.6 g ai/ha or more, 3.8 g ai/ha or more, 4 g ai/ha or more, 4.2 g ai/ha or more, 4.4 g ai/ha or more, 4.6 g ai/ha or more, 4.8 g ai/ha or more, 5 g ai/ha or more, 5.2 g ai/ha or more, 5.4 g ai/ha or more, 5.6 g ai/ha or more, 5.8 g ai/ha or more, 6 g ai/ha or more, 6.2 g ai/ha or more, 6.4 g ai/ha or more, 6.6 g ai/ha or more, 6.8 g ai/ha or more, 7 g ai/ha or more, 7.2 ai/ha or more, 7.4 g ai/ha or more, 7.6 g ai/ha or more, 8 g ai/ha or more, 8.2 g ai/ha or more, 8.4 ai/ha or more, 8.6 g ai/ha or more, 8.8 g ai/ha or more, 9 g ai/ha or more, 9.1 g ai/ha or more, 9.2 g ai/ha or more, 9.3 g ai/ha or more, 9.4 g ai/ha or more, 9.5 g ai/ha or more, 9.6 g ai/ha or more, 9.7 g ai/ha or more, 9.8 g ai/ha or more, or 9.9 g ai/ha or more; in an amount of 10 g ai/ha or less, such as 9.9 g ai/ha or less, 9.8 g ai/ha or less, 9.7 g ai/ha or less, 9.6 g ai/ha or less, 9.5 g ai/ha or less, 9.4 g ai/ha or less, 9.3 g ai/ha or less, 9.2 g ai/ha or less, 9.1 g ai/ha or less, 9 g ai/ha or less, 8.8 g ai/ha or less, 8.6 g ai/ha or less, 8.4 g ai/ha or less, 8.2 g ai/ha or less, 8 g ai/ha or less, 7.8 g ai/ha or less, 7.6 g ai/ha or less, 7.4 g ai/ha or less, 7.2 g ai/ha or less, 7 g ai/ha or less, 6.8 g ai/ha or less, 6.6 g ai/ha or less, 6.4 g ai/ha or less, 6.2 g ai/ha or less, 6 g ai/ha or less, 5.8 g ai/ha or less, 5.6 g ai/ha or less, 5.4 g ai/ha or less, 5.2 g ai/ha or less, 5 g ai/ha or less, 4.8 g ai/ha or less, 4.6 g ai/ha or less, 4.4 g ai/ha or less, 4.2 g ai/ha or less, 4 g ai/ha or less, 3.8 g ai/ha or less, 3.6 g ai/ha or less, 3.4 g ai/ha or less, 3.2 g ai/ha or less, 3 g ai/ha or less, 2.9 g ai/ha or less, 2.8 g ai/ha or less, 2.7 g ai/ha or less, or 2.6 g ai/ha or less; or in an amount ranging from any of the minimum values described above to any of the maximum values described above, such as 2.5-10 g ai/ha, 2.5-9.4 g ai/ha, 2.6-9 g ai/ha, 2.7-10 g ai/ha, 2.8-9.4 g ai/ha, 3-8.8 g ai/ha, 3.2-7.2 g ai/ha, 3.4-8.6 g ai/ha, 3.6-10 g ai/ha, 3.8-9.5 g ai/ha, 4-8.8 g ai/ha, 4.4-7 g ai/ha, 4.6-6.8 g ai/ha, or 5-9.5 g ai/ha.

Foramsulfuron

Compositions and methods of the present disclosure can include foramsulfuron or an agriculturally acceptable salt or ester thereof. Foramsulfuron, shown below, is a sulfonylurea that provides e.g., post-emergence control of grass and broadleaf weeds in maize. Foramsulfuron, as well as methods of preparing foramsulfuron, are known in the art. Its herbicidal activity is described in *The Pesticide Manual*, Seventeenth Edition, 2016.

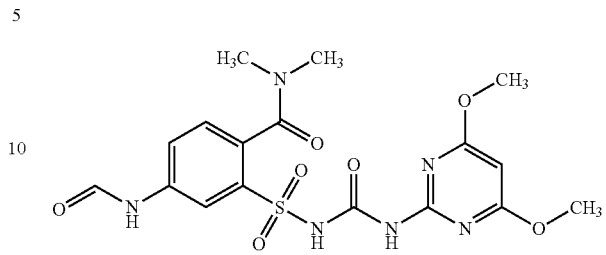

Foramsulfuron can be applied to vegetation or an area adjacent the vegetation or applied to soil or water to prevent the emergence or growth of vegetation in an amount sufficient to induce a herbicidal effect. In some aspects, foramsulfuron is applied to vegetation or an area adjacent the vegetation or applied to soil or water to prevent the emergence or growth of vegetation in an amount of 22.5 g ai/ha or more, such as 23 g ai/ha or more, 24 g ai/ha or more, 25 g ai/ha or more, 26 g ai/ha or more, 28 g ai/ha or more, 30 g ai/ha or more, 32 g ai/ha or more, 34 g ai/ha or more, 35 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 51 g ai/ha or more, 52 g ai/ha or more, 53 g ai/ha or more, 54 g ai/ha or more, 55 g ai/ha or more, 56 g ai/ha or more, 57 g ai/ha or more, or 58 g ai/ha or more; in an amount of 59 g ai/ha or less, such as 58 g ai/ha or less, 57 g ai/ha or less, 56 g ai/ha or less, 55 g ai/ha or less, 54 g ai/ha or less, 53 g ai/ha or less, 52 g ai/ha or less, 51 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 35 g ai/ha or less 34 g ai/ha or less, 32 g ai/ha or less, 30 g ai/ha or less, 28 g ai/ha or less, 26 g ai/ha or less, 25 g ai/ha or less, 24 g ai/ha or less, or 23 g ai/ha or less; or in an amount ranging from any of the minimum values described above to any of the maximum values described above, such as 22.5-59 g ai/ha, 23-51 g ai/ha, 25-38 g ai/ha, 26-57 g ai/ha, 28-48 g ai/ha, 30-58 g ai/ha, 30-50 g ai/ha, 32-55 g ai/ha, 34-57 g ai/ha, or 35-58 g ai/ha.

Halosulfuron

Compositions and methods of the present disclosure can include halosulfuron or an agriculturally acceptable salt or ester thereof. Halosulfuron-methyl, shown below, is a sulfonylurea that has demonstrated activity for the control of annual broadleaf weeds and nutsedge species, in maize, sugar cane, rice, sorghum, nuts, and turf. Halosulfuron, as well as methods of preparing halosulfuron, are known in the art. Its herbicidal activity is described in *The Pesticide Manual*, Seventeenth Edition, 2016.

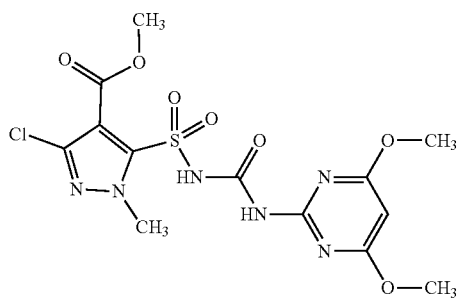 [SMILES: COC(=O)c1c(Cl)nn(C)c1S(=O)(=O)NC(=O)Nc1nc(OC)cc(OC)n1]

Halosulfuron can be applied to vegetation or an area adjacent the vegetation or applied to soil or water to prevent the emergence or growth of vegetation in an amount sufficient to induce a herbicidal effect. In some aspects, halosulfuron is applied to vegetation or an area adjacent the vegetation or applied to soil or water to prevent the emergence or growth of vegetation in an amount of 4.375 g ai/ha or more, such as 4.75 g ai/ha or more, 5 g ai/ha or more, 6 g ai/ha or more, 7 g ai/ha or more, 8 g ai/ha or more, 9 g ai/ha or more, 10 g ai/ha or more, 15 g ai/ha or more, 20 g ai/ha or more, 25 g ai/ha or more, 30 g ai/ha or more, 35 g ai/ha or more, 40 g ai/ha or more, 45 g ai/ha or more, 50 g ai/ha or more, 55 g ai/ha or more, 60 g ai/ha or more, 65 g ai/ha or more, 70 g ai/ha or more, 75 g ai/ha or more, 80 g ai/ha or more, 85 g ai/ha or more, 90 g ai/ha or more, 95 g ai/ha or more, 100 g ai/ha or more, 105 g ai/ha or more, 110 g ai/ha or more, 115 g ai/ha or more, 120 g ai/ha or more, 122 g ai/ha or more, 124 g ai/ha or more, 126 g ai/ha or more, 128 g ai/ha or more, 130 g ai/ha or more, 131 g ai/ha or more, 132 g ai/ha or more, 133 g ai/ha or more, 134 g ai/ha or more, 135 g ai/ha or more, 136 g ai/ha or more, 137 g ai/ha or more, 138 g ai/ha or more, or 139 g ai/ha or more; in an amount of 139 g ai/ha or less, such as 138 g ai/ha or less, 137 g ai/ha or less, 136 g ai/ha or less, 135 g ai/ha or less, 134 g ai/ha or less, 133 g ai/ha or less, 132 g ai/ha or less, 131 g ai/ha or less, 130 g ai/ha or less, 129 g ai/ha or less, 128 g ai/ha or less, 126 g ai/ha or less, 124 g ai/ha or less, 122 g ai/ha or less, 120 g ai/ha or less, 115 g ai/ha or less, 110 g ai/ha or less, 105 g ai/ha or less, 100 g ai/ha or less, 95 g ai/ha or less, 90 g ai/ha or less, 85 g ai/ha or less, 80 g ai/ha or less, 75 g ai/ha or less, 70 g ai/ha or less, 65 g ai/ha or less, 60 g ai/ha or less, 55 g ai/ha or less, 50 g ai/ha or less, 45 g ai/ha or less, 40 g ai/ha or less, 35 g ai/ha or less, 30 g ai/ha or less, 25 g ai/ha or less, 20 g ai/ha or less, 15 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, or 4.5 g ai/ha or less; or in an amount ranging from any of the minimum values described above to any of the maximum values described above, such as 4.375-140 g ai/ha, 4.5-120 g ai/ha, 4.75-100 g ai/ha, 5-95 g ai/ha, 5-131 g ai/ha, 6-80 g ai/ha, 7-130 g ai/ha, 8-122 g ai/ha, 9-75 g ai/ha, 10-139 g ai/ha, 15-90 g ai/ha, 20-124 g ai/ha, 25-110 g ai/ha, or 25-75 g ai/ha.

Iodosulfuron

Compositions and methods of the present disclosure can include iodosulfuron or an agriculturally acceptable salt or ester thereof. Iodosulfuron-methyl-sodium, shown below, is a sulfonylurea that provides, e.g., post-emergence control of grass and broadleaf weeds in winter, spring and durum wheat, triticale, rye and spring barley. Iodosulfuron, as well as methods of preparing iodosulfuron, are known in the art. Its herbicidal activity is described in *The Pesticide Manual*, Seventeenth Edition, 2016.

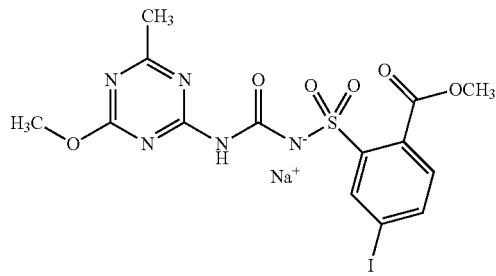 [SMILES: COC(=O)c1ccc(I)cc1S(=O)(=O)[N-]C(=O)Nc1nc(C)nc(OC)n1 ; [Na+]]

Iodosulfuron can be applied to vegetation or an area adjacent the vegetation or applied to soil or water to prevent the emergence or growth of vegetation in an amount sufficient to induce a herbicidal effect. In some aspects, iodosulfuron is applied to vegetation or an area adjacent the vegetation or applied to soil or water to prevent the emergence or growth of vegetation in an amount of 0.1 g ai/ha or more, such as 0.2 g ai/ha or greater, 0.3 g ai/ha or greater, 0.4 g ai/ha or greater, 0.5 g ai/ha or greater, 0.6 g ai/ha or greater, 0.7 g ai/ha or greater, 0.8 g ai/ha or greater, 0.9 g ai/ha or greater, 1 g ai/ha or greater, 1.1 g ai/ha or greater, 1.2 g ai/ha or greater, 1.3 g ai/ha or greater, 1.4 g ai/ha or more, 1.5 g ai/ha or more, 1.6 g ai/ha or more, 1.7 g ai/ha or more, 1.8 g ai/ha or more, 1.9 g ai/ha or more, 2.0 g ai/ha or more, 2.1 g ai/ha or more, 2.2 g ai/ha or more, 2.3 g ai/ha or more, 2.3 g ai/ha or more, 2.4 g ai/ha or more, 2.5 g ai/ha or more, 2.6 g ai/ha or more, 2.7 g ai/ha or more, 2.8 g ai/ha or more, 2.9 g ai/ha or more, 3.0 g ai/ha or more, 3.2 g ai/ha or more, 3.4 g ai/ha or more, 3.6 g ai/ha or more, 3.8 g ai/ha or more, 4 g ai/ha or more, 4.2 g ai/ha or more, 4.4 g ai/ha or more, 4.6 g ai/ha or more, 4.8 g ai/ha or more, 5 g ai/ha or more, 5.2 g ai/ha or more, 5.4 g ai/ha or more, 5.6 g ai/ha or more, 5.8 g ai/ha or more, 6 g ai/ha or more, 6.2 g ai/ha or more, 6.4 g ai/ha or more, 6.6 g ai/ha or more, 6.8 g ai/ha or more, 7 g ai/ha or more, 7.2 ai/ha or more, 7.4 g ai/ha or more, 7.6 g ai/ha or more, 8 g ai/ha or more, 8.2 g ai/ha or more, 8.4 ai/ha or more, 8.6 g ai/ha or more, 8.8 g ai/ha or more, 9 g ai/ha or more, 9.1 g ai/ha or more, 9.2 g ai/ha or more, 9.3 g ai/ha or more, 9.4 g ai/ha or more, 9.5 g ai/ha or more, 9.6 g ai/ha or more, 9.7 g ai/ha or more, 9.8 g ai/ha or more, or 9.9 g ai/ha or more; in an amount of 10 g ai/ha or less, such as 9.9 g ai/ha or less, 9.8 g ai/ha or less, 9.7 g ai/ha or less, 9.6 g ai/ha or less, 9.5 g ai/ha or less, 9.4 g ai/ha or less, 9.3 g ai/ha or less, 9.2 g ai/ha or less, 9.1 g ai/ha or less, 9 g ai/ha or less, 8.8 g ai/ha or less, 8.6 g ai/ha or less, 8.4 g ai/ha or less, 8.2 g ai/ha or less, 8 g ai/ha or less, 7.8 g ai/ha or less, 7.6 g ai/ha or less, 7.4 g ai/ha or less, 7.2 g ai/ha or less, 7 g ai/ha or less, 6.8 g ai/ha or less, 6.6 g ai/ha or less, 6.4 g ai/ha or less, 6.2 g ai/ha or less, 6 g ai/ha or less, 5.8 g ai/ha or less, 5.6 g ai/ha or less, 5.4 g ai/ha or less, 5.2 g ai/ha or less, 5 g ai/ha or less, 4.8 g ai/ha or less, 4.6 g ai/ha or less, 4.4 g ai/ha or less, 4.2 g ai/ha or less, 4 g ai/ha or less, 3.8 g ai/ha or less, 3.6 g ai/ha or less, 3.4 g ai/ha or less, 3.2 g ai/ha or less, 3 g ai/ha or less, 2.9 g ai/ha or less, 2.8 g ai/ha or less, 2.7 g ai/ha or less, 2.6 g ai/ha or less, 2.5 g ai/ha or less, 2.4 g ai/ha or less, 2.3 g ai/ha or less, 2.2 g ai/ha or less, 2.1 g ai/ha or less, 2.0 g ai/ha or less, 1.9 g ai/ha or less, 1.8 g ai/ha or less, 1.7 g ai/ha or less, 1.6 g ai/ha or less, 1.5 g ai/ha or less, 1.4 g ai/ha or less, 1.3 g ai/ha or less, 1.2 g ai/ha or less, 1.1 g ai/ha or less, 1 g ai/ha or less, 0.9 g ai/ha or less, 0.8 g ai/ha or less, 0.7 g ai/ha or less, 0.6 g ai/ha or less, 0.5 g ai/ha or less, 0.4 g ai/ha or less, 0.3 g ai/ha or less, or 0.2 g ai/ha or less; or in an amount ranging from any of the minimum values described above to any of the maximum values described above, such as 0.1-10 g ai/ha, 0.4-8.8 g ai/ha, 1.1-6.2 g ai/ha, 1.7-7.5 g ai/ha, 1.8-9.2 g ai/ha, 1.9-9 g ai/ha, 2-6.8 g ai/ha, 2.2-9.5 g ai/ha, 2.5-10 g ai/ha, 2.8-7.6 g ai/ha, 3-9.4 g ai/ha, 3.2-7.2 g ai/ha, 3.4-10 g ai/ha, or 3.6-8 g ai/ha.

Mesosulfuron

Compositions and methods of the present disclosure can include mesosulfuron or an agriculturally acceptable salt or ester thereof. Mesosulfuron-methyl, shown below, is a sulfonylurea that provides, e.g., early- to mid-post-emergence control of grass and some broadleaf weeds in winter, spring and durum wheat, triticale and rye. Mesosulfuron, as well as methods of preparing mesosulfuron, are known in the art. Its herbicidal activity is described in *The Pesticide Manual*, Seventeenth Edition, 2016.

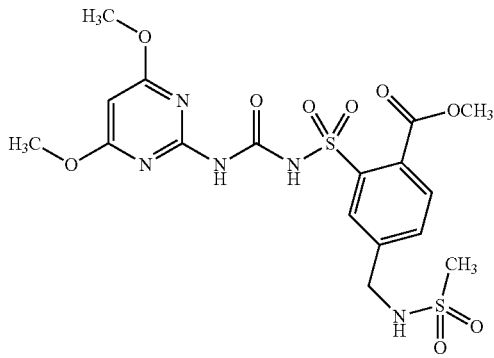 [SMILES: COC(=O)c1ccc(CNS(C)(=O)=O)cc1S(=O)(=O)NC(=O)Nc1nc(OC)cc(OC)n1]

Mesosulfuron can be applied to vegetation or an area adjacent the vegetation or applied to soil or water to prevent the emergence or growth of vegetation in an amount sufficient to induce a herbicidal effect. In some aspects, mesosulfuron thereof is applied to vegetation or an area adjacent the vegetation or applied to soil or water to prevent the emergence or growth of vegetation in an amount of 1.5 g ai/ha or more, such as 1.6 g ai/ha or more, 1.7 g ai/ha or more, 1.8 g ai/ha or more, 1.9 g ai/ha or more, 2 g ai/ha or more, 2.1 g ai/ha or more, 2.25 g ai/ha or more, 2.5 g ai/ha or more, 2.75 g ai/ha or more, 3 g ai/ha or more, 3.25 g ai/ha or more, 3.5 g ai/ha or more, 3.75 g ai/ha or more, 4 g ai/ha or more, 4.25 g ai/ha or more, 4.5 g ai/ha or more, 4.75 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 28 g ai/ha or more, 30 g ai/ha or more, 31 g ai/ha or more, 32 g ai/ha or more, 33 g ai/ha or more, 34 g ai/ha or more, 35 g ai/ha or more, 36 g ai/ha or more, 37 g ai/ha or more, 38 g ai/ha or more, 39 g ai/ha or more, 40 g ai/ha or more, 41 g ai/ha or more, 42 g ai/ha or more, 43 g ai/ha or more, or 44 g ai/ha or more; in an amount of 45 g ai/ha or less, such as 44 g ai/ha or less, 43 g ai/ha or less, 42 g ai/ha or less, 41 g ai/ha or less, 40 g ai/ha or less, 39 g ai/ha or less, 38 g ai/ha or less, 37 g ai/ha or less, 36 g ai/ha or less, 35 g ai/ha or less, 34 g ai/ha or less, 33 g ai/ha or less, 32 g ai/ha or less, 31 g ai/ha or less, 30 g ai/ha or less, 28 g ai/ha or less, 26 g ai/ha or less, 24 g ai/ha or less, 22 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, 4.75 g ai/ha or less, 4.5 g ai/ha or less, 4.25 g ai/ha or less, 4 g ai/ha or less, 3.75 g ai/ha or less, 3.5 g ai/ha or less, 3.25 g ai/ha or less, 3 g ai/ha or less, 2.75 g ai/ha or less, 2.5 g ai/ha or less, 2.25 g ai/ha or less, 2.1 g ai/ha or less, 2 g ai/ha or less, 1.9 g ai/ha or less, 1.8 g ai/ha or less, 1.7 g ai/ha or less, 1.6 g ai/ha or less; or in an amount ranging from any of the minimum values described above to any of the maximum values described above, such as 1.5-45 g ai/ha, 1.6-42 g ai/ha, 1.5-40 g ai/ha, 1.7-43 g ai/ha, 1.8-35 g ai/ha, 2-37 g ai/ha, 2.25-41 g ai/ha, 2.5-32 g ai/ha, 2.75-45 g ai/ha, 3-40 g ai/ha, 3-33 g ai/ha, 3-24 g ai/ha, 3.5-45 g ai/ha, or 4-39 g ai/ha.

Metsulfuron

Compositions and methods of the present disclosure can include metsulfuron or an agriculturally acceptable salt or ester thereof. Metsulfuron-methyl, shown below, is a sulfonylurea that controls, e.g., grass and broadleaf weeds in wheat, barley, rice, oats and triticale. Metsulfuron, as well as methods of preparing metsulfuron, are known in the art. Its herbicidal activity is described in *The Pesticide Manual*, Seventeenth Edition, 2016.

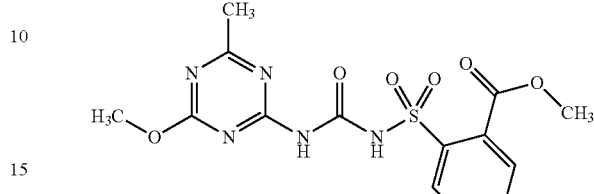

Metsulfuron can be applied to vegetation or an area adjacent the vegetation or applied to soil or water to prevent the emergence or growth of vegetation in an amount sufficient to induce a herbicidal effect. In some aspects, metsulfuron thereof is applied to vegetation or an area adjacent the vegetation or applied to soil or water to prevent the emergence or growth of vegetation in an amount of 1 g ai/ha or more, such as 1.1 g ai/ha or more, 1.2 g ai/ha or more, 1.25 g ai/ha or more, 1.3 g ai/ha or more, 1.4 g ai/ha or more, 1.5 g ai/ha or more, 1.6 g ai/ha or more, 1.7 g ai/ha or more, 1.8 g ai/ha or more, 1.9 g ai/ha or more, 2 g ai/ha or more, 2.1 g ai/ha or more, 2.2 g ai/ha or more, 2.3 g ai/ha or more, 2.3 g ai/ha or more, 2.4 g ai/ha or more, 2.5 g ai/ha or more, 2.6 g ai/ha or more, 2.7 g ai/ha or more, 2.8 g ai/ha or more, 2.9 g ai/ha or more, 3 g ai/ha or more, 3.2 g ai/ha or more, 3.4 g ai/ha or more, 3.6 g ai/ha or more, 3.8 g ai/ha or more, 4 g ai/ha or more, 4.2 g ai/ha or more, 4.4 g ai/ha or more, 4.6 g ai/ha or more, 4.8 g ai/ha or more, 5 g ai/ha or more, 5.2 g ai/ha or more, 5.4 g ai/ha or more, 5.6 g ai/ha or more, 5.8 g ai/ha or more, 6 g ai/ha or more, 6.2 g ai/ha or more, 6.4 g ai/ha or more, 6.6 g ai/ha or more, 6.8 g ai/ha or more, 7 g ai/ha or more, 7.2 ai/ha or more, 7.4 g ai/ha or more, 7.6 g ai/ha or more, 7.8 g ai/ha or more, 8 g ai/ha or more, 8.2 g ai/ha or more, 8.4 ai/ha or more, 8.6 g ai/ha or more, 8.8 g ai/ha or more, 9 g ai/ha or more, 9.2 g ai/ha or more, 9.4 g ai/ha or more, 9.6 g ai/ha or more, 9.8 g ai/ha or more, 10 g ai/ha or more, 10.2 g ai/ha or more, 10.4 g ai/ha or more, 10.6 g ai/ha or more, 10.8 g ai/ha or more, 11 g ai/ha or more, 11.1 g ai/ha or more, 11.2 g ai/ha or more, 11.3 g ai/ha or more, 11.4 g ai/ha or more, 11.5 g ai/ha or more, 11.6 g ai/ha or more, 11.7 g ai/ha or more, 11.8 g ai/ha or more, or 11.9 g ai/ha or more; in an amount of 12 g ai/ha or less, such as 11.9 g ai/ha or less, 11.8 g ai/ha or less, 11.7 g ai/ha or less, 11.6 g ai/ha or less, 11.5 g ai/ha or less, 11.4 g ai/ha or less, 11.3 g ai/ha or less, 11.2 g ai/ha or less, 11.1 g ai/ha or less, 11 g ai/ha or less, 10.8 g ai/ha or less, 10.6 g ai/ha or less, 10.4 g ai/ha or less, 10.2 g ai/ha or less, 10 g ai/ha or less, 9.8 g ai/ha or less, 9.6 g ai/ha or less, 9.4 g ai/ha or less, 9.2 g ai/ha or less, 9 g ai/ha or less, 8.8 g ai/ha or less, 8.6 g ai/ha or less, 8.4 g ai/ha or less, 8.2 g ai/ha or less, 8 g ai/ha or less, 7.8 g ai/ha or less, 7.6 g ai/ha or less, 7.4 g ai/ha or less, 7.2 g ai/ha or less, 7 g ai/ha or less, 6.8 g ai/ha or less, 6.6 g ai/ha or less, 6.4 g ai/ha or less, 6.2 g ai/ha or less, 6 g ai/ha or less, 5.8 g ai/ha or less, 5.6 g ai/ha or less, 5.4 g ai/ha or less, 5.2 g ai/ha or less, 5 g ai/ha or less, 4.8 g ai/ha or less, 4.6 g ai/ha or less, 4.4 g ai/ha or less, 4.2 g ai/ha or less, 4 g ai/ha or less, 3.8 g ai/ha or less, 3.6 g ai/ha or less, 3.4 g ai/ha or less, 3.2 g ai/ha or less, 3 g ai/ha or less, 2.9 g ai/ha or less, 2.8 g ai/ha or less, 2.7 g ai/ha or less, 2.6 g ai/ha or less, 2.5 g ai/ha or less, 2.4 g ai/ha or less, 2.3 g ai/ha or less, 2.2 g ai/ha or less, 2.1 g ai/ha or less, 2 g ai/ha or less, 1.9 g ai/ha or less, 1.8 g ai/ha, 1.7 g ai/ha or less, 1.6 g ai/ha or less, 1.5 g ai/ha or less, 1.4 g ai/ha or less, 1.3 g ai/ha or less, 1.25 g ai/ha or less, 1.2 g ai/ha or less, or 1.1 g ai/ha or less; or in an amount ranging from any of the minimum values described above to any of the maximum values described above, such as 1-12 g ai/ha, 1-10 g ai/ha, 1.1-9.4 g ai/ha, 1.25-8.2 g ai/ha, 1.25-11 g ai/ha, 1.3-7 g ai/ha, 1.4-5.8 g ai/ha, 1.5-12 g ai/ha, 1.5-10.4 g ai/ha, 1.5-8.8 g ai/ha, 2-11.7 g ai/ha, 2.2-6.4 g ai/ha, 2.5-7.6 g ai/ha, 2.8-12 g ai/ha, or 3-8 g ai/ha.

Nicosulfuron

Compositions and methods of the present disclosure can include nicosulfuron or an agriculturally acceptable salt or ester thereof. Nicosulfuron, shown below, is a sulfonylurea that provides e.g., selective post-emergence control in maize of annual grass weeds, including *Setaria, Echinochloa, Digitaria, Panicum, Lolium* and *Avena* spp., broadleaf weeds, including *Amaranthus* spp. and Cruciferae, and perennials such as *Sorghum halepense* and *Agropyron repens*. Nicosulfuron, as well as methods of preparing nicosulfuron, are known in the art. Its herbicidal activity is described in *The Pesticide Manual*, Seventeenth Edition, 2016.

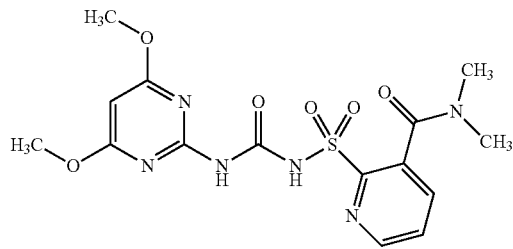

Nicosulfuron can be applied to vegetation or an area adjacent the vegetation or applied to soil or water to prevent the emergence or growth of vegetation in an amount sufficient to induce a herbicidal effect. In some aspects, nicosulfuron is applied to vegetation or an area adjacent the vegetation or applied to soil or water to prevent the emergence or growth of vegetation in an amount of 8.75 g ai/ha or more, such as 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, or 69 g ai/ha or more; in an amount of 70 g ai/ha or less, such as 69 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, or 9 g ai/ha or less; or in an amount ranging from any of the minimum values described above to any of the maximum values described above, such as 8.75-70 g ai/ha, 9-68 g ai/ha, 10-50 g ai/ha, 12-66 g ai/ha, 14-44 g ai/ha, 15-58 g ai/ha, 18-65 g ai/ha, 20-45 g ai/ha, 22-60 g ai/ha, 26-56 g ai/ha, or 30-70 g ai/ha.

Orthosulfamuron

Compositions and methods of the present disclosure can include orthosulfamuron or an agriculturally acceptable salt or ester thereof. Orthosulfamuron, shown below, is a sulfonylurea that provides e.g., early post-emergence control of annual and perennial broadleaf weeds and sedges in rice, cereals, pastures and sugar cane. Orthosulfamuron, as well as methods of preparing orthosulfamuron, are known in the art. Its herbicidal activity is described, for example, in *The Pesticide Manual*, Seventeenth Edition, 2016.

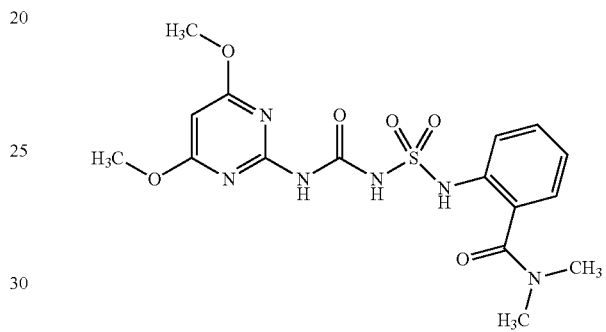

Orthosulfamuron can be applied to vegetation or an area adjacent the vegetation or applied to soil or water to prevent the emergence or growth of vegetation in an amount sufficient to induce a herbicidal effect. In some aspects, orthosulfamuron is applied to vegetation or an area adjacent the vegetation or applied to soil or water to prevent the emergence or growth of vegetation in an amount of 7.5 g ai/ha or more, such as 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, 70 g ai/ha or more, 71 g ai/ha or more, 72 g ai/ha or more, 73 g ai/ha or more, or 74 g ai/ha or more; in an amount of 75 g ai/ha or less, such as 74 g ai/ha or less, 72 g ai/ha or less, 70 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, or 8 g ai/ha or less; or in an amount ranging from any of the minimum values described above to any of the maximum values described above, such as 7.5-75 g ai/ha, 7.5-60 g ai/ha, 8-58 g ai/ha, 9-42 g ai/ha, 10-70 g ai/ha, 10-56 g ai/ha, 11-40 g ai/ha, 13-64 g ai/ha, 15-75 g ai/ha, 17-46 g ai/ha, 20-65 g ai/ha, 20-52 g ai/ha, 22-48 g ai/ha, or 24-74 g ai/ha.

Rimsulfuron

Compositions and methods of the present disclosure can include rimsulfuron or an agriculturally acceptable salt or ester thereof. Rimsulfuron, shown below, is a sulfonylurea that provides post-emergence control of most annual and perennial grass weeds and several broad-leaved weeds in maize, tomatoes and potatoes, at 15 g/ha. Rimsulfuron, as well as methods of preparing rimsulfuron, are known in the art. Its herbicidal activity is described in *The Pesticide Manual*, Seventeenth Edition, 2016.

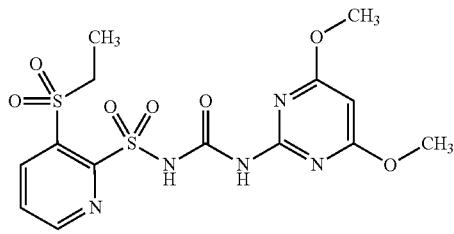 [SMILES: CCS(=O)(=O)c1cccnc1S(=O)(=O)NC(=O)Nc1nc(OC)cc(OC)n1]

Rimsulfuron can be applied to vegetation or an area adjacent the vegetation or applied to soil or water to prevent the emergence or growth of vegetation in an amount sufficient to induce a herbicidal effect. In some aspects, rimsulfuron is applied to vegetation or an area adjacent the vegetation or applied to soil or water to prevent the emergence or growth of vegetation in an amount of 5 g ai/ha or more, such as 5.5 g ai/ha or more, 6 g ai/ha or more, 7 g ai/ha or more, 7.5 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 27 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, 69 g ai/ha or more, 70 g ai/ha or more, 71 g ai/ha or more, 72 g ai/ha or more, 73 g ai/ha or more, or 74 g ai/ha or more; in an amount of 75 g ai/ha or less, such as 74 g ai/ha or less, 73 g ai/ha or less, 72 g ai/ha or less, 71 g ai/ha or less, 70 g ai/ha or less, 69 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 27 g ai/ha or less, 26 g ai/ha or less, 24 g ai/ha or less, 22 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7.5 g ai/ha or less, 7 g ai/ha or less, 6 g ai/ha or less, 5.5 g ai/ha or less, or 5 g ai/ha or less; or in an amount ranging from any of the minimum values described above to any of the maximum values described above, such as 5-75 g ai/ha, 7.5-70 g ai/ha, 9-64 g ai/ha, 18-69 g ai/ha, 27-36 g ai/ha, 5.5-66 g ai/ha, 14-18 g ai/ha, 27-69 g ai/ha, 7-38 g ai/ha, 12-52 g ai/ha, 9-44 g ai/ha, 10-38 g ai/ha, 16-75 g ai/ha, or 20-48 g ai/ha.

Sulfosulfuron

Compositions and methods of the present disclosure can include sulfosulfuron or an agriculturally acceptable salt or ester thereof. Sulfosulfuron, shown below, is a sulfonylurea that provides e.g., control of annual broadleaf weeds and grass weeds in cereals. Sulfosulfuron, as well as methods of preparing sulfosulfuron, are known in the art. Its herbicidal activity is described in *The Pesticide Manual*, Seventeenth Edition, 2016.

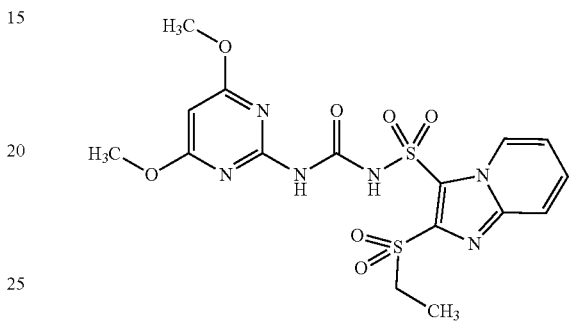

Sulfosulfuron can be applied to vegetation or an area adjacent the vegetation or applied to soil or water to prevent the emergence or growth of vegetation in an amount sufficient to induce a herbicidal effect. In some aspects, sulfosulfuron is applied to vegetation or an area adjacent the vegetation or applied to soil or water to prevent the emergence or growth of vegetation in an amount of 4.375 g ai/ha or more, such as 4.75 g ai/ha or more, 5 g ai/ha or more, 6 g ai/ha or more, 7 g ai/ha or more, 8 g ai/ha or more, 9 g ai/ha or more, 10 g ai/ha or more, 12 g ai/ha or more, 14 g ai/ha or more, 16 g ai/ha or more, 18 g ai/ha or more, 20 g ai/ha or more, 22 g ai/ha or more, 24 g ai/ha or more, 26 g ai/ha or more, 28 g ai/ha or more, 30 g ai/ha or more, 32 g ai/ha or more, 34 g ai/ha or more, 36 g ai/ha or more, 38 g ai/ha or more, 40 g ai/ha or more, 42 g ai/ha or more, 44 g ai/ha or more, 46 g ai/ha or more, 48 g ai/ha or more, 50 g ai/ha or more, 52 g ai/ha or more, 54 g ai/ha or more, 56 g ai/ha or more, 58 g ai/ha or more, 60 g ai/ha or more, 62 g ai/ha or more, 64 g ai/ha or more, 66 g ai/ha or more, 68 g ai/ha or more, 70 g ai/ha or more, 71 g ai/ha or more, 72 g ai/ha or more, 73 g ai/ha or more, or 74 g ai/ha or more; in an amount of 75 g ai/ha or less, such as 74 g ai/ha or less, 73 g ai/ha or less, 72 g ai/ha or less, 71 g ai/ha or less, 70 g ai/ha or less, 68 g ai/ha or less, 66 g ai/ha or less, 64 g ai/ha or less, 62 g ai/ha or less, 60 g ai/ha or less, 58 g ai/ha or less, 56 g ai/ha or less, 54 g ai/ha or less, 52 g ai/ha or less, 50 g ai/ha or less, 48 g ai/ha or less, 46 g ai/ha or less, 44 g ai/ha or less, 42 g ai/ha or less, 40 g ai/ha or less, 38 g ai/ha or less, 36 g ai/ha or less, 34 g ai/ha or less, 32 g ai/ha or less, 30 g ai/ha or less, 28 g ai/ha or less, 26 g ai/ha or less, 24 g ai/ha or less, 22 g ai/ha or less, 20 g ai/ha or less, 18 g ai/ha or less, 16 g ai/ha or less, 14 g ai/ha or less, 12 g ai/ha or less, 10 g ai/ha or less, 9 g ai/ha or less, 8 g ai/ha or less, 7 g ai/ha or less, 6 g ai/ha or less, 5 g ai/ha or less, or 4.75 g ai/ha or less, or 4.5 g ai/ha or less; or in an amount ranging from any of the minimum values described above to any of the maximum values described above such as 4.375-75 g ai/ha, 4.5-70 g ai/ha, 4.75-64 g ai/ha, 5-75 g ai/ha, 5-73 g ai/ha, 5-66 g ai/ha, 5-40 g ai/ha, 6-75 g ai/ha, 7-68 g ai/ha, 7-52 g ai/ha, 9-44 g ai/ha, 10-50 g ai/ha, 16-75 g ai/ha, or 20-60 g ai/ha.

Thifensulfuron

Compositions and methods of the present disclosure can include thifensulfuron or an agriculturally acceptable salt or ester thereof. Thifensulfuron-methyl, shown below, is a sulfonylurea that provides e.g., control of annual weeds in cereals, maize and pasture. Thifensulfuron, as well as methods of preparing thifensulfuron, are known in the art. Its herbicidal activity is described in *The Pesticide Manual*, Seventeenth Edition, 2016.

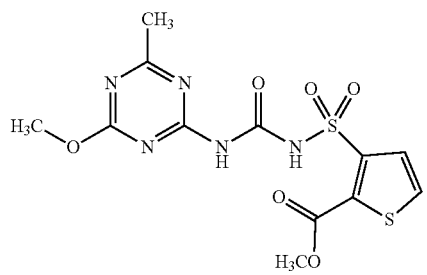 [SMILES: COC(=O)c1sccc1S(=O)(=O)NC(=O)Nc1nc(C)nc(OC)n1]

Thifensulfuron can be applied to vegetation or an area adjacent the vegetation or applied to soil or water to prevent the emergence or growth of vegetation in an amount sufficient to induce a herbicidal effect. In some aspects, thifensulfuron is applied to vegetation or an area adjacent the vegetation or applied to soil or water to prevent the emergence or growth of vegetation in an amount of 4.4 g ai/ha or more, such as 4.5 g ai/ha or more, 4.6 g ai/ha or more, 4.7 g ai/ha or more, 4.8 g ai/ha or more, 4.9 g ai/ha or more, 5 g ai/ha or more, 5.2 g ai/ha or more, 5.4 g ai/ha or more, 5.6 g ai/ha or more, 5.8 g ai/ha or more, 6 g ai/ha or more, 6.2 g ai/ha or more, 6.4 g ai/ha or more, 6.6 g ai/ha or more, 6.8 g ai/ha or more, 7 g ai/ha or more, 7.2 g ai/ha or more, 7.4 g ai/ha or more, 7.6 g ai/ha or more, 7.8 g ai/ha or more, 8 g ai/ha or more, 8.2 g ai/ha or more, 8.4 g ai/ha or more, 8.6 g ai/ha or more, 8.8 g ai/ha or more, 9 g ai/ha or more, 9.2 g ai/ha or more, 9.4 g ai/ha or more, 9.6 g ai/ha or more, 9.8 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 16.2 g ai/ha or more, 16.4 g ai/ha or more, 16.6 g ai/ha or more, 16.8 g ai/ha or more, 17 g ai/ha or more, 17.1 g ai/ha or more, 17.2 g ai/ha or more, 17.3 g ai/ha or more, or 17.4 g ai/ha or more; in an amount of 17.5 g ai/ha or less, such as 17.4 g ai/ha or less, 17.3 g ai/ha or less, 17.2 g ai/ha or less, 17.1 g ai/ha or less, 17 g ai/ha or less, 16.8 g ai/ha or less, 16.6 g ai/ha or less, 16.4 g ai/ha or less, 16.2 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9.8 g ai/ha or less, 9.6 g ai/ha or less, 9.4 g ai/ha or less, 9.2 g ai/ha or less, 9 g ai/ha or less, 8.8 g ai/ha or less, 8.6 g ai/ha or less, 8.4 g ai/ha or less, 8.2 g ai/ha or less, 8 g ai/ha or less, 7.8 g ai/ha or less, 7.6 g ai/ha or less, 7.4 g ai/ha or less, 7.2 g ai/ha or less, 7 g ai/ha or less, 6.8 g ai/ha or less, 6.6 g ai/ha or less, 6.4 g ai/ha or less, 6.2 g ai/ha or less, 6 g ai/ha or less, 5.8 g ai/ha or less, 5.6 g ai/ha or less, 5.4 g ai/ha or less, 5.2 g ai/ha or less, 5 g ai/ha or less, 4.9 g ai/ha or less, 4.8 g ai/ha or less, 4.7 g ai/ha or less, 4.6 g ai/ha or less, 4.5 g ai/ha or less, or 4.4 g ai/ha or less; or in an amount ranging from any of the minimum values described above to any of the maximum values described above, such as 4.4-17.5 g ai/ha, 4.5-16 g ai/ha, 4.8-11 g ai/ha, 5-17.3 g ai/ha, 5-16.2 g ai/ha, 5.4-13 g ai/ha, 5.8-10 g ai/ha, 6-12 g ai/ha, 6-16 g ai/ha, 7.4-16.4 g ai/ha, 7.8-15 g ai/ha, 8-15 g ai/ha, or 8-17.1 g ai/ha.

Tribenuron

Compositions and methods of the present disclosure can include tribenuron or an agriculturally acceptable salt or ester thereof. Tribenuron-methyl, shown below, is a sulfonylurea that provides e.g., post-emergence control of broadleaf weeds in cereal crops, including wheat, barley, oats, rye and triticale. Tribenuron, as well as methods of preparing tribenuron, are known in the art. Its herbicidal activity is described in *The Pesticide Manual*, Seventeenth Edition, 2016.

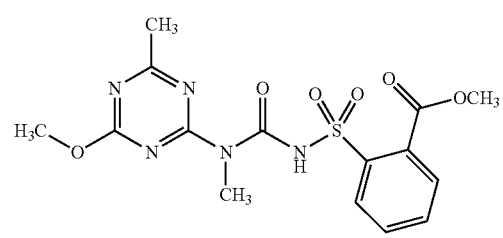 [SMILES: COC(=O)c1ccccc1S(=O)(=O)NC(=O)N(C)c1nc(C)nc(OC)n1]

Tribenuron can be applied to vegetation or an area adjacent the vegetation or applied to soil or water to prevent the emergence or growth of vegetation in an amount sufficient to induce a herbicidal effect. In some aspects, tribenuron is applied to vegetation or an area adjacent the vegetation or applied to soil or water to prevent the emergence or growth of vegetation in an amount of 3.75 g ai/ha or more, such as 4 g ai/ha or more, 4.25 g ai/ha or more, 4.5 g ai/ha or more, 4.75 g ai/ha or more, 5 g ai/ha or more, 5.25 g ai/ha or more, 5.5 g ai/ha or more, 5.75 g ai/ha or more, 6 g ai/ha or more, 7 g ai/ha or more, 7.5 g ai/ha or more, 8 g ai/ha or more, 9 g ai/ha or more, 10 g ai/ha or more, 11 g ai/ha or more, 12 g ai/ha or more, 13 g ai/ha or more, 14 g ai/ha or more, 15 g ai/ha or more, 16 g ai/ha or more, 17 g ai/ha or more, 18 g ai/ha or more, 19 g ai/ha or more, 20 g ai/ha or more, 21 g ai/ha or more, 22 g ai/ha or more, 23 g ai/ha or more, 24 g ai/ha or more, 25 g ai/ha or more, 25.5 g ai/ha or more, 26 g ai/ha or more, 26.5 g ai/ha or more, 27 g ai/ha or more, 27.5 g ai/ha or more, 28 g ai/ha or more, 28.5 g ai/ha or more, 29 g ai/ha or more, 29.25 g ai/ha or more, 29.5 g ai/ha or more, or 29.75 g ai/ha or more; in an amount of 30 g ai/ha or less, such as 29.75 g ai/ha or less, 29.5 g ai/ha or less, 29.25 g ai/ha or less, 29 g ai/ha or less, 28.5 g ai/ha or less, 28 g ai/ha or less, 27.5 g ai/ha or less, 27 g ai/ha or less, 26.5 g ai/ha or less, 26 g ai/ha or less, 25 g ai/ha or less, 24 g ai/ha or less, 23 g ai/ha or less, 22 g ai/ha or less, 21 g ai/ha or less, 20 g ai/ha or less, 19 g ai/ha or less, 18 g ai/ha or less, 17 g ai/ha or less, 16 g ai/ha or less, 15 g ai/ha or less, 14 g ai/ha or less, 13 g ai/ha or less, 12 g ai/ha or less, 11 g ai/ha or less, 10 g ai/ha or less, 9 g ai/ha or less, 8 g ai/ha or less, 7.5 g ai/ha or less, 7 g ai/ha or less, 6 g ai/ha or less, 5.75 g ai/ha or less, 5.5 g ai/ha or less, 5.25 g ai/ha or less, 5 g ai/ha or less, 4.75 g ai/ha or less, 4.5 g ai/ha or less, 4.25 g ai/ha or less, or 4 g ai/ha or less; or in an amount ranging from any of the minimum values described above to any of the maximum values described above such as 3.75-30 g ai/ha, 4-27.5 g ai/ha, 4.25-23 g ai/ha, 4.5-17 g ai/ha, 5-25 g ai/ha, 6-29.5 g ai/ha, 7-28 g ai/ha, 7.5-23 g ai/ha, 7.5-20 g ai/ha, 9-30 g ai/ha, 10-19 g ai/ha, or 10-27.5 g ai/ha.

IV. Compositions

A composition comprising (a) a pyridine carboxylate herbicide or an agriculturally acceptable N-oxide, salt, or ester thereof may be mixed with or applied in combination with (b) an ALS inhibitor or an agriculturally acceptable salt or ester thereof.

In some aspects, (a) and (b) are used in an amount sufficient to induce an unexpectedly enhanced herbicidal effect (e.g., increased damage or injury to undesirable vegetation) while still showing good crop compatibility (e.g., no increased damage to crops) when compared to the individual application of the herbicidal compounds (a) or (b). In some aspects, the damage or injury to undesirable vegetation caused by the compositions and methods disclosed herein is evaluated using a scale from 0% to 100%, when compared with the untreated control vegetation, wherein 0% indicates no damage to the undesirable vegetation and 100% indicates complete destruction of the undesirable vegetation.

In some aspects, the joint action of (a) the pyridine carboxylate herbicide or an agriculturally acceptable N-oxide, salt, or ester thereof and (b) the ALS inhibitor or an agriculturally acceptable salt or ester thereof results in unexpectedly enhanced herbicidal effect against undesirable vegetation, even at application rates below those typically used for the herbicide to have a herbicidal effect on its own. In some aspects, the compositions and methods disclosed herein can, based on the individual components, be used at lower application rates to achieve a herbicidal effect comparable to the effect produced by the individual components at normal application rates.

In some aspects, the weight ratio of (a) the pyridine carboxylate herbicide or an agriculturally acceptable N-oxide, salt, or ester thereof (in g ae/ha) to (b) the ALS inhibitor or an agriculturally acceptable salt or ester thereof (in g ai/ha) is 1:3400 or more, such as 1:3200 or more, 1:3000 or more, 1:2800 or more, 1:2600 or more, 1:2400 or more, 1:2200 or more, 1:2000 or more, 1:1800 or more, 1:1600 or more, 1:1400 or more, 1:1200 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:20 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 20:1 or more, 30:1 or more, 40:1 or more, 50:1 or more, 60:1 or more, 70:1 or more, 80:1 or more, 90:1 or more, 100:1 or more, 200:1 or more, 300:1 or more, 400:1 or more, 500:1 or more, 600:1 or more, 700:1 or more, 800:1 or more, 900:1 or more, 1000:1 or more, or 1100:1 or more; the weight ratio of (a) to (b) is 1200:1 or less, such as 1100:1 or less, 1000:1 or less, 900:1 or less, 800:1 or less, 700:1 or less, 600:1 or less, 500:1 or less, 400:1 or less, 300:1 or less, 200:1 or less, 100:1 or less, 90:1 or less, 80:1 or less, 70:1 or less, 60:1 or less, 50:1 or less, 40:1 or less, 30:1 or less, 20:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:20 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:600 or less, 1:700 or less, 1:800 or less, 1:900 or less, 1:1000 or less, 1:1200 or less, 1:1400 or less, 1:1600 or less, 1:1800 or less, 1:2000 or less, 1:2200 or less, 1:2400 or less, 1:2600 or less, 1:2800 or less, 1:3000 or less, or 1:3200 or less; or the weight ratio of (a) to (b) can range from any of the minimum ratios to any of the maximum ratios provided above, such as from 1:1700 to 600:1, from 1:280 to 160:1, from 1:10 to 16:1, from 1:14 to 10:1, or from 1:5 to 5:1.

In some aspects, (b) includes a triazolopyrimidine sulfonamide or an agriculturally acceptable salt or ester thereof. In some aspects, the weight ratio of (a) a pyridine carboxylate herbicide or an agriculturally acceptable N-oxide, salt, or ester thereof (in g ae/ha) to (b) a triazolopyrimidine sulfonamide or an agriculturally acceptable salt or ester thereof (in g ai/ha) is 1:2000 or more, such as 1:1900 or more, 1:1800 or more, 1:1700 or more, 1:1600 or more, 1:1500 or more, 1:1400 or more, 1:1300 or more, 1:1200 or more, 1:1100 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:20 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 20:1 or more, 30:1 or more, 40:1 or more, 50:1 or more, 60:1 or more, 70:1 or more, 80:1 or more, 90:1 or more, 100:1 or more, 200:1 or more, 300:1 or more, 400:1 or more, 500:1 or more, 600:1 or more, 700:1 or more, 800:1 or more, 900:1 or more, 1000:1 or more, or 1100:1 or more; the weight ratio of (a) to (b) is 1200:1 or less, such as 1100:1 or less, 1000:1 or less, 900:1 or less, 800:1 or less, 700:1 or less, 600:1 or less, 500:1 or less, 400:1 or less, 300:1 or less, 200:1 or less, 100:1 or less, 90:1 or less, 80:1 or less, 70:1 or less, 60:1 or less, 50:1 or less, 40:1 or less, 30:1 or less, 20:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:20 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:600 or less, 1:700 or less, 1:800 or less, 1:900 or less, 1:1000 or less, 1:1100 or less, 1:1200 or less, 1:1300 or less, 1:1400 or less, 1:1500 or less, 1:1600 or less, 1:1700 or less, 1:1800 or less, or 1:1900 or less; or the weight ratio of (a) a pyridine carboxylate herbicide or an agriculturally acceptable N-oxide, salt, or ester thereof (in g ae/ha) to (b) a triazolopyrimidine sulfonamide or an agriculturally acceptable salt or ester thereof (in g ai/ha) can range from any of the minimum ratios described above to any of the maximum values described above, such as from 1:2000 to 1200:1, from 1:2000 to 1000:1, from 1:2000 to 800:1, from 1:2000 to 600:1, from 1:1000 to 400:1, from 1:500 to 200:1, from 1:400 to 190:1, from 1:300 to 180:1, from 1:200 to 170:1, from 1:50 to 120:1, from 1:1.5 to 150:1, from 1:1.5 to 100:1, from 1:1.5 to 50:1, from 1:10 to 16:1, or from 1:1.5 to 40:1. In some aspects, the weight ratio of (a) to (b) is from 1:3.8 to 16:1, or from 1:5 to 6:1.

In some aspects, (b) includes an imidazolinone or an agriculturally acceptable salt or ester thereof. In some aspects, the weight ratio of (a) a pyridine carboxylate herbicide or an agriculturally acceptable N-oxide, salt, or ester thereof (in g ae/ha) to (b) imidazolinone or an agriculturally acceptable salt or ester thereof (in g ai/ha) is 1:3400 or more, such as 1:3200 or more, 1:3000 or more, 1:2800 or more, 1:2600 or more, 1:2400 or more, 1:2200 or more, 1:2000 or more, 1:1800 or more, 1:1600 or more, 1:1400 or more, 1:1200 or more, 1:1000 or more, 1:900 or more, 1:800 or more, 1:700 or more, 1:600 or more, 1:500 or more, 1:400 or more, 1:300 or more, 1:200 or more, 1:100 or more, 1:90 or more, 1:80 or more, 1:70 or more, 1:60 or more, 1:50 or more, 1:40 or more, 1:30 or more, 1:20 or more, 1:10 or more, 1:9 or more, 1:8 or more, 1:7 or more, 1:6 or more, 1:5 or more, 1:4 or more, 1:3 or more, 1:2 or more, 1:1.9 or more, 1:1.8 or more, 1:1.7 or more, 1:1.6 or more, 1:1.5 or more, 1:1.4 or more, 1:1.3 or more, 1:1.2 or more, 1:1.1 or more, 1:1 or more, 1.1:1 or more, 1.2:1 or more, 1.3:1 or more, 1.4:1 or more, 1.5:1 or more, 1.6:1 or more, 1.7:1 or more, 1.8:1 or more, 1.9:1 or more, 2:1 or more, 3:1 or more, 4:1 or more, 5:1 or more, 6:1 or more, 7:1 or more, 8:1 or more, 9:1 or more, 10:1 or more, 15:1 or more, 20:1 or more, 25:1 or more, 30:1 or more, 35:1 or more, 40:1 or more, 45:1 or more, 50:1 or more, 51:1 or more, 52:1 or more, 53:1 or more, 54:1 or more, 55:1 or more, 56:1 or more, 57:1 or more, 58:1 or more, or 59:1 or more; the weight ratio of (a) to (b) is 60:1 or less, such as 59:1 or less, 58:1 or less, 57:1 or less, 56:1 or less, 55:1 or less, 54:1 or less, 53:1 or less, 52:1 or less, 51:1 or less, 50:1 or less, 45:1 or less, 40:1 or less, 35:1 or less, 30:1 or less, 25:1 or less, 20:1 or less, 15:1 or less, 10:1 or less, 9:1 or less, 8:1 or less, 7:1 or less, 6:1 or less, 5:1 or less, 4:1 or less, 3:1 or less, 2:1 or less, 1.9:1 or less, 1.8:1 or less, 1.7:1 or less, 1.6:1 or less, 1.5:1 or less, 1.4:1 or less, 1.3:1 or less, 1.2:1 or less, 1.1:1 or less, 1:1 or less, 1:1.1 or less, 1:1.2 or less, 1:1.3 or less, 1:1.4 or less, 1:1.5 or less, 1:1.6 or less, 1:1.7 or less, 1:1.8 or less, 1:1.9 or less, 1:2 or less, 1:3 or less, 1:4 or less, 1:5 or less, 1:6 or less, 1:7 or less, 1:8 or less, 1:9 or less, 1:10 or less, 1:20 or less, 1:30 or less, 1:40 or less, 1:50 or less, 1:60 or less, 1:70 or less, 1:80 or less, 1:90 or less, 1:100 or less, 1:200 or less, 1:300 or less, 1:400 or less, 1:500 or less, 1:600 or less, 1:700 or less, 1:800 or less, 1:900 or less, 1:1000 or less, 1:1200 or less, 1:1400 or less, 1:1600 or less, 1:1800 or less, 1:2000 or less, 1:2200 or less, 1:2400 or less, 1:2600 or less, 1:2800 or less, 1:3000 or less, or 1:3200 or less; or the weight ratio of (a) a pyridine carboxylate herbicide or an agriculturally acceptable N-oxide, salt, or ester thereof (in g ae/ha) to (b) imidazolinone or an agriculturally acceptable salt or ester thereof (in g ai/ha) can range from any of the minimum ratios described above to any of the maximum values described above, such as from 1:3400 to 60:1, from 1:3000 to 60:1, from 1:2500 to 50:1, from 1:2000 to 50:1, from 1:1400 to 60:1, from 1:1500 to 50:1, from 1:1000 to 40:1, from 1:750 to 50:1, from 1:440 to 30:1, from 1:280 to 17:1, from 1:100 to 15:1, from 1:50 to 10:1, or from 1:50 to 7:1. In some aspects, the weight ratio of (a) to (b) is from 1:10 to 5:1, or from 1:10 to 1:6.

In some aspects, (b) includes pyrimidinyl oxybenzoate or an agriculturally acceptable salt or ester thereof. In some aspects, the weight ratio of (a) a pyridine carboxylate herbicide or an agriculturally acceptable N-oxide, salt, or ester thereof (in g ae/ha) to (b) pyrimidinyl oxybenzoate or an agriculturally acceptable salt or ester thereof (in g ai/ha) is 1:600 or more, such as 1:590 or more, 1:580 or more, 1:570 or more, 1:560 or more, 1:550 or more, 1:500 or more, 1:450 or more, 1:400 or more, 1:350 or more, 1:300 or more, 1:250 or more, 1:225 or more, 1:200 or more, 1:175 or more, 1:150 or more, 1:125 or more, 1:100 or more, 1:90 or more, 1:80 or more, 1:70 or more, 1:60 or more, 1:50 or more, 1:40 or more, 1:30 or more, 1:20 or more, 1:15 or more, 1:10 or more, 1:5 or more, 1:2.5 or more, 1:1.25 or more, 1:1.1 or more, 1:1 or more, 1.1:1 or more, 1.25:1 or more, 1.5:1 or more, 2:1 or more, 3:1 or more, 4:1 or more, 5:1 or more, 6:1 or more, 7:1 or more, 8:1 or more, 9:1 or more, 10:1 or more, 12:1 or more, 14:1 or more, 16:1 or more, 18:1 or more, 20:1 or more, 22:1 or more, 24:1 or more, 26:1 or more, 28:1 or more, 30:1 or more, 32:1 or more, 34:1 or more, 36:1 or more, 38:1 or more, 40:1 or more, 42:1 or more, 44:1 or more, 46:1 or more, 48:1 or more, 50:1 or more, 51:1 or more, 52:1 or more, 53:1 or more, 54:1 or more, 55:1 or more, 56:1 or more, 58:1 or more, or 59:1 or more; the weight ratio of (a) to (b) is 60:1 or less, such as 59:1 or less, 58:1 or less, 57:1 or less, 56:1 or less, 55:1 or less, 54:1 or less, 53:1 or less, 52:1 or less, 51:1 or less, 50:1 or less, 48:1 or less, 46:1 or less, 44:1 or less, 42:1 or less, 40:1 or less, 38:1 or less, 36:1 or less, 34:1 or less, 32:1 or less, 30:1 or less, 28:1 or less, 26:1 or less, 24:1 or less, 22:1 or less, 20:1 or less, 18:1 or less, 16:1 or less, 14:1 or less, 12:1 or less, 10:1 or less, 9:1 or less, 8:1 or less, 7:1 or less, 6:1 or less, 5:1 or less, 4:1 or less, 3:1 or less, 2:1 or less, 1.5:1 or less, 1.25:1 or less, 1.1:1 or less, 1:1 or less, 1:1.1 or less, 1:1.25 or less, 1:2.5 or less, 1:5 or less, 1:10 or less, 1:15 or less, 1:20 or less, 1:30 or less, 1:40 or less, 1:50 or less, 1:60 or less, 1:70 or less, 1:80 or less, 1:90 or less, 1:100 or less, 1:125 or less, 1:150 or less, 1:175 or less, 1:200 or less, 1:225 or less, 1:250 or less, 1:300 or less, 1:350 or less, 1:400 or less, 1:450 or less, 1:500 or less, 1:550 or less, 1:560 or less, 1:570 or less, 1:580 or less, or 1:590 or less; or the weight ratio of (a) a pyridine carboxylate herbicide or an agriculturally acceptable N-oxide, salt, or ester thereof (in g ae/ha) to (b) pyrimidinyl oxybenzoate or an agriculturally acceptable salt or ester thereof (in g ai/ha) can range from any of the minimum ratios described above to any of the maximum values described above, such as from 1:600 to 60:1, from 1:500 to 60:1, from 1:500 to 55:1, from 1:400 to 52:1, from 1:400 to 50:1, from 1:300 to 47:1, from 1:250 to 45:1, from 1:200 to 42:1, from 1:140 to 40:1, from 1:130 to 30:1, 1:120 to 20:1 or from 1:100 to 10:1. In some aspects, the weight ratio of (a) to (b) is from 1:15 to 5:1, or from 1:10 to 5:1.

In some aspects, (b) includes a sulfonylaminocarbonyl triazolinone or an agriculturally acceptable salt or ester thereof. In some aspects, the weight ratio of (a) a pyridine carboxylate herbicide or an agriculturally acceptable N-oxide, salt, or ester thereof (in g ae/ha) to (b) sulfonylaminocarbonyl triazolinone or an agriculturally acceptable salt or ester thereof (in g ai/ha) is 1:600 or more, such as 1:590 or more, 1:580 or more, 1:570 or more, 1:560 or more, 1:550 or more, 1:500 or more, 1:450 or more, 1:400 or more, 1:350 or more, 1:300 or more, 1:250 or more, 1:225 or more, 1:200 or more, 1:175 or more, 1:150 or more, 1:125 or more, 1:100 or more, 1:90 or more, 1:80 or more, 1:70 or more, 1:60 or more, 1:50 or more, 1:40 or more, 1:30 or more, 1:20 or more, 1:15 or more, 1:10 or more, 1:5 or more, 1:2.5 or more, 1:1.25 or more, 1:1.1 or more, 1:1 or more, 1.1:1 or more, 1.25:1 or more, 1.5:1 or more, 2:1 or more, 3:1 or more, 4:1 or more, 5:1 or more, 6:1 or more, 7:1 or more, 8:1 or more, 9:1 or more, 10:1 or more, 12:1 or more, 14:1 or more, 16:1 or more, 18:1 or more, 20:1 or more, 25:1 or more, 30:1 or more, 35:1 or more, 40:1 or more, 45:1 or more, 50:1 or more, 55:1 or more, 60:1 or more, 65:1 or more, 70:1 or more, 75:1 or more, 80:1 or more, 85:1 or more, 90:1 or more, 95:1 or more, 100:1 or more, 105:1 or more, 110:1 or more, 112:1 or more, 114:1 or more, 116:1 or more, 117:1 or more, 118:1 or more, or 119:1 or more; the weight ratio of (a) to (b) is 120:1 or less, such as 119:1 or less, 118:1 or less, 117:1 or less, 116:1 or less, 114:1 or less, 112:1 or less, 110:1 or less, 105:1 or less, 100:1 or less, 95:1 or less, 90:1 or less, 85:1 or less, 80:1 or less, 75:1 or less, 70:1 or less, 65:1 or less, 60:1 or less, 55:1 or less, 50:1 or less, 45:1 or less, 40:1 or less, 35:1 or less, 30:1 or less, 25:1 or less, 20:1 or less, 18:1 or less, 16:1 or less, 14:1 or less, 12:1 or less, 10:1 or less, 9:1 or less, 8:1 or less, 7:1 or less, 6:1 or less, 5:1 or less, 4:1 or less, 3:1 or less, 2:1 or less, 1.5:1 or less, 1.25:1 or less, 1.1:1 or less, 1:1 or less, 1:1.1 or less, 1:1.25 or less, 1:2.5 or less, 1:5 or less, 1:10 or less, 1:15 or less, 1:20 or less, 1:30 or less, 1:40 or less, 1:50 or less, 1:60 or less, 1:70 or less, 1:80 or less, 1:90 or less, 1:100 or less, 1:125 or less, 1:150 or less, 1:175 or less, 1:200 or less, 1:225 or less, 1:250 or less, 1:300 or less, 1:350 or less, 1:400 or less, 1:450 or less, 1:500 or less, 1:550 or less, 1:560 or less, 1:570 or less, 1:580 or less, or 1:590 or less; or the weight ratio of (a) to (b) can range from any of the minimum ratios described above to any of the maximum values described above, such as from 1:600 to 120:1, from 1:500 to 120:1, from 1:500 to 100:1, from 1:400 to 100:1, from 1:400 to 80:1, from 1:300 to 120:1, from 1:300 to 100:1, from 1:250 to 120:1, from 1:200 to 100:1, from 1:175 to 85:1, from 1:150 to 80:1, from 1:140 to 80:1, from 1:130 to 50:1, or from 1:100 to 25:1. In some aspects, the weight ratio of (a) a pyridine carboxylate herbicide or an agriculturally acceptable N-oxide, salt, or ester thereof to (b) sulfonylaminocarbonyl triazolinone or an agriculturally acceptable salt or ester thereof is from 1:7.5 to 10:1, or from 1:5 to 1:1.

In some aspects, (b) includes sulfonylurea or an agriculturally acceptable salt or ester thereof. In some aspects, the weight ratio of (a) a pyridine carboxylate herbicide or an agriculturally acceptable N-oxide, salt, or ester thereof (in g ae/ha) to (b) a sulfonylurea or an agriculturally acceptable salt or ester thereof (in g ai/ha) is 1:400 or more, such as 1:390 or more, 1:380 or more, 1:360 or more, 1:360 or more, 1:350 or more, 1:340 or more, 1:330 or more, 1:320 or more, 1:310 or more, 1:300 or more, 1:250 or more, 1:225 or more, 1:200 or more, 1:175 or more, 1:150 or more, 1:125 or more, 1:100 or more, 1:90 or more, 1:80 or more, 1:70 or more, 1:60 or more, 1:50 or more, 1:40 or more, 1:30 or more, 1:20 or more, 1:15 or more, 1:10 or more, 1:5 or more, 1:2.5 or more, 1:1.25 or more, 1:1.1 or more, 1:1 or more, 1.1:1 or more, 1.25:1 or more, 2.5:1 or more, 5:1 or more, 10:1 or more, 15:1 or more, 20:1 or more, 30:1 or more, 40:1 or more, 50:1 or more, 60:1 or more, 70:1 or more, 80:1 or more, 90:1 or more, 100:1 or more, 125:1 or more, 150:1 or more, 175:1 or more, 200:1 or more, 225:1 or more, 250:1 or more, 300:1 or more, 310:1 or more, 320:1 or more, 330:1 or more, 340:1 or more, 350:1 or more, 360:1 or more, 380:1 or more, 385:1 or more, 390:1 or more, 392:1 or more, 394:1 or more, 396:1 or more, 397:1 or more, 398:1 or more, or 399:1 or more; the weight ratio of (a) to (b) is 400:1 or less, such as 390:1 or less, 380:1 or less, 370:1 or less, 360:1 or less, 350:1 or less, 340:1 or less, 330:1 or less, 320:1 or less, 310:1 or less, 300:1 or less, 250:1 or less, 225:1 or less, 200:1 or less, 175:1 or less, 150:1 or less, 125:1 or less, 100:1 or less, 90:1 or less, 80:1 or less, 70:1 or less, 60:1 or less, 50:1 or less, 40:1 or less, 30:1 or less, 20:1 or less, 15:1 or less, 10:1 or less, 5:1 or less, 2.5:1 or less, 1.25:1 or less, 1.1:1 or less, 1:1 or less, 1:1.1 or less, 1:1.25 or less, 1:2.5 or less, 1:5 or less, 1:10 or less, 1:15 or less, 1:20 or less, 1:30 or less, 1:40 or less, 1:50 or less, 1:60 or less, 1:70 or less, 1:80 or less, 1:90 or less, 1:100 or less, 1:125 or less, 1:150 or less, 1:175 or less, 1:200 or less, 1:225 or less, 1:250 or less, 1:300 or less, 1:310 or less, 1:320 or less, 1:330 or less, 1:340 or less, 1:350 or less, 1:360 or less, or 1:390 or less; or the weight ratio of (a) to (b) can range from any of the minimum ratios described above to any of the maximum values described above, such as from 1:400 to 400:1, from 1:300 to 300:1, from 1:250 to 250:1, from 1:200 to 200:1, from 1:175 to 175:1, from 1:150 to 150:1, from 1:125 to 125:1, from 1:100 to 100:1, from 1:75 to 75:1, from 1:50 to 50:1, from 1:40 to 40:1, from 1:30 to 30:1, from 1:25 to 25:1, or from 1:20 to 20:1. In some aspects, the weight ratio of (a) a pyridine carboxylate herbicide or an agriculturally acceptable N-oxide, salt, or ester thereof to (b) pyroxsulam or an agriculturally acceptable salt or ester thereof is from 1:10 to 5:1, or from 1:8.75 to 2:1.

In some aspects, the active ingredients in the compositions disclosed herein consist of (a) a pyridine carboxylate herbicide or an agriculturally acceptable N-oxide, salt, or ester thereof and (b) an ALS inhibitor or an agriculturally acceptable salt or ester thereof.

In some aspects, (a) and (b), independently, can be employed in a purity of from 90% to 100% (e.g., from 95% to 100%) according to nuclear magnetic resonance (NMR) spectroscopy.

V. Formulations

The present disclosure also includes formulations of the compositions and methods disclosed herein.

A. Additives

The compositions and methods disclosed herein can also be mixed with or applied with an additive. In some aspects, the additive is added sequentially. In some aspects, the additive is added simultaneously. In some aspects, the additive is premixed with the pyridine carboxylate herbicide or agriculturally acceptable N-oxide, salt, or ester thereof.

1. Other Pesticides

Some aspects of the described herbicidal compositions includes adding one or more additional pesticide active ingredients to the solid herbicidal compositions. These pesticide active ingredients may include one or more of an herbicide, an insecticide, a fungicide, a nematocide, a miticide, a arthropodicide, a bactericide, a plant growth regulator, or combinations thereof that are compatible with the compositions of the present disclosure.

In some aspects, the additive is an additional herbicide. For example, the compositions described herein can be applied in conjunction with one or more additional herbicides to control undesirable vegetation. The composition can be formulated with the one or more additional herbicides, tank mixed with the one or more additional herbicides, or applied sequentially with the one or more additional herbicides. Exemplary additional herbicides include, but are not limited to: 4-CPA; 4-CPB; 4-CPP; 2,4-D; 2,4-D choline salt; 2,4-D salts, esters and amines; 2,4-DB; 3,4-DA; 3,4-DB; 2,4-DEB; 2,4-DEP; 2,4-DP; 3,4-DP; 2,3,6-TBA; 2,4,5-T; 2,4,5-TB; acetochlor; acifluorfen; aclonifen; acrolein; alachlor; allidochlor; alloxydim; allyl alcohol; alorac; ametridione; ametryne; amibuzin; amicarbazone; amidosulfuron; aminocyclopyrachlor; 4-aminopicolinic acid based herbicides, such as halauxifen, halauxifen-methyl, florpyrauxifen, and those described in U.S. Pat. Nos. 7,314,849 and 7,432,227 to Balko, et al.; aminopyralid; amiprofos-methyl; amitrole; ammonium sulfamate; anilofos; anisuron; asulam;

atraton; atrazine; azafenidin; azimsulfuron; aziprotryne; barban; BCPC; beflubutamid; benazolin; bencarbazone; benfluralin; benfuresate; bensulide; bensulfuron; benthiocarb; bentazone; benzadox; benzfendizone; benzipram; benzobicyclon; benzofenap; benzofluor; benzoylprop; benzthiazuron; bialaphos; bicyclopyrone; bifenox; bilanafos; bispyribac; borax; bromacil; bromobonil; bromobutide; bromofenoxim; bromoxynil; brompyrazon; butachlor; butafenacil; butamifos; butenachlor; buthidazole; buthiuron; butralin; butroxydim; buturon; butylate; cacodylic acid; cafenstrole; calcium chlorate; calcium cyanamide; cambendichlor; carbasulam; carbetamide; carboxazole; chlorprocarb; carfentrazone-ethyl; CDEA; CEPC; chlomethoxyfen; chloramben; chloranocryl; chlorazifop; chlorazine; chlorobromuron; chlorbufam; chloreturon; chlorfenac; chlorfenprop; chlorflurazole; chlorflurenol; chloridazon; chlorimuron; chlomitrofen; chloropon; chlorotoluron; chloroxuron; chloroxynil; chlorpropham; chlorsulfuron; chlorthal; chlorthiamid; cinidon-ethyl; cinmethylin; cinosulfuron; cisanilide; clacyfos; clethodim; cliodinate; clodinafop-propargyl; clofop; clomazone; clomeprop; cloprop; cloproxydim; clopyralid; cloransulam-methyl; CMA; copper sulfate; CPMF; CPPC; credazine; cresol; cumyluron; cyanatryn; cyanazine; cycloate; cyclopyrimorate; cyclosulfamuron; cycloxydim; cycluron; cyhalofop-butyl; cyperquat; cyprazine; cyprazole; cypromid; daimuron; dalapon; dazomet; delachlor; desmedipham; desmetryn; di-allate; dicamba; dichlobenil; dichloralurea; dichlormate; dichlorprop; dichlorprop-P; diclofop-methyl; diclosulam; diethamquat; diethatyl; difenopenten; difenoxuron; difenzoquat; diflufenican; diflufenzopyr; dimefuron; dimepiperate; dimethachlor; dimethametryn; dimethenamid; dimethenamid-P; dimexano; dimidazon; dinitramine; dinofenate; dinoprop; dinosam; dinoseb; dinoterb; diphenamid; dipropetryn; diquat; disul; dithiopyr; diuron; DMPA; DNOC; DSMA; EBEP; eglinazine; endothal; epronaz; EPTC; erbon; esprocarb; ethalfluralin; ethametsulfuron; ethbenzamide; ethametsulfuron; ethidimuron; ethiolate; ethobenzamid; ethofumesate; ethoxyfen; ethoxysulfuron; etinofen; etnipromid; etobenzanid; EXD; fenasulam; fenoprop; fenoxaprop; fenoxaprop-P-ethyl; fenoxaprop-P-ethyl+isoxadifen-ethyl; fenoxasulfone; fenquinotrione; fenteracol; fenthiaprop; fentrazamide; fenuron; ferrous sulfate; flamprop; flamprop-M; flazasulfuron; florasulam; fluazifop; fluazifop-P-butyl; fluazolate; flucarbazone; flucetosulfuron; fluchloralin; flufenacet; flufenican; flufenpyr-ethyl; flumetsulam; flumezin; flumiclorac-pentyl; flumioxazin; flumipropyn; fluometuron; fluorodifen; fluoroglycofen; fluoromidine; fluoronitrofen; fluothiuron; flupoxam; flupropacil; flupropanate; flupyrsulfuron; fluridone; flurochloridone; fluroxypyr; fluroxypyr-meptyl; flurtamone; fluthiacet; fomesafen; foramsulfuron; fosamine; fumiclorac; furyloxyfen; glufosinate; glufosinate-ammonium; glufosinate-P-ammonium; glyphosate salts and esters; halosafen; halosulfuron; haloxydine; haloxyfop; hexachloroacetone; hexaflurate; hexazinone; imazamethabenz; imazamox; imazapic; imazapyr; imazaquin; imazethapyr; imazosulfuron; indanofan; indaziflam; iodobonil; iodomethane; iodosulfuron; iodosulfuron-ethyl-sodium; iofensulfuron; ioxynil; ipazine; ipfencarbazone; iprymidam; isocarbamid; isocil; isomethiozin; isonoruron; isopolinate; isopropalin; isoproturon; isouron; isoxaben; isoxachlortole; isoxaflutole; isoxapyrifop; karbutilate; ketospiradox; lactofen; lenacil; linuron; MAA; MAMA; MCPA esters and amines; MCPA-thioethyl; MCPB; mecoprop; mecoprop-P; medinoterb; mefenacet; mefluidide; mesoprazine; mesosulfuron; mesotrione; metam; metamifop; metamitron; metazachlor; metflurazon; methabenzthiazuron; methalpropalin; methazole; methiobencarb; methiozolin; methiuron; methometon; methoprotryne; methyl bromide; methyl isothiocyanate; methyldymron; metobenzuron; metobromuron; metolachlor; metosulam; metoxuron; metribuzin; metsulfuron; molinate; monalide; monisouron; monochloroacetic acid; monolinuron; monuron; morfamquat; MSMA; naproanilide; napropamide; napropamide-M; naptalam; neburon; nicosulfuron; nipyraclofen; nitralin; nitrofen; nitrofluorfen; norflurazon; noruron; OCH; orbencarb; ortho-dichlorobenzene; orthosulfamuron; oryzalin; oxadiargyl; oxadiazon; oxapyrazon; oxasulfuron; oxaziclomefone; oxyfluorfen; paraflufen-ethyl; parafluron; paraquat; pebulate; pelargonic acid; pendimethalin; penoxsulam; pentachlorophenol; pentanochlor; pentoxazone; perfluidone; pethoxamid; phenisopham; phenmedipham; phenmedipham-ethyl; phenobenzuron; phenylmercury acetate; picloram; picolinafen; pinoxaden; piperophos; potassium arsenite; potassium azide; potassium cyanate; pretilachlor; primisulfuron; procyazine; prodiamine; profluazol; profluralin; profoxydim; proglinazine; prohexadione-calcium; prometon; prometryne; pronamide; propachlor; propanil; propaquizafop; propazine; propham; propisochlor; propoxycarbazone; propyrisulfuron; propyzamide; prosulfalin; prosulfocarb; prosulfuron; proxan; prynachlor; pydanon; pyraclonil; pyraflufen; pyrasulfotole; pyrazogyl; pyrazone; pyrazolynate; pyrazosulfuron; pyrazoxyfen; pyribenzoxim; pyributicarb; pyriclor; pyridafol; pyridate; pyriftalid; pyriminobac; pyrimisulfan; pyrithiobac-sodium; pyroxasulfone; pyroxsulam; quinclorac; quinmerac; quinoclamine; quinonamid; quizalofop; quizalofop-P-ethyl; quizalofop-P-tefuryl; rhodethanil; rimsulfuron; saflufenacil; S-metolachlor; sebuthylazine; secbumeton; sethoxydim; siduron; simazine; simeton; simetryn; SMA; sodium arsenite; sodium azide; sodium chlorate; sulcotrione; sulfallate; sulfentrazone; sulfometuron; sulfosate; sulfosulfuron; sulfuric acid; sulglycapin; swep; TCA; tebutam; tebuthiuron; tefuryltrione; tembotrione; tepraloxydim; terbacil; terbucarb; terbuchlor; terbumeton; terbuthylazine; terbutryne; tetrafluron; thenylchlor; thiameturon; thiazafluron; thiazopyr; thidiazimin; thidiazuron; thiencarbazone; thifensulfuron; thiobencarb; tiafenacil; tiocarbazil; tioclorim; tolpyralate; topramezone; tralkoxydim; tri-allate; triafamone; triasulfuron; triaziflam; tribenuron; tribenuron; tricamba; triclopyr choline salt; triclopyr esters and amines; tridiphane; trietazine; trifloxysulfuron; trifludimoxazin; trifluralin; triflusulfuron; trifop; trifopsime; trihydroxytriazine; trimeturon; tripropindan; tritac; tritosulfuron; vemolate; xylachlor; and salts, esters, optically active isomers, and mixtures thereof.

In some aspects, the additional pesticide or an agriculturally acceptable salt or ester thereof is provided in a premixed formulation with (a), (b), or combinations thereof. In some aspects, the pyridine carboxylate herbicide or an agriculturally acceptable N-oxide, salt, or ester thereof is provided in a premixed formulation with an additional pesticide. In some aspects, the ALS inhibitor or an agriculturally acceptable salt or ester thereof is provided in a premixed formulation with an additional pesticide.

In some aspects, the compositions may include one or more herbicidal active ingredients in addition to (a). In some aspects, the compositions do not include an herbicidal active ingredient in addition to (a). In some aspects, the compositions may exclude one or more herbicidal active ingredients specified above. In some aspects, the compositions may include one or more herbicidal active ingredients in addition to (a), but may exclude one or more herbicidal ingredients specified above.

2. Adjuvants

In some aspects, the additive includes an agriculturally acceptable adjuvant. Exemplary agriculturally acceptable adjuvants include, but are not limited to, antifreeze agents, antifoam agents, compatibilizing agents, sequestering agents, neutralizing agents and buffers, corrosion inhibitors, colorants, odorants, penetration aids, wetting agents, spreading agents, dispersing agents, thickening agents, freeze point depressants, antimicrobial agents, crop oil, adhesives (for instance, for use in seed formulations), surfactants, protective colloids, emulsifiers, tackifiers, and mixtures thereof.

Exemplary agriculturally acceptable adjuvants include, but are not limited to, crop oil concentrates (e.g., 85% mineral oil+15% emulsifiers); nonylphenol ethoxylates; benzylcocoalkyldimethyl quaternary ammonium salts; blends of petroleum hydrocarbon, alkyl esters, organic acids, and anionic surfactants; $C_9$-$C_{11}$ alkylpolyglycoside; phosphate alcohol ethoxylates; natural primary alcohol ($C_{12}$-$C_{16}$) ethoxylate; di-sec-butylphenol EO-PO block copolymers; polysiloxane-methyl cap; nonylphenol ethoxylate+urea ammonium nitrates; emulsified methylated seed oils; tridecyl alcohol (synthetic) ethoxylates (e.g., 8 EO); tallow amine ethoxylates (e.g., 15 EO); and PEG(400) dioleate-99.

Exemplary surfactants (e.g., wetting agents, tackifiers, dispersants, emulsifiers) include, but are not limited to: the alkali metal salts, alkaline earth metal salts and ammonium salts of fatty acids or of aromatic sulfonic acids (e.g., lignosulfonic acids, phenolsulfonic acids, naphthalenesulfonic acids, and dibutylnaphthalenesulfonic acid); alkyl- and alkylarylsulfonates; alkyl sulfates, lauryl ether sulfates and fatty alcohol sulfates; salts of sulfated hexa-, hepta- and octadecanols; salts of fatty alcohol glycol ethers; condensates of sulfonated naphthalene and its derivatives with formaldehyde; condensates of naphthalene or of the naphthalene sulfonic acids with phenol and formaldehyde; polyoxyethylene octylphenol ether; ethoxylated isooctyl-, octyl- or nonylphenol, alkylphenyl or tributylphenyl polyglycol ether; alkyl aryl polyether alcohols; isotridecyl alcohol; fatty alcohol/ethylene oxide condensates; ethoxylated castor oil; polyoxyethylene alkyl ethers or polyoxypropylene alkyl ethers; lauryl alcohol polyglycol ether acetate; sorbitol esters; lignosulfite waste liquors and proteins; denatured proteins, polysaccharides (e.g., methylcellulose); hydrophobically modified starches; and polyvinyl alcohol, polycarboxylates, polyalkoxylates, polyvinyl amine, polyethyleneimine, polyvinylpyrrolidone, and copolymers thereof.

Exemplary thickeners include, but are not limited to, polysaccharides (e.g., xanthan gum), organic and inorganic sheet minerals, and mixtures thereof.

Exemplary antifoam agents include, but are not limited to, silicone emulsions, long-chain alcohols, fatty acids, fatty acid salts, organofluorine compounds, and mixtures thereof.

Exemplary antimicrobial agents include, but are not limited to: bactericides based on dichlorophen and benzyl alcohol hemiformal; isothiazolinone derivatives, such as alkylisothiazolinones and benzisothiazolinones; and mixtures thereof.

Exemplary antifreeze agents, include, but are not limited to ethylene glycol, propylene glycol, urea, glycerol, and mixtures thereof.

Exemplary colorants include, but are not limited to, the dyes known under the names Rhodamine B, pigment blue 15:4, pigment blue 15:3, pigment blue 15:2, pigment blue 15:1, pigment blue 80, pigment yellow 1, pigment yellow 13, pigment red 112, pigment red 48:2, pigment red 48:1, pigment red 57:1, pigment red 53:1, pigment orange 43, pigment orange 34, pigment orange 5, pigment green 36, pigment green 7, pigment white 6, pigment brown 25, basic violet 10, basic violet 49, acid red 51, acid red 52, acid red 14, acid blue 9, acid yellow 23, basic red 10, basic red 108, and mixtures thereof.

Exemplary adhesives include, but are not limited to, polyvinylpyrrolidone, polyvinyl acetate, polyvinyl alcohol, tylose, and mixtures thereof.

3. Safeners

In some aspects, the additive is a safener. Safeners are compounds leading to better crop plant compatibility when applied with a herbicide. In some aspects, the safener itself is herbicidally active. In some aspects, the safener acts as an antidote or antagonist in the crop plants and can protect the crop plants from damage that might otherwise occur from an applied herbicide. Exemplary safeners include, but are not limited to, AD-67 (MON 4660), benoxacor, benthiocarb, brassinolide, cloquintocet, cloquintocet-mexyl, cyometrinil, cyprosulfamide, daimuron, dichlormid, dicyclonon, dietholate, dimepiperate, disulfoton, fenchlorazole, fenchlorazole-ethyl, fenclorim, flurazole, fluxofenim, furilazole, harpin proteins, isoxadifen-ethyl, jiecaowan, jiecaoxi, mefenpyr, mefenpyr-diethyl, mephenate, naphthalic anhydride, 2,2,5-trimethyl-3-(dichloroacetyl)-1,3-oxazolidine, 4-(dichloroacetyl)-1-oxa-4-azaspiro [4.5]decane, oxabetrinil, R29148, and N-phenyl-sulfonylbenzoic acid amides, as well as thereof agriculturally acceptable salts and, provided they have a carboxyl group, their agriculturally acceptable derivatives. In some aspects, the safener can be cloquintocet or an ester or salt thereof, such as cloquintocet-mexyl. In some aspects, the safener can be mefenpyr or an ester or salt thereof, such as mefenpyr-diethyl. In some aspects, the safener is employed in rice, cereal, or maize. For example, mefenpyr or cloquintocet can be used to antagonize harmful effects of the compositions on rice, row crops, and cereals.

4. Carriers

In some aspects, the additive includes a carrier. In some aspects, the additive includes a liquid or solid carrier. In some aspects, the additive includes an organic or inorganic carrier. Exemplary liquid carriers include, but are not limited to: water; petroleum fractions or hydrocarbons such as mineral oil, aromatic solvents, paraffinic oils, and the like; vegetable oils such as soybean oil, rapeseed oil, olive oil, castor oil, sunflower seed oil, coconut oil, corn oil, cottonseed oil, linseed oil, palm oil, peanut oil, safflower oil, sesame oil, tung oil and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids and the like; toluene; xylene; petroleum naphtha; crop oil; acetone; methyl ethyl ketone; cyclohexanone; trichloroethylene; perchloroethylene; ethyl acetate; amyl acetate; butyl acetate; propylene glycol monomethyl ether and diethylene glycol monomethyl ether; methyl alcohol; ethyl alcohol; isopropyl alcohol; amyl alcohol; ethylene glycol; propylene glycol; glycerine; N-methyl-2-pyrrolidinone; N;N-dimethyl alkylamides; dimethyl sulfoxide; and liquid fertilizers, as well as mixtures thereof. Exemplary solid carriers include, but are not limited to: silicas, silica gels, silicates, talc, kaolin, limestone, lime, chalk, bole, loess, clay, dolomite, diatomaceous earth, calcium sulfate, magnesium sulfate, magnesium oxide, ground synthetic materials, pyrophyllite clay, attapulgus clay, kieselguhr, calcium carbonate, bentonite clay, Fuller's earth, cottonseed hulls, wheat flour, soybean flour, pumice, wood flour, walnut shell flour, lignin, ammonium sulfate, ammonium phosphate, ammonium nitrate, ureas, cereal meal, tree bark meal, wood meal and nutshell meal, cellulose powders, and mixtures thereof.

B. Physical States

In some aspects, the formulation of (a) the pyridine carboxylate herbicide or an agriculturally acceptable N-oxide, salt, or ester thereof and (b) the ALS inhibitor or an agriculturally acceptable salt or ester thereof may be present in suspended, emulsified, dissolved, or solid form. Exemplary formulations include, but are not limited to, aqueous solutions, aqueous suspensions, aqueous dispersions, aqueous emulsions, aqueous microemulsions, aqueous suspoemulsions, oil solutions, oil suspensions, oil dispersions, oil emulsions, oil microemulsions, oil suspo-emulsions, self-emulsifying formulations, pastes, powders, dusts, granules, and materials for spreading.

In some aspects, (a) and (b) are aqueous solutions that can be diluted before use. In various aspects, (a) or (b) may be provided as a high-strength formulation such as a concentrate. In some aspects, the concentrate is stable and retains potency during storage and shipping. In various aspects, the concentrate is a clear, homogeneous liquid that is stable at temperatures of 54° C. or greater. In some aspects, the concentrate does not exhibit any precipitation of solids at temperatures of −10° C. or higher. In some aspects, the concentrate does not exhibit separation, precipitation, or crystallization of any components at low temperatures. For example, the concentrate remains a clear solution at temperatures below 0° C. (e.g., below −5° C., below −10° C., below −15° C.). In some aspects, the concentrate exhibits a viscosity of less than 50 centipoise (50 megapascals), even at temperatures as low as 5° C. In some aspects, the concentrate does not exhibit separation, precipitation, or crystallization of any components during storage for a period of 2 weeks or greater (e.g., 4 weeks, 6 weeks, 8 weeks, 3 months, 6 months, 9 months, or 12 months or greater).

In some aspects, emulsions, pastes, or oil dispersions can be prepared by homogenizing (a) and (b) in water with a wetting agent, tackifier, dispersant, or emulsifier. In some aspects, concentrates suitable for dilution with water can be prepared, comprising (a), (b), a wetting agent, a tackifier, and a dispersant or emulsifier.

In some aspects, powders, materials for spreading, or dusts can be prepared by mixing or concomitant grinding of (a) and (b) and optionally other additives with a solid carrier.

In some aspects, granules (e.g., coated granules, impregnated granules and homogeneous granules) can be prepared by binding the (a) and (b) to solid carriers.

In some aspects, the formulations comprise, by total weight of (a) and (b), from 1% to 99% of (a) and 1% to 99% of (b) (e.g., 95% of (a) and 5% of (b); 70% of (a) and 30% of (b); or 40% of (a) and 60% of (b)). In formulations designed to be employed as concentrates, the total amount of (a) and (b) can be present in a concentration of from about 0.1 to about 98 weight percent (wt. %), based on the total weight of the formulation For example, the total amount of (a) and (b) can be present in a concentration as little as about 1 wt. %, about 2.5 wt. 00 about 5 wt. 00 about 7.5 wt. 0 about 10 wt. 00 about 15 wt. 00 about 20 wt. 00 about 25 wt. 00 about 30 wt. 00 about 35 wt. 0 about 40 wt. 00 about 45 wt. 00 as high as about 50 wt. 00 about 55 wt. 00 about 60 wt. 00 about 65 wt. 00 about 70 wt. 00 about 75 wt. %, about 80 wt. 00 about 85 wt. 00 about 90 wt. %, about 95 wt. 0, about 97 wt. 0, or within any range defined between any two of the forgoing values, such as between about 1 wt. % to about 97 wt. %, between about 10 wt. % to about 90 wt. %, between about 20 wt. % to about 45 wt. %, and about 25 wt. % to about 50 wt. % based on the total weight of the formulation. Concentrates can be diluted with an inert carrier, such as water, prior to application. The diluted formulations applied to undesirable vegetation or the locus of undesirable vegetation can contain from 0.0006 to 8.0 wt. % of the total amount of (a) and (b) (e.g., from 0.001 to 5.0 wt. %), based on the total weight of the diluted formulation.

C. Packaging

In some aspects, the formulation can be in the form of a single package formulation including both: (a) the pyridine carboxylate herbicide or an agriculturally acceptable N-oxide, salt, or ester thereof; and (b) the ALS inhibitor or an agriculturally acceptable salt or ester thereof. In some aspects, the formulation can be in the form of a single package formulation including both (a) and (b) and further including at least one additive. In some aspects, the formulation can be in the form of a multi-package formulation, such as a two-package formulation, wherein one package contains (a) and optionally at least one additive while the other package contains (b) and optionally at least one additive. In some aspects of the two-package formulation, the formulation including (a) and optionally at least one additive and the formulation including (b) and optionally at least one additive are mixed before application and then applied simultaneously. In some aspects, the mixing is performed as a tank mix (e.g., the formulations are mixed immediately before or upon dilution with water). In some aspects, the formulation including (a) and the formulation including (b) are not mixed but are applied sequentially (in succession), for example, immediately or within 1 hour, within 2 hours, within 4 hours, within 8 hours, within 16 hours, within 24 hours, within 2 days, or within 3 days, of each other.

VI. Methods of Use

The compositions disclosed herein can be applied in any known technique for applying herbicides. Exemplary application techniques include, but are not limited to, spraying, atomizing, dusting, spreading, or direct application into water. The method of application can vary depending on the intended purpose. In some aspects, the method of application can be chosen to ensure the finest possible distribution of the compositions disclosed herein.

In some aspects, a method of controlling undesirable vegetation which comprises contacting the vegetation or the locus thereof with or applying to the soil or water to prevent the emergence or growth of vegetation any of the compositions is disclosed herein.

The compositions disclosed herein can be applied pre-emergence (before the emergence of undesirable vegetation) or post-emergence (e.g., during and/or after emergence of the undesirable vegetation). In some aspects, the composition is applied post-emergence to the undesirable vegetation. In some aspects, the pyridine carboxylate herbicide and ALS inhibitor are applied simultaneously. In some aspects, the pyridine carboxylate herbicide and ALS inhibitor are applied sequentially, for example, immediately or with minimal delay, within about 10 minutes, within about 20 minutes, within about 30 minutes, within about 40 minutes, within about 1 hour, within about 2 hours, within about 4 hours, within about 8 hours, within about 16 hours, within about 24 hours, within about 2 days, or within about 3 days, of each other.

When the compositions are used in crops, the compositions can be applied after seeding and before or after the emergence of the crop plants. In some aspects, the compositions disclosed herein show good crop tolerance even when the crop has already emerged and can be applied during or after the emergence of the crop plants. In some aspects, when the compositions are used in crops, the compositions can be applied before seeding of the crop plants.

In some aspects, the compositions disclosed herein are applied to vegetation or an area adjacent the vegetation or applying to soil or water to prevent the emergence or growth of vegetation by spraying (e.g., foliar spraying). In some aspects, the spraying techniques use, for example, water as carrier and spray volume rates of from 2 liters per hectare (L/ha) to 2000 L/ha (e.g., from 10-1000 L/ha or from 50-500 L/ha). In some aspects, the compositions disclosed herein are applied by the low-volume or the ultra-low-volume method, wherein the application is in the form of micro granules. In some aspects, wherein the compositions disclosed herein are less well tolerated by certain crop plants, the compositions can be applied with the aid of the spray apparatus in such a way that they come into little contact, if any, with the leaves of the sensitive crop plants while reaching the leaves of undesirable vegetation that grows underneath or on the bare soil (e.g., post-directed or lay-by). In some aspects, the compositions disclosed herein can be applied as dry formulations (e.g., granules, powders, or dusts).

In some aspects, wherein the undesirable vegetation is treated post-emergence, the compositions disclosed herein are applied by foliar application. In some aspects, herbicidal activity is exhibited by the compounds of the mixture when they are applied directly to the plant or to the locus of the plant at any stage of growth or before planting or emergence. The effect observed can depend upon the type of undesirable vegetation to be controlled, the stage of growth of the undesirable vegetation, the application parameters of dilution and spray drop size, the particle size of solid components, the environmental conditions at the time of use, the specific compound employed, the specific adjuvants and carriers employed, the soil type, and the like, as well as the amount of chemical applied. In some aspects, these and other factors can be adjusted to promote non-selective or selective herbicidal action.

The compositions and methods disclosed herein can be used to control undesirable vegetation in a variety of applications. The compositions and methods disclosed herein can be used for controlling undesirable vegetation in areas including, but not limited to, farmland, turfgrass, pastures, grasslands, rangelands, fallow land, rights-of-way, aquatic settings, tree and vine, wildlife management areas, or range-land. In some aspects, the undesirable vegetation is controlled in a row crop. Exemplary crops include, but are not limited to, wheat, barley, triticale, rye, teff, oats, maize, cotton, soy, sorghum, rice, millet, sugarcane and range land (e.g., pasture grasses). In some aspects, the compositions and methods disclosed herein can be used for controlling undesirable vegetation in maize, wheat, barley, rice, sorghum, millet, oats, or a combination thereof. In some aspects, the compositions and methods disclosed herein can be used for controlling undesirable vegetation in broadleaf crops. In some aspects, the compositions and methods disclosed herein can be used for controlling undesirable vegetation in canola, flax, sunflower, soy, or cotton. In some aspects, the compositions and methods disclosed herein can be used in industrial vegetation management (IVM) or for utility, pipeline, roadside, and railroad rights-of-way applications. In some aspects, the compositions and methods disclosed herein can also be used in forestry (e.g., for site preparation or for combating undesirable vegetation in plantation forests). In some aspects, the compositions and methods disclosed herein can be used to control undesirable vegetation in conservation reserve program lands (CRP), trees, vines, grasslands, and grasses grown for seeds. In some aspects, the compositions and methods disclosed herein can be used on lawns (e.g., residential, industrial, and institutional), golf courses, parks, cemeteries, athletic fields, and sod farms.

The compositions and methods disclosed herein can also be used in crop plants that are resistant to, for instance, herbicides, pathogens, and/or insects. In some aspects, the compositions and methods disclosed herein can be used in crop plants that are resistant to one or more herbicides because of genetic engineering or breeding. In some aspects, the compositions and methods disclosed herein can be used in crop plants that are resistant to one or more pathogens such as plant pathogenic fungi owing to genetic engineering or breeding. In some aspects, the compositions and methods disclosed herein can be used in crop plants that are resistant to attack by insects owing to genetic engineering or breeding. Exemplary resistant crops include, but are not limited to, crops that are resistant to photosystem II inhibitors, or crop plants that, owing to introduction of the gene for *Bacillus thuringiensis* (or Bt) toxin by genetic modification, are resistant to attack by certain insects. In some aspects, the compositions and methods described herein can be used in conjunction with glyphosate, glufosinate, dicamba, phenoxy auxins, pyridyloxy auxins, aryloxyphenoxypropionates, acetyl CoA carboxylase (ACCase) inhibitors, imidazolinones, acetolactate synthase (ALS) inhibitors, 4-hydroxyphenyl-pyruvate dioxygenase (HPPD) inhibitors, protoporphyrinogen oxidase (PPO) inhibitors, triazines, and bromoxynil to control vegetation in crops tolerant to glyphosate, glufosinate, dicamba, phenoxy auxins, pyridyloxy auxins, aryloxyphenoxypropionates, ACCase inhibitors, imidazolinones, ALS inhibitors, HPPD inhibitors, PPO inhibitors, triazines, bromoxynil, or combinations thereof. In some aspects, the undesirable vegetation is controlled in glyphosate, glufosinate, dicamba, phenoxy auxins, pyridyloxy auxins, aryloxyphenoxypropionates, ACCase inhibitors, ALS inhibitors, HPPD inhibitors, PPO inhibitors, triazines, and bromoxynil tolerant crops possessing single, multiple or stacked traits conferring tolerance to single or multiple chemistries and/or multiple modes of action. In some aspects, the undesirable vegetation can be controlled in a crop that is ACCase-tolerant, ALS-tolerant, or a combination thereof. The combination of (a) and (b) can be used in combination with one or more herbicides that are selective for the crop being treated and which complement the spectrum of weeds controlled by these compounds at the application rate employed. In some aspects, the compositions described herein and other complementary herbicides are applied at the same time, either as a combination formulation or as a tank mix, or as sequential applications. The compositions and methods may be used in controlling undesirable vegetation in crops possessing agronomic stress tolerance (including but not limited to drought, cold, heat, salt, water, nutrient, fertility, pH), pest tolerance (including but not limited to insects, fungi and pathogens), and crop improvement traits (including but not limited to yield; protein, carbohydrate, or oil content; protein, carbohydrate, or oil composition; plant stature and plant architecture).

In some aspects, the compositions disclosed herein can be used for controlling undesirable vegetation including grasses, broadleaf weeds, sedge weeds, and combinations thereof. In some aspects, the compositions disclosed herein can be used for controlling undesirable vegetation including, but not limited to, *Polygonum* species, *Amaranthus* species, *Chenopodium* species, *Sida* species, *Ambrosia* species, *Cyperus* species, *Setaria* species, *Sorghum* species, *Acanthospermum* species, *Anthemis* species, *Atriplex* species, *Brassica* species, *Cirsium* species, *Convolvulus* species, *Conyza* species, *Cassia* species, *Commelina* species, *Datura* species, *Euphorbia* species, Geranium species, *Galinsoga* species, *Ipomea* species, *Lamium* species, *Lolium* species, *Malva* species, *Matricaria* species, *Prosopis* species, *Rumex* species, *Sisymbrium* species, *Solanum* species, *Trifolium* species, *Xanthium* species, Veronica species, and Viola species. In some aspects, the undesired vegetation includes common chickweed (*Stellaria media*), velvetleaf (*Abutilon theophrasti*), hemp sesbania (*Sesbania exaltata* Cory), *Anoda cristata, Bidens pilosa, Brassica* kaber, shepherd's purse (*Capsella bursa-pastoris*), cornflower (*Centaurea cyanus* or *Cyanus segetum*), hempnettle (*Galeopsis tetrahit*), cleavers (*Galium aparine*), common sunflower (*Helianthus annuus*), *Desmodium tortuosum*, Italian ryegrass (*Lolium multiflorum*), kochia (*Kochia scoparia*), *Medicago arabica, Mercurialis annua, Myosotis arvensis*, common poppy (*Papaver rhoeas*), *Raphanus raphanistrum*, broad-leaf dock (*Rumex obtusifolius*), Russian thistle (*Salsola kali*), wild mustard (*Sinapis arvensis*), *Sonchus arvensis, Thlaspi arvense, Tagetes minuta, Richardia brasiliensis, Plantago major, Plantago lanceolata*, bird's-eye speedwell (*Veronica persica*), pigweed (*Amaranthus retroflexus*), winter rape (*Brassica napus*), lambsquarters (*Chenopodium album*), Canadian thistle (*Cirsium arvense*), nutsedge (*Cyperus esculentus*), poinsettia (*Euphorbia heterophylla*), prickly lettuce (*Lactuca serriola*), purple deadnettle (*Lamium purpureum*), wild chamomile (*Matricaria chamomilla*), false chamomile (*Matricaria inodora*), field chamomile (*Anthemis arvensis*), common buckwheat (*Fagopyrum esculentum*), wild buckwheat (*Polygonum convulvus*), giant foxtail (*Setaria faberi*), green foxtail (*Setaria viridis*), common sorghum (*Sorghum vulgare*), wild pansy (Viola tricolor), or a combination thereof.

The compositions described herein can be used to control herbicide resistant or tolerant weeds. The methods employing the compositions described herein may also be employed to control herbicide resistant or tolerant weeds. Exemplary resistant or tolerant weeds include, but are not limited to, biotypes resistant or tolerant to acetolactate synthase (ALS) or acetohydroxy acid synthase (AHAS) inhibitors (e.g., imidazolinones, sulfonylureas, pyrimidinylthiobenzoates, triazolopyrimidines, sulfonylaminocarbonyltriazolinones), photosystem II inhibitors (e.g., phenylcarbamates, pyridazinones, triazines, triazinones, uracils, amides, ureas, benzothiadiazinones, nitriles, phenylpyridazines), acetyl CoA carboxylase (ACCase) inhibitors (e.g., aryloxyphenoxypropionates, cyclohexanediones, phenylpyrazolines), synthetic auxins (e.g., benzoic acids, phenoxycarboxylic acids, pyridine carboxylates, quinoline carboxylic acids), auxin transport inhibitors (e.g., phthalamates, semicarbazones), photosystem I inhibitors (e.g., bipyridyliums), 5-enolpyruvylshikimate-3-phosphate (EPSP) synthase inhibitors (e.g., glyphosate), glutamine synthetase inhibitors (e.g., glufosinate, bialaphos), microtubule assembly inhibitors (e.g., benzamides, benzoic acids, dinitroanilines, phosphoramidates, pyridines), mitosis inhibitors (e.g., carbamates), very long chain fatty acid (VLCFA) inhibitors (e.g., acetamides, chloroacetamides, oxyacetamides, tetrazolinones), fatty acid and lipid synthesis inhibitors (e.g., phosphorodithioates, thiocarbamates, benzofuranes, chlorocarbonic acids), protoporphyrinogen oxidase (PPO) inhibitors (e.g., diphenylethers, N-phenylphthalimides, oxadiazoles, oxazolidinediones, phenylpyrazoles, pyrimidindiones, thiadiazoles, triazolinones), carotenoid biosynthesis inhibitors (e.g., clomazone, amitrole, aclonifen), phytoene desaturase (PDS) inhibitors (e.g., amides, anilidex, furanones, phenoxybutan-amides, pyridiazinones, pyridines), 4-hydroxyphenyl-pyruvate-dioxygenase (HPPD) inhibitors (e.g., callistemones, isoxazoles, pyrazoles, triketones), cellulose biosynthesis inhibitors (e.g., nitriles, benzamides, quinclorac, triazolocarboxamides), herbicides with multiple modes of action such as quinclorac, and unclassified herbicides such as arylaminopropionic acids, difenzoquat, endothall, and organoarsenicals. Exemplary resistant or tolerant weeds include, but are not limited to, biotypes with resistance or tolerance to multiple herbicides, biotypes with resistance or tolerance to multiple chemical classes, biotypes with resistance or tolerance to multiple herbicide modes of action, and biotypes with multiple resistance or tolerance mechanisms (e.g., target site resistance or metabolic resistance).

By way of non-limiting illustration, examples of some aspects of the present disclosure are given below. Parts and percentages are on a per weight basis unless otherwise indicated.

EXAMPLES

Greenhouse Trial Methodology—Evaluation of Postemergence Herbicidal Effect

Seeds of the desired test plant species were planted in a 90:10% v/v (volume/volume) mixture of PRO-MIX® BX (Premier Tech Horticulture, Quakertown, PA, USA) and PROFILE® GREENS GRADE™ (Profile Products LLC, Buffalo Grove, IL, USA) planting mixture, which typically has a pH of 5.2 to 6.2 and an organic matter content of at least 50 percent, in plastic pots with a surface area of 103.2 square centimeters ($cm^2$). In some aspects, to ensure good germination and healthy plants, a fungicide treatment and/or other chemical or physical treatment was applied. The plants were grown for 7-36 days (d) in a greenhouse with an approximate 14-hour (h) photo-period which was maintained at about 23° C. during the day and 22° C. during the night. Nutrients and water were added on a regular basis and supplemental lighting was provided with overhead metal halide 1000-Watt lamps as necessary. The plants were employed for testing when they reached the second or third true leaf stage.

Emulsifiable concentrates of each of each pyridine carboxylate herbicide (Compound A or Compound B) were prepared at 100 grams acid equivalent per liter (g ae/L). The emulsifiable concentrates also included a safener, cloquintocet-mexyl, at 120 grams active ingredient per liter (g ai/L), unless otherwise noted below. An aliquot of each emulsifiable concentrate was placed in a 25 mL glass vial and diluted with an aqueous mixture of 1.25% (v/v) ACTIROB® B esterified rapeseed oil (Bayer Crop Science, Research Triangle Park, NC, USA) or MSO® Concentrate with LECI-TECH® methylated soybean oil (Loveland Products, Loveland, CO, USA) to obtain concentrated stock solutions at the highest application rate for each herbicide, based upon a 12 milliliter (mL) application volume at a rate of 187 liters per hectare (L/ha). The concentrated stock solutions were further diluted with an aqueous mixture of 1.25% v/v ACTI- ROB® B or MSO® Concentrate with LECI-TECH® to obtain stock solutions at reduced application rates for each herbicide. Spray solutions of the herbicide combinations (Compound A or Compound B plus ALS herbicide) were prepared by adding weighed amounts or aliquots of the ALS herbicides to the stock solutions of Compound A or Compound B to form 12-mL spray solutions in two- or three-way combinations.

The spray solutions were applied to the plant material with an overhead Mandel track sprayer equipped with 8002E nozzles calibrated to deliver 187 L/ha over an application area of 0.503 square meters ($m^2$) at a spray height of 18 inches (43 centimeters (cm)) above the average plant canopy. Control plants were sprayed in the same manner with the solvent blank. All pyridine carboxylate herbicide (component a) application rates are given as "g ae/ha" and all ALS inhibitor (component b) application rates are given as "g ai/ha."

The treated plants and control plants were placed in a greenhouse as described above and watered by sub-irrigation to prevent wash-off of the test compounds. After 20-22 d, the condition of the test plants as compared with that of the control plants was determined visually and scored on a scale of 0 to 100 percent where 0 corresponds to no injury and 100 corresponds to complete kill.

The details of the compositions and the crops tested are specified in the following Examples.

Example 1

Compositions comprising Compound A and florasulam were tested on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), cornflower (CENCY, *Cyanus segetum*), field violet (VIOAR, *Viola arvensis*), cleavers (GALAP, *Galium aparine*), purple deadnettle (LAMPU, *Lamium purpureum*), ivyleaf speedwell (VERHE, *Veronica hederifolia*), corn poppy (PAPRH, *Papaver rhoeas*), bird's-eye speedwell (VERPE, *Veronica persica*), wild pansy (VIOTR, *Viola tricolor*), shepherd's purse (CAPBP, *Capsella bursa-pastoris*), chickweed (STEME, *Stellaria media*), field chamomile (ANTAR, *Anthemis arvensis*), wild chamomile (MATCH, *Matricaria chamomilla*), pineapple weed (MATMT, *Matricaria discoidea*), false chamomile (MATIN, *Matricaria inodora*), and Canadian thistle (CIRAR, *Cirsium arvense*), to determine the efficacy of the compositions on these undesirable vegetation species. The compositions were also tested on spring wheat (TRZAS), winter wheat (TRZAW), spring barley (HORVS), and winter barley (HORVW), and the phytotoxicity of the compositions on each crop was measured.

The results are summarized in Table 1 below.

TABLE 1

Herbicidal Effects (% visual injury) of Compound A and Florasulam on weed and grain crops.

| Application rate (g/ha) | Compound A | | | | | | |
|---|---|---|---|---|---|---|---|
| | 7.5 | 10 | 15 | 0 | 7.5 | 10 | 15 |
| | Florasulam | | | | | | |
| | 0 | 0 | 0 | 5 | 5 | 5 | 5 |
| BRSNW | 70 | 75 | 75 | 97 | 97 | 97 | 99 |
| POLCO | 90 | 95 | 97 | 87 | 90 | 90 | 93 |
| SINAR | 97 | 95 | 97 | 95 | 100 | 100 | 100 |

TABLE 1-continued

Herbicidal Effects (% visual injury) of Compound A and Florasulam on weed and grain crops.

| Application rate (g/ha) | Compound A | | | | | | |
|---|---|---|---|---|---|---|---|
| | 7.5 | 10 | 15 | 0 | 7.5 | 10 | 15 |
| | Florasulam | | | | | | |
| | 0 | 0 | 0 | 5 | 5 | 5 | 5 |
| SASKR | 70 | 70 | 75 | 85 | 90 | 90 | 90 |
| KCHSC | 70 | 75 | 75 | 95 | 95 | 97 | 99 |
| CENCY | 95 | 93 | 95 | 70 | 93 | 97 | 97 |
| VIOAR | 5 | 5 | 5 | 10 | 10 | 10 | 10 |
| GALAP | 25 | 25 | 35 | 95 | 97 | 97 | 100 |
| LAMPU | 70 | 75 | 75 | 10 | 75 | 85 | 85 |
| VERHE | 75 | 80 | 80 | 5 | 65 | 65 | 65 |
| PAPRH | 85 | 100 | 100 | 97 | 100 | 97 | 100 |
| VERPE | 90 | 93 | 95 | 10 | 95 | 93 | 97 |
| R-PAPRH | 95 | 93 | 93 | 75 | 97 | 97 | 100 |
| VIOTR | 5 | 10 | 10 | 10 | 15 | 15 | 20 |
| CAPBP | 75 | 70 | 80 | 80 | 85 | 85 | 80 |
| STEME | 70 | 100 | 100 | 100 | 100 | 100 | 100 |
| ANTAR | 80 | 90 | 95 | 70 | 100 | 95 | 95 |
| MATCH | 20 | 40 | 50 | 85 | 95 | 93 | 97 |
| MATMT | 10 | 15 | 30 | 95 | 97 | 93 | 93 |
| MATIN | 97 | 100 | 100 | 100 | 97 | 99 | 100 |
| CIRAR | 40 | 40 | 65 | 75 | 93 | 95 | 95 |
| TRZAW | 0 | 0 | 0 | 0 | 0 | 0 | 0 |
| TRZAS | 0 | 0 | 0 | 0 | 0 | 0 | 0 |
| HORVS | 0 | 0 | 0 | 0 | 0 | 0 | 0 |
| HORVW | 0 | 0 | 0 | 0 | 0 | 0 | 0 | g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CENCY = *Cyanus segetum* (cornflower)
VIOAR = *Viola arvensis* (field violet)
GALAP = *Galium aparine* (cleavers)
LAMPU = *Lamium purpureum* (purple deadnettle)
VERHE = *Veronica hederifolia* (ivyleaf speedwell)
PAPRH = *Papaver rhoeas* (corn poppy)
VERPE = *Veronica persica* (bird's-eye speedwell)
R-PAPRH = *Papaver rhoeas* (corn poppy), herbicide-resistant
VIOTR = *Viola tricolor* (wild pansy)
CAPBP = *Capsella bursa-pastoris* (shepherd's purse)
STEME = *Stellaria media* (chickweed)
ANTAR = *Anthemis arvensis* (field chamomile)
MATCH = *Matricaria chamomilla* (wild chamomile)
MATMT = *Matricaria discoidea* (pineapple weed)
MATIN = *Matricaria inodora* (false chamomile)
CIRAR = *Cirsium arvense* (Canadian thistle)
TRZAW = *Triticum aestivum* (winter wheat)
TRZAS = *Triticum aestivum* (spring wheat)
HORVS = *Hordeum vulgare* (spring barley)
HORVW = *Hordeum vulgare* (winter barley)

Example 2

Compositions comprising Compound A and pyroxsulam were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), cornflower (CENCY, *Cyanus segetum*), field violet (VIOAR, *Viola arvensis*), cleavers (GALAP, *Galium aparine*), purple deadnettle (LAMPU, *Lamium purpureum*), ivyleaf speedwell (VERHE, *Veronica hederifolia*), corn poppy (PAPRH, *Papaver rhoeas*), bird's-eye speedwell (VERPE, *Veronica persica*), wild pansy (VIOTR, *Viola tricolor*), shepherd's purse (CAPBP, *Capsella* bursa-pastoris), chickweed (STEME, *Stellaria media*), field chamomile (ANTAR, *Anthemis arvensis*), wild chamomile (MATCH, *Matricaria chamomilla*), pineapple weed (MATMT, *Matricaria discoidea*), false chamomile (MATIN, *Matricaria inodora*), and Canadian Canadian thistle (CIRAR, *Cirsium arvense*). The compositions were also tested on spring wheat (TRZAS), winter wheat (TRZAW), spring barley (HORVS), and winter barley (HORVW), and the phytotoxicity of the compositions on each crop was measured.

The results are summarized in Table 2 below.

TABLE 2

Herbicidal Effects (% visual injury) of Compound A and Pyroxsulam on weed and grain crops.

| Application rate (g/ha) | Compound A | | | | | | |
|---|---|---|---|---|---|---|---|
| | 7.5 | 10 | 15 | 0 | 7.5 | 10 | 15 |
| | Pyroxsulam | | | | | | |
| | 0 | 0 | 0 | 10 | 10 | 10 | 10 |
| BRSNW | 70 | 75 | 75 | 99 | 99 | 97 | 99 |
| POLCO | 90 | 95 | 97 | 93 | 93 | 95 | 95 |
| SINAR | 97 | 95 | 97 | 99 | 100 | 100 | 100 |
| SASKR | 70 | 70 | 75 | 100 | 97 | 100 | 100 |
| KCHSC | 70 | 75 | 75 | 30 | 85 | 85 | 93 |
| CENCY | 95 | 93 | 95 | 70 | 99 | 99 | 100 |
| VIOAR | 5 | 5 | 5 | 80 | 93 | 95 | 95 |
| GALAP | 25 | 25 | 35 | 60 | 100 | 95 | 95 |
| LAMPU | 70 | 75 | 75 | 50 | 85 | 100 | 90 |
| VERHE | 75 | 80 | 80 | 70 | 85 | 80 | 85 |
| PAPRH | 85 | 100 | 100 | 5 | 95 | 95 | 97 |
| VERPE | 90 | 93 | 95 | 75 | 90 | 93 | 93 |
| R-PAPRH | 95 | 93 | 93 | 10 | 93 | 95 | 95 |
| VIOTR | 5 | 10 | 10 | 85 | 85 | 90 | 93 |
| CAPBP | 75 | 70 | 80 | 90 | 93 | 95 | 90 |
| STEME | 70 | 100 | 100 | 100 | 85 | 85 | 95 |
| ANTAR | 80 | 90 | 95 | 60 | 65 | 80 | 85 |
| MATCH | 20 | 40 | 50 | 60 | 65 | 65 | 60 |
| MATMT | 10 | 15 | 30 | 50 | 70 | 75 | 75 |
| MATIN | 97 | 100 | 100 | 65 | 70 | 80 | 85 |
| CIRAR | 40 | 40 | 65 | 75 | 70 | 75 | 80 |
| TRZAW | 0 | 0 | 0 | 0 | 0 | 0 | 0 |
| TRZAS | 0 | 0 | 0 | 0 | 0 | 0 | 0 |
| HORVS | 0 | 0 | 0 | 0 | 0 | 0 | 0 |
| HORVW | 0 | 0 | 0 | 0 | 0 | 0 | 0 | g/ha = grams per hectare
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CENCY = *Cyanus segetum* (cornflower)
VIOAR = *Viola arvensis* (field violet)
GALAP = *Galium aparine* (cleavers)
LAMPU = *Lamium purpureum* (purple deadnettle)
VERHE = *Veronica hederifolia* (ivyleaf speedwell)
PAPRH = *Papaver rhoeas* (corn poppy)
VERPE = *Veronica persica* (bird's-eye speedwell)
R-PAPRH = *Papaver rhoeas* (corn poppy), herbicide-resistant
VIOTR = *Viola tricolor* (wild pansy)
CAPBP = *Capsella bursa-pastoris* (shepherd's purse)
STEME = *Stellaria media* (chickweed)
ANTAR = *Anthemis arvensis* (field chamomile)
MATCH = *Matricaria chamomilla* (wild chamomile)
MATMT = *Matricaria discoidea* (pineapple weed)
MATIN = *Matricaria inodora* (false chamomile)
CIRAR = *Cirsium arvense* (Canadian thistle)
TRZAW = *Triticum aestivum* (winter wheat)
TRZAS = *Triticum aestivum* (spring wheat)
HORVS = *Hordeum vulgare* (spring barley)
HORVW = *Hordeum vulgare* (winter barley)

Example 3

Compositions comprising Compound A and imazamethabenz were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 3 below.

TABLE 3

Herbicidal Effects (% visual injury) of Compound A and Imazamethabenz on weed and grain crops.

| Application rate (g/ha) | Compound A | | | | |
|---|---|---|---|---|---|
| | 7.5 | 10 | 0 | 7.5 | 10 |
| | Imazamethabenz | | | | |
| | 0 | 0 | 100 | 100 | 100 |
| TRZAS | 0 | 0 | 0 | 0 | 0 |
| HORVS | 0 | 0 | 0 | 0 | 0 |
| BRSNW | 35 | 43 | 35 | 83 | 95 |
| POLCO | 78 | 93 | 70 | 84 | 95 |
| SINAR | 88 | 90 | 68 | 100 | 100 |
| SASKR | 60 | 63 | 0 | 70 | 70 |
| KCHSC | 63 | 63 | 0 | 65 | 70 |
| CHEAL | 88 | 93 | 0 | 89 | 88 |
| AMARE | 78 | 73 | 0 | 85 | 85 |
| MATCH | 20 | 30 | 0 | 45 | 40 |
| CIRAR | 30 | 40 | 0 | 65 | 68 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 4

Compositions comprising Compound A and bispyribac were tested to determine the efficacy of the compositions on undesirable vegetation species, including poinsettia (EPHHL, *Euphorbia heterophylla*), Canadian thistle (CIRAR, *Cirsium arvense*), spring rape (BRSNN, *Brassica napus*), grain sorghum (SORVU, *Sorghum vulgare*), nutsedge (CYPES, *Cyperus esculentus*), ivyleaf morningglory (IPOHE, *Ipomoea hederacea*), and common sunflower (HELAN, *Helianthus annuus*). The compositions were also tested on spring wheat (TRZAS), and the phytotoxicity of the compositions on this crop was measured.

The results are summarized in Table 4 below.

TABLE 4

Herbicidal Effects (% visual injury) of Compound A and Bispyribac on weed and grain crops.

| Application rate (g/ha) | Compound A<br>Bispyribac | 7.5<br>0 | 10<br>0 | 0<br>90 | 7.5<br>90 | 10<br>90 |
|---|---|---|---|---|---|---|
| EPHHL | | 97 | 97 | 95 | 90 | 93 |
| CIRAR | | 40 | 60 | 90 | 93 | 85 |
| BRSNN | | 65 | 65 | 88 | 88 | 90 |
| SORVU | | 0 | 0 | 73 | 63 | 55 |
| CYPES | | 30 | 8 | 20 | 40 | 45 |
| IPOHE | | 20 | 25 | 70 | 80 | 83 |
| HELAN | | 90 | 89 | 97 | 99 | 97 |
| TRZAS | | 5 | 3 | 18 | 8 | 3 | g/ha = grams per hectare
EPHHL = *Euphorbia heterophylla* (poinsettia)
CIRAR = *Cirsium arvense* (Canadian thistle)
BRSNN = *Brassica napus* (spring rape)
SORVU = *Sorghum vulgare* (grain sorghum)
CYPES = *Cyperus esculentus* (nutsedge)
IPOHE = *Ipomoea hederacea* (ivyleaf morningglory)
HELAN = *Helianthus annuus* (common sunflower)
TRZAS = *Triticum aestivum* (spring wheat)

Example 5

Compositions comprising Compound A and pyribenzoxim were tested to determine the efficacy of the compositions on undesirable vegetation species, including poinsettia (EPHHL, *Euphorbia heterophylla*), Canadian thistle (CIRAR, *Cirsium arvense*), spring rape (BRSNN, *Brassica napus*), grain sorghum (SORVU, *Sorghum vulgare*), nutsedge (CYPES, *Cyperus esculentus*), ivyleaf morningglory (IPOHE, *Ipomoea hederacea*), and common sunflower (HELAN, *Helianthus annuus*). The compositions were also tested on spring wheat (TRZAS), and the phytotoxicity of the compositions on this crop was measured.

The results are summarized in Table 5 below.

TABLE 5

Herbicidal Effects (% visual injury) of Compound A and Pyribenzoxim on weed and grain crops.

| Application rate (g/ha) | Compound A<br>Pyribenzoxim | 7.5<br>0 | 10<br>0 | 0<br>10 | 7.5<br>10 | 10<br>10 |
|---|---|---|---|---|---|---|
| EPHHL | | 97 | 97 | 100 | 94 | 94 |
| CIRAR | | 40 | 60 | 90 | 93 | 98 |
| BRSNN | | 65 | 65 | 90 | 88 | 93 |
| SORVU | | 0 | 0 | 73 | 80 | 80 |
| CYPES | | 30 | 8 | 0 | 63 | 73 |
| IPOHE | | 20 | 25 | 78 | 88 | 83 |
| HELAN | | 90 | 89 | 98 | 98 | 99 |
| TRZAS | | 5 | 3 | 13 | 5 | 5 | g/ha = grams per hectare
EPHHL = *Euphorbia heterophylla* (poinsettia)
CIRAR = *Cirsium arvense* (Canadian thistle)
BRSNN = *Brassica napus* (spring rape)
SORVU = *Sorghum vulgare* (grain sorghum)
CYPES = *Cyperus esculentus* (nutsedge)
IPOHE = *Ipomoea hederacea* (ivyleaf morningglory)
HELAN = *Helianthus annuus* (common sunflower)
TRZAS = *Triticum aestivum* (spring wheat)

Example 6

Compositions comprising Compound A and flucarbazone were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 6 below.

TABLE 6

Herbicidal Effects (% visual injury) of Compound A and Flucarbazone on weed and grain crops.

| Application rate (g/ha) | Compound A<br>Flucarbazone | 7.5<br>0 | 10<br>0 | 0<br>7.5 | 7.5<br>7.5 | 10<br>7.5 |
|---|---|---|---|---|---|---|
| TRZAS | | 0 | 0 | 0 | 0 | 0 |
| HORVS | | 0 | 0 | 23 | 13 | 0 |
| BRSNW | | 35 | 43 | 83 | 92 | 93 |
| POLCO | | 78 | 93 | 68 | 87 | 95 |
| SINAR | | 88 | 90 | 95 | 100 | 100 |
| SASKR | | 60 | 63 | 62 | 70 | 70 |
| KCHSC | | 63 | 63 | 15 | 65 | 63 |
| CHEAL | | 88 | 93 | 13 | 85 | 91 |
| AMARE | | 78 | 73 | 70 | 93 | 80 |
| MATCH | | 23 | 30 | 0 | 30 | 40 |
| CIRAR | | 30 | 40 | 10 | 55 | 63 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 7

Compositions comprising Compound A and thiencarbazone were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 7 below.

TABLE 7

Herbicidal Effects (% visual injury) of Compound A and Thiencarbazone on weed and grain crops.

| Application rate (g/ha) | Compound A<br>Thiencarbazone | 7.5<br>0 | 10<br>0 | 0<br>5 | 7.5<br>5 | 10<br>5 |
|---|---|---|---|---|---|---|
| TRZAS | | 0 | 0 | 0 | 0 | 0 |
| HORVS | | 0 | 0 | 0 | 5 | 10 |

TABLE 7-continued

Herbicidal Effects (% visual injury) of Compound A and Thiencarbazone on weed and grain crops.

| Application rate (g/ha) | Compound A Thiencarbazone | 7.5 0 | 10 0 | 0 5 | 7.5 5 | 10 5 |
|---|---|---|---|---|---|---|
| BRSNW | | 35 | 43 | 97 | 99 | 98 |
| POLCO | | 78 | 93 | 89 | 92 | 93 |
| SINAR | | 88 | 90 | 95 | 100 | 100 |
| SASKR | | 60 | 63 | 53 | 70 | 70 |
| KCHSC | | 63 | 63 | 25 | 75 | 78 |
| CHEAL | | 88 | 93 | 60 | 85 | 90 |
| AMARE | | 78 | 73 | 83 | 95 | 95 |
| MATCH | | 23 | 30 | 55 | 63 | 55 |
| CIRAR | | 30 | 40 | 10 | 68 | 68 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album L.* (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 8

Compositions comprising Compound A and iodosulfuron were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 8 below.

TABLE 8

Herbicidal Effects (% visual injury) of Compound A and Iodosulfuron on weed and grain crops.

| Application rate (g/ha) | Compound A Iodosulfuron | 7.5 0 | 10 0 | 0 2.5 | 7.5 2.5 | 10 2.5 |
|---|---|---|---|---|---|---|
| TRZAS | | 0 | 0 | 0 | 0 | 0 |
| HORVS | | 0 | 0 | 0 | 0 | 3 |
| BRSNW | | 35 | 43 | 99 | 99 | 100 |
| POLCO | | 78 | 93 | 63 | 78 | 80 |
| SINAR | | 88 | 90 | 100 | 100 | 100 |
| SASKR | | 60 | 63 | 85 | 88 | 90 |
| KCHSC | | 63 | 63 | 40 | 93 | 80 |
| CHEAL | | 88 | 93 | 75 | 88 | 83 |
| AMARE | | 78 | 73 | 70 | 100 | 98 |
| MATCH | | 20 | 30 | 68 | 78 | 75 |
| CIRAR | | 30 | 40 | 78 | 83 | 89 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album L.* (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 9

Compositions comprising Compound A and mesosulfuron were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 9 below.

TABLE 9

Herbicidal Effects (% visual injury) of Compound A and Mesosulfuron on weed and grain crops.

| Application rate (g/ha) | Compound A Mesosulfuron | 7.5 0 | 10 0 | 0 3 | 7.5 3 | 10 3 |
|---|---|---|---|---|---|---|
| TRZAS | | 0 | 0 | 0 | 0 | 0 |
| HORVS | | 0 | 0 | 18 | 15 | 18 |
| BRSNW | | 35 | 43 | 100 | 98 | 99 |
| POLCO | | 78 | 93 | 20 | 80 | 83 |
| SINAR | | 88 | 90 | 98 | 100 | 100 |
| SASKR | | 60 | 63 | 15 | 68 | 70 |
| KCHSC | | 63 | 63 | 0 | 65 | 63 |
| CHEAL | | 88 | 93 | 30 | 91 | 88 |
| AMARE | | 78 | 73 | 78 | 93 | 95 |
| MATCH | | 20 | 30 | 15 | 35 | 45 |
| CIRAR | | 30 | 40 | 78 | 80 | 81 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album L.* (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 10

Compositions comprising Compound A and metsulfuron were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 10 below.

TABLE 10

Herbicidal Effects (% visual injury) of Compound A and Metsulfuron on weed and grain crops.

| Application rate (g/ha) | Compound A Metsulfuron | 7.5 0 | 10 0 | 0 1.5 | 7.5 1.5 | 10 1.5 |
|---|---|---|---|---|---|---|
| TRZAS |  | 0 | 0 | 0 | 0 | 0 |
| HORVS |  | 0 | 0 | 0 | 5 | 0 |
| BRSNW |  | 35 | 43 | 99 | 100 | 100 |
| POLCO |  | 78 | 93 | 78 | 84 | 90 |
| SINAR |  | 88 | 90 | 99 | 100 | 100 |
| SASKR |  | 60 | 63 | 98 | 95 | 99 |
| KCHSC |  | 63 | 63 | 58 | 82 | 90 |
| CHEAL |  | 88 | 93 | 93 | 100 | 100 |
| AMARE |  | 78 | 73 | 98 | 100 | 100 |
| MATCH |  | 20 | 30 | 78 | 90 | 90 |
| CIRAR |  | 30 | 40 | 85 | 97 | 98 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 11

Compositions comprising Compound A and tribenuron were tested to determine the efficacy of the compositions on undesirable vegetation species, including winter rape (BRSNW, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), common lambsquarters (CHEAL, *Chenopodium album* L.), pigweed (AMARE, *Amaranthus retroflexus*), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 11 below.

TABLE 11

Herbicidal Effects (% visual injury) of Compound A and Tribenuron on weed and grain crops.

| Application rate (g/ha) | Compound A Tribenuron | 7.5 0 | 10 0 | 0 7.5 | 7.5 7.5 | 10 7.5 |
|---|---|---|---|---|---|---|
| TRZAS |  | 0 | 0 | 0 | 0 | 0 |
| HORVS |  | 0 | 0 | 0 | 0 | 0 |

TABLE 11-continued

Herbicidal Effects (% visual injury) of Compound A and Tribenuron on weed and grain crops.

| Application rate (g/ha) | Compound A Tribenuron | 7.5 0 | 10 0 | 0 7.5 | 7.5 7.5 | 10 7.5 |
|---|---|---|---|---|---|---|
| BRSNW |  | 35 | 43 | 90 | 97 | 97 |
| POLCO |  | 78 | 93 | 65 | 80 | 75 |
| SINAR |  | 88 | 90 | 93 | 96 | 100 |
| SASKR |  | 60 | 63 | 98 | 93 | 95 |
| KCHSC |  | 63 | 63 | 78 | 88 | 89 |
| CHEAL |  | 88 | 93 | 95 | 97 | 99 |
| AMARE |  | 78 | 73 | 50 | 88 | 98 |
| MATCH |  | 20 | 30 | 78 | 83 | 90 |
| CIRAR |  | 30 | 40 | 88 | 92 | 92 | g/ha = grams per hectare
TRZAS = *Triticum aestivum* (spring wheat)
HORVS = *Hordeum vulgare* (spring barley)
BRSNW = *Brassica napus* (winter rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
CHEAL = *Chenopodium album* L. (common lambsquarters)
AMARE = *Amaranthus retroflexus* (pigweed)
MATCH = *Matricaria chamomilla* (wild chamomile)
CIRAR = *Cirsium arvense* (Canadian thistle)

Example 12

Compositions comprising Compound A and halosulfuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring barley (HORVS) and spring wheat (TRZAS), and the phytotoxicity of the compositions on each crop was measured.

The results are summarized in Table 12 below.

TABLE 12

Herbicidal Effects (% visual injury) of Compound A and Halosulfuron on weed and grain crops.

| Application rate (g/ha) | Compound A Halosulfuron |  | 7.5 0 | 10 0 | 0 8.75 | 7.5 8.75 | 10 8.75 |
|---|---|---|---|---|---|---|---|
| AMARE | Obs | | 70 | 90 | 95 | 96 | 96 |
|  | Exp | | — | — | — | 99 | 100 |
|  | Δ | | | | | −3 | −4 |
| BRSNW | Obs | | 63 | 68 | 88 | 100 | 100 |
|  | Exp | | — | — | — | 95 | 96 |
|  | Δ | | | | | 5 | 4 |
| CHEAL | Obs | | 70 | 78 | 10 | 95 | 90 |
|  | Exp | | — | — | — | 73 | 80 |
|  | Δ | | | | | 22 | 10 |
| CIRAR | Obs | | 18 | 30 | 40 | 70 | 75 |
|  | Exp | | — | — | — | 51 | 58 |
|  | Δ | | | | | 20 | 17 |
| KCHSC | Obs | | 65 | 70 | 15 | 70 | 80 |
|  | Exp | | — | — | — | 70 | 75 |
|  | Δ | | | | | 0 | 6 |
| MATCH | Obs | | 18 | 30 | 78 | 88 | 88 |
|  | Exp | | — | — | — | 81 | 84 |
|  | Δ | | | | | 6 | 3 |
| POLCO | Obs | | 60 | 70 | 63 | 78 | 83 |
|  | Exp | | — | — | — | 85 | 89 |
|  | Δ | | | | | −8 | −6 |

TABLE 12-continued

Herbicidal Effects (% visual injury) of Compound A and Halosulfuron on weed and grain crops.

| Application rate (g/ha) | Compound A<br>Halosulfuron | 7.5<br>0 | 10<br>0 | 0<br>8.75 | 7.5<br>8.75 | 10<br>8.75 |
|---|---|---|---|---|---|---|
| SINAR | Obs | 85 | 88 | 95 | 98 | 10 |
|  | Exp | — | — | — | 99 | 99 |
|  | Δ |  |  |  | −2 | 1 |
| HORVS | Obs | 0 | 0 | 0 | 0 | 5 |
|  | Exp | — | — | — | 0 | 0 |
|  | Δ |  |  |  | 0 | 5 |
| TRZAS | Obs | 0 | 0 | 0 | 0 | 0 |
|  | Exp | — | — | — | 0 | 0 |
|  | Δ |  |  |  | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 13

Compositions comprising Compound A and sulfosulfuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring barley (HORVS) and spring wheat (TRZAS), and the phytotoxicity of the compositions on each crop was measured.

The results are summarized in Table 13 below.

TABLE 13

Herbicidal Effects (% visual injury) of Compound A and Sulfosulfuron on weed and grain crops.

| Application rate (g/ha) | Compound A<br>Sulfosulfuron | 7.5<br>0 | 10<br>0 | 0<br>140 | 7.5<br>140 | 10<br>140 |
|---|---|---|---|---|---|---|
| AMARE | Obs | 70 | 90 | 88 | 88 | 100 |
|  | Exp | — | — | — | 96 | 99 |
|  | Δ |  |  |  | −9 | 1 |
| BRSNW | Obs | 63 | 68 | 98 | 100 | 100 |
|  | Exp | — | — | — | 99 | 99 |
|  | Δ |  |  |  | 1 | 1 |
| CHEAL | Obs | 70 | 78 | 43 | 90 | 88 |
|  | Exp | — | — | — | 83 | 87 |
|  | Δ |  |  |  | 7 | 0 |
| CIRAR | Obs | 18 | 30 | 45 | 73 | 75 |
|  | Exp | — | — | — | 55 | 62 |
|  | Δ |  |  |  | 18 | 14 |
| KCHSC | Obs | 65 | 70 | 8 | 80 | 83 |
|  | Exp | — | — | — | 68 | 72 |
|  | Δ |  |  |  | 12 | 10 |
| MATCH | Obs | 18 | 30 | 73 | 80 | 83 |
|  | Exp | — | — | — | 77 | 81 |
|  | Δ |  |  |  | 3 | 2 |
| POLCO | Obs | 60 | 70 | 83 | 88 | 83 |
|  | Exp | — | — | — | 93 | 95 |
|  | Δ |  |  |  | −6 | −12 |

TABLE 13-continued

Herbicidal Effects (% visual injury) of Compound A and Sulfosulfuron on weed and grain crops.

| Application rate (g/ha) | Compound A<br>Sulfosulfuron | 7.5<br>0 | 10<br>0 | 0<br>140 | 7.5<br>140 | 10<br>140 |
|---|---|---|---|---|---|---|
| SINAR | Obs | 85 | 88 | 99 | 100 | 100 |
|  | Exp | — | — | — | 100 | 100 |
|  | Δ |  |  |  | 0 | 0 |
| HORVS | Obs | 0 | 0 | 28 | 8 | 0 |
|  | Exp | — | — | — | 28 | 28 |
|  | Δ |  |  |  | −20 | −28 |
| TRZAS | Obs | 0 | 0 | 0 | 0 | 0 |
|  | Exp | — | — | — | 0 | 0 |
|  | Δ |  |  |  | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 14

Compositions comprising Compound A and amidosulfuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 14 below.

TABLE 14

Herbicidal Effects (% visual injury) of Compound A and Amidosulfuron on weed and grain crops.

| Application rate (g/ha) | Compound A<br>Amidosulfuron | 7.5<br>0 | 10<br>0 | 15<br>0 | 0<br>45 | 7.5<br>45 | 10<br>45 | 15<br>45 |
|---|---|---|---|---|---|---|---|---|
| AMARE | Obs | 73 | 75 | 80 | 100 | 100 | 100 | 98 |
|  | Exp | — | — | — | — | 100 | 100 | 100 |
|  | Δ |  |  |  |  | 0 | 0 | −3 |
| BRSNW | Obs | 63 | 45 | 73 | 98 | 98 | 95 | 93 |
|  | Exp | — | — | — | — | 99 | 99 | 99 |
|  | Δ |  |  |  |  | −2 | −4 | −7 |
| CHEAL | Obs | 78 | 78 | 85 | 25 | 83 | 85 | 80 |
|  | Exp | — | — | — | — | 83 | 83 | 89 |
|  | Δ |  |  |  |  | −1 | 2 | −9 |
| CIRAR | Obs | 25 | 33 | 55 | 18 | 63 | 73 | 73 |
|  | Exp | — | — | — | — | 38 | 44 | 63 |
|  | Δ |  |  |  |  | 24 | 28 | 10 |
| KCHSC | Obs | 68 | 68 | 68 | 5 | 75 | 78 | 80 |
|  | Exp | — | — | — | — | 69 | 69 | 69 |
|  | Δ |  |  |  |  | 6 | 8 | 11 |
| MATCH | Obs | 20 | 45 | 45 | 50 | 50 | 60 | 75 |
|  | Exp | — | — | — | — | 60 | 73 | 73 |
|  | Δ |  |  |  |  | −10 | −13 | 3 |
| POLCO | Obs | 88 | 98 | 88 | 55 | 73 | 85 | 85 |
|  | Exp | — | — | — | — | 94 | 99 | 94 |
|  | Δ |  |  |  |  | −22 | −14 | −9 |

TABLE 14-continued

Herbicidal Effects (% visual injury) of Compound A and Amidosulfuron on weed and grain crops.

| Application rate (g/ha) | Compound A<br>Amidosulfuron | 7.5<br>0 | 10<br>0 | 15<br>0 | 0<br>45 | 7.5<br>45 | 10<br>45 | 15<br>45 |
|---|---|---|---|---|---|---|---|---|
| SINAR | Obs | 93 | 93 | 93 | 82 | 98 | 99 | 98 |
|  | Exp | — | — | — | — | 99 | 99 | 99 |
|  | Δ |  |  |  |  | -1 | 0 | -1 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 0 | 0 | 0 | 0 |
|  | Exp | — | — | — | — | 0 | 0 | 0 |
|  | Δ |  |  |  |  | 0 | 0 | 0 | g/ha = grams per hectare
AMARE = *Amaranthus retroflexus* (pigweed)
BRSNW = *Brassica napus* (winter rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 15

Compositions comprising Compound A and iodosulfuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 15 below.

TABLE 15

Herbicidal Effects (% visual injury) of Compound A and Iodosulfuron on weed and grain crops.

| Application rate (g/ha) | Compound A<br>Iodosulfuron | 7.5<br>0 | 10<br>0 | 15<br>0 | 0<br>33.75 | 7.5<br>33.75 | 10<br>33.75 | 15<br>33.75 |
|---|---|---|---|---|---|---|---|---|
| AMARE | Obs | 73 | 75 | 80 | 98 | 98 | 98 | 100 |
|  | Exp | — | — | — | — | 99 | 99 | 100 |
|  | Δ |  |  |  |  | -2 | -2 | 0 |
| BRSNW | Obs | 63 | 45 | 73 | 98 | 96 | 96 | 99 |
|  | Exp | — | — | — | — | 99 | 99 | 99 |
|  | Δ |  |  |  |  | -3 | -3 | -1 |
| CHEAL | Obs | 78 | 78 | 85 | 90 | 93 | 91 | 89 |
|  | Exp | — | — | — | — | 98 | 98 | 99 |
|  | Δ |  |  |  |  | -5 | -7 | -10 |
| CIRAR | Obs | 25 | 33 | 55 | 85 | 95 | 96 | 97 |
|  | Exp | — | — | — | — | 89 | 90 | 93 |
|  | Δ |  |  |  |  | 6 | 6 | 4 |
| KCHSC | Obs | 68 | 68 | 68 | 70 | 88 | 90 | 85 |
|  | Exp | — | — | — | — | 90 | 90 | 90 |
|  | Δ |  |  |  |  | -3 | 0 | -5 |
| MATCH | Obs | 20 | 45 | 45 | 85 | 88 | 90 | 93 |
|  | Exp | — | — | — | — | 88 | 92 | 92 |
|  | Δ |  |  |  |  | -1 | -2 | 1 |
| POLCO | Obs | 88 | 98 | 88 | 85 | 95 | 83 | 94 |
|  | Exp | — | — | — | — | 98 | 100 | 98 |
|  | Δ |  |  |  |  | -3 | -17 | -4 |

TABLE 15-continued

Herbicidal Effects (% visual injury) of Compound A and Iodosulfuron on weed and grain crops.

| Application rate (g/ha) | Compound A<br>Iodosulfuron | 7.5<br>0 | 10<br>0 | 15<br>0 | 0<br>33.75 | 7.5<br>33.75 | 10<br>33.75 | 15<br>33.75 |
|---|---|---|---|---|---|---|---|---|
| SINAR | Obs | 93 | 93 | 93 | 100 | 10 | 96 | 100 |
|  | Exp | — | — | — | — | 100 | 100 | 100 |
|  | Δ |  |  |  |  | 0 | -4 | 0 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 0 | 0 | 0 | 0 |
|  | Exp | — | — | — | — | 0 | 0 | 0 |
|  | Δ |  |  |  |  | 0 | 0 | 0 | g/ha = grams per hectare
AMARE = *Amaranthus retroflexus* (pigweed)
BRSNW = *Brassica napus* (winter rape)
CHEAL = *Chenopodium album L.* (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 16

Compositions comprising Compound A and mesosulfuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 16 below.

TABLE 16

Herbicidal Effects (% visual injury) of Compound A and Mesosulfuron on weed and grain crops.

| Application rate (g/ha) | Compound A<br>Mesosulfuron | 7.5<br>0 | 10<br>0 | 15<br>0 | 0<br>9 | 7.5<br>9 | 10<br>9 | 15<br>9 |
|---|---|---|---|---|---|---|---|---|
| AMARE | Obs | 73 | 75 | 80 | 100 | 98 | 95 | 98 |
|  | Exp | — | — | — | — | 100 | 100 | 100 |
|  | Δ |  |  |  |  | -3 | -5 | -3 |
| BRSNW | Obs | 63 | 45 | 73 | 95 | 96 | 99 | 99 |
|  | Exp | — | — | — | — | 98 | 97 | 99 |
|  | Δ |  |  |  |  | -2 | 1 | 0 |
| CHEAL | Obs | 78 | 78 | 85 | 48 | 85 | 83 | 85 |
|  | Exp | — | — | — | — | 88 | 88 | 92 |
|  | Δ |  |  |  |  | -3 | -6 | -7 |
| CIRAR | Obs | 25 | 33 | 55 | 73 | 85 | 93 | 93 |
|  | Exp | — | — | — | — | 79 | 81 | 88 |
|  | Δ |  |  |  |  | 6 | 11 | 5 |
| KCHSC | Obs | 68 | 68 | 68 | 13 | 73 | 73 | 73 |
|  | Exp | — | — | — | — | 72 | 72 | 72 |
|  | Δ |  |  |  |  | 1 | 1 | 1 |
| MATCH | Obs | 20 | 45 | 45 | 45 | 35 | 25 | 35 |
|  | Exp | — | — | — | — | 56 | 70 | 70 |
|  | Δ |  |  |  |  | -21 | -45 | -35 |
| POLCO | Obs | 88 | 98 | 88 | 28 | 96 | 96 | 95 |
|  | Exp | — | — | — | — | 91 | 98 | 91 |
|  | Δ |  |  |  |  | 5 | -2 | 4 |

TABLE 16-continued

Herbicidal Effects (% visual injury) of Compound A and Mesosulfuron on weed and grain crops.

| Application rate (g/ha) | Compound A<br>Mesosulfuron | 7.5<br>0 | 10<br>0 | 15<br>0 | 0<br>9 | 7.5<br>9 | 10<br>9 | 15<br>9 |
|---|---|---|---|---|---|---|---|---|
| SINAR | Obs | 93 | 93 | 93 | 94 | 100 | 100 | 98 |
|  | Exp | — | — | — | — | 100 | 100 | 100 |
|  | Δ |  |  |  |  | 0 | 0 | −2 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 10 | 13 | 13 | 18 |
|  | Exp | — | — | — | — | 10 | 10 | 10 |
|  | Δ |  |  |  |  | 3 | 3 | 8 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 17

Compositions comprising Compound A and metsulfuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 17 below.

TABLE 17

Herbicidal Effects (% visual injury) of Compound A and Metsulfuron on weed and grain crops.

| Application rate (g/ha) | Compound A<br>Metsulfuron | 7.5<br>0 | 10<br>0 | 15<br>0 | 0<br>3 | 7.5<br>3 | 10<br>3 | 15<br>3 |
|---|---|---|---|---|---|---|---|---|
| AMARE | Obs | 73 | 75 | 80 | 100 | 98 | 100 | 100 |
|  | Exp | — | — | — | — | 100 | 100 | 100 |
|  | Δ |  |  |  |  | −3 | 0 | 0 |
| BRSNW | Obs | 63 | 45 | 73 | 90 | 99 | 90 | 100 |
|  | Exp | — | — | — | — | 96 | 95 | 97 |
|  | Δ |  |  |  |  | 2 | −5 | 3 |
| CHEAL | Obs | 78 | 78 | 85 | 98 | 98 | 95 | 95 |
|  | Exp | — | — | — | — | 99 | 99 | 100 |
|  | Δ |  |  |  |  | −2 | −4 | −5 |
| CIRAR | Obs | 25 | 33 | 55 | 85 | 96 | 96 | 96 |
|  | Exp | — | — | — | — | 89 | 90 | 93 |
|  | Δ |  |  |  |  | 7 | 6 | 3 |
| KCHSC | Obs | 68 | 68 | 68 | 75 | 88 | 88 | 92 |
|  | Exp | — | — | — | — | 92 | 92 | 92 |
|  | Δ |  |  |  |  | −4 | −4 | 0 |
| MATCH | Obs | 20 | 45 | 45 | 96 | 95 | 85 | 95 |
|  | Exp | — | — | — | — | 97 | 98 | 98 |
|  | Δ |  |  |  |  | −2 | −13 | −3 |
| POLCO | Obs | 88 | 98 | 88 | 85 | 93 | 90 | 90 |
|  | Exp | — | — | — | — | 98 | 100 | 98 |
|  | Δ |  |  |  |  | −6 | −10 | −8 |

TABLE 17-continued

Herbicidal Effects (% visual injury) of Compound A and Metsulfuron on weed and grain crops.

| Application rate (g/ha) | Compound A<br>Metsulfuron | 7.5<br>0 | 10<br>0 | 15<br>0 | 0<br>3 | 7.5<br>3 | 10<br>3 | 15<br>3 |
|---|---|---|---|---|---|---|---|---|
| SINAR | Obs | 93 | 93 | 93 | 88 | 100 | 98 | 98 |
|  | Exp | — | — | — | — | 99 | 99 | 99 |
|  | Δ |  |  |  |  | 1 | −2 | −2 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 0 | 0 | 0 | 5 |
|  | Exp | — | — | — | — | 0 | 0 | 0 |
|  | Δ |  |  |  |  | 0 | 0 | 5 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 18

Compositions comprising Compound A and tribenuron were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 18 below.

TABLE 18

Herbicidal Effects (% visual injury) of Compound A and Tribenuron on weed and grain crops.

| Application rate (g/ha) | Compound A<br>Tribenuron | 7.5<br>0 | 10<br>0 | 15<br>0 | 0<br>15 | 7.5<br>15 | 10<br>15 | 15<br>15 |
|---|---|---|---|---|---|---|---|---|
| AMARE | Obs | 73 | 75 | 80 | 100 | 100 | 88 | 93 |
|  | Exp | — | — | — | — | 100 | 100 | 100 |
|  | Δ |  |  |  |  | 0 | −13 | −8 |
| BRSNW | Obs | 63 | 45 | 73 | 99 | 94 | 97 | 97 |
|  | Exp | — | — | — | — | 99 | 99 | 100 |
|  | Δ |  |  |  |  | −6 | −2 | −3 |
| CHEAL | Obs | 78 | 78 | 85 | 96 | 97 | 99 | 100 |
|  | Exp | — | — | — | — | 99 | 99 | 99 |
|  | Δ |  |  |  |  | −2 | −1 | 1 |
| CIRAR | Obs | 25 | 33 | 55 | 89 | 88 | 94 | 90 |
|  | Exp | — | — | — | — | 92 | 93 | 95 |
|  | Δ |  |  |  |  | −4 | 1 | −5 |
| KCHSC | Obs | 68 | 68 | 68 | 50 | 84 | 98 | 95 |
|  | Exp | — | — | — | — | 84 | 84 | 84 |
|  | Δ |  |  |  |  | 0 | 14 | 11 |
| MATCH | Obs | 20 | 45 | 45 | 87 | 89 | 95 | 88 |
|  | Exp | — | — | — | — | 89 | 93 | 93 |
|  | Δ |  |  |  |  | 0 | 2 | −5 |
| POLCO | Obs | 88 | 98 | 88 | 78 | 90 | 95 | 93 |
|  | Exp | — | — | — | — | 97 | 99 | 97 |
|  | Δ |  |  |  |  | −7 | −4 | −5 |

TABLE 18-continued

Herbicidal Effects (% visual injury) of Compound A and Tribenuron on weed and grain crops.

| Application rate (g/ha) | Compound A Tribenuron | 7.5 0 | 10 0 | 15 0 | 0 15 | 7.5 15 | 10 15 | 15 15 |
|---|---|---|---|---|---|---|---|---|
| SINAR | Obs | 93 | 93 | 93 | 95 | 98 | 99 | 99 |
| | Exp | — | — | — | — | 100 | 100 | 100 |
| | Δ | | | | | −2 | −1 | −1 |
| TRZAS | Obs | 0 | 0 | 0 | 3 | 0 | 0 | 0 |
| | Exp | — | — | — | — | 3 | 3 | 3 |
| | Δ | | | | | −3 | −3 | −3 |
| HORVS | Obs | 0 | 0 | 0 | 0 | 0 | 0 | 0 |
| | Exp | — | — | — | — | 0 | 0 | 0 |
| | Δ | | | | | 0 | 0 | 0 | g/ha = grams per hectare
AMARE = *Amaranthus retoflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 19

Compositions comprising Compound A and propoxycarbazone were tested to determine the efficacy of the compositions on undesirable vegetation species, including spring rape (BRSNN, *Brassica napus*), wild buckwheat (POLCO, *Polygonum convolvulus*), Russian thistle (SASKR, *Salsola kali*), kochia (KCHSC, *Kochia scoparia*), common lambsquarters (CHEAL, *Chenopodium album* L.), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 19 below.

TABLE 19

Herbicidal Effects (% visual injury) of Compound A and Propoxycarbazone on weed and grain crops.

| Application rate (g/ha) | Compound A Propoxycarbazone | 7.5 0 | 10 0 | 0 20 | 7.5 20 | 10 20 |
|---|---|---|---|---|---|---|
| TRZAS | Obs | 0 | 0 | 0 | 0 | 0 |
| | Exp | — | — | — | 0 | 0 |
| | Δ | | | | 0 | 0 |
| HORVS | Obs | 8 | 0 | 48 | 55 | 53 |
| | Exp | — | — | — | 51 | 48 |
| | Δ | | | | 4 | 5 |
| BRSNN | Obs | 55 | 60 | 96 | 100 | 100 |
| | Exp | — | — | — | 98 | 98 |
| | Δ | | | | 2 | 2 |
| POLCO | Obs | 70 | 78 | 0 | 100 | 100 |
| | Exp | — | — | — | 70 | 78 |
| | Δ | | | | 30 | 23 |
| SASKR | Obs | 45 | 60 | 20 | 85 | 83 |
| | Exp | — | — | — | 56 | 68 |
| | Δ | | | | 29 | 15 |
| KCHSC | Obs | 50 | 58 | 13 | 78 | 83 |
| | Exp | — | — | — | 56 | 63 |
| | Δ | | | | 21 | 20 |
| CHEAL | Obs | 70 | 83 | 10 | 85 | 88 |
| | Exp | — | — | — | 73 | 84 |
| | Δ | | | | 12 | 3 |

TABLE 19-continued

Herbicidal Effects (% visual injury) of Compound A and Propoxycarbazone on weed and grain crops.

| Application rate (g/ha) | Compound A Propoxycarbazone | 7.5 0 | 10 0 | 0 20 | 7.5 20 | 10 20 |
|---|---|---|---|---|---|---|
| MATCH | Obs | 13 | 15 | 5 | 38 | 50 |
| | Exp | — | — | — | 17 | 19 |
| | Δ | | | | 21 | 31 | g/ha = grams per hectare
TRZAS = *Triticum aestivum* (spring wheat)
HORVS = *Hordeum vulgare* (spring barley)
BRSNN = *Brassica napus* (spring rape)
POLCO = *Polygonum convolvulus* (wild buckwheat)
SASKR = *Salsola kali* (Russian thistle)
KCHSC = *Kochia scoparia* (kochia)
CHEAL = *Chenopodium album* L. (common lambsquarters)
MATCH = *Matricaria chamomilla* (wild chamomile)

Example 20

Compositions comprising Compound A and flurcarbazone were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 20 below.

TABLE 20

Herbicidal Effects (% visual injury) of Compound A and Flurcarbazone on weed and grain crops.

| Application rate (g/ha) | Compound A Flurcarbazone | 7.5 0 | 10 0 | 15 0 | 0 30 | 7.5 30 | 10 30 | 15 30 |
|---|---|---|---|---|---|---|---|---|
| AMARE | Obs | 73 | 75 | 80 | 98 | 93 | 90 | 95 |
| | Exp | — | — | — | — | 99 | 99 | 100 |
| | Δ | | | | | −7 | −9 | −5 |
| BRSNW | Obs | 63 | 45 | 73 | 83 | 94 | 91 | 93 |
| | Exp | — | — | — | — | 93 | 90 | 95 |
| | Δ | | | | | 0 | 1 | −3 |
| CHEAL | Obs | 78 | 78 | 85 | 10 | 78 | 78 | 83 |
| | Exp | — | — | — | — | 80 | 80 | 87 |
| | Δ | | | | | −2 | −2 | −4 |
| CIRAR | Obs | 25 | 33 | 55 | 28 | 48 | 68 | 68 |
| | Exp | — | — | — | — | 46 | 51 | 67 |
| | Δ | | | | | 2 | 16 | 0 |
| KCHSC | Obs | 68 | 68 | 68 | 25 | 75 | 75 | 78 |
| | Exp | — | — | — | — | 76 | 76 | 76 |
| | Δ | | | | | −1 | −1 | 2 |
| MATCH | Obs | 20 | 45 | 45 | 18 | 10 | 18 | 30 |
| | Exp | — | — | — | — | 34 | 55 | 55 |
| | Δ | | | | | −24 | −37 | −25 |
| POLCO | Obs | 88 | 98 | 88 | 88 | 91 | 95 | 93 |
| | Exp | — | — | — | — | 98 | 100 | 98 |
| | Δ | | | | | −7 | −5 | −6 |
| SINAR | Obs | 93 | 93 | 93 | 88 | 94 | 100 | 97 |
| | Exp | — | — | — | — | 99 | 99 | 99 |
| | Δ | | | | | −6 | 1 | −2 |
| TRZAS | Obs | 0 | 0 | 0 | 0 | 10 | 3 | 10 |
| | Exp | — | — | — | — | 0 | 0 | 0 |
| | Δ | | | | | 10 | 3 | 10 |

TABLE 20-continued

Herbicidal Effects (% visual injury) of Compound A
and Flurcarbazone on weed and grain crops.

| Application rate (g/ha) | Compound A Flurcarbazone | 7.5 0 | 10 0 | 15 0 | 0 30 | 7.5 30 | 10 30 | 15 30 |
|---|---|---|---|---|---|---|---|---|
| HORVS | Obs | 0 | 0 | 0 | 20 | 40 | 38 | 43 |
| | Exp | — | — | — | — | 20 | 20 | 20 |
| | Δ | | | | | 20 | 18 | 23 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 21

Compositions comprising Compound A and propoxycarbazone were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured. The results are summarized in Table 21 below.

TABLE 21

Herbicidal Effects (% visual injury) of Compound A
and Propoxycarbazone on weed and grain crops.

| Application rate (g/ha) | Compound A Propoxycarbazone | 7.5 0 | 10 0 | 15 0 | 0 40 | 7.5 40 | 10 40 | 15 40 |
|---|---|---|---|---|---|---|---|---|
| AMARE | Obs | 73 | 75 | 80 | 95 | 91 | 95 | 99 |
| | Exp | — | — | — | — | 99 | 99 | 99 |
| | Δ | | | | | -8 | -4 | -1 |
| BRSNW | Obs | 63 | 45 | 73 | 100 | 100 | 99 | 99 |
| | Exp | — | — | — | — | 100 | 100 | 100 |
| | Δ | | | | | 0 | -2 | -2 |
| CHEAL | Obs | 78 | 78 | 85 | 38 | 73 | 80 | 78 |
| | Exp | — | — | — | — | 86 | 86 | 91 |
| | Δ | | | | | -13 | -6 | -13 |
| CIRAR | Obs | 25 | 33 | 55 | 68 | 65 | 73 | 83 |
| | Exp | — | — | — | — | 76 | 78 | 85 |
| | Δ | | | | | -11 | -6 | -3 |
| KCHSC | Obs | 68 | 68 | 68 | 18 | 90 | 80 | 83 |
| | Exp | — | — | — | — | 73 | 73 | 73 |
| | Δ | | | | | 17 | 7 | 9 |
| MATCH | Obs | 20 | 45 | 45 | 28 | 15 | 35 | 35 |
| | Exp | — | — | — | — | 42 | 60 | 60 |
| | Δ | | | | | -27 | -25 | -25 |
| POLCO | Obs | 88 | 98 | 88 | 8 | 93 | 100 | 100 |
| | Exp | — | — | — | — | 88 | 98 | 88 |
| | Δ | | | | | 4 | 2 | 12 |
| SINAR | Obs | 93 | 93 | 93 | 96 | 96 | 100 | 100 |
| | Exp | — | — | — | — | 100 | 100 | 100 |
| | Δ | | | | | -4 | 0 | 0 |
| TRZAS | Obs | 0 | 0 | 0 | 8 | 0 | 0 | 0 |
| | Exp | — | — | — | — | 8 | 8 | 8 |
| | Δ | | | | | -8 | -8 | -8 |

TABLE 21-continued

Herbicidal Effects (% visual injury) of Compound A
and Propoxycarbazone on weed and grain crops.

| Application rate (g/ha) | Compound A Propoxycarbazone | 7.5 0 | 10 0 | 15 0 | 0 40 | 7.5 40 | 10 40 | 15 40 |
|---|---|---|---|---|---|---|---|---|
| HORVS | Obs | 0 | 0 | 0 | 90 | 58 | 90 | 58 |
| | Exp | — | — | — | — | 90 | 90 | 90 |
| | Δ | | | | | -33 | -30 | -33 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 22

Compositions comprising Compound A and thiencarbazone were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 22 below.

TABLE 22

Herbicidal Effects (% visual injury) of Compound A
and Thiencarbazone on weed and grain crops.

| Application rate (g/ha) | Compound A Thiencarbazone | 7.5 0 | 10 0 | 15 0 | 0 10 | 7.5 10 | 10 10 | 15 10 |
|---|---|---|---|---|---|---|---|---|
| AMARE | Obs | 73 | 75 | 80 | 98 | 100 | 100 | 98 |
| | Exp | — | — | — | — | 99 | 99 | 100 |
| | Δ | | | | | 1 | 1 | -2 |
| BRSNW | Obs | 63 | 45 | 73 | 98 | 98 | 100 | 99 |
| | Exp | — | — | — | — | 99 | 99 | 99 |
| | Δ | | | | | -2 | 1 | -1 |
| CHEAL | Obs | 78 | 78 | 85 | 83 | 85 | 85 | 88 |
| | Exp | — | — | — | — | 96 | 96 | 97 |
| | Δ | | | | | -11 | -11 | -10 |
| CIRAR | Obs | 25 | 33 | 55 | 45 | 65 | 70 | 75 |
| | Exp | — | — | — | — | 59 | 63 | 75 |
| | Δ | | | | | 6 | 7 | 0 |
| KCHSC | Obs | 68 | 68 | 68 | 45 | 83 | 83 | 85 |
| | Exp | — | — | — | — | 82 | 82 | 82 |
| | Δ | | | | | 0 | 0 | 3 |
| MATCH | Obs | 20 | 45 | 45 | 80 | 80 | 88 | 90 |
| | Exp | — | — | — | — | 84 | 89 | 89 |
| | Δ | | | | | -4 | -2 | 1 |
| POLCO | Obs | 88 | 98 | 88 | 95 | 96 | 98 | 96 |
| | Exp | — | — | — | — | 99 | 100 | 99 |
| | Δ | | | | | -3 | -2 | -3 |
| SINAR | Obs | 93 | 93 | 93 | 90 | 100 | 100 | 93 |
| | Exp | — | — | — | — | 99 | 99 | 99 |
| | Δ | | | | | 1 | 1 | -7 |
| TRZAS | Obs | 0 | 0 | 0 | 0 | 0 | 0 | 0 |
| | Exp | — | — | — | — | 0 | 0 | 0 |
| | Δ | | | | | 0 | 0 | 0 |

TABLE 22-continued

Herbicidal Effects (% visual injury) of Compound A
and Thiencarbazone on weed and grain crops.

| Application rate (g/ha) | Compound A Thiencarbazone | 7.5 0 | 10 0 | 15 0 | 0 10 | 7.5 10 | 10 10 | 15 10 |
|---|---|---|---|---|---|---|---|---|
| HORVS | Obs | 0 | 0 | 0 | 8 | 10 | 13 | 10 |
|  | Exp | — | — | — | — | 8 | 8 | 8 |
|  | Δ |  |  |  |  | 3 | 5 | 3 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 23

Compositions comprising Compound A and cloransulam were tested to determine the efficacy of the compositions on undesirable vegetation species, including spring rape (BRSNN, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), pigweed (AMARE, *Amaranthus retroflexus*), common lambsquarters (CHEAL, *Chenopodium album* L.), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 23 below.

TABLE 23

Herbicidal Effects (% visual injury) of Compound A
and Cloransulam on weed and grain crops.

| Application rate (g/ha) | Compound A Cloransulam | 7.5 0 | 10 0 | 0 17.5 | 7.5 17.5 | 10 17.5 |
|---|---|---|---|---|---|---|
| TRZAS | Obs | 0 | 0 | 0 | 0 | 0 |
|  | Exp | — | — | — | 0 | 0 |
|  | Δ |  |  |  | 0 | 0 |
| HORVS | Obs | 8 | 0 | 15 | 25 | 8 |
|  | Exp | — | — | — | 21 | 15 |
|  | Δ |  |  |  | 4 | -8 |
| BRSNN | Obs | 55 | 60 | 100 | 100 | 100 |
|  | Exp | — | — | — | 100 | 100 |
|  | Δ |  |  |  | 0 | 0 |
| POLCO | Obs | 70 | 78 | 80 | 98 | 100 |
|  | Exp | — | — | — | 94 | 96 |
|  | Δ |  |  |  | 4 | 5 |
| SINAR | Obs | 88 | 92 | 97 | 100 | 100 |
|  | Exp |  |  |  | 100 | 100 |
|  | Δ |  |  |  | 0 | 0 |
| SASKR | Obs | 45 | 60 | 25 | 73 | 73 |
|  | Exp | — | — | — | 59 | 70 |
|  | Δ |  |  |  | 14 | 3 |
| KCHSC | Obs | 50 | 58 | 0 | 63 | 68 |
|  | Exp | — | — | — | 50 | 58 |
|  | Δ |  |  |  | 13 | 10 |
| AMARE | Obs | 100 | 100 | 15 | 93 | 100 |
|  | Exp |  |  |  | 100 | 100 |
|  | Δ |  |  |  | -8 | 0 |
| CHEAL | Obs | 70 | 83 | 0 | 83 | 89 |
|  | Exp | — | — | — | 70 | 83 |
|  | Δ |  |  |  | 13 | 7 |

TABLE 23-continued

Herbicidal Effects (% visual injury) of Compound A
and Cloransulam on weed and grain crops.

| Application rate (g/ha) | Compound A Cloransulam | 7.5 0 | 10 0 | 0 17.5 | 7.5 17.5 | 10 17.5 |
|---|---|---|---|---|---|---|
| MATCH | Obs | 13 | 15 | 40 | 53 | 63 |
|  | Exp | — | — | — | 48 | 49 |
|  | Δ |  |  |  | 5 | 14 | g/ha = grams per hectare
TRZAS = *Triticum aestivum* (spring wheat)
HORVS = *Hordeum vulgare* (spring barley)
BRSNN = *Brassica napus* (spring rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
AMARE = *Amaranthus retroflexus* (pigweed)
CHEAL = *Chenopodium album* L. (common lambsquarters)
MATCH = *Matricaria chamomilla* (wild chamomile)

Example 24

Compositions comprising Compound A and diclosulam were tested to determine the efficacy of the compositions on undesirable vegetation species, including spring rape (BRSNN, *Brassica napus*), wild buckwheat (POLCO, *Polygonum convolvulus*), wild mustard (SINAR, *Sinapis arvensis*), Russian thistle (SASKR, *Salsola kali*), kochia (KCHSC, *Kochia scoparia*), pigweed (AMARE, *Amaranthus retroflexus*), common lambsquarters (CHEAL, *Chenopodium album* L.), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 24 below.

TABLE 24

Herbicidal Effects (% visual injury) of Compound A
and Diclosulam on weed and grain crops.

| Application rate (g/ha) | Compound A Diclosulam | 7.5 0 | 10 0 | 0 17.5 | 7.5 17.5 | 10 17.5 |
|---|---|---|---|---|---|---|
| TRZAS | Obs | 0 | 0 | 0 | 0 | 0 |
|  | Exp | — | — | — | 0 | 0 |
|  | Δ |  |  |  | 0 | 0 |
| HORVS | Obs | 8 | 0 | 5 | 0 | 3 |
|  | Exp | — | — | — | 12 | 5 |
|  | Δ |  |  |  | -12 | -3 |
| BRSNN | Obs | 55 | 60 | 100 | 100 | 100 |
|  | Exp | — | — | — | 100 | 100 |
|  | Δ |  |  |  | 0 | 0 |
| POLCO | Obs | 70 | 78 | 98 | 93 | 95 |
|  | Exp | — | — | — | 99 | 99 |
|  | Δ |  |  |  | -7 | -4 |
| SINAR | Obs | 88 | 92 | 100 | 100 | 100 |
|  | Exp |  |  |  | 100 | 100 |
|  | Δ |  |  |  | 0 | 0 |
| SASKR | Obs | 45 | 60 | 25 | 65 | 73 |
|  | Exp | — | — | — | 59 | 70 |
|  | Δ |  |  |  | 6 | 3 |
| KCHSC | Obs | 50 | 58 | 0 | 75 | 80 |
|  | Exp | — | — | — | 50 | 58 |
|  | Δ |  |  |  | 25 | 23 |
| AMARE | Obs | 100 | 100 | 85 | 100 | 100 |
|  | Exp |  |  |  | 100 | 100 |
|  | Δ |  |  |  | 0 | 0 |
| CHEAL | Obs | 70 | 83 | 0 | 85 | 88 |
|  | Exp | — | — | — | 70 | 83 |
|  | Δ |  |  |  | 15 | 5 |

TABLE 24-continued

Herbicidal Effects (% visual injury) of Compound A and Diclosulam on weed and grain crops.

| Application rate (g/ha) | Compound A<br>Diclosulam | 7.5<br>0 | 10<br>0 | 0<br>17.5 | 7.5<br>17.5 | 10<br>17.5 |
|---|---|---|---|---|---|---|
| MATCH | Obs | 13 | 15 | 68 | 47 | 85 |
|  | Exp | — | — | — | 72 | 72 |
|  | Δ |  |  |  | −25 | 13 | g/ha = grams per hectare
TRZAS = *Triticum aestivum* (spring wheat)
HORVS = *Hordeum vulgare* (spring barley)
BRSNN = *Brassica napus* (spring rape)
POLCO = *Polygonum convolvulus* (wild buckwheat)
SINAR = *Sinapis arvensis* (wild mustard)
SASKR = *Salsola kali* (Russian thistle)
KCHSC = *Kochia scoparia* (kochia)
AMARE = *Amaranthus retroflexus* (pigweed)
CHEAL = *Chenopodium album* L. (common lambsquarters)
MATCH = *Matricaria chamomilla* (wild chamomile)

Example 25

Compositions comprising Compound A and penoxsulam were tested to determine the efficacy of the compositions on undesirable vegetation species, including barnyard grass (ECHCG, *Echinochloa crus-galli*), small-flower flatsedge (CYPDI, *Cyperus difformis*), and broadleaf signalgrass (BRAPP, *Brachiaria platyphylla*).

The results are summarized in Table 25 below.

TABLE 25

Herbicidal Effects (% visual injury) of Compound A and Penoxsulam on weeds.

| Application rate (g/ha) | Compound A<br>Penoxsulam | 7.5<br>0 | 10<br>0 | 0<br>20 | 7.5<br>20 | 10<br>20 |
|---|---|---|---|---|---|---|
| ECHCG | Obs | 80 | 85 | 60 | 87 | 83 |
|  | Exp | — | — | — | 92 | 94 |
|  | Δ |  |  |  | −5 | −11 |
| CYPDI | Obs | 60 | 72 | 17 | 57 | 75 |
|  | Exp | — | — | — | 67 | 76 |
|  | Δ |  |  |  | −10 | −1 |
| BRAPP | Obs | 43 | 68 | 32 | 87 | 93 |
|  | Exp | — | — | — | 61 | 78 |
|  | Δ |  |  |  | 25 | 15 | g/ha = grams per hectare
ECHCG = *Echinochloa crus-galli* (barnyardgrass)
CYPDI = *Cyperus difformis* (small-flower flatsedge)
BRAPP = *Brachiaria platyphylla* (broadleaf signalgrass)

Example 26

Compositions comprising Compound A and florasulam were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 26 below.

TABLE 26

Herbicidal Effects (% visual injury) of Compound A and Florasulam on weed and grain crops.

| Application rate (g/ha) | Compound A<br>Florasulam | 7.5<br>0 | 10<br>0 | 15<br>0 | 0<br>3.75 | 7.5<br>3.75 | 10<br>3.75 | 15<br>3.75 |
|---|---|---|---|---|---|---|---|---|
| AMARE | Obs | 73 | 75 | 80 | 100 | 100 | 95 | 98 |
|  | Exp | — | — | — | — | 100 | 100 | 100 |
|  | Δ |  |  |  |  | 0 | −5 | −3 |
| BRSNW | Obs | 63 | 45 | 73 | 95 | 94 | 96 | 96 |
|  | Exp | — | — | — | — | 98 | 97 | 99 |
|  | Δ |  |  |  |  | −5 | −1 | −3 |
| CHEAL | Obs | 78 | 78 | 85 | 0 | 78 | 78 | 83 |
|  | Exp | — | — | — | — | 78 | 78 | 85 |
|  | Δ |  |  |  |  | 0 | 0 | −3 |
| CIRAR | Obs | 25 | 33 | 55 | 68 | 75 | 78 | 94 |
|  | Exp | — | — | — | — | 76 | 78 | 85 |
|  | Δ |  |  |  |  | −1 | −1 | 9 |
| KCHSC | Obs | 68 | 68 | 68 | 70 | 75 | 78 | 83 |
|  | Exp | — | — | — | — | 90 | 90 | 90 |
|  | Δ |  |  |  |  | −15 | −13 | −8 |
| MATCH | Obs | 20 | 45 | 45 | 85 | 90 | 93 | 93 |
|  | Exp | — | — | — | — | 88 | 92 | 92 |
|  | Δ |  |  |  |  | 2 | 1 | 1 |
| POLCO | Obs | 88 | 98 | 88 | 90 | 96 | 96 | 96 |
|  | Exp | — | — | — | — | 99 | 100 | 99 |
|  | Δ |  |  |  |  | −3 | −4 | −3 |
| SINAR | Obs | 93 | 93 | 93 | 85 | 95 | 100 | 98 |
|  | Exp | — | — | — | — | 99 | 99 | 99 |
|  | Δ |  |  |  |  | −4 | 1 | −1 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 0 | 0 | 0 | 0 |
|  | Exp | — | — | — | — | 0 | 0 | 0 |
|  | Δ |  |  |  |  | 0 | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 27

Compositions comprising Compound A and pyroxsulam were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 27 below.

TABLE 27

Herbicidal Effects (% visual injury) of Compound A and Pyroxsulam on weed and grain crops.

| Application rate (g/ha) | | Compound A 7.5 | 10 | 15 | 0 | 7.5 | 10 | 15 |
|---|---|---|---|---|---|---|---|---|
| | | Pyroxsulam 0 | 0 | 0 | 15 | 15 | 15 | 15 |
| AMARE | Obs | 73 | 75 | 80 | 98 | 100 | 98 | 100 |
| | Exp | — | — | — | — | 99 | 99 | 100 |
| | Δ | | | | | 1 | −2 | 1 |
| BRSNW | Obs | 63 | 45 | 73 | 68 | 93 | 93 | 95 |
| | Exp | — | — | — | — | 88 | 82 | 91 |
| | Δ | | | | | 5 | 10 | 4 |
| CHEAL | Obs | 78 | 78 | 85 | 73 | 80 | 75 | 85 |
| | Exp | — | — | — | — | 94 | 94 | 96 |
| | Δ | | | | | −14 | −19 | −11 |
| CIRAR | Obs | 25 | 33 | 55 | 48 | 70 | 68 | 73 |
| | Exp | — | — | — | — | 61 | 65 | 76 |
| | Δ | | | | | 9 | 3 | −4 |
| KCHSC | Obs | 68 | 68 | 68 | 55 | 78 | 78 | 78 |
| | Exp | — | — | — | — | 85 | 85 | 85 |
| | Δ | | | | | −8 | −8 | −8 |
| MATCH | Obs | 20 | 45 | 45 | 53 | 48 | 33 | 43 |
| | Exp | — | — | — | — | 62 | 74 | 74 |
| | Δ | | | | | −15 | −41 | −31 |
| POLCO | Obs | 88 | 98 | 88 | 94 | 97 | 97 | 97 |
| | Exp | — | — | — | — | 99 | 100 | 99 |
| | Δ | | | | | −2 | −3 | −2 |
| SINAR | Obs | 93 | 93 | 93 | 73 | 100 | 98 | 96 |
| | Exp | — | — | — | — | 98 | 98 | 98 |
| | Δ | | | | | 2 | 0 | −2 |
| TRZAS | Obs | 0 | 0 | 0 | 0 | 0 | 0 | 0 |
| | Exp | — | — | — | — | 0 | 0 | 0 |
| | Δ | 0 | 0 | 0 | | | | |
| HORVS | Obs | 0 | 0 | 0 | 0 | 3 | 8 | 0 |
| | Exp | — | — | — | — | 0 | 0 | 0 |
| | Δ | | | | | 3 | 8 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

wheat (TRZAS) and spring barley (HORVS), and the phytotoxicity of the compositions on each crop was measured.

The results are summarized in Table 28 below.

TABLE 28

Herbicidal Effects (% visual injury) of Compound A and Flumetsulam on weed and grain crops.

| Application rate (g/ha) | | Compound A 7.5 | 10 | 0 | 7.5 | 10 |
|---|---|---|---|---|---|---|
| | | Flumetsulam 0 | 0 | 4.375 | 4.375 | 4.375 |
| AMARE | Obs | 90 | 85 | 98 | 98 | 98 |
| | Exp | — | — | — | 100 | 100 |
| | Δ | | | | −2 | −2 |
| BRSNW | Obs | 35 | 40 | 40 | 68 | 75 |
| | Exp | — | — | — | 61 | 64 |
| | Δ | | | | 7 | 11 |
| CHEAL | Obs | 75 | 80 | 45 | 83 | 80 |
| | Exp | — | — | — | 86 | 89 |
| | Δ | | | | −4 | −9 |
| CIRAR | Obs | 40 | 55 | 5 | 65 | 65 |
| | Exp | — | — | — | 43 | 57 |
| | Δ | | | | 22 | 8 |
| KCHSC | Obs | 70 | 70 | 5 | 80 | 83 |
| | Exp | — | — | — | 72 | 72 |
| | Δ | | | | 9 | 11 |
| MATCH | Obs | 10 | 20 | 83 | 85 | 88 |
| | Exp | — | — | — | 84 | 86 |
| | Δ | | | | 1 | 2 |
| POLCO | Obs | 30 | 43 | 5 | 60 | 65 |
| | Exp | — | — | — | 34 | 45 |
| | Δ | | | | 27 | 20 |
| SASKR | Obs | 60 | 63 | 0 | 70 | 73 |
| | Exp | — | — | — | 60 | 63 |
| | Δ | | | | 10 | 10 |
| SINAR | Obs | 83 | 88 | 50 | 88 | 93 |
| | Exp | — | — | — | 91 | 94 |
| | Δ | | | | −4 | −1 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 0 | 0 | 0 |
| | Exp | — | — | — | 0 | 0 |
| | Δ | | | | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
TRZAS = *Triticum aestivum* (spring wheat)
HORVS = *Hordeum vulgare* (spring barley)

Example 28

Compositions comprising Compound A and flumetsulam were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*). The compositions were also tested on spring Example 29

Compositions comprising Compound A and bispyribac were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 29 below.

TABLE 29

Herbicidal Effects (% visual injury) of Compound A and Pyroxsulam on weed and grain crops.

| Application rate (g/ha) | Compound A Bispyrabac | 7.5 0 | 10 0 | 15 0 | 0 20 | 7.5 20 | 10 20 | 15 20 |
|---|---|---|---|---|---|---|---|---|
| AMARE | Obs | 73 | 75 | 80 | 100 | 95 | 96 | 100 |
|  | Exp | — | — | — | — | 100 | 100 | 100 |
|  | Δ |  |  |  |  | −5 | −4 | 0 |
| BRSNW | Obs | 63 | 45 | 73 | 100 | 99 | 99 | 99 |
|  | Exp | — | — | — | — | 100 | 100 | 100 |
|  | Δ |  |  |  |  | −2 | −2 | −2 |
| CHEAL | Obs | 78 | 78 | 85 | 0 | 78 | 80 | 85 |
|  | Exp | — | — | — | — | 78 | 78 | 85 |
|  | Δ |  |  |  |  | 0 | 3 | 0 |
| CIRAR | Obs | 25 | 33 | 55 | 68 | 94 | 95 | 94 |
|  | Exp | — | — | — | — | 76 | 78 | 85 |
|  | Δ |  |  |  |  | 18 | 17 | 9 |
| KCHSC | Obs | 68 | 68 | 68 | 10 | 70 | 75 | 78 |
|  | Exp | — | — | — | — | 71 | 71 | 71 |
|  | Δ |  |  |  |  | −1 | 4 | 7 |
| MATCH | Obs | 20 | 45 | 45 | 23 | 15 | 25 | 65 |
|  | Exp | — | — | — | — | 38 | 57 | 57 |
|  | Δ |  |  |  |  | −23 | −32 | 8 |
| POLCO | Obs | 88 | 98 | 88 | 96 | 99 | 97 | 99 |
|  | Exp | — | — | — | — | 100 | 100 | 100 |
|  | Δ |  |  |  |  | −1 | −3 | −1 |
| SINAR | Obs | 93 | 93 | 93 | 96 | 100 | 100 | 100 |
|  | Exp | — | — | — | — | 100 | 100 | 100 |
|  | Δ |  |  |  |  | 0 | 0 | 0 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 13 | 0 | 5 | 0 |
|  | Exp | — | — | — | — | 13 | 13 | 13 |
|  | Δ |  |  |  |  | −13 | −8 | −13 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

the phytotoxicity of the compositions on each crop was measured.

The results are summarized in Table 30 below.

TABLE 30

Herbicidal Effects (% visual injury) of Compound A and Imazamethabenz on weed and grain crops.

| Application rate (g/ha) | Compound A Imazamethabenz | 7.5 0 | 10 0 | 15 0 | 0 200 | 7.5 200 | 10 200 | 15 200 |
|---|---|---|---|---|---|---|---|---|
| AMARE | Obs | 73 | 75 | 80 | 5 | 78 | 70 | 73 |
|  | Exp | — | — | — | — | 74 | 76 | 81 |
|  | Δ |  |  |  |  | 4 | −6 | −9 |
| BRSNW | Obs | 63 | 45 | 73 | 53 | 85 | 88 | 96 |
|  | Exp | — | — | — | — | 82 | 74 | 87 |
|  | Δ |  |  |  |  | 3 | 14 | 9 |
| CHEAL | Obs | 78 | 78 | 85 | 0 | 75 | 80 | 78 |
|  | Exp | — | — | — | — | 78 | 78 | 85 |
|  | Δ |  |  |  |  | −3 | 3 | −8 |
| CIRAR | Obs | 25 | 33 | 55 | 5 | 63 | 65 | 73 |
|  | Exp | — | — | — | — | 29 | 36 | 57 |
|  | Δ |  |  |  |  | 34 | 29 | 15 |
| KCHSC | Obs | 68 | 68 | 68 | 0 | 70 | 73 | 73 |
|  | Exp | — | — | — | — | 68 | 68 | 68 |
|  | Δ |  |  |  |  | 3 | 5 | 5 |
| MATCH | Obs | 20 | 45 | 45 | 5 | 20 | 20 | 58 |
|  | Exp | — | — | — | — | 24 | 48 | 48 |
|  | Δ |  |  |  |  | −4 | −28 | 10 |
| POLCO | Obs | 88 | 98 | 88 | 88 | 95 | 96 | 99 |
|  | Exp | — | — | — | — | 98 | 100 | 98 |
|  | Δ |  |  |  |  | −3 | −4 | 0 |
| SINAR | Obs | 93 | 93 | 93 | 75 | 95 | 95 | 89 |
|  | Exp | — | — | — | — | 98 | 98 | 98 |
|  | Δ |  |  |  |  | −3 | −3 | −10 |
| TRZAS | Obs | 0 | 0 | 0 | 0 | 0 | 0 | 0 |
|  | Exp | — | — | — | — | 0 | 0 | 0 |
|  | Δ |  |  |  |  | 0 | 0 | 0 |
| HORVS | Obs | 0 | 0 | 0 | 0 | 0 | 0 | 0 |
|  | Exp | — | — | — | — | 0 | 0 | 0 |
|  | Δ |  |  |  |  | 0 | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 30

Compositions comprising Compound A and imazamethabenz were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring wheat (TRZAS) and spring barley (HORVS), and

Example 31

Compositions comprising Compound A and imazapic were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*). The compositions were also tested on spring wheat (TRZAS) and spring barley (HORVS), and the phytotoxicity of the compositions on each crop was measured.

The results are summarized in Table 31 below.

TABLE 31

Herbicidal Effects (% visual injury) of Compound A and Imazapic on weed and grain crops.

| | | Application rate (g/ha) Compound A | | | | |
|---|---|---|---|---|---|---|
| | | 7.5 | 10 | 0 | 7.5 | 10 |
| | | | | Imazapic | | |
| | | 0 | 0 | 35 | 35 | 35 |
| AMARE | Obs | 90 | 85 | 100 | 100 | 100 |
| | Exp | — | — | — | 100 | 100 |
| | Δ | | | | 0 | 0 |
| BRSNW | Obs | 35 | 40 | 98 | 98 | 98 |
| | Exp | — | — | — | 98 | 99 |
| | Δ | | | | −1 | −1 |
| CHEAL | Obs | 75 | 80 | 78 | 90 | 95 |
| | Exp | — | — | — | 94 | 96 |
| | Δ | | | | −4 | −1 |
| CIRAR | Obs | 40 | 55 | 68 | 73 | 78 |
| | Exp | — | — | — | 81 | 85 |
| | Δ | | | | −8 | −8 |
| KCHSC | Obs | 70 | 70 | 80 | 96 | 96 |
| | Exp | — | — | — | 94 | 94 |
| | Δ | | | | 2 | 2 |
| MATCH | Obs | 10 | 20 | 68 | 85 | 80 |
| | Exp | — | — | — | 71 | 74 |
| | Δ | | | | 14 | 6 |
| POLCO | Obs | 30 | 43 | 63 | 65 | 75 |
| | Exp | — | — | — | 74 | 78 |
| | Δ | | | | −9 | −3 |
| SASKR | Obs | 60 | 63 | 35 | 93 | 90 |
| | Exp | — | — | — | 74 | 76 |
| | Δ | | | | 19 | 14 |
| SINAR | Obs | 83 | 88 | 91 | 98 | 98 |
| | Exp | — | — | — | 98 | 99 |
| | Δ | | | | −1 | −1 |
| TRZAS | Obs | 0 | 0 | 90 | 63 | 68 |
| | Exp | — | — | — | 90 | 90 |
| | Δ | | | | −28 | −23 |
| HORVS | Obs | 0 | 0 | 90 | 80 | 88 |
| | Exp | — | — | — | 90 | 90 |
| | Δ | | | | −10 | −3 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
TRZAS = *Triticum aestivum* (spring wheat)
HORVS = *Hordeum vulgare* (spring barley)

Example 32

Compositions comprising Compound B and florasulam were tested to determine the efficacy of the compositions on undesirable vegetation species, including winter rape (BRSNW, *Brassica napus*), turnip (BRSRR, *Brassica rapa*), wild chamomile (MATCH, *Matricaria chamomilla*), and pineapple weed (MATMT, *Matricaria discoidea*).

The results are summarized in Table 32 below.

TABLE 32

Herbicidal Effects (% visual injury) of Compound B and Florasulam on weeds.

| | | Application rate (g/ha) Compound B | | | | |
|---|---|---|---|---|---|---|
| | | 10 | 0 | 0 | 10 | 10 |
| | | | | Florasulam | | |
| | | 0 | 2.5 | 5 | 2.5 | 5 |
| BRSNW | Obs | 93 | 30 | 35 | 100 | 99 |
| | Exp | — | — | — | 95 | 95 |
| | Δ | | | | 5 | 4 |
| BRSRR | Obs | 85 | 70 | 95 | 100 | 100 |
| | Exp | — | — | — | 96 | 99 |
| | Δ | | | | 5 | 1 |
| MATCH | Obs | 20 | 30 | 20 | 70 | 100 |
| | Exp | — | — | — | 44 | 36 |
| | Δ | | | | 26 | 64 |
| MATMT | Obs | 20 | 75 | 65 | 100 | 100 |
| | Exp | — | — | — | 80 | 72 |
| | Δ | | | | 20 | 28 | g/ha = grams per hectare
BRSNW = *Brassica napus* (winter rape)
BRSRR = *Brassica rapa* (turnip)
MATCH = *Matricaria chamomilla* (wild chamomile)
MATMT = *Matricaria discoidea* (pineapple weed)

Example 33

Compositions comprising Compound B (without cloquintocet-mexyl safener) and pyroxsulam were tested to determine the efficacy of the compositions on the weed *kochia* (KCHSC, *Kochia scoparia*). The compositions were also tested on spring wheat (TRZAS), and the phytotoxicity of the compositions on this crop was measured.

The results are summarized in Table 33 below.

TABLE 33

Herbicidal Effects (% visual injury) of Compound B and Pyroxsulam on weed and grain crops.

| | | Application rate (g/ha) Compound B | | | | | | | |
|---|---|---|---|---|---|---|---|---|---|
| | | 7.5 | 10 | 0 | 0 | 7.5 | 7.5 | 10 | 10 |
| | | | | | | Pyroxsulam | | | |
| | | 0 | 0 | 7.5 | 15 | 7.5 | 15 | 7.5 | 15 |
| TRZAS | Obs | 27 | 28 | 10 | 0 | 0 | 0 | 0 | 2 |
| | Exp | — | — | — | — | 34 | 27 | 36 | 28 |
| | Δ | | | | | −34 | −27 | −36 | −27 |
| KCHSC | Obs | 78 | 96 | 2 | 13 | 94 | 92 | 89 | 85 |
| | Exp | — | — | — | — | 79 | 81 | 96 | 96 |
| | Δ | | | | | 15 | 10 | −7 | −12 | g/ha = grams per hectare
TRZAS = *Triticum aeshvum* (spring wheat)
KCHSC = *Kochia scoparia* (kochia)

Example 34

Compositions comprising Compound B and iodosulfuron were tested to determine the efficacy of the compositions on undesirable vegetation species, including *kochia* (KCHSC, *Kochia scoparia*) and pigweed (AMARE, *Amaranthus retroflexus*). The compositions were also tested on spring wheat (TRZAS) and spring barley (HORVS), and the phytotoxicity of the compositions on each crop was measured.

The results are summarized in Table 34 below.

TABLE 34

Herbicidal Effects (% visual injury) of Compound B and Iodosulfuron on weed and grain crops.

| | | Application rate (g/ha) Compound B | | | | |
|---|---|---|---|---|---|---|
| | | 7.5 | 10 | 0 | 7.5 | 10 |
| | | | | Iodosulfuron | | |
| | | 0 | 0 | 2.5 | 2.5 | 2.5 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 0 | 0 | 0 |
| | Exp | — | — | — | 0 | 0 |
| | Δ | | | | 0 | 0 |
| KCHSC | Obs | 63 | 65 | 20 | 83 | 91 |
| | Exp | — | — | — | 70 | 72 |
| | Δ | | | | 13 | 19 |
| AMARE | Obs | 75 | 84 | 85 | 100 | 100 |
| | Exp | — | — | — | 96 | 98 |
| | Δ | | | | 4 | 2 | g/ha = grams per hectare
TRZAS = *Triticum aestivum* (spring wheat)
HORVS = *Hordeum vulgare* (spring barley)
KCHSC = *Kochia scoparia* (kochia)
AMARE = *Amaranthus retroflexus* (pigweed)

Example 35

Compositions comprising Compound B and mesosulfuron were tested to determine the efficacy of the compositions on undesirable vegetation species, including wild buckwheat (POLCO, *Polygonum convolvulus*) and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 35 below.

TABLE 35

Herbicidal Effects (% visual injury) of Compound B and Mesosulfuron on weed and grain crops.

| | | Application rate (g/ha) Compound B | | | | |
|---|---|---|---|---|---|---|
| | | 7.5 | 10 | 0 | 7.5 | 10 |
| | | | | Mesosulfuron | | |
| | | 0 | 0 | 3 | 3 | 3 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 15 | 18 | 8 |
| | Exp | — | — | — | 15 | 15 |
| | Δ | | | | 3 | -8 |
| POLCO | Obs | 70 | 97 | 3 | 83 | 78 |
| | Exp | — | — | — | 71 | 97 |
| | Δ | | | | 12 | -20 |
| MATCH | Obs | 20 | 18 | 10 | 23 | 43 |
| | Exp | — | — | — | 28 | 26 |
| | Δ | | | | -6 | 17 | g/ha = grams per hectare
TRZAS = *Triticum aestivum* (spring wheat)
HORVS = *Hordeum vulgare* (spring barley)
POLCO = *Polygonum convolvulus* (wild buckwheat)
MATCH = *Matricaria chamomilla* (wild chamomile)

Example 36

Compositions comprising Compound B and imazamethabenz were tested to determine the efficacy of the compositions on undesirable vegetation species, including Canadian thistle (CIRAR, *Cirsium arvense*), Russian thistle (SASKR, *Salsola kali*), and common lambsquarters (CHEAL, *Chenopodium album* L). The compositions were also tested on spring wheat (TRZAS) and spring barley (HORVS), and the phytotoxicity of the compositions on each crop was measured.

The results are summarized in Table 36 below.

TABLE 36

Herbicidal Effects (% visual injury) of Compound B and Imazamethabenz on weed and grain crops.

| | | Application rate (g/ha) Compound B | | | | |
|---|---|---|---|---|---|---|
| | | 7.5 | 10 | 0 | 7.5 | 10 |
| | | | | Imazamethabenz | | |
| | | 0 | 0 | 100 | 100 | 100 |
| TRZAS | Obs | 0 | 0 | 0 | 0 | 0 |
| | Exp | — | — | — | 0 | 0 |
| | Δ | | | | 0 | 0 |
| HORVS | Obs | 8 | 0 | 0 | 0 | 5 |
| | Exp | — | — | — | 0 | 0 |
| | Δ | | | | 0 | 5 |
| CIRAR | Obs | 18 | 25 | 5 | 28 | 28 |
| | Exp | — | — | — | 22 | 29 |
| | Δ | | | | 6 | -1 |
| SASKR | Obs | 53 | 63 | 13 | 65 | 65 |
| | Exp | — | — | — | 58 | 67 |
| | Δ | | | | 7 | -2 |
| CHEAL | Obs | 85 | 94 | 0 | 95 | 90 |
| | Exp | — | — | — | 85 | 94 |
| | Δ | | | | 10 | -4 | g/ha = grams per hectare
TRZAS = *Triticum aestivum* (spring wheat)
HORVS = *Hordeum vulgare* (spring barley)
CIRAR = *Cirsium arvense* (Canadian thistle)
SASKR = *Salsola kali* (Russian thistle)
CHEAL = *Chenopodium album* L. (common lambsquarters)

Example 37

Compositions comprising Compound B and bensulfuron were tested to determine the efficacy of the compositions on undesirable vegetation species, including pigweed (AMARE, *Amaranthus retroflexus*), kochia (KCHSC, *Kochia scoparia*), chickweed (STEME, *Stellaria media*), wild pansy (VIOTR, *Viola tricolor*), common lambsquarters (CHEAL, *Chenopodium album* L.), Canadian thistle (CIRAR, *Cirsium arvense*), large crabgrass (DIGSA, *Digitaria sanguinalis*), Wild buckwheat (POLCO, *Polygonum convolvulus*), and broad-leaf dock (RUMOB, *Rumex obtusifolius*). The compositions were also tested on spring wheat (TRZAS), and the phytotoxicity of the compositions on this crop was measured.

The results are summarized in Table 37 below.

TABLE 37

Herbicidal Effects (% visual injury) of Compound B and Bensulfuron on weed and grain crops.

| | | Application rate (g/ha) Compound B | | | | |
|---|---|---|---|---|---|---|
| | | 5 | 10 | 0 | 5 | 10 |
| | | | | Bensulfuron | | |
| | | 0 | 0 | 16 | 16 | 16 |
| AMARE | Obs | 93 | 94 | 20 | 100 | 100 |
| | Exp | — | — | — | 94 | 95 |
| | Δ | | | | 6 | 5 |
| KCHSC | Obs | 60 | 65 | 20 | 65 | 70 |
| | Exp | — | — | — | 68 | 72 |
| | Δ | | | | −3 | −2 |
| STEME | Obs | 85 | 95 | 8 | 98 | 100 |
| | Exp | — | — | — | 86 | 95 |
| | Δ | | | | 11 | 5 |
| VIOTR | Obs | 20 | 18 | 8 | 13 | 10 |
| | Exp | — | — | — | 26 | 24 |
| | Δ | | | | −14 | −14 |
| CHEAL | Obs | 96 | 96 | 10 | 90 | 95 |
| | Exp | — | — | — | 96 | 96 |
| | Δ | | | | −6 | −1 |
| CIRAR | Obs | 50 | 60 | 20 | 55 | 55 |
| | Exp | — | — | — | 60 | 68 |
| | Δ | | | | −5 | −13 |
| DIGSA | Obs | 50 | 63 | 0 | 35 | 45 |
| | Exp | — | — | — | 50 | 63 |
| | Δ | | | | −15 | −18 |
| POLCO | Obs | 88 | 87 | 80 | 83 | 90 |
| | Exp | — | — | — | 98 | 97 |
| | Δ | | | | −15 | −7 |
| RUMOB | Obs | 23 | 18 | 60 | 68 | 70 |
| | Exp | — | — | — | 69 | 67 |
| | Δ | | | | −2 | 3 |
| TRZAS | Obs | 13 | 20 | 8 | 0 | 20 |
| | Exp | — | — | — | 19 | 26 |
| | Δ | | | | −19 | −6 | g/ha = grams per hectare
AMARE = *Amaranthus retroflexus* (pigweed)
KCHSC = *Kochia scoparia* (kochia)
STEME = *Stellaria media* (chickweed)
VIOTR = *Viola tricolor* (wild pansy)
CHEAL = *Chenopodium album* L. (common lambsquarters)
CIRAR = *Cirsium arvense* (Canadian thistle)
DIGSA = *Digitaria sanguinalis* (large crabgrass)
POLCO = *Polygonum convolvulus* (wild buckwheat)
RUMOB = *Rumex obtusifolius* (broad-leaf dock)
TRZAS = *Triticum aestivum* (spring wheat)

The results are summarized in Table 38 below.

TABLE 38

Herbicidal Effects (% visual injury) of Compound B and Flupyrsulfuron on weed and grain crops.

| | | Application rate (g/ha) Compound B | | | | |
|---|---|---|---|---|---|---|
| | | 5 | 10 | 0 | 5 | 10 |
| | | | | Flupyrsulfuron | | |
| | | 0 | 0 | 10 | 10 | 10 |
| AMARE | Obs | 93 | 94 | 97 | 100 | 100 |
| | Exp | — | — | — | 100 | 100 |
| | Δ | | | | 0 | 0 |
| KCHSC | Obs | 60 | 65 | 30 | 80 | 85 |
| | Exp | — | — | — | 72 | 76 |
| | Δ | | | | 8 | 10 |
| STEME | Obs | 85 | 95 | 80 | 100 | 99 |
| | Exp | — | — | — | 97 | 99 |
| | Δ | | | | 3 | −1 |
| VIOTR | Obs | 20 | 18 | 8 | 25 | 30 |
| | Exp | — | — | — | 26 | 24 |
| | Δ | | | | −1 | 6 |
| CHEAL | Obs | 96 | 96 | 63 | 95 | 91 |
| | Exp | — | — | — | 99 | 99 |
| | Δ | | | | −4 | −8 |
| CIRAR | Obs | 50 | 60 | 84 | 90 | 85 |
| | Exp | — | — | — | 92 | 94 |
| | Δ | | | | −2 | −9 |
| DIGSA | Obs | 50 | 63 | 0 | 5 | 8 |
| | Exp | — | — | — | 50 | 63 |
| | Δ | | | | −45 | −55 |
| POLCO | Obs | 88 | 87 | 91 | 94 | 85 |
| | Exp | — | — | — | 99 | 99 |
| | Δ | | | | −5 | −14 |
| RUMOB | Obs | 23 | 18 | 70 | 68 | 70 |
| | Exp | — | — | — | 77 | 75 |
| | Δ | | | | −9 | −5 |
| TRZAS | Obs | 13 | 20 | 15 | 23 | 0 |
| | Exp | — | — | — | 26 | 32 |
| | Δ | | | | −3 | −32 | g/ha = grams per hectare
AMARE = *Amaranthus retraflexus* (pigweed)
KCHSC = *Kochia scoparia* (kochia)
STEME = *Stellaria media* (chickweed)
VIOTR = *Viola tricolor* (wild pansy)
CHEAL = *Chenopodium album* L. (common lambsquarters)
CIRAR = *Cirsium arvense* (Canadian thistle)
DIGSA = *Digitaria sanguinalis* (large crabgrass)
POLCO = *Polygonum convolvulus* (wild buckwheat)
RUMOB = *Rumex obtusifolius* (broad-leaf dock)
TRZAS = *Triticum aestivum* (spring wheat)

Example 38

Compositions comprising Compound B and flupyrsulfuron were tested to determine the efficacy of the compositions on undesirable vegetation species, including pigweed (AMARE, *Amaranthus retroflexus*), kochia (KCHSC, *Kochia scoparia*), chickweed (STEME, *Stellaria media*), wild pansy (VIOTR, *Viola* tricolor), common lambsquarters (CHEAL, *Chenopodium album* L.), Canadian thistle (CIRAR, *Cirsium arvense*), large crabgrass (DIGSA, *Digitaria sanguinalis*), wild buckwheat (POLCO, *Polygonum convolvulus*), and broad-leaf dock (RUMOB, *Rumex obtusifolius*). The compositions were also tested on spring wheat (TRZAS), and the phytotoxicity of the compositions on this crop was measured.

Example 39

Compositions comprising Compound B and propoxycarbazone were tested to determine the efficacy of the compositions on undesirable vegetation species, including pigweed (AMARE, *Amaranthus retroflexus*), kochia (KCHSC, *Kochia scoparia*), chickweed (STEME, *Stellaria media*), wild pansy (VIOTR, *Viola* tricolor), common lambsquarters (CHEAL, *Chenopodium album* L.), Canadian thistle (CIRAR, *Cirsium arvense*), large crabgrass (DIGSA, *Digitaria sanguinalis*), wild buckwheat (POLCO, *Polygonum convolvulus*), and broad-leaf dock (RUMOB, *Rumex obtusifolius*). The compositions were also tested on spring wheat (TRZAS), and the phytotoxicity of the compositions on this crop was measured.

The results are summarized in Table 39 below.

TABLE 39

Herbicidal Effects (% visual injury) of Compound B and Propoxycarbazone on weed and grain crops.

| | | Application rate (g/ha) Compound B | | | | |
|---|---|---|---|---|---|---|
| | | 5 | 10 | 0 | 5 | 10 |
| | | | | Propoxycarbazone | | |
| | | 0 | 0 | 20 | 20 | 20 |
| AMARE | Obs | 93 | 94 | 90 | 93 | 100 |
| | Exp | — | — | — | 99 | 99 |
| | Δ | | | | −6 | 1 |
| KCHSC | Obs | 60 | 65 | 60 | 80 | 85 |
| | Exp | — | — | — | 84 | 86 |
| | Δ | | | | −4 | −1 |
| STEME | Obs | 85 | 95 | 88 | 100 | 97 |
| | Exp | — | — | — | 98 | 99 |
| | Δ | | | | 2 | −3 |
| VIOTR | Obs | 20 | 18 | 15 | 20 | 30 |
| | Exp | — | — | — | 32 | 30 |
| | Δ | | | | −12 | 0 |
| CHEAL | Obs | 96 | 96 | 80 | 96 | 83 |
| | Exp | — | — | — | 99 | 99 |
| | Δ | | | | −3 | −17 |
| CIRAR | Obs | 50 | 60 | 68 | 68 | 70 |
| | Exp | — | — | — | 84 | 87 |
| | Δ | | | | −16 | −17 |
| DIGSA | Obs | 50 | 63 | 0 | 5 | 15 |
| | Exp | — | — | — | 50 | 63 |
| | Δ | | | | −45 | −48 |
| POLCO | Obs | 88 | 87 | 0 | 93 | 95 |
| | Exp | — | — | — | 88 | 87 |
| | Δ | | | | 5 | 9 |
| RUMOB | Obs | 23 | 18 | 73 | 70 | 65 |
| | Exp | — | — | — | 79 | 77 |
| | Δ | | | | −9 | −12 |
| TRZAS | Obs | 13 | 20 | 35 | 38 | 28 |
| | Exp | — | — | — | 43 | 48 |
| | Δ | | | | −6 | −21 | g/ha = grams per hectare
AMARE = *Amaranthus retroflexus* (pigweed)
KCHSC = *Kochia scoparia* (kochia)
STEME = *Stellaria media* (chickweed)
VIOTR = *Viola tricolor* (wild pansy)
CHEAL = *Chenopodium album* L. (common lambsquarters)
CIRAR = *Cirsium arvense* (Canadian thistle)
DIGSA = *Digitaria sanguinalis* (large crabgrass)
POLCO = *Polygonum convolvulus* (wild buckwheat)
RUMOB = *Rumex obtusifolius* (broad-leaf dock)
TRZAS = *Triticum aestivum* (spring wheat)

Example 40

Compositions comprising Compound B and pyriminobac methyl were tested to determine the efficacy of the compositions on undesirable vegetation species, including pigweed (AMARE, *Amaranthus retroflexus*), kochia (KCHSC, *Kochia scoparia*), chickweed (STEME, *Stellaria media*), wild pansy (VIOTR, *Viola* tricolor), common lambsquarters (CHEAL, *Chenopodium album* L.), Canadian thistle (CIRAR, *Cirsium arvense*), large crabgrass (DIGSA, *Digitaria sanguinalis*), wild buckwheat (POLCO, *Polygonum convolvulus*), and broad-leaf dock (RUMOB, *Rumex obtusifolius*). The compositions were also tested on spring wheat (TRZAS), and the phytotoxicity of the compositions on this crop was measured.

The results are summarized in Table 40 below.

TABLE 40

Herbicidal Effects (% visual injury) of Compound B and Pyriminobac methyl on weed and grain crops.

| | | Application rate (g/ha) Compound B | | | | |
|---|---|---|---|---|---|---|
| | | 5 | 10 | 0 | 5 | 10 |
| | | | | Pyriminobac methyl | | |
| | | 0 | 0 | 30 | 30 | 30 |
| AMARE | Obs | 93 | 94 | 93 | 100 | 97 |
| | Exp | — | — | — | 99 | 100 |
| | Δ | | | | 1 | −3 |
| KCHSC | Obs | 60 | 65 | 33 | 78 | 85 |
| | Exp | — | — | — | 73 | 76 |
| | Δ | | | | 5 | −1 |
| STEME | Obs | 85 | 95 | 15 | 100 | 99 |
| | Exp | — | — | — | 87 | 96 |
| | Δ | | | | 13 | 3 |
| VIOTR | Obs | 20 | 18 | 5 | 28 | 18 |
| | Exp | — | — | — | 24 | 22 |
| | Δ | | | | 4 | −4 |
| CHEAL | Obs | 96 | 96 | 20 | 96 | 94 |
| | Exp | — | — | — | 97 | 97 |
| | Δ | | | | −1 | −3 |
| CIRAR | Obs | 50 | 60 | 8 | 60 | 65 |
| | Exp | — | — | — | 54 | 63 |
| | Δ | | | | 6 | 2 |
| DIGSA | Obs | 50 | 63 | 0 | 60 | 63 |
| | Exp | — | — | — | 50 | 63 |
| | Δ | | | | 10 | 1 |
| POLCO | Obs | 88 | 87 | 80 | 88 | 93 |
| | Exp | — | — | — | 98 | 97 |
| | Δ | | | | −10 | −5 |
| RUMOB | Obs | 23 | 18 | 65 | 63 | 65 |
| | Exp | — | — | — | 73 | 71 |
| | Δ | | | | −10 | −6 |
| TRZAS | Obs | 13 | 20 | 0 | 13 | 15 |
| | Exp | — | — | — | 13 | 20 |
| | Δ | | | | 0 | −5 | g/ha = grams per hectare
AMARE = *Amaranthus retroflexus* (pigweed)
KCHSC = *Kochia scoparia* (kochia)
STEME = *Stellaria media* (chickweed)
VIOTR = *Viola tricolor* (wild pansy)
CHEAL = *Chenopodium album* L. (common lambsquarters)
CIRAR = *Cirsium arvense* (Canadian thistle)
DIGSA = *Digitaria sanguinalis* (large crabgrass)
POLCO = *Polygonum convolvulus* (wild buckwheat)
RUMOB = *Rumex obtusifolius* (broad-leaf dock)
TRZAS = *Triticum aestivum* (spring wheat)

Example 41

Compositions comprising Compound B and halosulfuron were tested to determine the efficacy of the compositions on undesirable vegetation species, including velvetleaf (ABUTH, *Abutilon theophrasti*), pigweed (AMARE, *Amaranthus retroflexus*), common lambsquarters (CHEAL, *Chenopodium album* L.), Canadian thistle (CIRAR, *Cirsium arvense*), soybean (GLXMA, *Glycine max*), common sunflower (HELAN, *Helianthus annuus*), ivyleaf morningglory (IPOHE, *Ipomoea hederacea*), kochia (KCHSC, *Kochia scoparia*), wild buckwheat (POLCO, *Polygonum convolvulus*), broad-leaf dock (RUMOB, *Rumex obtusifolius*), chickweed (STEME, *Stellaria media*), and wild pansy (VIOTR, *Viola* tricolor).

The results are summarized in Table 41 below.

TABLE 41

Herbicidal Effects (% visual injury) of Compound B and Halosulfuron on weeds.

| | | Application rate (g/ha) Compound B | | | | |
|---|---|---|---|---|---|---|
| | | 7.5 | 10 | 0 | 7.5 | 10 |
| | | | | Halosulfuron | | |
| | | 0 | 0 | 8.75 | 8.75 | 8.75 |
| ABUTH | Obs | 45 | 68 | 95 | 93 | 95 |
| | Exp | — | — | — | 97 | 98 |
| | Δ | | | | −5 | −3 |
| AMARE | Obs | 60 | 73 | 40 | 78 | 88 |
| | Exp | — | — | — | 76 | 84 |
| | Δ | | | | 2 | 4 |
| CHEAL | Obs | 80 | 93 | 0 | 98 | 93 |
| | Exp | — | — | — | 80 | 93 |
| | Δ | | | | 18 | 0 |
| CIRAR | Obs | 18 | 55 | 10 | 38 | 70 |
| | Exp | — | — | — | 26 | 60 |
| | Δ | | | | 12 | 11 |
| GLXMA | Obs | 68 | 73 | 78 | 85 | 95 |
| | Exp | — | — | — | 93 | 94 |
| | Δ | | | | −8 | 1 |
| HELAN | Obs | 98 | 100 | 100 | 100 | 100 |
| | Exp | — | — | — | 100 | 100 |
| | Δ | | | | 0 | 0 |
| IPOHE | Obs | 0 | 0 | 0 | 0 | 0 |
| | Exp | — | — | — | 0 | 0 |
| | Δ | | | | 0 | 0 |
| KCHSC | Obs | 65 | 73 | 0 | 83 | 90 |
| | Exp | — | — | — | 65 | 73 |
| | Δ | | | | 18 | 18 |
| POLCO | Obs | 75 | 90 | 5 | 93 | 95 |
| | Exp | — | — | — | 76 | 91 |
| | Δ | | | | 16 | 5 |
| RUMOB | Obs | 10 | 15 | 0 | 13 | 35 |
| | Exp | — | — | — | 10 | 15 |
| | Δ | | | | 3 | 20 |
| STEME | Obs | 58 | 90 | 0 | 55 | 88 |
| | Exp | — | — | — | 58 | 90 |
| | Δ | | | | −3 | −3 |
| VIOTR | Obs | 3 | 8 | 15 | 20 | 20 |
| | Exp | — | — | — | 17 | 21 |
| | Δ | | | | 3 | −1 | g/ha = grams per hectare
ABUTH = *Abutilon theophrasti* (velvetleaf)
AMARE = *Amaranthus retroflexus* (pigweed)
CHEAL = *Chenopodium album* L. (common lambsquarters)
CIRAR = *Cirsium arvense* (Canadian thistle)
GLXMA = *Glycine max* (soybean)
KCHSC = *Kochia scoparia* (kochia)
HELAN = *Helianthus annuus* (common sunflower)
IPOHE = *Ipomoea hederacea* (ivyleaf morningglory)
KCHSC = *Kochia scoparia* (kochia)
POLCO = *Polygonum convolvulus* (wild buckwheat)
RUMOB = *Rumex obtusifolius* (broad-leaf dock)
STEME = *Stellaria media* (chickweed)
VIOTR = *Viola tricolor* (wild pansy)

Example 42

Compositions comprising Compound B and sulfosulfuron were tested to determine the efficacy of the compositions on undesirable vegetation species, including velvetleaf (ABUTH, *Abutilon theophrasti*), pigweed (AMARE, *Amaranthus retroflexus*), common lambsquarters (CHEAL, *Chenopodium album* L.), Canadian thistle (CIRAR, *Cirsium arvense*), soybean (GLXMA, *Glycine max*), common sunflower (HELAN, *Helianthus annuus*), ivyleaf morningglory (IPOHE, *Ipomoea hederacea*), kochia (KCHSC, *Kochia scoparia*), wild buckwheat (POLCO, *Polygonum convolvulus*), broad-leaf dock (RUMOB, *Rumex obtusifolius*), chickweed (STEME, *Stellaria media*), and wild pansy (VIOTR, *Viola tricolor*).

The results are summarized in Table 42 below.

TABLE 42

Herbicidal Effects (% visual injury) of Compound B and Sulfosulfuron on weeds.

| | | Application rate (g/ha) Compound B | | | | |
|---|---|---|---|---|---|---|
| | | 7.5 | 10 | 0 | 7.5 | 10 |
| | | | | Sulfosulfuron | | |
| | | 0 | 0 | 8.75 | 8.75 | 8.75 |
| ABUTH | Obs | 45 | 68 | 30 | 53 | 60 |
| | Exp | — | — | — | 62 | 77 |
| | Δ | | | | −9 | −17 |
| AMARE | Obs | 60 | 73 | 40 | 90 | 98 |
| | Exp | — | — | — | 76 | 84 |
| | Δ | | | | 14 | 14 |
| CHEAL | Obs | 80 | 93 | 0 | 83 | 85 |
| | Exp | — | — | — | 80 | 93 |
| | Δ | | | | 3 | −8 |
| CIRAR | Obs | 18 | 55 | 5 | 55 | 75 |
| | Exp | — | — | — | 22 | 57 |
| | Δ | | | | 33 | 18 |
| GLXMA | Obs | 68 | 73 | 85 | 95 | 90 |
| | Exp | — | — | — | 95 | 96 |
| | Δ | | | | 0 | −6 |
| HELAN | Obs | 98 | 100 | 100 | 100 | 90 |
| | Exp | — | — | — | 100 | 100 |
| | Δ | | | | 0 | −10 |
| IPOHE | Obs | 0 | 0 | 78 | 98 | 100 |
| | Exp | — | — | — | 78 | 78 |
| | Δ | | | | 20 | 23 |
| KCHSC | Obs | 65 | 73 | 0 | 88 | 88 |
| | Exp | — | — | — | 65 | 73 |
| | Δ | | | | 23 | 15 |
| POLCO | Obs | 75 | 90 | 5 | 93 | 95 |
| | Exp | — | — | — | 76 | 91 |
| | Δ | | | | 16 | 5 |
| RUMOB | Obs | 10 | 15 | 0 | 10 | 10 |
| | Exp | — | — | — | 10 | 15 |
| | Δ | | | | 0 | −5 |
| STEME | Obs | 58 | 90 | 53 | 100 | 100 |
| | Exp | — | — | — | 80 | 95 |
| | Δ | | | | 20 | 5 |
| VIOTR | Obs | 3 | 8 | 55 | 38 | 60 |
| | Exp | — | — | — | 56 | 58 |
| | Δ | | | | −19 | 2 | g/ha = grams per hectare
ABUTH = *Abutilon theophrasti* (velvetleaf)
AMARE = *Amaranthus retroflexus* (pigweed)
CHEAL = *Chenopodium album* L. (common lambsquarters)
CIRAR = *Cirsium arvense* (Canadian thistle)
GLXMA = *Glycine max* (soybean)
KCHSC = *Kochia scoparia* (kochia)
HELAN = *Helianthus annuus* (common sunflower)
IPOHE = *Ipomoea hederacea* (ivyleaf morningglory)
KCHSC = *Kochia scoparia* (kochia)
POLCO = *Polygonum convolvulus* (wild buckwheat)
RUMOB = *Rumex obtusifolius* (broad-leaf dock)
STEME = *Stellaria media* (chickweed)
VIOTR = *Viola tricolor* (wild pansy)

Example 43

Compositions comprising Compound A and amidosulfuron were tested to determine the efficacy of the compositions on undesirable vegetation species, including spring rape (BRSNN, *Brassica napus*), wild pansy (VIOTR, *Viola tricolor*), kochia (KCHSC, *Kochia scoparia* and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 43 below.

TABLE 43

Herbicidal Effects (% visual injury) of Compound A and Amidosulfuron on weed and grain crops.

| | | Application rate (g/ha) Compound A | | | | |
|---|---|---|---|---|---|---|
| | | 7.5 | 10 | 0 | 7.5 | 10 |
| | | | | Amidosulfuron | | |
| | | 0 | 0 | 22.5 | 22.5 | 22.5 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 0 | 0 | 0 |
| | Exp | — | — | — | 0 | 0 |
| | Δ | | | | 0 | 0 |
| BRSNN | Obs | 55 | 73 | 98 | 100 | 100 |
| | Exp | — | — | — | 99 | 99 |
| | Δ | | | | 1 | 1 |
| VIOTR | Obs | 15 | 23 | 18 | 30 | 50 |
| | Exp | — | — | — | 30 | 36 |
| | Δ | | | | 0 | 14 |
| KCHSC | Obs | 60 | 68 | 15 | 65 | 80 |
| | Exp | — | — | — | 66 | 72 |
| | Δ | | | | −1 | 8 |
| CIRAR | Obs | 15 | 43 | 15 | 40 | 63 |
| | Exp | — | — | — | 28 | 51 |
| | Δ | | | | 12 | 11 | g/ha = grams per hectare
TRZAS = *Triticum aestivum* (spring wheat)
HORVS = *Hordeum vulgare* (spring barley)
BRSNN = *Brassica napus* (spring rape)
VIOTR = *Viola tricolor* (wild pansy)
KCHSC = *Kochia scoparia* (kochia)
CIRAR = *Cirsium arvense* (Canadian thistle)

Example 44

Compositions comprising Compound A and bensulfuron were tested to determine the efficacy of the compositions on undesirable vegetation species, including Russian thistle (SASKR, *Salsola kali*), kochia (KCHSC, *Kochia scoparia*), common lambsquarters (CHEAL, *Chenopodium album* L.), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 44 below.

TABLE 44

Herbicidal Effects (% visual injury) of Compound A and Bensulfuron on weed and grain crops.

| | | Application rate (g/ha) Compound A | | | | |
|---|---|---|---|---|---|---|
| | | 7.5 | 10 | 0 | 7.5 | 10 |
| | | | | Bensulfuron | | |
| | | 0 | 0 | 16 | 16 | 16 |
| TRZAS | Obs | 0 | 0 | 0 | 0 | 0 |
| | Exp | — | — | — | 0 | 0 |
| | Δ | | | | 0 | 0 |
| HORVS | Obs | 8 | 0 | 8 | 5 | 0 |
| | Exp | — | — | — | 14 | 8 |
| | Δ | | | | −9 | −8 |

TABLE 44-continued

Herbicidal Effects (% visual injury) of Compound A and Bensulfuron on weed and grain crops.

| | | Application rate (g/ha) Compound A | | | | |
|---|---|---|---|---|---|---|
| | | 7.5 | 10 | 0 | 7.5 | 10 |
| | | | | Bensulfuron | | |
| | | 0 | 0 | 16 | 16 | 16 |
| SASKR | Obs | 45 | 60 | 0 | 68 | 70 |
| | Exp | — | — | — | 45 | 60 |
| | Δ | | | | 23 | 10 |
| KCHSC | Obs | 50 | 58 | 5 | 75 | 78 |
| | Exp | — | — | — | 53 | 60 |
| | Δ | | | | 23 | 18 |
| CHEAL | Obs | 70 | 83 | 10 | 83 | 88 |
| | Exp | — | — | — | 73 | 84 |
| | Δ | | | | 10 | 3 |
| MATCH | Obs | 13 | 15 | 38 | 53 | 48 |
| | Exp | — | — | — | 45 | 47 |
| | Δ | | | | 7 | 1 | g/ha = grams per hectare
TRZAS = *Triticum aestivum* (spring wheat)
HORVS = *Hordeum vulgare* (spring barley)
SASKR = *Salsola kali* (Russian thistle)
KCHSC = *Kochia scoparia* (kochia)
CHEAL = *Chenopodium album* L. (common lambsquarters)
MATCH = *Matricaria chamomilla* (wild chamomile)

Example 45

Compositions comprising Compound A and flupyrsulfuron were tested to determine the efficacy of the compositions on undesirable vegetation species, including Russian thistle (SASKR, *Salsola kali*), kochia (KCHSC, *Kochia scoparia*), common lambsquarters (CHEAL, *Chenopodium album* L.), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 45 below.

TABLE 45

Herbicidal Effects (% visual injury) of Compound A and Flupyrsulfuron on weed and grain crops.

| | | Application rate (g/ha) Compound A | | | | |
|---|---|---|---|---|---|---|
| | | 7.5 | 10 | 0 | 7.5 | 10 |
| | | | | Flupyrsulfuron | | |
| | | 0 | 0 | 10 | 10 | 10 |
| TRZAS | Obs | 0 | 0 | 0 | 0 | 0 |
| | Exp | — | — | — | 0 | 0 |
| | Δ | | | | 0 | 0 |
| HORVS | Obs | 8 | 0 | 8 | 0 | 15 |
| | Exp | — | — | — | 14 | 8 |
| | Δ | | | | −14 | 8 |
| SASKR | Obs | 45 | 60 | 45 | 80 | 85 |
| | Exp | — | — | — | 70 | 78 |
| | Δ | | | | 10 | 7 |
| KCHSC | Obs | 50 | 58 | 15 | 94 | 90 |
| | Exp | — | — | — | 58 | 64 |
| | Δ | | | | 37 | 26 |
| CHEAL | Obs | 70 | 83 | 75 | 96 | 95 |
| | Exp | — | — | — | 93 | 96 |
| | Δ | | | | 4 | −1 |

TABLE 45-continued

Herbicidal Effects (% visual injury) of Compound A
and Flupyrsulfuron on weed and grain crops.

| | | Application rate (g/ha) | | | | |
|---|---|---|---|---|---|---|
| | | Compound A | | | | |
| | | 7.5 | 10 | 0 | 7.5 | 10 |
| | | Flupyrsulfuron | | | | |
| | | 0 | 0 | 10 | 10 | 10 |
| MATCH | Obs | 13 | 15 | 83 | 90 | 94 |
| | Exp | — | — | — | 85 | 85 |
| | Δ | | | | 5 | 9 | g/ha = grams per hectare
TRZAS = *Triticum aestivum* (spring wheat)
HORVS = *Hordeum vulgare* (spring barley)
SASKR = *Salsola kali* (Russian thistle)
KCHSC = *Kochia scoparia* (kochia)
CHEAL = *Chenopodium album* L. (common lambsquarters)
MATCH = *Matricaria chamomilla* (wild chamomile)

Example 46

Compositions comprising Compound A and nicosulfuron were tested to determine the efficacy of the compositions on undesirable vegetation species, including large crabgrass (DIGSA, *Digitaria sanguinalis*), wild oat (AVEFA, *Avena fatua*), annual ryegrass (LOLMG=*Lolium multiforum* subsp. *gaudini*), giant foxtail (SETFA, *Setaria faberi*), and nutsedge (CYPES, *Cyperus esculentus*).

The results are summarized in Table 46 below.

TABLE 46

Herbicidal Effects (% visual injury) of Compound A and Nicosulfuron on weeds.

| | | Application rate (g/ha) | | | | |
|---|---|---|---|---|---|---|
| | | Compound A | | | | |
| | | 7.5 | 10 | 0 | 7.5 | 10 |
| | | Nicosulfuron | | | | |
| | | 0 | 0 | 20 | 20 | 20 |
| DIGSA | Obs | 0 | 0 | 65 | 80 | 83 |
| | Exp | — | — | — | 65 | 65 |
| | Δ | | | | 15 | 18 |
| AVEFA | Obs | 0 | 0 | 96 | 99 | 99 |
| | Exp | — | — | — | 6 | 6 |
| | Δ | | | | 3 | 3 |
| LOLMG | Obs | 0 | 3 | 96 | 100 | 100 |
| | Exp | — | — | — | 96 | 96 |
| | Δ | | | | 4 | 4 |
| SETFA | Obs | 0 | 0 | 100 | 100 | 99 |
| | Exp | — | — | — | 100 | 100 |
| | Δ | | | | 0 | −2 |
| CYPES | Obs | 40 | 45 | 40 | 70 | 68 |
| | Exp | — | — | — | 64 | 67 |
| | Δ | | | | 6 | 1 | g/ha = grams per hectare
DIGSA = *Digitaria sanguinalis* (large crabgrass)
AVEFA = *Avena fatua* (wild oat)
LOLMG = *Lolium multiflorum* subsp. *gaudini* (annual ryegrass)
SETFA = *Setaria faberi* (giant foxtail)
CYPES = *Cyperus esculentus* (nutsedge)

Example 47

Compositions comprising Compound A and imazamox were tested to determine the efficacy of the compositions on undesirable vegetation species, including wild pansy (VIOTR, *Viola* tricolor) and Canadian thistle (CIRAR, *Cirsium arvense*).

The results are summarized in Table 47 below.

TABLE 47

Herbicidal Effects (% visual injury) of Compound A and Imazamox on weeds.

| | | Application rate (g/ha) | | | | |
|---|---|---|---|---|---|---|
| | | Compound A | | | | |
| | | 7.5 | 10 | 0 | 7.5 | 10 |
| | | Imazamox | | | | |
| | | 0 | 0 | 17.5 | 17.5 | 17.5 |
| VIOTR | Obs | 15 | 23 | 75 | 80 | 85 |
| | Exp | — | — | — | 79 | 81 |
| | Δ | | | | 1 | 4 |
| CIRAR | Obs | 15 | 43 | 63 | 88 | 93 |
| | Exp | — | — | — | 68 | 78 |
| | Δ | | | | 19 | 14 | g/ha = grams per hectare
VIOTR = *Viola tricolor* (wild pansy)
CIRAR = *Cirsium arvense* (Canadian thistle)

Example 48

Compositions comprising Compound A and imazapyr were tested to determine the efficacy of the compositions on undesirable vegetation species, including wild pansy (VIOTR, *Viola* tricolor), kochia (KCHSC, *Kochia scoparia*), and Canadian thistle (CIRAR, *Cirsium arvense*).

The results are summarized in Table 48 below.

TABLE 48

Herbicidal Effects (% visual injury) of Compound A and Imazapyr on weeds.

| | | Application rate (g/ha) | | | | |
|---|---|---|---|---|---|---|
| | | Compound A | | | | |
| | | 7.5 | 10 | 0 | 7.5 | 10 |
| | | Imazapyr | | | | |
| | | 0 | 0 | 140 | 140 | 140 |
| VIOTR | Obs | 15 | 23 | 63 | 73 | 83 |
| | Exp | — | — | — | 68 | 71 |
| | Δ | | | | 4 | 12 |
| KCHSC | Obs | 60 | 68 | 54 | 99 | 99 |
| | Exp | — | — | — | 81 | 85 |
| | Δ | | | | 17 | 14 |
| CIRAR | Obs | 15 | 43 | 80 | 85 | 89 |
| | Exp | — | — | — | 83 | 89 |
| | Δ | | | | 2 | 0 | g/ha = grams per hectare
VIOTR = *Viola tricolor* (wild pansy)
KCHSC = *Kochia scoparia* (kochia)
CIRAR = *Cirsium arvense* (Canadian thistle)

Example 49

Compositions comprising Compound A and imazethapyr were tested to determine the efficacy of the compositions on undesirable vegetation species, including kochia (KCHSC, *Kochia scoparia*), Russian thistle (SASKR, *Salsola kali*), common lambsquarters (CHEAL, *Chenopodium album* L.), wild chamomile (MATCH, *Matricaria chamomilla*), and Canadian thistle (CIRAR, *Cirsium arvense*).

The results are summarized in Table 49 below.

TABLE 49

Herbicidal Effects (% visual injury) of Compound A and Imazethapyr on weeds.

| | | Application rate (g/ha) | | | | |
|---|---|---|---|---|---|---|
| | | Compound A | | | | |
| | | 7.5 | 10 | 0 | 7.5 | 10 |
| | | | | Imazethapyr | | |
| | | 0 | 0 | 35 | 35 | 35 |
| KCHSC | Obs | 50 | 55 | 53 | 80 | 89 |
| | Exp | — | — | — | 76 | 79 |
| | Δ | | | | 4 | 10 |
| SASKR | Obs | 38 | 63 | 40 | 88 | 85 |
| | Exp | — | — | — | 63 | 78 |
| | Δ | | | | 25 | 8 |
| CHEAL | Obs | 60 | 90 | 28 | 89 | 93 |
| | Exp | — | — | — | 71 | 93 |
| | Δ | | | | 18 | 0 |
| MATCH | Obs | 0 | 33 | 18 | 63 | 60 |
| | Exp | — | — | — | 18 | 44 |
| | Δ | | | | 45 | 16 |
| CIRAR | Obs | 10 | 23 | 40 | 60 | 55 |
| | Exp | — | — | — | 46 | 54 |
| | Δ | | | | 14 | 2 | g/ha = grams per hectare
KCHSC = *Kochia scoparia* (kochia)
SASKR = *Salsola kali* (Russian thistle)
CHEAL = *Chenopodium album* L. (common lambsquarters)
MATCH = *Matricaria chamomilla* (wild chamomile)
CIRAR = *Cirsium arvense* (Canadian thistle)

Example 50

Compositions comprising Compound A and pyriminobac were tested to determine the efficacy of the compositions on undesirable vegetation species, including spring rape (BRSNN, *Brassica napus*), wild mustard (SINAR, *Sinapis arvensis*), kochia (KCHSC, *Kochia scoparia*), Russian thistle (SASKR, *Salsola kali*), common lambsquarters (CHEAL, *Chenopodium album* L.), wild chamomile (MATCH, *Matricaria chamomilla*), and Canadian thistle (CIRAR, *Cirsium arvense*). The compositions were also tested on spring wheat (TRZAS) and spring barley (HORVS), and the phytotoxicity of the compositions on each crop was measured.

The results are summarized in Table 50 below.

TABLE 50

Herbicidal Effects (% visual injury) of Compound A and Pyriminobac on weed and grain crops.

| | | Application rate (g/ha) | | | | |
|---|---|---|---|---|---|---|
| | | Compound A | | | | |
| | | 7.5 | 10 | 0 | 7.5 | 10 |
| | | | | Pyriminobac | | |
| | | 0 | 0 | 17.5 | 17.5 | 17.5 |
| TRZAS | Obs | 0 | 0 | 0 | 0 | 0 |
| | Exp | — | — | — | 0 | 0 |
| | Δ | | | | 0 | 0 |
| HORVS | Obs | 0 | 0 | 0 | 0 | 0 |
| | Exp | — | — | — | 0 | 0 |
| | Δ | | | | 0 | 0 |
| BRSNN | Obs | 55 | 70 | 0 | 80 | 83 |
| | Exp | — | — | — | 55 | 70 |
| | Δ | | | | 25 | 13 |
| SINAR | Obs | 85 | 90 | 5 | 100 | 100 |
| | Exp | — | — | — | 86 | 91 |
| | Δ | | | | 14 | 10 |
| KCHSC | Obs | 50 | 55 | 0 | 65 | 65 |
| | Exp | — | — | — | 50 | 55 |
| | Δ | | | | 15 | 10 |
| SASKR | Obs | 38 | 63 | 0 | 75 | 80 |
| | Exp | — | — | — | 38 | 63 |
| | Δ | | | | 38 | 18 |
| CHEAL | Obs | 60 | 90 | 5 | 90 | 93 |
| | Exp | — | — | — | 62 | 91 |
| | Δ | | | | 28 | 2 |
| MATCH | Obs | 0 | 33 | 5 | 79 | 81 |
| | Exp | — | — | — | 5 | 36 |
| | Δ | | | | 74 | 45 |
| CIRAR | Obs | 10 | 23 | 0 | 50 | 50 |
| | Exp | — | — | — | 10 | 23 |
| | Δ | | | | 40 | 28 | g/ha = grams per hectare
TRZAS = *Triticum aestivum* (spring wheat)
HORVS = *Hordeum vulgare* (spring barley)
BRSNN = *Brassica napus* (spring rape)
SINAR = *Sinapis arvensis* (wild mustard)
KCHSC = *Kochia scoparia* (kochia)
SASKR = *Salsola kali* (Russian thistle)
CHEAL = *Chenopodium album* L. (common lambsquarters)
MATCH = *Matricaria chamomilla* (wild chamomile)
CIRAR = *Cirsium arvense* (Canadian thistle)

Example 51

Compositions comprising Compound A and pyriftalid were tested to determine the efficacy of the compositions on undesirable vegetation species, including spring rape (BRSNN, *Brassica napus*), wild mustard (SINAR, *Sinapis arvensis*), Russian thistle (SASKR, *Salsola kali*), kochia (KCHSC, *Kochia scoparia*), and wild chamomile (MATCH, *Matricaria chamomilla*). The compositions were also tested on spring wheat (TRZAS) and spring barley (HORVS), and the phytotoxicity of the compositions on each crop was measured.

The results are summarized in Table 51 below.

TABLE 51

Herbicidal Effects (% visual injury) of Compound A and Pyriftalid on weed and grain crops.

| | | Application rate (g/ha) | | | | |
|---|---|---|---|---|---|---|
| | | Compound A | | | | |
| | | 7.5 | 10 | 0 | 7.5 | 10 |
| | | | | Pyriftalid | | |
| | | 0 | 0 | 30 | 30 | 30 |
| TRZAS | Obs | 0 | 0 | 0 | 0 | 0 |
| | Exp | — | — | — | 0 | 0 |
| | Δ | | | | 0 | 0 |

TABLE 51-continued

Herbicidal Effects (% visual injury) of Compound A and Pyriftalid on weed and grain crops.

| | | Application rate (g/ha) | | | | |
|---|---|---|---|---|---|---|
| | | Compound A | | | | |
| | | 7.5 | 10 | 0 | 7.5 | 10 |
| | | | | Pyriftalid | | |
| | | 0 | 0 | 30 | 30 | 30 |
| HORVS | Obs | 8 | 0 | 5 | 8 | 13 |
| | Exp | — | — | — | 12 | 5 |
| | Δ | | | | −5 | 8 |
| BRSNN | Obs | 55 | 60 | 18 | 73 | 70 |
| | Exp | — | — | — | 63 | 67 |
| | Δ | | | | 10 | 3 |
| SINAR | Obs | 88 | 92 | 23 | 97 | 98 |
| | Exp | — | — | — | 90 | 93 |
| | Δ | | | | 7 | 4 |
| SASKR | Obs | 45 | 60 | 0 | 65 | 68 |
| | Exp | — | — | — | 45 | 60 |
| | Δ | | | | 20 | 8 |
| KCHSC | Obs | 50 | 58 | 0 | 65 | 70 |
| | Exp | — | — | — | 50 | 58 |
| | Δ | | | | 15 | 13 |
| MATCH | Obs | 13 | 15 | 0 | 30 | 45 |
| | Exp | | | | 13 | 15 |
| | Δ | | | | 18 | 30 | g/ha = grams per hectare
TRZAS = *Triticum aestivum* (spring wheat)
HORVS = *Hordeum vulgare* (spring barley)
BRSNN = *Brassica napus* (spring rape)
SINAR = *Sinapis arvensis* (wild mustard)
SASKR = *Salsola kali* (Russian thistle)
KCHSC = *Kochia scoparia* (kochia)
MATCH = *Matricaria chamomilla* (wild chamomile)

Example 52

Compositions comprising Compound A, mesosulfuron, and iodosulfuron were tested to determine the efficacy of the compositions on undesirable vegetation species, including large crabgrass (DIGSA, *Digitaria sanguinalis*), annual ryegrass (LOLMG=*Lolium multiflorum* subsp. *gaudini*), and giant foxtail (SETFA, *Setaria faberi*).

The results are summarized in Table 52 below.

TABLE 52

Herbicidal Effects (% visual injury) of Compound A, Mesosulfuron, and Iodosulfuron on weeds.

| | | Application rate (g/ha) | | | | |
|---|---|---|---|---|---|---|
| | | Compound A | | | | |
| | | 7.5 | 10 | 0 | 7.5 | 10 |
| | | | | Mesosulfuron | | |
| | | 0 | 0 | 2.1 | 2.1 | 2.1 |
| | | | | Iodosulfuron | | |
| | | 0 | 0 | 0.4 | 0.4 | 0.4 |
| DIGSA | Obs | 0 | 0 | 0 | 20 | 0 |
| | Exp | — | — | — | 0 | 0 |
| | Δ | | | | 20 | 0 |
| LOLMG | Obs | 0 | 3 | 88 | 90 | 96 |
| | Exp | — | — | — | 88 | 88 |
| | Δ | | | | 3 | 8 |
| SETFA | Obs | 0 | 0 | 63 | 85 | 89 |
| | Exp | — | — | — | 63 | 63 |
| | Δ | | | | 23 | 27 | g/ha = grams per hectare
DIGSA = *Digitaria sanguinalis* (large crabgrass)
LOLMG = *Lolium multiflorum* subsp. *gaudini* (annual ryegrass)
SETFA = *Setaria faberi* (giant foxtail)

Example 53

Compositions comprising Compound A, mesosulfuron, and iodosulfuron were tested to determine the efficacy of the compositions on undesirable vegetation species, including velvetleaf (ABUTH, *Abutilon theophrasti*), wild buckwheat (POLCO, *Polygonum convolvulus*), poinsettia (EPHHL, *Euphorbia heterophylla*), and kochia (KCHSC, *Kochia scoparia*).

The results are summarized in Table 53 below.

TABLE 53

Herbicidal Effects (% visual injury) of Compound A, Mesosulfuron, and Iodosulfuron on weeds.

| | | Application rate (g/ha) | | | | |
|---|---|---|---|---|---|---|
| | | Compound A | | | | |
| | | 7.5 | 10 | 0 | 7.5 | 10 |
| | | | | Mesosulfuron | | |
| | | 0 | 0 | 2.1 | 2.1 | 2.1 |
| | | | | Iodosulfuron | | |
| | | 0 | 0 | 0.4 | 0.4 | 0.4 |
| ABUTH | Obs | 40 | 48 | 73 | 80 | 91 |
| | Exp | — | — | — | 84 | 86 |
| | Δ | | | | −4 | 5 |
| POLCO | Obs | 68 | 70 | 0 | 60 | 80 |
| | Exp | — | — | — | 68 | 70 |
| | Δ | | | | −8 | 10 |
| EPHHL | Obs | 91 | 83 | 60 | 93 | 97 |
| | Exp | — | — | — | 96 | 93 |
| | Δ | | | | −4 | 4 |
| KCHSC | Obs | 63 | 65 | 5 | 85 | 85 |
| | Exp | — | — | — | 64 | 67 |
| | Δ | | | | 21 | 18 | g/ha = grams per hectare
ABUTH = *Abutilon theophrasti* (velvetleaf)
POLCO = *Polygonum convolvulus* (wild buckwheat)
EPHHL = *Euphorbia heterophylla* (poinsettia)
KCHSC = *Kochia scoparia* (kochia)

Example 54

Compositions comprising Compound A, florasulam, and pyroxsulam were tested to determine the efficacy of the compositions on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*). The compositions were also tested on spring barley (HORVS) and spring wheat (TRZAS), and the phytotoxicity of the compositions on each crop was measured.

The results are summarized in Table 54 below. In the table, an application rate of "X+Y" indicates that the application rate of florasulam is "X" and pyroxsulam is "Y."

TABLE 54

Herbicidal Effects (% visual injury) of Compound A and Florasulam + Pyroxsulam on weed and grain crops.

| | | Application rate (g/ha) | | | | |
|---|---|---|---|---|---|---|
| | | Compound A | | | | |
| | | 7.5 | 10 | 0 | 7.5 | 10 |
| | | | | Florasulam + Pyroxsulam | | |
| | | 0 | 0 | 3.75 + 10 | 3.75 + 10 | 3.75 + 10 |
| AMARE | Obs | 70 | 90 | 100 | 100 | 100 |
| | Exp | — | — | — | 100 | 100 |
| | Δ | | | | 0 | 0 |
| BRSNW | Obs | 63 | 68 | 100 | 100 | 100 |
| | Exp | — | — | — | 100 | 100 |
| | Δ | | | | 0 | 0 |
| CHEAL | Obs | 70 | 78 | 96 | 96 | 98 |
| | Exp | — | — | — | 99 | 99 |
| | Δ | | | | −3 | −2 |
| CIRAR | Obs | 18 | 30 | 68 | 90 | 93 |
| | Exp | — | — | — | 73 | 77 |
| | Δ | | | | 17 | 15 |
| KCHSC | Obs | 65 | 70 | 73 | 95 | 95 |
| | Exp | — | — | — | 90 | 92 |
| | Δ | | | | 5 | 3 |
| MATCH | Obs | 18 | 30 | 78 | 90 | 94 |
| | Exp | — | — | — | 81 | 84 |
| | Δ | | | | 9 | 10 |
| POLCO | Obs | 60 | 70 | 88 | 93 | 93 |
| | Exp | — | — | — | 95 | 96 |
| | Δ | | | | −3 | −4 |
| SINAR | Obs | 85 | 88 | 98 | 99 | 99 |
| | Exp | — | — | — | 100 | 100 |
| | Δ | | | | −1 | −1 |
| HORVS | Obs | 0 | 0 | 43 | 50 | 68 |
| | Exp | — | — | — | 43 | 43 |
| | Δ | | | | 8 | 25 |
| TRZAS | Obs | 0 | 0 | 0 | 0 | 0 |
| | Exp | — | — | — | 0 | 0 |
| | Δ | | | | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
TRZAS = *Triticum aestivum* (spring wheat)
HORVS = *Hordeum vulgare* (spring barley)

Example 55

Compositions comprising Compound A, florasulam, and pyroxsulam were tested to determine the efficacy of the compositions on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*). The compositions were also tested on spring barley (HORVS) and spring wheat (TRZAS), and the phytotoxicity of the compositions on each crop was measured.

The results are summarized in Table 55 below. In the table, an application rate of "X+Y" indicates that the application rate of florasulam is "X" and pyroxsulam is "Y."

TABLE 55

Herbicidal Effects (% visual injury) of Compound A and Florasulam + Pyroxsulam on weed and grain crops.

| | | Application rate (g/ha) | | | | |
|---|---|---|---|---|---|---|
| | | Compound A | | | | |
| | | 7.5 | 10 | 0 | 7.5 | 10 |
| | | | | Florasulam + Pyroxsulam | | |
| | | 0 | 0 | 3.75 + 10 | 3.75 + 10 | 3.75 + 10 |
| AMARE | Obs | 100 | 100 | 100 | 100 | 100 |
| | Exp | — | — | — | 100 | 100 |
| | Δ | | | | 0 | 0 |
| BRSNN | Obs | 55 | 55 | 100 | 100 | 100 |
| | Exp | — | — | — | 100 | 100 |
| | Δ | | | | 0 | 0 |
| CHEAL | Obs | 83 | 88 | 80 | 94 | 96 |
| | Exp | — | — | — | 97 | 98 |
| | Δ | | | | −3 | −2 |
| CIRAR | Obs | 18 | 20 | 83 | 90 | 93 |
| | Exp | — | — | — | 86 | 86 |
| | Δ | | | | 4 | 7 |
| KCHSC | Obs | 55 | 65 | 18 | 100 | 98 |
| | Exp | — | — | — | 63 | 71 |
| | Δ | | | | 37 | 27 |
| MATCH | Obs | 20 | 13 | 70 | 83 | 93 |
| | Exp | — | — | — | 76 | 74 |
| | Δ | | | | 7 | 19 |
| POLCO | Obs | 93 | 91 | 100 | 100 | 99 |
| | Exp | — | — | — | 100 | 100 |
| | Δ | | | | 0 | −2 |
| SASKR | Obs | 63 | 65 | 96 | 99 | 100 |
| | Exp | — | — | — | 99 | 99 |
| | Δ | | | | 0 | 1 |
| SINAR | Obs | 100 | 100 | 100 | 100 | 100 |
| | Exp | — | — | — | 100 | 100 |
| | Δ | | | | 0 | 0 |
| HORVS | Obs | 0 | 0 | 35 | 40 | 25 |
| | Exp | — | — | — | 35 | 35 |
| | Δ | | | | 5 | −10 |
| TRZAS | Obs | 0 | 0 | 0 | 0 | 0 |
| | Exp | — | — | — | 0 | 0 |
| | Δ | | | | 0 | 0 | g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 56

Compositions comprising Compound A (with the safener mefenpyr-diethyl instead of cloquintocet-mexyl), mesosulfuron, iodosulfuron, and thiencarbazone were tested to determine the efficacy of the compositions on undesirable vegetation species, including wild pansy (VIOTR, *Viola tricolor*), chickweed (STEME, *Stellaria media*), Canadian thistle (CIRAR, *Cirsium arvense*), broad-leaf dock (RUMOB, *Rumex obtusifolius*), spring rape (BRSNN, *Brassica napus*), kochia (KCHSC, *Kochia scoparia*), common sunflower (HELAN, *Helianthus annuus*), soybean (GLXMA, *Glycine max*), common lambsquarters (CHEAL, *Chenopodium album* L.), ivyleaf morningglory (IPOHE, *Ipomoea hederacea*), velvetleaf (ABUTH, *Abutilon theophrasti*), wild buckwheat (POLCO, *Polygonur convolvulus*), pigweed (AMARE, *Amaranthus retroflexus*), large crabgrass (DIGSA, *Digitaria sanguinalis*), giant foxtail (SETFA, *Setaria faberi*), blackgrass (ALOMY, *Alopecurus myosuroides*), Italian ryegrass (LOLMU, *Lolhum multiflorum*), nutsedge (CYPES, *Cyperus esculentus*), grain sorghum (SORVU, *Sorghum vulgare*), wild oat (AVEFA, *Avena fatua*), and barnyard grass (ECHCG, *Echinochloa crusgalli*). The compositions were also tested on rice (ORYSA, *Oryza sativa*), spring wheat (TRZAS), and maize (ZEAMX, *Zea mays*), and the phytotoxicity of the compositions on each crop was measured The results are summarized in Table 56 below. In the table, an application rate of "X+Y+Z" indicates that the application rate of mesosulfuron is "X," iodosulfuron is "Y," and thiencarbazone is "Z."

TABLE 56

Herbicidal Effects (% visual injury) of Compound A and Mesosulfuron + Iodosulfuron + Thiencarbazone on weed and grain crops.

| | | Application rate (g/ha) | | | | |
|---|---|---|---|---|---|---|
| | | Compound A | | | | |
| | | 7.5 | 10 | 0 | 7.5 | 10 |
| | | Mesosulfuron + Iodosulfuron + Thiencarbazone | | | | |
| | | 0 | 0 | 9 + 9 + 7.5 | 9 + 9 + 7.5 | 9 + 9 + 7.5 |
| VIOTR | Obs | 10 | 18 | 85 | 93 | 93 |
| | Exp | — | — | — | 87 | 88 |
| | Δ | | | | 6 | 5 |
| STEME | Obs | 88 | 83 | 100 | 100 | 100 |
| | Exp | — | — | — | 100 | 100 |
| | Δ | | | | 0 | 0 |
| CIRAR | Obs | 28 | 43 | 83 | 99 | 100 |
| | Exp | — | — | — | 87 | 90 |
| | Δ | | | | 11 | 10 |
| RUMOB | Obs | 20 | 20 | 100 | 100 | 100 |
| | Exp | — | — | — | 100 | 100 |
| | Δ | | | | 0 | 0 |
| BRSNN | Obs | 70 | 78 | 100 | 100 | 100 |
| | Exp | — | — | — | 100 | 100 |
| | Δ | | | | 0 | 0 |
| KCHSC | Obs | 68 | 70 | 85 | 85 | 96 |
| | Exp | — | — | — | 95 | 96 |
| | Δ | | | | -10 | 1 |
| HELAN | Obs | 100 | 98 | 100 | 100 | 100 |
| | Exp | — | — | — | 100 | 100 |
| | Δ | | | | 0 | 0 |
| GLXMA | Obs | 95 | 95 | 97 | 100 | 100 |
| | Exp | — | — | — | 100 | 100 |
| | Δ | | | | 0 | 0 |
| CHEAL | Obs | 100 | 100 | 100 | 99 | 99 |
| | Exp | — | — | — | 100 | 100 |
| | Δ | | | | -2 | -2 |
| IPOHE | Obs | 8 | 5 | 99 | 100 | 98 |
| | Exp | — | — | — | 99 | 99 |
| | Δ | | | | 1 | -1 |
| ABUTH | Obs | 68 | 73 | 95 | 96 | 96 |
| | Exp | — | — | — | 98 | 99 |
| | Δ | | | | -2 | -3 |
| POLCO | Obs | 100 | 100 | 70 | 98 | 100 |
| | Exp | — | — | — | 100 | 100 |
| | Δ | | | | -3 | 0 |
| AMARE | Obs | 93 | 98 | 100 | 100 | 100 |
| | Exp | — | — | — | 100 | 100 |
| | Δ | | | | 0 | 0 |
| DIGSA | Obs | 13 | 10 | 81 | 93 | 95 |
| | Exp | — | — | — | 83 | 83 |
| | Δ | | | | 9 | 12 |
| SETFA | Obs | 78 | 80 | 95 | 97 | 96 |
| | Exp | — | — | — | 99 | 99 |
| | Δ | | | | -2 | -3 |
| ALOMY | Obs | 0 | 13 | 97 | 98 | 99 |
| | Exp | — | — | — | 97 | 97 |
| | Δ | | | | 1 | 1 |
| LOLMU | Obs | 5 | 10 | 100 | 100 | 100 |
| | Exp | — | — | — | 100 | 100 |
| | Δ | | | | 0 | 0 |
| CYPES | Obs | 15 | 28 | 65 | 83 | 78 |
| | Exp | — | — | — | 70 | 75 |
| | Δ | | | | 12 | 3 |
| SORVU | Obs | 5 | 10 | 98 | 100 | 100 |
| | Exp | — | — | — | 98 | 98 |
| | Δ | | | | 2 | 2 |
| AVEFA | Obs | 0 | 0 | 98 | 100 | 99 |
| | Exp | — | — | — | 98 | 98 |
| | Δ | | | | 2 | 1 |
| ECHCG | Obs | 88 | 85 | 95 | 98 | 99 |
| | Exp | — | — | — | 99 | 99 |
| | Δ | | | | -2 | -1 |
| ORYSA | Obs | 3 | 5 | 50 | 80 | 80 |
| | Exp | — | — | — | 51 | 53 |
| | Δ | | | | 29 | 28 |
| TRZAS | Obs | 0 | 3 | 0 | 0 | 5 |
| | Exp | — | — | — | 0 | 3 |
| | Δ | | | | 0 | 3 |
| ZEAMX | Obs | 0 | 5 | 88 | 85 | 88 |
| | Exp | — | — | — | 88 | 88 |
| | Δ | | | | -3 | -1 | g/ha = grams per hectare
VIOTR = *Viola tricolor* (wild pansy)
STEME = *Stellaria media* (chickweed)
CIRAR = *Cirsium arvense* (Canadian thistle)
RUMOB = *Rumex obtusifolius* (broad-leaf dock)
BRSNN = *Brassica napus* (spring rape)
KCHSC = *Kochia scoparia* (kochia)
HELAN = *Helianthus annuus* (common sunflower)
GLXMA = *Glycine max* (soybean)
CHEAL = *Chenopodium album* L. (common lambsquarters)
IPOHE = *Ipomoea hederacea* (ivyleaf morningglory)
ABUTH = *Abutilon theophrasti* (velvetleaf)
POLCO = *Polygonum convolvulus* (wild buckwheat)
AMARE = *Amaranthus retroflexus* (pigweed)
DIGSA = *Digitaria sanguinalis* (large crabgrass)
SETFA = *Setaria faberi* (giant foxtail)
ALOMY = *Alopecurus myosuroides* (blackgrass)
LOLMU = *Lolium multiflorum* (Italian ryegrass)
CYPES = *Cyperus esculentus* (nutsedge)
SORVU = *Sorghum vulgare* (grain sorghum)
AVEFA = *Avena fatua* (wild oat)
ECHCG = *Echinochloa crus-galli* (barnyardgrass)
ORYSA = *Oryza sativa* (common rice)
TRZAS = *Triticum aestivum* (spring wheat)
ZEAMX = *Zea mays* (maize)

Example 57

Compositions comprising Compound A (with the safener mefenpyr-diethyl instead of cloquintocet-mexyl), amidosulfuron, and iodosulfuron were tested to determine the efficacy of the compositions on undesirable vegetation species, including wild pansy (VIOTR, *Viola tricolor*), chickweed (STEME, *Stellaria media*), Canadian thistle (CIRAR, *Cirsium arvense*), broad-leaf dock (RUMOB, *Rumex obtusifolius*), spring rape (BRSNN, *Brassica napus*), kochia (KCHSC, *Kochia scoparia*), common sunflower (HELAN, *Helianthus annuus*), soybean (GLXMA, *Glycine max*), common lambsquarters (CHEAL, *Chenopodium album* L.), ivyleaf morningglory (IPOHE, *Ipomoea hederacea*), velvetleaf (ABUTH, *Abutilon theophrasti*), wild buckwheat (POLCO, *Polygonum convolvulus*), pigweed (AMARE, *Amaranthus retroflexus*), large crabgrass (DIGSA, *Digitaria sanguinalis*), giant foxtail (SETFA, *Setaria faberi*), blackgrass (ALOMY, *Alopecurus myosuroides*), Italian ryegrass (LOLMU, *Lolium multiflorum*), nutsedge (CYPES, *Cyperus esculentus*), grain sorghum (SORVU, *Sorghum vulgare*), wild oat (AVEFA, *Avena fatua*), and barnyard grass (ECHCG, *Echinochloa crus-galli*). The compositions were also tested on rice (ORYSA, *Oryza sativa*), spring wheat (TRZAS), and maize (ZEAMX, *Zea mays*), and the phytotoxicity of the compositions on each crop was measured The results are summarized in Table 57 below. In the table, an application rate of "X+Y" indicates that the application rate of amidosulfuron is "X" and iodosulfuron is "Y."

TABLE 57

Herbicidal Effects (% visual injury) of Compound A and Amidosulfuron + Iodosulfuron on weed and grain crops.

| | | Application rate (g/ha) | | | | |
|---|---|---|---|---|---|---|
| | | Compound A | | | | |
| | | 7.5 | 10 | 0 | 7.5 | 10 |
| | | Amidosulfuron + Iodosulfuron | | | | |
| | | 0 | 0 | 25 + 25 | 25 + 25 | 25 + 25 |
| VIOTR | Obs | 10 | 18 | 73 | 78 | 70 |
| | Exp | — | — | — | 75 | 77 |
| | Δ | | | | 2 | −7 |
| STEME | Obs | 88 | 83 | 100 | 100 | 100 |
| | Exp | — | — | — | 100 | 100 |
| | Δ | | | | −1 | 0 |
| CIRAR | Obs | 28 | 43 | 68 | 95 | 90 |
| | Exp | — | — | — | 76 | 81 |
| | Δ | | | | 19 | 9 |
| RUMOB | Obs | 20 | 20 | 90 | 98 | 98 |
| | Exp | — | — | — | 92 | 92 |
| | Δ | | | | 6 | 6 |
| BRSNN | Obs | 70 | 78 | 98 | 99 | 100 |
| | Exp | — | — | — | 99 | 99 |
| | Δ | | | | −1 | 1 |
| KCHSC | Obs | 68 | 70 | 30 | 88 | 88 |
| | Exp | — | — | — | 77 | 79 |
| | Δ | | | | 10 | 9 |
| HELAN | Obs | 100 | 98 | 99 | 100 | 100 |
| | Exp | — | — | — | 100 | 100 |
| | Δ | | | | 0 | 0 |
| GLXMA | Obs | 95 | 95 | 95 | 100 | 100 |
| | Exp | — | — | — | 100 | 100 |
| | Δ | | | | 0 | 0 |
| CHEAL | Obs | 100 | 100 | 88 | 100 | 93 |
| | Exp | — | — | — | 100 | 100 |
| | Δ | | | | 0 | −8 |
| IPOHE | Obs | 8 | 5 | 83 | 93 | 91 |
| | Exp | — | — | — | 84 | 83 |
| | Δ | | | | 9 | 8 |
| ABUTH | Obs | 68 | 73 | 88 | 95 | 95 |
| | Exp | — | — | — | 96 | 97 |
| | Δ | | | | −1 | −2 |
| POLCO | Obs | 100 | 100 | 73 | 88 | 93 |
| | Exp | — | — | — | 100 | 100 |
| | Δ | | | | −13 | −8 |
| AMARE | Obs | 93 | 98 | 98 | 100 | 100 |
| | Exp | — | — | — | 100 | 100 |
| | Δ | | | | 0 | 0 |
| DIGSA | Obs | 13 | 10 | 0 | 10 | 5 |
| | Exp | — | — | — | 13 | 10 |
| | Δ | | | | −3 | −5 |
| SETFA | Obs | 78 | 80 | 0 | 80 | 85 |
| | Exp | — | — | — | 78 | 80 |
| | Δ | | | | 3 | 5 |
| ALOMY | Obs | 0 | 13 | 0 | 0 | 0 |
| | Exp | — | — | — | 0 | 13 |
| | Δ | | | | 0 | −13 |
| LOLMU | Obs | 5 | 10 | 63 | 75 | 83 |
| | Exp | — | — | — | 64 | 66 |
| | Δ | | | | 11 | 16 |
| CYPES | Obs | 15 | 28 | 60 | 68 | 58 |
| | Exp | — | — | — | 66 | 71 |
| | Δ | | | | 2 | −14 |
| SORVU | Obs | 5 | 10 | 0 | 8 | 8 |
| | Exp | — | — | — | 5 | 10 |
| | Δ | | | | 3 | −3 |
| AVEFA | Obs | 0 | 0 | 0 | 5 | 0 |
| | Exp | — | — | — | 0 | 0 |
| | Δ | | | | 5 | 0 |
| ECHCG | Obs | 88 | 85 | 0 | 70 | 85 |
| | Exp | — | — | — | 88 | 85 |
| | Δ | | | | −18 | 0 |
| ORYSA | Obs | 3 | 5 | 0 | 5 | 5 |
| | Exp | — | — | — | 3 | 5 |
| | Δ | | | | 3 | 0 |
| TRZAS | Obs | 0 | 3 | 0 | 0 | 0 |
| | Exp | — | — | — | 0 | 3 |
| | Δ | | | | 0 | −3 |
| ZEAMX | Obs | 0 | 5 | 0 | 0 | 0 |
| | Exp | — | — | — | 0 | 5 |
| | Δ | | | | 0 | −5 | g/ha = grams per hectare
VIOTR = *Viola tricolor* (wild pansy)
STEME = *Stellaria media* (chickweed)
CIRAR = *Cirsium arvense* (Canadian thistle)
RUMOB = *Rumex obtusifolius* (broad-leaf dock)
BRSNN = *Brassica napus* (spring rape)
KCHSC = *Kochia scoparia* (kochia)
HELAN = *Helianthus annuus* (common sunflower)
GLXMA = *Glycine max* (soybean)
CHEAL = *Chenopodium album* L. (common lambsquarters)
IPOHE = *Ipomoea hederacea* (ivyleaf morningglory)
ABUTH = *Abutilon theophrasti* (velvetleaf)
POLCO = *Polygonum convolvulus* (wild buckwheat)
AMARE = *Amaranthus retroflexus* (pigweed)
DIGSA = *Digitaria sanguinalis* (large crabgrass)
SETFA = *Setaria faberi* (giant foxtail)
ALOMY = *Alopecurus myosuroides* (blackgrass)
LOLMU = *Lolium multiflorum* (Italian ryegrass)
CYPES = *Cyperus esculentus* (nutsedge)
SORVU = *Sorghum vulgare* (grain sorghum)
AVEFA = *Avena fatua* (wild oat)
ECHCG = *Echinochloa crus-galli* (barnyardgrass)
ORYSA = *Oryza sativa* (common rice)
TRZAS = *Triticum aestivum* (spring wheat)
ZEAMX = *Zea mays* (maize)

Example 58

Compositions comprising Compound A (with the safener mefenpyr-diethyl instead of cloquintocet-mexyl), mesosulfuron, iodosulfuron, and amidosulfuron were tested to determine the efficacy of the compositions on undesirable vegetation species, including wild pansy (VIOTR, *Viola tricolor*), chickweed (STEME, *Stellaria media*), Canadian thistle (CIRAR, *Cirsium arvense*), broad-leaf dock (RUMOB, *Rumex obtusifolius*), spring rape (BRSNN, *Brassica napus*), kochia (KCHSC, *Kochia scoparia*), common sunflower (HELAN, *Helianthus annuus*), soybean (GLXMA, *Glycine max*), common lambsquarters (CHEAL, *Chenopodium album* L.), ivyleaf morningglory (IPOHE, *Ipomoea hederacea*), velvetleaf (ABUTH, *Abutilon theophrasti*), wild buckwheat (POLCO, *Polygonum convolvulus*), pigweed (AMARE, *Amaranthus retroflexus*), large crabgrass (DIGSA, *Digitaria sanguinalis*), giant foxtail (SETFA, *Setaria faberi*), blackgrass (ALOMY, *Alopecurus myosuroides*), Italian ryegrass (LOLMU, *Lolium multiflorum*), nutsedge (CYPES, *Cyperus esculentus*), grain sorghum (SORVU, *Sorghum vulgare*), wild oat (AVEFA, *Avena fatua*), and barnyard grass (ECHCG, *Echinochloa crus-galli*). The compositions were also tested on rice (ORYSA, *Oryza sativa*), spring wheat (TRZAS), and maize (ZEAMX, *Zea mays*), and the phytotoxicity of the compositions on each crop was measured.

The results are summarized in Table 58 below. In the table, an application rate of "X+Y+Z" indicates that the application rate of mesosulfuron is "X," iodosulfuron is "Y," and amidosulfurone is "Z."

TABLE 58

Herbicidal Effects (% visual injury) of Compound A and Mesosulfuron + Iodosulfuron + Amidosulfuron on weed and grain crops.

| | | Application rate (g/ha) | | | | |
|---|---|---|---|---|---|---|
| | | Compound A | | | | |
| | | 7.5 | 10 | 0 | 7.5 | 10 |
| | | Mesosulfuron + Iodosulfuron + Amidosulfurone | | | | |
| | | 0 | 0 | 9 + 3 + 15 | 9 + 3 + 15 | 9 + 3 + 15 |
| VIOTR | Obs | 10 | 18 | 80 | 88 | 89 |
| | Exp | — | — | — | 82 | 84 |
| | Δ | | | | 6 | 6 |
| STEME | Obs | 88 | 83 | 100 | 98 | 100 |
| | Exp | — | — | — | 100 | 100 |
| | Δ | | | | −3 | −1 |
| CIRAR | Obs | 28 | 43 | 80 | 99 | 96 |
| | Exp | — | — | — | 86 | 89 |
| | Δ | | | | 13 | 8 |
| RUMOB | Obs | 20 | 20 | 100 | 100 | 98 |
| | Exp | — | — | — | 100 | 100 |
| | Δ | | | | 0 | −3 |
| BRSNN | Obs | 70 | 78 | 100 | 100 | 100 |
| | Exp | — | — | — | 100 | 100 |
| | Δ | | | | 0 | 0 |
| KCHSC | Obs | 68 | 70 | 78 | 89 | 96 |
| | Exp | — | — | — | 93 | 93 |
| | Δ | | | | −4 | 3 |
| HELAN | Obs | 100 | 98 | 100 | 100 | 100 |
| | Exp | — | — | — | 100 | 100 |
| | Δ | | | | 0 | 0 |
| GLXMA | Obs | 95 | 95 | 96 | 100 | 100 |
| | Exp | — | — | — | 100 | 100 |
| | Δ | | | | 0 | 0 |
| CHEAL | Obs | 100 | 100 | 99 | 100 | 98 |
| | Exp | — | — | — | 100 | 100 |
| | Δ | | | | 0 | −3 |
| IPOHE | Obs | 8 | 5 | 88 | 100 | 100 |
| | Exp | — | — | — | 88 | 88 |
| | Δ | | | | 12 | 12 |
| ABUTH | Obs | 68 | 73 | 98 | 98 | 96 |
| | Exp | — | — | — | 99 | 99 |
| | Δ | | | | −1 | −3 |
| POLCO | Obs | 100 | 100 | 78 | 98 | 93 |
| | Exp | — | — | — | 100 | 100 |
| | Δ | | | | −3 | −8 |
| AMARE | Obs | 93 | 98 | 93 | 99 | 100 |
| | Exp | — | — | — | 99 | 100 |
| | Δ | | | | −1 | 0 |
| DIGSA | Obs | 13 | 10 | 0 | 20 | 23 |
| | Exp | — | — | — | 13 | 10 |
| | Δ | | | | 8 | 13 |
| SETFA | Obs | 78 | 80 | 90 | 93 | 85 |
| | Exp | — | — | — | 98 | 98 |
| | Δ | | | | −5 | −13 |
| ALOMY | Obs | 0 | 13 | 96 | 96 | 99 |
| | Exp | — | — | — | 96 | 97 |
| | Δ | | | | 0 | 2 |
| LOLMU | Obs | 5 | 10 | 96 | 97 | 99 |
| | Exp | — | — | — | 96 | 96 |
| | Δ | | | | 1 | 2 |
| CYPES | Obs | 15 | 28 | 63 | 80 | 78 |
| | Exp | — | — | — | 68 | 73 |
| | Δ | | | | 12 | 5 |
| SORVU | Obs | 5 | 10 | 96 | 100 | 100 |
| | Exp | — | — | — | 96 | 96 |
| | Δ | | | | 4 | 4 |
| AVEFA | Obs | 0 | 0 | 96 | 100 | 100 |
| | Exp | — | — | — | 96 | 96 |
| | Δ | | | | 4 | 4 |
| ECHCG | Obs | 88 | 85 | 45 | 83 | 78 |
| | Exp | — | — | — | 93 | 92 |
| | Δ | | | | −11 | −14 |
| ORYSA | Obs | 3 | 5 | 40 | 45 | 25 |
| | Exp | — | — | — | 42 | 43 |
| | Δ | | | | 4 | −18 |
| TRZAS | Obs | 0 | 3 | 0 | 0 | 0 |
| | Exp | — | — | — | 0 | 3 |
| | Δ | | | | 0 | −3 |
| ZEAMX | Obs | 0 | 5 | 75 | 85 | 85 |
| | Exp | — | — | — | 75 | 76 |
| | Δ | | | | 10 | 9 | g/ha = grams per hectare
VIOTR = *Viola tricolor* (wild pansy)
STEME = *Stellaria media* (chickweed)
CIRAR = *Cirsium arvense* (Canadian thistle)
RUMOB = *Rumex obtusifolius* (broad-leaf dock)
BRSNN = *Brassica napus* (spring rape)
KCHSC = *Kochia scoparia* (kochia)
HELAN = *Helianthus annuus* (common sunflower)
GLXMA = *Glycine max* (soybean)
CHEAL = *Chenopodium album* L. (common lambsquarters)
IPOHE = *Ipomoea hederacea* (ivyleaf morningglory)
ABUTH = *Abutilon theophrasti* (velvetleaf)
POLCO = *Polygonum convolvulus* (wild buckwheat)
AMARE = *Amaranthus retroflexus* (pigweed)
DIGSA = *Digitaria sanguinalis* (large crabgrass)
SETFA = *Setaria faberi* (giant foxtail)
ALOMY = *Alopecurus myosuroides* (blackgrass)
LOLMU = *Lolium multiflorum* (Italian ryegrass)
CYPES = *Cyperus esculentus* (nutsedge)
SORVU = *Sorghum vulgare* (grain sorghum)
AVEFA = *Avena fatua* (wild oat)
ECHCG = *Echinochloa crus-galli* (barnyardgrass)
ORYSA = *Oryza sativa* (common rice)
TRZAS = *Triticum aestivum* (spring wheat)
ZEAMX = *Zea mays* (maize)

Example 59

Compositions comprising Compound A (with the safener mefenpyr-diethyl instead of cloquintocet-mexyl), iodosulfuron, and propoxycarbazone were tested to determine the efficacy of the compositions on undesirable vegetation species, including wild pansy (VIOTR, *Viola* tricolor), chickweed (STEME, *Stellaria media*), Canadian thistle (CIRAR, *Cirsium arvense*), broad-leaf dock (RUMOB, *Rumex obtusifolius*), spring rape (BRSNN, *Brassica napus*), kochia (KCHSC, *Kochia scoparia*), common sunflower (HELAN, *Helianthus annuus*), soybean (GLXMA, *Glycine max*), common lambsquarters (CHEAL, *Chenopodium album* L.), ivyleaf morningglory (IPOHE, *Ipomoea hederacea*), velvetleaf (ABUTH, *Abutilon theophrasti*), wild buckwheat (POLCO, *Polygonum convolvulus*), pigweed (AMARE, *Amaranthus retroflexus*), large crabgrass (DIGSA, *Digitaria sanguinalis*), giant foxtail (SETFA, *Setaria faberi*), blackgrass (ALOMY, *Alopecurus myosuroides*), Italian ryegrass (LOLMU, *Lolium multiflorum*), nutsedge (CYPES, *Cyperus esculentus*), grain sorghum (SORVU, *Sorghum vulgare*), wild oat (AVEFA, *Avena fatua*), and barnyard grass (ECHCG, *Echinochloa crus-galli*). The compositions were also tested on rice (ORYSA, *Oryza sativa*), spring wheat (TRZAS), and maize (ZEAMX, *Zea mays*), and the phytotoxicity of the compositions on each crop was measured The results are summarized in Table 59 below. In the table, an application rate of "X+Y" indicates that the application rate of iodosulfuron is "X" and propoxycarbazone is "Y."

TABLE 59

Herbicidal Effects (% visual injury) of Compound A and Iodosulfuron + Propoxycarbazone on weed and grain crops.

| Application rate (g/ha) | Compound A<br>Iodosulfuron + Propoxycarbazone | | 7.5<br>0 | 10<br>0 | 0<br>3 + 50.4 | 7.5<br>3 + 50.4 | 10<br>3 + 50.4 |
|---|---|---|---|---|---|---|---|
| VIOTR | Obs | | 10 | 18 | 78 | 78 | 80 |
| | Exp | | — | — | — | 80 | 81 |
| | Δ | | | | | −2 | −1 |
| STEME | Obs | | 88 | 83 | 98 | 98 | 100 |
| | Exp | | — | — | — | 100 | 100 |
| | Δ | | | | | −2 | 0 |
| CIRAR | Obs | | 28 | 43 | 98 | 95 | 95 |
| | Exp | | — | — | — | 98 | 99 |
| | Δ | | | | | −3 | −4 |
| RUMOB | Obs | | 20 | 20 | 92 | 94 | 100 |
| | Exp | | — | — | — | 94 | 94 |
| | Δ | | | | | 0 | 6 |
| BRSNN | Obs | | 70 | 78 | 100 | 100 | 98 |
| | Exp | | — | — | — | 100 | 100 |
| | Δ | | | | | 0 | −3 |
| KCHSC | Obs | | 68 | 70 | 48 | 93 | 96 |
| | Exp | | — | — | — | 83 | 84 |
| | Δ | | | | | 10 | 12 |
| HELAN | Obs | | 100 | 98 | 100 | 100 | 100 |
| | Exp | | — | — | — | 100 | 100 |
| | Δ | | | | | 0 | 0 |
| GLXMA | Obs | | 95 | 95 | 95 | 100 | 100 |
| | Exp | | — | — | — | 100 | 100 |
| | Δ | | | | | 0 | 0 |
| CHEAL | Obs | | 100 | 100 | 92 | 95 | 100 |
| | Exp | | — | — | — | 100 | 100 |
| | Δ | | | | | −5 | 0 |
| IPOHE | Obs | | 8 | 5 | 94 | 100 | 100 |
| | Exp | | — | — | — | 94 | 94 |
| | Δ | | | | | 6 | 6 |
| ABUTH | Obs | | 68 | 73 | 85 | 93 | 96 |
| | Exp | | — | — | — | 95 | 96 |
| | Δ | | | | | −3 | 0 |
| POLCO | Obs | | 100 | 100 | 70 | 88 | 100 |
| | Exp | | — | — | — | 100 | 100 |
| | Δ | | | | | −13 | −1 |
| AMARE | Obs | | 93 | 98 | 90 | 100 | 100 |
| | Exp | | — | — | — | 99 | 100 |
| | Δ | | | | | 1 | 0 |
| DIGSA | Obs | | 13 | 10 | 0 | 5 | 10 |
| | Exp | | — | — | — | 13 | 10 |
| | Δ | | | | | −8 | 0 |
| SETFA | Obs | | 78 | 80 | 0 | 70 | 73 |
| | Exp | | — | — | — | 78 | 80 |
| | Δ | | | | | −8 | −8 |
| ALOMY | Obs | | 0 | 13 | 80 | 95 | 96 |
| | Exp | | — | — | — | 80 | 83 |
| | Δ | | | | | 15 | 14 |
| LOLMU | Obs | | 5 | 10 | 85 | 95 | 96 |
| | Exp | | — | — | — | 86 | 87 |
| | Δ | | | | | 9 | 10 |
| CYPES | Obs | | 15 | 28 | 65 | 78 | 78 |
| | Exp | | — | — | — | 70 | 75 |
| | Δ | | | | | 7 | 3 |

TABLE 59-continued

Herbicidal Effects (% visual injury) of Compound A and Iodosulfuron + Propoxycarbazone on weed and grain crops.

| Application rate (g/ha) | Compound A<br>Iodosulfuron + Propoxycarbazone | 7.5<br>0 | 10<br>0 | 0<br>3 + 50.4 | 7.5<br>3 + 50.4 | 10<br>3 + 50.4 |
|---|---|---|---|---|---|---|
| SORVU | Obs | 5 | 10 | 70 | 85 | 85 |
|  | Exp | — | — | — | 72 | 73 |
|  | Δ |  |  |  | 14 | 12 |
| AVEFA | Obs | 0 | 0 | 95 | 96 | 93 |
|  | Exp | — | — | — | 95 | 95 |
|  | Δ |  |  |  | 1 | −3 |
| ECHCG | Obs | 88 | 85 | 95 | 100 | 98 |
|  | Exp | — | — | — | 99 | 96 |
|  | Δ |  |  |  | 1 | −1 |
| ORYSA | Obs | 3 | 5 | 60 | 80 | 85 |
|  | Exp | — | — | — | 61 | 62 |
|  | Δ |  |  |  | 19 | 23 |
| TRZAS | Obs | 0 | 3 | 0 | 0 | 0 |
|  | Exp | — | — | — | 0 | 3 |
|  | Δ |  |  |  | 0 | −3 |
| ZEAMX | Obs | 0 | 5 | 98 | 100 | 100 |
|  | Exp | — | — | — | 98 | 98 |
|  | Δ |  |  |  | 3 | 2 | g/ha = grams per hectare
VIOTR = *Viola tricolor* (wild pansy)
STEME = *Stellaria media* (chickweed)
CIRAR = *Cirsium arvense* (Canadian thistle)
RUMOB = *Rumex obtusifolius* (broad-leaf dock)
BRSNN = *Brassica napus* (spring rape)
KCHSC = *Kochia scoparia* (kochia)
HELAN = *Helianthus annuus* (common sunflower)
GLXMA = *Glycine max* (soybean)
CHEAL = *Chenopodium album* L. (common lambsquarters)
IPOHE = *Ipomoea hederacea* (ivyleaf morningglory)
ABUTH = *Abutilon theophrasti* (velvetleaf)
POLCO = *Polygonum convolvulus* (wild buckwheat)
AMARE = *Amaranthus retroflexus* (pigweed)
DIGSA = *Digitaria sanguinalis* (large crabgrass)
SETFA = *Setaria faberi* (giant foxtail)
ALOMY = *Alopecurus myosuroides* (blackgrass)
LOLMU = *Lolium multiflorum* (Italian ryegrass)
CYPES = *Cyperus esculentus* (nutsedge)
SORVU = *Sorghum vulgare* (grain sorghum)
AVEFA = *Avena fatua* (wild oat)
ECHCG = *Echinochloa crus-galli* (barnyardgrass)
ORYSA = *Oryza sativa* (common rice)
TRZAS = *Triticum aestivum* (spring wheat)
ZEAMX = *Zea mays* (maize)

Example 60

Compositions comprising Compound A (with the safener mefenpyr-diethyl instead of cloquintocet-mexyl), iodosulfuron, and metsulfuron were tested to determine the efficacy of the compositions on undesirable vegetation species, including wild pansy (VIOTR, *Viola* tricolor), chickweed (STEME, *Stellaria media*), Canadian thistle (CIRAR, *Cirsium arvense*), broad-leaf dock (RUMOB, *Rumex obtusifolius*), spring rape (BRSNN, *Brassica napus*), kochia (KCHSC, *Kochia scoparia*), common sunflower (HELAN, *Helianthus annuus*), soybean (GLXMA, *Glycine max*), common lambsquarters (CHEAL, *Chenopodium album* L.), ivyleaf morningglory (IPOHE, *Ipomoea hederacea*), velvetleaf (ABUTH, *Abutilon theophrasti*), wild buckwheat (POLCO, *Polygonum convolvulus*), pigweed (AMARE, *Amaranthus retroflexus*), large crabgrass (DIGSA, *Digitaria sanguinalis*), giant foxtail (SETFA, *Setaria faberi*), blackgrass (ALOMY, *Alopecurus myosuroides*), Italian ryegrass (LOLMU, *Lolium multiflorum*), nutsedge (CYPES, *Cyperus esculentus*), grain sorghum (SORVU, *Sorghum vulgare*), wild oat (AVEFA, *Avena fatua*), and barnyard grass (ECHCG, *Echinochloa crus-galli*). The compositions were also tested on rice (ORYSA, *Oryza sativa*), spring wheat (TRZAS), and maize (ZEAMX, *Zea mays*), and the phytotoxicity of the compositions on each crop was measured The results are summarized in Table 60 below. In the table, an application rate of "X+Y" indicates that the application rate of iodosulfuron is "X" and metsulfuron is "Y."

TABLE 60

Herbicidal Effects (% visual injury) of Compound A and Iodosulfuron + Metsulfuron on weed and grain crops.

| Application rate (g/ha) | Compound A<br>Iodosulfuron + Metsulfuron | 7.5<br>0 | 10<br>0 | 0<br>3 + 6 | 7.5<br>3 + 6 | 10<br>3 + 6 |
|---|---|---|---|---|---|---|
| VIOTR | Obs | 10 | 18 | 90 | 96 | 95 |
|  | Exp | — | — | — | 9 | 92 |
|  | Δ |  |  |  | 5 | 3 |
| STEME | Obs | 88 | 83 | 100 | 100 | 100 |
|  | Exp | — | — | — | 100 | 100 |
|  | Δ |  |  |  | 0 | 0 |
| CIRAR | Obs | 28 | 43 | 73 | 99 | 100 |
|  | Exp | — | — | — | 80 | 84 |
|  | Δ |  |  |  | 18 | 15 |

TABLE 60-continued

Herbicidal Effects (% visual injury) of Compound A and Iodosulfuron + Metsulfuron on weed and grain crops.

| Application rate (g/ha) | Compound A<br>Iodosulfuron + Metsulfuron | 7.5<br>0 | 10<br>0 | 0<br>3 + 6 | 7.5<br>3 + 6 | 10<br>3 + 6 |
|---|---|---|---|---|---|---|
| RUMOB | Obs | 20 | 20 | 100 | 100 | 100 |
| | Exp | — | — | — | 100 | 100 |
| | Δ | | | | 0 | 0 |
| BRSNN | Obs | 70 | 78 | 100 | 100 | 100 |
| | Exp | — | — | — | 100 | 100 |
| | Δ | | | | 0 | 0 |
| KCHSC | Obs | 68 | 70 | 60 | 97 | 98 |
| | Exp | — | — | — | 87 | 88 |
| | Δ | | | | 10 | 10 |
| HELAN | Obs | 100 | 98 | 100 | 100 | 100 |
| | Exp | — | — | — | 100 | 100 |
| | Δ | | | | 0 | 0 |
| GLXMA | Obs | 95 | 95 | 96 | 100 | 50 |
| | Exp | — | — | — | 100 | 100 |
| | Δ | | | | 0 | −50 |
| CHEAL | Obs | 100 | 100 | 98 | 100 | 100 |
| | Exp | — | — | — | 100 | 100 |
| | Δ | | | | 0 | 0 |
| IPOHE | Obs | 8 | 5 | 98 | 100 | 100 |
| | Exp | — | — | — | 98 | 98 |
| | Δ | | | | 2 | 2 |
| ABUTH | Obs | 68 | 73 | 95 | 98 | 98 |
| | Exp | — | — | — | 98 | 99 |
| | Δ | | | | 0 | −1 |
| POLCO | Obs | 100 | 100 | 70 | 90 | 97 |
| | Exp | — | — | — | 100 | 100 |
| | Δ | | | | −10 | −3 |
| AMARE | Obs | 93 | 98 | 95 | 100 | 100 |
| | Exp | — | — | — | 100 | 100 |
| | Δ | | | | 0 | 0 |
| DIGSA | Obs | 13 | 10 | 0 | 30 | 20 |
| | Exp | — | — | — | 13 | 10 |
| | Δ | | | | 18 | 10 |
| SETFA | Obs | 78 | 80 | 0 | 68 | 75 |
| | Exp | — | — | — | 78 | 80 |
| | Δ | | | | −10 | −5 |
| ALOMY | Obs | 0 | 13 | 40 | 55 | 48 |
| | Exp | — | — | — | 40 | 48 |
| | Δ | | | | 15 | 0 |
| LOLMU | Obs | 5 | 10 | 95 | 96 | 96 |
| | Exp | — | — | — | 95 | 96 |
| | Δ | | | | 1 | 1 |
| CYPES | Obs | 15 | 28 | 70 | 78 | 75 |
| | Exp | — | — | — | 75 | 78 |
| | Δ | | | | 3 | −3 |
| SORVU | Obs | 5 | 10 | 60 | 78 | 73 |
| | Exp | — | — | — | 62 | 64 |
| | Δ | | | | 16 | 9 |
| AVEFA | Obs | 0 | 0 | 70 | 70 | 70 |
| | Exp | — | — | — | 70 | 70 |
| | Δ | | | | 0 | 0 |
| ECHCG | Obs | 88 | 85 | 48 | 85 | 83 |
| | Exp | — | — | — | 93 | 92 |
| | Δ | | | | −8 | −10 |
| ORYSA | Obs | 3 | 5 | 40 | 50 | 60 |
| | Exp | — | — | — | 42 | 43 |
| | Δ | | | | 9 | 17 |
| TRZAS | Obs | 0 | 3 | 0 | 0 | 0 |
| | Exp | — | — | — | 0 | 3 |
| | Δ | | | | 0 | −3 |
| ZEAMX | Obs | 0 | 5 | 85 | 98 | 95 |
| | Exp | — | — | — | 85 | 86 |
| | Δ | | | | 13 | 9 | g/ha = grams per hectare
VIOTR = *Viola tricolor* (wild pansy)
STEME = *Stellaria media* (chickweed)
CIRAR = *Cirsium arvense* (Canadian thistle)
RUMOB = *Rumex obtusifolius* (broad-leaf dock)
BRSNN = *Brassica napus* (spring rape)
KCHSC = *Kochia scoparia* (kochia)
HELAN = *Helianthus annuus* (common sunflower)
GLXMA = *Glycine max* (soybean)
CHEAL = *Chenopodium album* L. (common lambsquarters)
IPOHE = *Ipomoea hederacea* (ivyleaf morningglory)
ABUTH = *Abutilon theophrasti* (velvetleaf)
POLCO = *Polygonum convolvulus* (wild buckwheat)
AMARE = *Amaranthus retroflexus* (pigweed)
DIGSA = *Digitaria sanguinalis* (large crabgrass)
SETFA = *Setaria faberi* (giant foxtail)
ALOMY = *Alopecurus myosuroides* (blackgrass)
LOLMU = *Lolium multiflorum* (Italian ryegrass)
CYPES = *Cyperus esculentus* (nutsedge)
SORVU = *Sorghum vulgare* (grain sorghum)
AVEFA = *Avena fatua* (wild oat)
ECHCG = *Echinochloa crus-galli* (barnyardgrass)
ORYSA = *Oryza sativa* (common rice)
TRZAS = *Triticum aestivum* (spring wheat)
ZEAMX = *Zea mays* (maize)

Example 61

Compositions comprising Compound A (with the safener mefenpyr-diethyl instead of cloquintocet-mexyl), mesosulfuron, and propoxycarbazone were tested to determine the efficacy of the compositions on undesirable vegetation species, including wild pansy (VIOTR, *Viola* tricolor), chickweed (STEME, *Stellaria media*), Canadian thistle (CIRAR, *Cirsium arvense*), broad-leaf dock (RUMOB, *Rumex obtusifolius*), spring rape (BRSNN, *Brassica napus*), kochia (KCHSC, *Kochia scoparia*), common sunflower (HELAN, *Helianthus annuus*), soybean (GLXMA, *Glycine max*), common lambsquarters (CHEAL, *Chenopodium album* L.), ivyleaf morningglory (IPOHE, *Ipomoea hederacea*), velvetleaf (ABUTH, *Abutilon theophrasti*), wild buckwheat (POLCO, *Polygonum convolvulus*), pigweed (AMARE, *Amaranthus retroflexus*), large crabgrass (DIGSA, *Digitaria sanguinalis*), giant foxtail (SETFA, *Setaria faberi*), blackgrass (ALOMY, *Alopecurus myosuroides*), Italian ryegrass (LOLMU, Lolhum muluiflorum), nutsedge (CYPES, *Cyperus esculentus*), grain sorghum (SORVU, *Sorghum vulgare*), wild oat (AVEFA, *Avena fatua*), and barnyard grass (ECHCG, *Echinochloa crus-galli*). The compositions were also tested on rice (ORYSA, *Oryza sativa*), spring wheat (TRZAS), and maize (ZEAMX, *Zea mays*), and the phytotoxicity of the compositions on each crop was measured The results are summarized in Table 61 below. In the table, an application rate of "X+Y" indicates that the application rate of mesosulfuron is "X" and propoxycarbazone is "Y."

TABLE 61

Herbicidal Effects (% visual injury) of Compound A and Mesosulfuron + Propoxycarbazone on weed and grain crops.

| Application rate (g/ha) | Compound A<br>Mesosulfuron + Propoxycarbazone | | 7.5<br>0 | 10<br>0 | 0<br>9 + 13.5 | 7.5<br>9 + 13.5 | 10<br>9 + 13.5 |
|---|---|---|---|---|---|---|---|
| VIOTR | Obs | | 10 | 18 | 70 | 73 | 75 |
|  | Exp | | — | — | — | 73 | 75 |
|  | Δ | | | | | −1 | 0 |
| STEME | Obs | | 88 | 83 | 93 | 98 | 98 |
|  | Exp | | — | — | — | 99 | 99 |
|  | Δ | | | | | −2 | −1 |
| CIRAR | Obs | | 28 | 43 | 70 | 93 | 88 |
|  | Exp | | — | — | — | 78 | 83 |
|  | Δ | | | | | 14 | 5 |
| RUMOB | Obs | | 20 | 20 | 78 | 95 | 93 |
|  | Exp | | — | — | — | 82 | 82 |
|  | Δ | | | | | 13 | 11 |
| BRSNN | Obs | | 70 | 78 | 100 | 100 | 99 |
|  | Exp | | — | — | — | 100 | 100 |
|  | Δ | | | | | 0 | −2 |
| KCHSC | Obs | | 68 | 70 | 53 | 85 | 95 |
|  | Exp | | — | — | — | 85 | 86 |
|  | Δ | | | | | 0 | 9 |
| HELAN | Obs | | 100 | 98 | 100 | 100 | 100 |
|  | Exp | | — | — | — | 100 | 100 |
|  | Δ | | | | | 0 | 0 |
| GLXMA | Obs | | 95 | 95 | 96 | 100 | 100 |
|  | Exp | | — | — | — | 100 | 100 |
|  | Δ | | | | | 0 | 0 |
| CHEAL | Obs | | 100 | 100 | 90 | 93 | 93 |
|  | Exp | | — | — | — | 100 | 100 |
|  | Δ | | | | | −8 | −8 |
| IPOHE | Obs | | 8 | 5 | 83 | 100 | 95 |
|  | Exp | | — | — | — | 84 | 83 |
|  | Δ | | | | | 16 | 12 |
| ABUTH | Obs | | 68 | 73 | 93 | 91 | 97 |
|  | Exp | | — | — | — | 98 | 98 |
|  | Δ | | | | | −7 | −1 |
| POLCO | Obs | | 100 | 100 | 60 | 80 | 88 |
|  | Exp | | — | — | — | 100 | 100 |
|  | Δ | | | | | −20 | −13 |
| AMARE | Obs | | 93 | 98 | 83 | 98 | 100 |
|  | Exp | | — | — | — | 99 | 100 |
|  | Δ | | | | | −1 | 0 |
| DIGSA | Obs | | 13 | 10 | 0 | 0 | 0 |
|  | Exp | | — | — | — | 13 | 10 |
|  | Δ | | | | | −13 | −10 |
| SETFA | Obs | | 78 | 80 | 88 | 95 | 95 |
|  | Exp | | — | — | — | 97 | 98 |
|  | Δ | | | | | −2 | −3 |
| ALOMY | Obs | | 0 | 13 | 96 | 98 | 99 |
|  | Exp | | — | — | — | 96 | 97 |
|  | Δ | | | | | 2 | 2 |
| LOLMU | Obs | | 5 | 10 | 93 | 98 | 97 |
|  | Exp | | — | — | — | 93 | 93 |
|  | Δ | | | | | 5 | 4 |
| CYPES | Obs | | 15 | 28 | 65 | 75 | 90 |
|  | Exp | | — | — | — | 70 | 75 |
|  | Δ | | | | | 5 | 15 |
| SORVU | Obs | | 5 | 10 | 96 | 99 | 100 |
|  | Exp | | — | — | — | 96 | 96 |
|  | Δ | | | | | 2 | 4 |
| AVEFA | Obs | | 0 | 0 | 97 | 99 | 100 |
|  | Exp | | — | — | — | 97 | 97 |
|  | Δ | | | | | 2 | 3 |
| ECHCG | Obs | | 88 | 85 | 95 | 98 | 98 |
|  | Exp | | — | — | — | 99 | 99 |
|  | Δ | | | | | −1 | −1 |
| ORYSA | Obs | | 3 | 5 | 75 | 85 | 78 |
|  | Exp | | — | — | — | 76 | 76 |
|  | Δ | | | | | 9 | 1 |
| TRZAS | Obs | | 0 | 3 | 0 | 0 | 0 |
|  | Exp | | — | — | — | 0 | 3 |
|  | Δ | | | | | 0 | −3 |

TABLE 61-continued

Herbicidal Effects (% visual injury) of Compound A and Mesosulfuron + Propoxycarbazone on weed and grain crops.

| Application rate (g/ha) | Compound A<br>Mesosulfuron + Propoxycarbazone | 7.5<br>0 | 10<br>0 | 0<br>9 + 13.5 | 7.5<br>9 + 13.5 | 10<br>9 + 13.5 |
|---|---|---|---|---|---|---|
| ZEAMX | Obs | 0 | 5 | 95 | 100 | 97 |
|  | Exp | — | — | — | 95 | 95 |
|  | Δ |  |  |  | 5 | 2 | g/ha = grams per hectare
VIOTR = *Viola tricolor* (wild pansy)
STEME = *Stellaria media* (chickweed)
CIRAR = *Cirsium arvense* (Canadian thistle)
RUMOB = *Rumex obtusifolius* (broad-leaf dock)
BRSNN = *Brassica napus* (spring rape)
KCHSC = *Kochia scoparia* (kochia)
HELAN = *Helianthus annuus* (common sunflower)
GLXMA = *Glycine max* (soybean)
CHEAL = *Chenopodium album* L. (common lambsquarters)
IPOHE = *Ipomoea hederacea* (ivyleaf morningglory)
ABUTH = *Abutilon theophrasti* (velvetleaf)
POLCO = *Polygonum convolvulus* (wild buckwheat)
AMARE = *Amaranthus retroflexus* (pigweed)
DIGSA = *Digitaria sanguinalis* (large crabgrass)
SETFA = *Setaria faberi* (giant foxtail)
ALOMY = *Alopecurus myosuroides* (blackgrass)
LOLMU = *Lolium multiflorum* (Italian ryegrass)
CYPES = *Cyperus esculentus* (nutsedge)
SORVU = *Sorghum vulgare* (grain sorghum)
AVEFA = *Avena fatua* (wild oat)
ECHCG = *Echinochloa crus-galli* (barnyardgrass)
ORYSA = *Oryza sativa* (common rice)
TRZAS = *Triticum aestivum* (spring wheat)
ZEAMX = *Zea mays* (maize)

Example 62

Compositions comprising Compound A, florasulam, and the synthetic auxin herbicide clopyralid were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 62 below. In the table, an application rate of "X+Y" indicates that the application rate of florasulam is "X" and clopyralid is "Y."

TABLE 62

Herbicidal Effects (% visual injury) of Compound A and Florasulam + Clopyralid on weed and grain crops.

| Application rate (g/ha) | Compound A<br>Florasulam + Clopyralid | 7.5<br>0 | 10<br>0 | 0<br>5 + 60 | 7.5<br>5 + 60 | 10<br>5 + 60 |
|---|---|---|---|---|---|---|
| AMARE | Obs | 100 | 100 | 100 | 100 | 100 |
|  | Exp | — | — | — | 100 | 100 |
|  | Δ |  |  |  | 0 | 0 |
| BRSNN | Obs | 55 | 55 | 100 | 100 | 98 |
|  | Exp | — | — | — | 100 | 100 |
|  | Δ |  |  |  | 0 | −2 |
| CHEAL | Obs | 83 | 88 | 18 | 90 | 93 |
|  | Exp | — | — | — | 92 | 92 |
|  | Δ |  |  |  | 4 | 3 |
| CIRAR | Obs | 18 | 20 | 90 | 96 | 95 |
|  | Exp | — | — | — | 92 | 92 |
|  | Δ |  |  |  | 4 | 3 |
| KCHSC | Obs | 55 | 65 | 0 | 78 | 95 |
|  | Exp | — | — | — | 55 | 65 |
|  | Δ |  |  |  | 23 | 30 |
| MATCH | Obs | 20 | 13 | 95 | 95 | 95 |
|  | Exp | — | — | — | 96 | 95 |
|  | Δ |  |  |  | −1 | 0 |
| POLCO | Obs | 93 | 91 | 99 | 100 | 96 |
|  | Exp | — | — | — | 100 | 100 |
|  | Δ |  |  |  | 0 | −4 |

TABLE 62-continued

Herbicidal Effects (% visual injury) of Compound A and Florasulam + Clopyralid on weed and grain crops.

| Application rate (g/ha) | Compound A<br>Florasulam + Clopyralid | 7.5<br>0 | 10<br>0 | 0<br>5 + 60 | 7.5<br>5 + 60 | 10<br>5 + 60 |
|---|---|---|---|---|---|---|
| SASKR | Obs | 63 | 65 | 30 | 70 | 73 |
| | Exp | — | — | — | 74 | 76 |
| | Δ | | | | −4 | −3 |
| SINAR | Obs | 100 | 100 | 98 | 100 | 100 |
| | Exp | — | — | — | 100 | 100 |
| | Δ | | | | 0 | 0 |
| HORVS | Obs | 0 | 0 | 0 | 0 | 0 |
| | Exp | — | — | — | 0 | 0 |
| | Δ | | | | 0 | 0 |
| TRZAS | Obs | 0 | 0 | 0 | 0 | 0 |
| | Exp | — | — | — | 0 | 0 |
| | Δ | | | | 0 | 0 | g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 63

Compositions comprising Compound A, florasulam, and the synthetic auxin herbicide MCPA were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 63 below. In the table, an application rate of "X+Y" indicates that the application rate of florasulam is "X" and MCPA is "Y."

TABLE 63

Herbicidal Effects (% visual injury) of Compound A and MCPA + Florasulam on weed and grain crops.

| Application rate (g/ha) | Compound A<br>Florasulam + MCPA | 7.5<br>0 | 10<br>0 | 0<br>5 + 350 | 7.5<br>5 + 350 | 10<br>5 + 350 |
|---|---|---|---|---|---|---|
| AMARE | Obs | 100 | 100 | 100 | 100 | 100 |
| | Exp | — | — | — | 100 | 100 |
| | Δ | | | | 0 | 0 |
| BRSNN | Obs | 55 | 55 | 100 | 100 | 100 |
| | Exp | — | — | — | 100 | 100 |
| | Δ | | | | 0 | 0 |
| CHEAL | Obs | 83 | 88 | 70 | 95 | 100 |
| | Exp | — | — | — | 95 | 96 |
| | Δ | | | | 0 | 4 |
| CIRAR | Obs | 18 | 20 | 89 | 90 | 89 |
| | Exp | — | — | — | 91 | 91 |
| | Δ | | | | −1 | −2 |
| KCHSC | Obs | 55 | 65 | 13 | 95 | 98 |
| | Exp | — | — | — | 61 | 69 |
| | Δ | | | | 34 | 28 |
| MATCH | Obs | 20 | 13 | 85 | 93 | 85 |
| | Exp | — | — | — | 88 | 87 |
| | Δ | | | | 5 | −2 |
| POLCO | Obs | 93 | 91 | 99 | 96 | 95 |
| | Exp | — | — | — | 100 | 100 |
| | Δ | | | | −4 | −5 |
| SASKR | Obs | 63 | 65 | 58 | 68 | 70 |
| | Exp | — | — | — | 84 | 85 |
| | Δ | | | | −17 | −15 |

TABLE 63-continued

Herbicidal Effects (% visual injury) of Compound A and MCPA + Florasulam on weed and grain crops.

| Application rate (g/ha) | Compound A<br>Florasulam + MCPA | 7.5<br>0 | 10<br>0 | 0<br>5 + 350 | 7.5<br>5 + 350 | 10<br>5 + 350 |
|---|---|---|---|---|---|---|
| SINAR | Obs | 100 | 100 | 100 | 99 | 100 |
|  | Exp | — | — | — | 100 | 100 |
|  | Δ |  |  |  | −2 | 0 |
| HORVS | Obs | 0 | 0 | 0 | 0 | 0 |
|  | Exp | — | — | — | 0 | 0 |
|  | Δ |  |  |  | 0 | 0 |
| TRZAS | Obs | 0 | 0 | 0 | 0 | 0 |
|  | Exp | — | — | — | 0 | 0 |
|  | Δ |  |  |  | 0 | 0 | g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 64

Compositions comprising Compound A, florasulam, and the synthetic auxin herbicide halauxifen-methyl were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 64 below. In the table, an application rate of "X+Y" indicates that the application rate of florasulam is "X" and halauxifen-methyl is "Y."

TABLE 64

Herbicidal Effects (% visual injury) of Compound A and Florasulam + Halauxifen-methyl on weed and grain crops.

| Application rate (g/ha) | Compound A<br>Florasulam + Halauxifen-methyl | 7.5<br>0 | 10<br>0 | 0<br>5 + 5 | 0<br>5 + 6 | 7.5<br>5 + 5 | 10<br>5 + 5 | 7.5<br>5 + 6 | 10<br>5 + 6 |
|---|---|---|---|---|---|---|---|---|---|
| AMARE | Obs | 100 | 100 | 83 | 100 | 100 | 100 | 98 | 100 |
|  | Exp | — | — | — | — | 100 | 100 | 100 | 100 |
|  | Δ |  |  |  |  | 0 | 0 | −3 | 0 |
| BRSNN | Obs | 55 | 55 | 100 | 98 | 98 | 98 | 100 | 100 |
|  | Exp | — | — | — | — | 100 | 100 | 99 | 99 |
|  | Δ |  |  |  |  | −3 | −2 | 1 | 1 |
| CHEAL | Obs | 83 | 88 | 70 | 45 | 95 | 95 | 98 | 98 |
|  | Exp | — | — | — | — | 95 | 96 | 90 | 93 |
|  | Δ |  |  |  |  | 0 | −1 | 7 | 4 |
| CIRAR | Obs | 18 | 20 | 88 | 90 | 94 | 93 | 92 | 95 |
|  | Exp | — | — | — | — | 90 | 90 | 92 | 92 |
|  | Δ |  |  |  |  | 4 | 3 | 0 | 3 |
| KCHSC | Obs | 55 | 65 | 38 | 48 | 90 | 5 | 94 | 93 |
|  | Exp | — | — | — | — | 72 | 78 | 76 | 82 |
|  | Δ |  |  |  |  | 18 | 17 | 17 | 11 |
| MATCH | Obs | 20 | 13 | 88 | 85 | 98 | 100 | 93 | 93 |
|  | Exp | — | — | — | — | 90 | 89 | 88 | 87 |
|  | Δ |  |  |  |  | 8 | 11 | 5 | 6 |
| POLCO | Obs | 93 | 91 | 98 | 98 | 98 | 94 | 98 | 97 |
|  | Exp | — | — | — | — | 100 | 100 | 100 | 100 |
|  | Δ |  |  |  |  | −2 | −6 | −2 | −3 |
| SASKR | Obs | 63 | 65 | 80 | 65 | 70 | 35 | 68 | 85 |
|  | Exp | — | — | — | — | 93 | 93 | 87 | 88 |
|  | Δ |  |  |  |  | −23 | −58 | −19 | −3 |
| SINAR | Obs | 100 | 100 | 100 | 100 | 100 | 100 | 100 | 100 |
|  | Exp | — | — | — | — | 100 | 100 | 100 | 100 |
|  | Δ |  |  |  |  | 0 | 0 | 0 | 0 |

TABLE 64-continued

Herbicidal Effects (% visual injury) of Compound A and Florasulam + Halauxifen-methyl on weed and grain crops.

| Application rate (g/ha) | Compound A<br>Florasulam + Halauxifen-methyl | | 7.5<br>0 | 10<br>0 | 0<br>5 + 5 | 0<br>5 + 6 | 7.5<br>5 + 5 | 10<br>5 + 5 | 7.5<br>5 + 6 | 10<br>5 + 6 |
|---|---|---|---|---|---|---|---|---|---|---|
| HORVS | Obs | | 0 | 0 | 0 | 0 | 0 | 0 | 0 | 0 |
|  | Exp | | — | — | — | — | 0 | 0 | 0 | 0 |
|  | Δ | | | | | | 0 | 0 | 0 | 0 |
| TRZAS | Obs | | 0 | 0 | 0 | 0 | 0 | 0 | 0 | 0 |
|  | Exp | | — | — | — | — | 0 | 0 | 0 | 0 |
|  | Δ | | | | | | 0 | 0 | 0 | 0 | g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 65

Compositions comprising Compound A, pyroxsulam, and the synthetic auxin herbicide halauxifen-methyl were tested on undesirable vegetation species, including pigweed (AMARE, *Amaranthus retroflexus*), spring rape (BRSNN, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonurn convolvulus*), Russian thistle (SASKR, *Salsola kali*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 65 below. In the table, an application rate of "X+Y" indicates that the application rate of pyroxsulam is "X" and halauxifen-methyl is "Y."

TABLE 65

Herbicidal Effects (% visual injury) of Compound A and Pyroxsulam + Halauxifen-methyl on weed and grain crops.

| Application rate (g/ha) | Compound A<br>Pyroxsulam + Halauxifen-methyl | | 7.5<br>0 | 10<br>0 | 0<br>15 + 5 | 0<br>18.75 + 5 | 7.5<br>15 + 5 | 10<br>15 + 5 | 7.5<br>18.75 + 5 | 10<br>18.75 + 5 |
|---|---|---|---|---|---|---|---|---|---|---|
| AMARE | Obs | | 100 | 100 | 100 | 100 | 100 | 100 | 100 | 100 |
|  | Exp | | — | — | — | — | 100 | 100 | 100 | 100 |
|  | Δ | | | | | | 0 | 0 | 0 | 0 |
| BRSNN | Obs | | 55 | 55 | 100 | 100 | 96 | 99 | 98 | 99 |
|  | Exp | | — | — | — | — | 100 | 100 | 100 | 100 |
|  | Δ | | | | | | −4 | −2 | −3 | −2 |
| CHEAL | Obs | | 83 | 88 | 63 | 58 | 83 | 93 | 78 | 85 |
|  | Exp | | — | — | — | — | 93 | 95 | 93 | 95 |
|  | Δ | | | | | | −11 | −3 | −15 | −10 |
| CIRAR | Obs | | 18 | 20 | 70 | 68 | 93 | 83 | 78 | 83 |
|  | Exp | | — | — | — | — | 75 | 76 | 73 | 74 |
|  | Δ | | | | | | 17 | 7 | 4 | 9 |
| KCHSC | Obs | | 55 | 65 | 57 | 73 | 97 | 90 | 93 | 94 |
|  | Exp | | — | — | — | — | 80 | 85 | 88 | 90 |
|  | Δ | | | | | | 17 | 5 | 5 | 3 |
| MATCH | Obs | | 20 | 13 | 63 | 25 | 58 | 40 | 65 | 70 |
|  | Exp | | — | — | — | — | 70 | 67 | 40 | 34 |
|  | Δ | | | | | | −13 | −27 | 25 | 36 |
| POLCO | Obs | | 93 | 91 | 94 | 93 | 95 | 95 | 95 | 93 |
|  | Exp | | — | — | — | — | 100 | 99 | 99 | 99 |
|  | Δ | | | | | | −5 | −4 | −4 | −7 |
| SASKR | Obs | | 63 | 65 | 94 | 88 | 85 | 96 | 93 | 95 |
|  | Exp | | — | — | — | — | 98 | 98 | 95 | 96 |
|  | Δ | | | | | | −13 | −2 | −3 | −1 |
| SINAR | Obs | | 100 | 100 | 100 | 100 | 100 | 100 | 100 | 100 |
|  | Exp | | — | — | — | — | 100 | 100 | 100 | 100 |
|  | Δ | | | | | | 0 | 0 | 0 | 0 |
| HORVS | Obs | | 0 | 0 | 13 | 5 | 18 | 20 | 10 | 5 |
|  | Exp | | — | — | — | — | 13 | 13 | 5 | 5 |
|  | Δ | | | | | | 5 | 8 | 5 | 0 |

TABLE 65-continued

Herbicidal Effects (% visual injury) of Compound A and Pyroxsulam + Halauxifen-methyl on weed and grain crops.

| Application rate (g/ha) | Compound A<br>Pyroxsulam + Halauxifen-methyl | 7.5<br>0 | 10<br>0 | 0<br>15 + 5 | 0<br>18.75 + 5 | 7.5<br>15 + 5 | 10<br>15 + 5 | 7.5<br>18.75 + 5 | 10<br>18.75 + 5 |
|---|---|---|---|---|---|---|---|---|---|
| TRZAS | Obs | 0 | 0 | 0 | 0 | 0 | 0 | 0 | 0 |
| | Exp | — | — | — | — | 0 | 0 | 0 | 0 |
| | Δ | | | | | 0 | 0 | 0 | 0 | g/ha = grams per hectare
AMARE = *Amaranthus retroflexus* (pigweed)
BRSNN = *Brassica napus* (spring rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
SINAR = *Sinapis arvensis* (wild mustard)
HORVS = *Hordeum vulgare* (spring barley)
TRZAS = *Triticum aestivum* (spring wheat)

Example 66

Compositions comprising Compound A, iodosulfuron, mesosulfuron, and the PDS inhibitor herbicide diflufenican were tested on undesirable vegetation species, including pigweed (AMARE, *Amaranthus retroflexus*), winter rape (BRSNW, *Brassica napus*), common lambsquarters (CHEAL, *Chenopodium album* L.), Canadian thistle (CIRAR, *Cirsium arvense*), kochia (KCHSC, *Kochia scoparia*), wild chamomile (MATCH, *Matricaria chamomilla*), wild buckwheat (POLCO, *Polygonum convolvulus*), and wild mustard (SINAR, *Sinapis arvensis*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 66 below. In the table, an application rate of "X+Y+Z" indicates that the application rate of iodosulfuron is "X," mesosulfuron is "Y," and diflufenican is "Z."

TABLE 66

Herbicidal Effects (% visual injury) of Compound A and Iodosulfuron + Mesosulfuron + Diflufenican on weeds and grain crops.

| Application rate (g/ha) | Compound A<br>Iodosulfuron + Mesosulfuron + Diflufenican | 7.5<br>0 | 10<br>0 | 0<br>2 + 10 + 150 | 7.5<br>2 + 10 + 150 | 10<br>2 + 10 + 150 |
|---|---|---|---|---|---|---|
| AMARE | Obs | 70 | 90 | 98 | 100 | 100 |
| | Exp | — | — | — | 99 | 100 |
| | Δ | | | | 1 | 0 |
| BRSNW | Obs | 63 | 68 | 95 | 98 | 99 |
| | Exp | — | — | — | 98 | 98 |
| | Δ | | | | −1 | 0 |
| CHEAL | Obs | 70 | 78 | 93 | 90 | 96 |
| | Exp | — | — | — | 98 | 98 |
| | Δ | | | | −8 | −2 |
| CIRAR | Obs | 18 | 30 | 30 | 78 | 85 |
| | Exp | — | — | — | 42 | 51 |
| | Δ | | | | 35 | 34 |
| KCHSC | Obs | 65 | 70 | 25 | 73 | 80 |
| | Exp | — | — | — | 74 | 78 |
| | Δ | | | | −1 | 3 |
| MATCH | Obs | 18 | 30 | 80 | 88 | 88 |
| | Exp | — | — | — | 84 | 86 |
| | Δ | | | | 4 | 2 |
| POLCO | Obs | 60 | 70 | 80 | 90 | 93 |
| | Exp | — | — | — | 92 | 94 |
| | Δ | | | | −2 | −2 |
| SINAR | Obs | 85 | 88 | 98 | 100 | 100 |
| | Exp | — | — | — | 100 | 100 |
| | Δ | | | | 0 | 0 |
| HORVS | Obs | 0 | 0 | 35 | 43 | 50 |
| | Exp | — | — | — | 35 | 35 |
| | Δ | | | | 8 | 15 |

TABLE 66-continued

Herbicidal Effects (% visual injury) of Compound A and Iodosulfuron + Mesosulfuron + Diflufenican on weeds and grain crops.

| Application rate (g/ha) | Compound A<br>Iodosulfuron + Mesosulfuron + Diflufenican | 7.5<br>0 | 10<br>0 | 0<br>2 + 10 + 150 | 7.5<br>2 + 10 + 150 | 10<br>2 + 10 + 150 |
|---|---|---|---|---|---|---|
| TRZAS | Obs | 0 | 0 | 0 | 0 | 0 |
|  | Exp | — | — | — | 0 | 0 |
|  | Δ |  |  |  | 0 | 0 | g/ha = grams per hectare
AMARE = *Amaranthus retroflexus* (pigweed)
BRSNW = *Brassica napus* (winter rape)
CHEAL = *Chenopodium album* L. (common lambsquarters)
CIRAR = *Cirsium arvense* (Canadian thistle)
KCHSC = *Kochia scoparia* (kochia)
MATCH = *Matricaria chamomilla* (wild chamomile)
POLCO = *Polygonum convolvulus* (wild buckwheat)
SINAR = *Sinapis arvensis* (wild mustard)
HORVS = *Hordeum vulgare* (spring barley)
TRZAS = *Triticum aestivum* (spring wheat)

Example 67

Compositions comprising Compound A, iodosulfuron, mesosulfuron, and the PDS inhibitor herbicide diflufenican were tested on undesirable vegetation species, including pigweed (AMARE, *Amaranthus retroflexus*), winter rape (BRSNW, *Brassica napus*), common lambsquarters (CHEAL, *Chenopodium album* L.), kochia (KCHSC, *Kochia scoparia*), wild chamomile (MATCH, *Matricaria chamomilla*), wild buckwheat (POLCO, *Polygonum convolvulus*), and Russian thistle (SASKR, *Salsola kali*), to determine the efficacy of the compositions on these undesirable vegetation species. The compositions were also tested on spring wheat (TRZAS) and spring barley (HORVS), and the phytotoxicity of the compositions on each crop was measured.

The results are summarized in Table 67 below. In the table, an application rate of "X+Y+Z" indicates that the application rate of iodosulfuron is "X," mesosulfuron is "Y," and diflufenican is "Z."

TABLE 67

Herbicidal Effects (% visual injury) of Compound A and Iodosulfuron + Mesosulfuron + Diflufenican on weeds and grain crops.

| Application rate (g/ha) | Compound A<br>Iodosulfuron + Mesosulfuron + Diflufenican | 7.5<br>0 | 10<br>0 | 15<br>0 | 0<br>1.875 + 5.625 + 37.5 | 0<br>3.75 + 11.25 + 75 | 7.5<br>1.875 + 5.625 + 37.5 |
|---|---|---|---|---|---|---|---|
| AMARE | Obs | 78 | 78 | 83 | 38 | 60 | 70 |
|  | Exp | — | — | — | — | — | 86 |
|  | Δ |  |  |  |  |  | −16 |
| BRSNW | Obs | 60 | 60 | 75 | 99 | 100 | 99 |
|  | Exp | — | — | — | — | — | 99 |
|  | Δ |  |  |  |  |  | −1 |
| CHEAL | Obs | 70 | 78 | 83 | 45 | 70 | 85 |
|  | Exp | — | — | — | — | — | 84 |
|  | Δ |  |  |  |  |  | 2 |
| KCHSC | Obs | 70 | 70 | 70 | 15 | 30 | 80 |
|  | Exp | — | — | — | — | — | 75 |
|  | Δ |  |  |  |  |  | 6 |
| MATCH | Obs | 8 | 15 | 10 | 45 | 83 | 68 |
|  | Exp | — | — | — | — | — | 49 |
|  | Δ |  |  |  |  |  | 18 |
| POLCO | Obs | 63 | 60 | 63 | 43 | 73 | 73 |
|  | Exp | — | — | — | — | — | 78 |
|  | Δ |  |  |  |  |  | −6 |
| SASKR | Obs | 55 | 58 | 65 | 68 | 75 | 73 |
|  | Exp | — | — | — | — | — | 85 |
|  | Δ |  |  |  |  |  | −13 |
| HORVS | Obs | 8 | 5 | 3 | 18 | 35 | 23 |
|  | Exp | — | — | — | — | — | 24 |
|  | Δ |  |  |  |  |  | −1 |
| TRZAS | Obs | 3 | 3 | 0 | 5 | 3 | 5 |
|  | Exp | — | — | — | — | — | 7 |
|  | Δ |  |  |  |  |  | −2 |

TABLE 67-continued

Herbicidal Effects (% visual injury) of Compound A and Iodosulfuron + Mesosulfuron + Diflufenican on weeds and grain crops.

| Application rate (g/ha) | Compound A<br>Iodosulfuron +<br>Mesosulfuron +<br>Diflufenican | 10<br>1.875 +<br>5.625 +<br>37.5 | 15<br>1.875 +<br>5.625 +<br>37.5 | 7.5<br>3.75 +<br>11.25 +<br>75 | 10<br>3.75 +<br>11.25 +<br>75 | 15<br>3.75 +<br>11.25 +<br>75 |
|---|---|---|---|---|---|---|
| AMARE | Obs | 80 | 75 | 73 | 70 | 73 |
|  | Exp | 86 | 89 | 91 | 91 | 93 |
|  | Δ | −6 | −14 | −19 | −21 | −21 |
| BRSNW | Obs | 99 | 99 | 99 | 99 | 100 |
|  | Exp | 99 | 100 | 100 | 100 | 100 |
|  | Δ | −1 | −1 | −1 | −1 | 0 |
| CHEAL | Obs | 85 | 75 | 78 | 83 | 83 |
|  | Exp | 88 | 90 | 91 | 93 | 95 |
|  | Δ | −3 | −15 | −14 | −11 | −12 |
| KCHSC | Obs | 85 | 83 | 73 | 80 | 78 |
|  | Exp | 75 | 75 | 79 | 79 | 79 |
|  | Δ | 11 | 8 | −7 | 1 | −2 |
| MATCH | Obs | 75 | 73 | 70 | 75 | 80 |
|  | Exp | 53 | 51 | 84 | 85 | 84 |
|  | Δ | 22 | 22 | −14 | −10 | −4 |
| POLCO | Obs | 70 | 73 | 73 | 70 | 68 |
|  | Exp | 77 | 78 | 90 | 89 | 90 |
|  | Δ | −7 | −6 | −17 | −19 | −22 |
| SASKR | Obs | 83 | 75 | 83 | 90 | 94 |
|  | Exp | 86 | 89 | 89 | 89 | 91 |
|  | Δ | −4 | −14 | −6 | 1 | 2 |
| HORVS | Obs | 25 | 28 | 25 | 38 | 30 |
|  | Exp | 22 | 20 | 40 | 38 | 37 |
|  | Δ | 3 | 8 | −15 | −1 | −7 |
| TRZAS | Obs | 5 | 5 | 3 | 5 | 5 |
|  | Exp | 7 | 5 | 5 | 5 | 3 |
|  | Δ | −2 | 0 | −2 | 0 | 3 | g/ha = grams per hectare
AMARE = *Amaranthus retroflexus* (pigweed)
BRSNW = *Brassica napus* (winter rape)
CHEAL = *Chenopodium album* L. (common lambsquarters)
KCHSC = *Kochia scoparia* (kochia)
MATCH = *Matricaria chamomilla* (wild chamomile)
POLCO = *Polygonum convolvulus* (wild buckwheat)
SASKR = *Salsola kali* (Russian thistle)
HORVS = *Hordeum vulgare* (spring barley)
TRZAS = *Triticum aestivum* (spring wheat)

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various aspects, the terms "consisting essentially of" and "consisting of" can be used in place of "comprising" and "including" to provide for more specific aspects and are also disclosed. Other than in the examples, or where otherwise noted, all numbers expressing quantities of ingredients, reaction conditions, and so forth used in the specification and claims are to be understood to be construed in light of the number of significant digits and ordinary rounding approaches, and not as an attempt to limit the application of the doctrine of equivalents to the scope of the claims.

What is claimed is:

1. A composition, comprising:
   (a) a pyridine carboxylate herbicide defined by Formula (I):

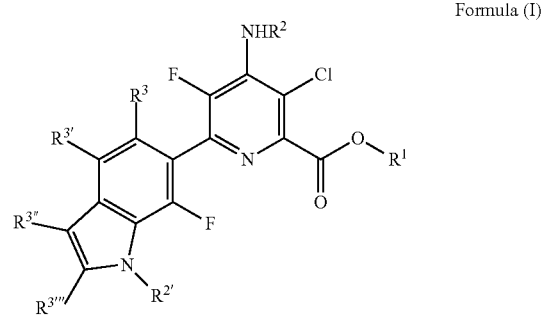

Formula (I)

wherein:
R¹ is propargyl;
R² and R²' are independently hydrogen, $C_1$-$C_6$ alkyl, formyl, alkoxycarbonyl, or acyl;
R³, R³', R³'', and R³''' are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide or salt thereof; and
(b) an acetolactate synthase (ALS) inhibitor or an agriculturally acceptable salt or ester thereof.

2. The composition of claim 1, wherein the pyridine carboxylate herbicide compound is propargyl 4-amino-3-chloro-5-fluoro-6-(7-fluoro-1H-indol-6-yl) pyridine-2-carboxylate:

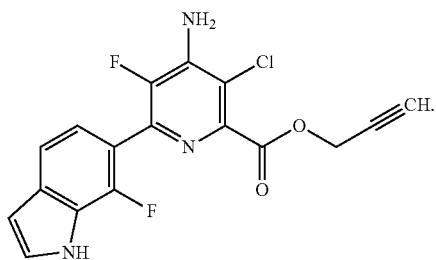

3. The composition of claim 1, wherein the ALS inhibitor is selected from the group consisting of triazolopyrimidines sulfonamide herbicides, imidazolinone herbicides, pyrimidinyl oxybenzoate herbicides, sulfonylaminocarbonyl triazolinone herbicides, sulfonylurea herbicides, and combinations thereof.

4. The composition of claim 3, wherein the ALS inhibitor is selected from the group consisting of amidosulfuron, azimsulfuron, bispyribac, bensulfuron, chlorimuron, chlorsulfuron, cinosulfuron, cloransulam, cyclosulfamuron, diclosulam, ethametsulfuron, ethoxysulfuron, flazasulfuron, florasulam, flucarbazone, flucetosulfuron, flumetsulam, flupyrsulfuron, foramsulfuron, halosulfuron, imazamethabenz, imazamox, imazapic, imazapyr, imazaquin, imazethapyr, imazosulfuron, iodosulfuron, iofensulfuron, mesosulfuron, metazosulfuron, metosulam, metsulfuron, nicosulfuron, orthosulfamuron, oxasulfuron, penoxsulam, primisulfuron, propoxycarbazone, propyrisulfuron, prosulfuron, pyrazosulfuron, pyribenzoxim, pyriftalid, pyriminobac, pyrimisulfan, pyrithiobac, pyroxsulam, rimsulfuron, sulfometuron, sulfosulfuron, thiencarbazone, thifensulfuron, triasulfuron, tribenuron, trifloxysulfuron, triflusulfuron, tritosulfuron, agriculturally acceptable salts and esters thereof, and combinations thereof.

5. The composition of claim 1, wherein the weight ratio of the pyridine carboxylate herbicide (in g ae/ha) to the ALS inhibitor (in g ai/ha) is from about 1:100 to about 20:1.

6. The composition of claim 1, further comprising a safener.

7. The composition of claim 1, further comprising applying an additional pesticide.

8. The composition of claim 1, wherein the composition does not include a herbicidal active ingredient in addition to (a) and (b).

9. A method of controlling undesirable vegetation, comprising applying to vegetation or an area adjacent the vegetation or applying to soil or water to limit the emergence or growth of vegetation a composition, comprising:

(a) a pyridine carboxylate herbicide defined by Formula (I):

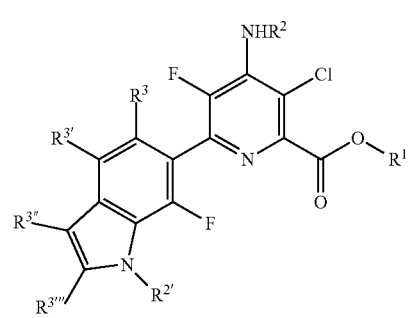

wherein
R¹ is propargyl;
R² and R²' are independently hydrogen, $C_1$-$C_6$ alkyl, formyl, alkoxycarbonyl, or acyl;
R³, R³', R³'', and R³''' are independently hydrogen, halogen, $C_1$-$C_4$ alkyl, $C_1$-$C_4$ haloalkyl, $C_1$-$C_3$ alkoxy, or $C_1$-$C_3$ haloalkoxy;
or an agriculturally acceptable N-oxide or salt thereof; and
(b) an acetolactate synthase (ALS) inhibitor or an agriculturally acceptable salt or ester thereof;
wherein the pyridine carboxylate herbicide is applied in an amount of at least 0.1 g ae/ha; and
wherein the ALS inhibitor is applied in an amount of at least 0.1 g ai/ha.

10. The method of claim 9, wherein the pyridine carboxylate herbicide compound is propargyl 4-amino-3-chloro-5-fluoro-6-(7-fluoro-1H-indol-6-yl) pyridine-2-carboxylate:

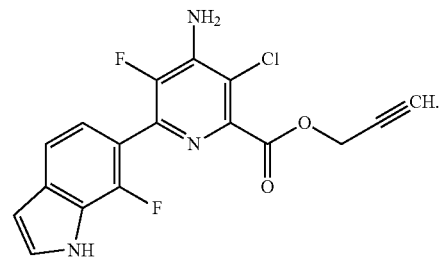 [SMILES: C#CCOC(=O)c1nc(-c2ccc3cc[nH]c3c2F)c(F)c(N)c1Cl]

11. The method of claim 9, wherein the pyridine carboxylate herbicide and the ALS inhibitor are applied simultaneously.

12. The method of claim 9, wherein the ALS inhibitor is selected from the group consisting of triazolopyrimidines sulfonamide herbicides, imidazolinone herbicides, pyrimidinyl oxybenzoate herbicides, sulfonylaminocarbonyl triazolinone herbicides, sulfonylurea herbicides, and combinations thereof.

13. The method of claim 12, wherein the ALS inhibitor is selected from the group consisting of amidosulfuron, azimsulfuron, bispyribac, bensulfuron, chlorimuron, chlorsulfuron, cinosulfuron, cloransulam, cyclosulfamuron, diclosulam, ethametsulfuron, ethoxysulfuron, flazasulfuron, florasulam, flucarbazone, flucetosulfuron, flumetsulam, flupyrsulfuron, foramsulfuron, halosulfuron, imazamethabenz, imazamox, imazapic, imazapyr, imazaquin, imazethapyr, imazosulfuron, iodosulfuron, iofensulfuron, mesosulfuron, metazosulfuron, metosulam, metsulfuron, nicosulfuron, orthosulfamuron, oxasulfuron, penoxsulam, primisulfuron, propoxycarbazone, propyrisulfuron, prosulfuron, pyrazosulfuron, pyribenzoxim, pyriftalid, pyriminobac, pyrimisulfan, pyrithiobac, pyroxsulam, rimsulfuron, sulfometuron, sulfosulfuron, thiencarbazone, thifensulfuron, triasulfuron, tribenuron, trifloxysulfuron, triflusulfuron, tritosulfuron, agriculturally acceptable salts and esters thereof, and combinations thereof.

14. The method of claim 9, wherein the pyridine carboxylate herbicide is provided in amount of 0.1 g ae/ha to 300 g ae/ha.

15. The method of claim 9, wherein weight ratio of the pyridine carboxylate herbicide (in g ae/ha) to the ALS inhibitor (in g ai/ha) is from about 1:100 to about 20:1.

16. The method of claim 9, further comprising applying a safener.

17. The method of claim 9, further comprising applying an additional pesticide.

18. The method of claim 9, wherein the composition does not include a herbicidal active ingredient in addition to (a) and (b).

* * * * *